(12) United States Patent
Kato et al.

(10) Patent No.: US 8,400,371 B2
(45) Date of Patent: Mar. 19, 2013

(54) HEAD MOUNT DISPLAY

(75) Inventors: Shigeru Kato, Kawasaki (JP); Masaki Otsuki, Yokohama (JP); Nobuyuki Miyake, Hiratuka (JP); Kenzo Chiaki, Kawasaki (JP)

(73) Assignee: Nikon Corporation, Tokyo (JP)

( * ) Notice: Subject to any disclaimer, the term of this patent is extended or adjusted under 35 U.S.C. 154(b) by 700 days.

(21) Appl. No.: 12/430,637

(22) Filed: Apr. 27, 2009

(65) Prior Publication Data

US 2009/0243970 A1   Oct. 1, 2009

Related U.S. Application Data

(60) Division of application No. 11/154,893, filed on Jun. 16, 2005, now Pat. No. 7,542,012, which is a continuation of application No. PCT/JP03/16422, filed on Dec. 22, 2003.

(30) Foreign Application Priority Data

| Dec. 24, 2002 | (JP) | 2002-371994 |
|---|---|---|
| Jan. 31, 2003 | (JP) | 2003-23734 |
| Jan. 31, 2003 | (JP) | 2003-23735 |
| Jan. 31, 2003 | (JP) | 2003-23740 |
| Jan. 31, 2003 | (JP) | 2003-23744 |
| Jan. 31, 2003 | (JP) | 2003-25282 |
| Jan. 31, 2003 | (JP) | 2003-25292 |
| Feb. 13, 2003 | (JP) | 2003-34679 |

(51) Int. Cl.
*G09G 5/00* (2006.01)
(52) U.S. Cl. .................... 345/8; 359/630
(58) Field of Classification Search .......... 345/8
See application file for complete search history.

(56) References Cited

U.S. PATENT DOCUMENTS

| 4,695,129 | A | 9/1987 | Faessen et al. |
|---|---|---|---|
| 4,722,601 | A | 2/1988 | McFarlane |
| 4,947,348 | A | 8/1990 | Van Arsdell |
| 5,059,957 | A | 10/1991 | Todoriki et al. |
| 5,479,224 | A | 12/1995 | Yasugaki et al. |
| 5,485,172 | A | 1/1996 | Sawachika et al. |
| 5,671,037 | A | 9/1997 | Ogasawara et al. |
| 5,739,797 | A | 4/1998 | Karasawa et al. |
| 5,782,639 | A | 7/1998 | Beal |
| 5,793,339 | A | 8/1998 | Takahashi |
| 5,798,850 | A | 8/1998 | Ishikawa et al. |
| 5,808,801 | A | 9/1998 | Nakayama et al. |

(Continued)

FOREIGN PATENT DOCUMENTS

| JP | 62-058966 U | 4/1987 |
|---|---|---|
| JP | 02-063379 A | 3/1990 |

(Continued)

*Primary Examiner* — Amare Mengistu
*Assistant Examiner* — Shawna Stepp Jones
(74) *Attorney, Agent, or Firm* — Holtz, Holtz, Goodman & Chick, P.C.

(57) ABSTRACT

The head mounted display of the present invention has a display part for displaying images to the wearer, a supporting part which supports the display part, which is fed out into a position in front of as eye from a position that is not located in front of the face, and which is moved from this position in front of as eye into this position that is not located in front of the face, and a mounting part which holds this supporting part, and which is mounted on the wearer in a position that is not located in front of the face, and is constructed so that the supporting part can move past the side of the head along the contour of the head. As a result, a display device is produced which is relatively free of unsightliness with respect to the wearer.

9 Claims, 71 Drawing Sheets

U.S. PATENT DOCUMENTS

| | | | |
|---|---|---|---|
| 5,815,126 A * | 9/1998 | Fan et al. | 345/8 |
| 5,825,456 A | 10/1998 | Tabata et al. | |
| 5,844,824 A | 12/1998 | Newman et al. | |
| 5,880,773 A | 3/1999 | Suzuki | |
| 5,886,735 A | 3/1999 | Bullister | |
| 6,011,653 A | 1/2000 | Karasawa | |
| 6,040,945 A | 3/2000 | Karasawa | |
| 6,050,717 A | 4/2000 | Kosugi et al. | |
| 6,067,190 A | 5/2000 | Kelly | |
| 6,081,304 A | 6/2000 | Kuriyama et al. | |
| 6,108,716 A | 8/2000 | Kimura et al. | |
| 6,172,657 B1 | 1/2001 | Kamakura et al. | |
| 6,181,304 B1 | 1/2001 | Robinson et al. | |
| 6,222,677 B1 | 4/2001 | Budd et al. | |
| 6,234,446 B1 | 5/2001 | Patterson | |
| 6,288,689 B1 | 9/2001 | Shikama | |
| 6,292,158 B1 | 9/2001 | Amafuji et al. | |
| 6,317,103 B1 * | 11/2001 | Furness et al. | 345/8 |
| 6,324,005 B1 | 11/2001 | Kodama | |
| 6,359,602 B1 | 3/2002 | Amafuji et al. | |
| 6,380,997 B1 | 4/2002 | Sharp et al. | |
| 6,388,640 B1 | 5/2002 | Chigira et al. | |
| 6,421,031 B1 | 7/2002 | Ronzani et al. | |
| 6,424,321 B1 | 7/2002 | Ronzani et al. | |
| 6,445,363 B1 | 9/2002 | Urisaka | |
| 6,452,572 B1 | 9/2002 | Fan et al. | |
| 6,464,363 B1 | 10/2002 | Nishioka et al. | |
| 6,515,853 B2 | 2/2003 | Saito | |
| 6,529,331 B2 | 3/2003 | Massof et al. | |
| 6,539,208 B1 | 3/2003 | Mori | |
| 6,543,899 B2 | 4/2003 | Covannon et al. | |
| 6,600,461 B1 | 7/2003 | Okauchi et al. | |
| 6,822,623 B2 | 11/2004 | Kim et al. | |
| 6,900,925 B2 | 5/2005 | Kato et al. | |
| 6,940,714 B2 | 9/2005 | Helot et al. | |
| 7,031,922 B1 | 4/2006 | Kalinowski et al. | |
| 7,061,449 B2 | 6/2006 | Oya et al. | |
| 2001/0054989 A1 | 12/2001 | Zavracky et al. | |
| 2002/0005819 A1 | 1/2002 | Ronzani et al. | |
| 2002/0067466 A1 | 6/2002 | Covannon et al. | |
| 2002/0118273 A1 | 8/2002 | Chandra | |
| 2002/0118506 A1 | 8/2002 | Saito | |
| 2002/0149545 A1 | 10/2002 | Hanayama et al. | |
| 2002/0158823 A1 | 10/2002 | Zavracky et al. | |
| 2002/0158827 A1 | 10/2002 | Zimmerman | |
| 2002/0163486 A1 | 11/2002 | Ronzani et al. | |
| 2002/0171605 A1 | 11/2002 | Kim et al. | |
| 2002/0171793 A1 | 11/2002 | Sharp et al. | |
| 2002/0190923 A1 | 12/2002 | Ronzani et al. | |
| 2003/0058543 A1 | 3/2003 | Sheedy et al. | |
| 2003/0090437 A1 | 5/2003 | Adams | |
| 2003/0091966 A1 | 5/2003 | Collodi | |
| 2003/0104850 A1 | 6/2003 | Lai et al. | |
| 2004/0004584 A1 | 1/2004 | Hebert | |
| 2006/0018027 A1 | 1/2006 | Yamasaki | |
| 2006/0192306 A1 | 8/2006 | Giller et al. | |
| 2006/0221266 A1 | 10/2006 | Kato et al. | |
| 2006/0238878 A1 | 10/2006 | Miyake et al. | |

FOREIGN PATENT DOCUMENTS

| | | |
|---|---|---|
| JP | 04-233589 A | 8/1992 |
| JP | 04-341078 A | 11/1992 |
| JP | 05-304646 A | 11/1993 |
| JP | 05-328256 A | 12/1993 |
| JP | 06-070268 A | 3/1994 |
| JP | 06-250101 A | 9/1994 |
| JP | 06-324284 A | 11/1994 |
| JP | 06-337389 A | 12/1994 |
| JP | 7-075038 A | 3/1995 |
| JP | 07-75080 A | 3/1995 |
| JP | 9-504120 A | 4/1995 |
| JP | 07-121093 A | 5/1995 |
| JP | 07-234376 A | 9/1995 |
| JP | 07-239447 A | 9/1995 |
| JP | 07-244253 A | 9/1995 |
| JP | 07-284041 A | 10/1995 |
| JP | 07-311362 A | 11/1995 |
| JP | 08-021974 A | 1/1996 |
| JP | 08-082762 A | 3/1996 |
| JP | 08-166557 A | 6/1996 |
| JP | 08-168059 A | 6/1996 |
| JP | 08-304734 A | 11/1996 |
| JP | 08-313844 A | 11/1996 |
| JP | 08-320453 A | 12/1996 |
| JP | 09-018756 A | 1/1997 |
| JP | 09-152563 A | 6/1997 |
| JP | 09-159965 A | 6/1997 |
| JP | 09-261556 A | 10/1997 |
| JP | 09-318905 A | 12/1997 |
| JP | 10-074051 A | 3/1998 |
| JP | 10-142551 A | 5/1998 |
| JP | 10-327373 A | 12/1998 |
| JP | 11-064781 A | 3/1999 |
| JP | 11-133348 A | 5/1999 |
| JP | 11-136598 A | 5/1999 |
| JP | 11-136602 A | 5/1999 |
| JP | 11-142782 A | 5/1999 |
| JP | 11-174991 A | 7/1999 |
| JP | 2000-111828 A | 4/2000 |
| JP | 2000-121989 A | 4/2000 |
| JP | 2000-184245 A | 6/2000 |
| JP | 2000-249967 A | 9/2000 |
| JP | 2000-249972 A | 9/2000 |
| JP | 2000-249974 A | 9/2000 |
| JP | 2000-330070 A | 11/2000 |
| JP | 2000-352689 A | 12/2000 |
| JP | 2001-013941 A | 1/2001 |
| JP | 2001-075496 A | 3/2001 |
| JP | 2001-264682 A | 9/2001 |
| JP | 2001-330794 A | 11/2001 |
| JP | 2002-162597 A | 6/2002 |
| JP | 2002-258488 A | 9/2002 |
| JP | 2002-311379 A | 10/2002 |
| JP | 2003-140079 A | 5/2003 |
| JP | 2003-140081 A | 5/2003 |
| JP | 2004-061731 A | 2/2004 |
| JP | 2004-078057 A | 3/2004 |
| JP | 2004-080679 A | 3/2004 |
| JP | 2004-086190 A | 3/2004 |
| JP | 2004-240037 A | 8/2004 |
| WO | WO 95/11473 A | 4/1995 |
| WO | WO 96/00406 A1 | 1/1996 |
| WO | WO 97/31477 A | 8/1997 |
| WO | WO 97/34182 A | 9/1997 |
| WO | WO 00/10156 A | 2/2000 |

* cited by examiner

Fig. 21
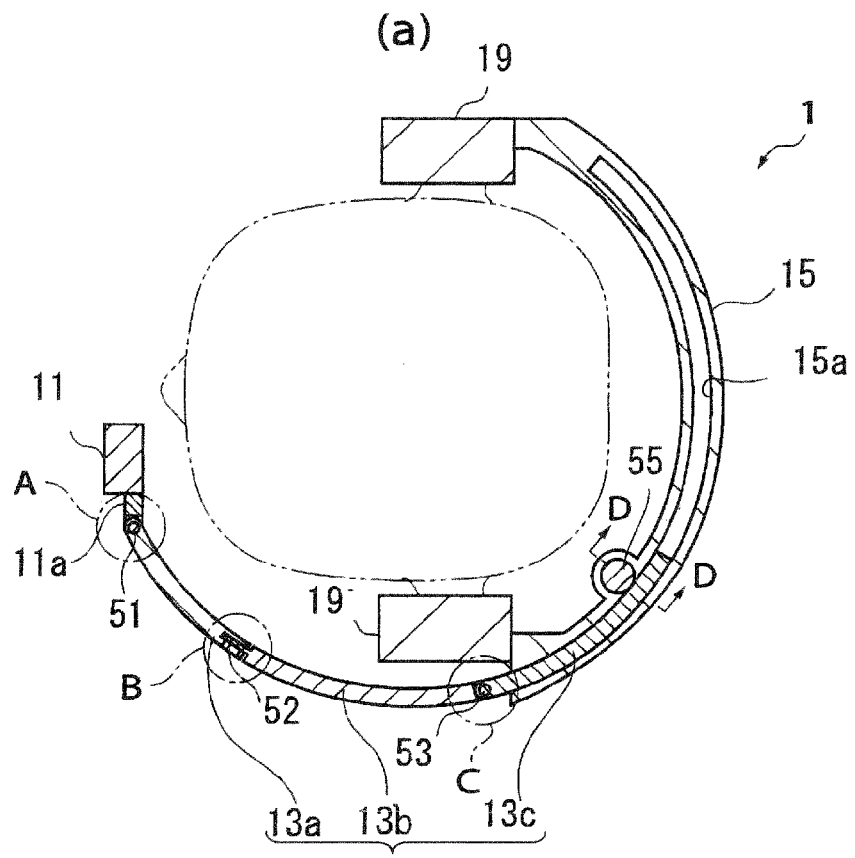
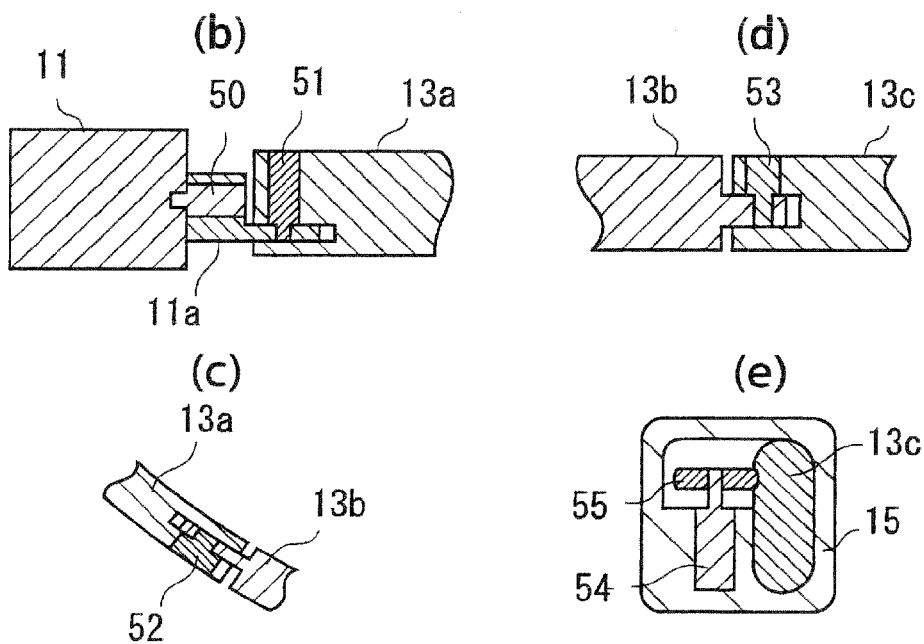

Fig. 32
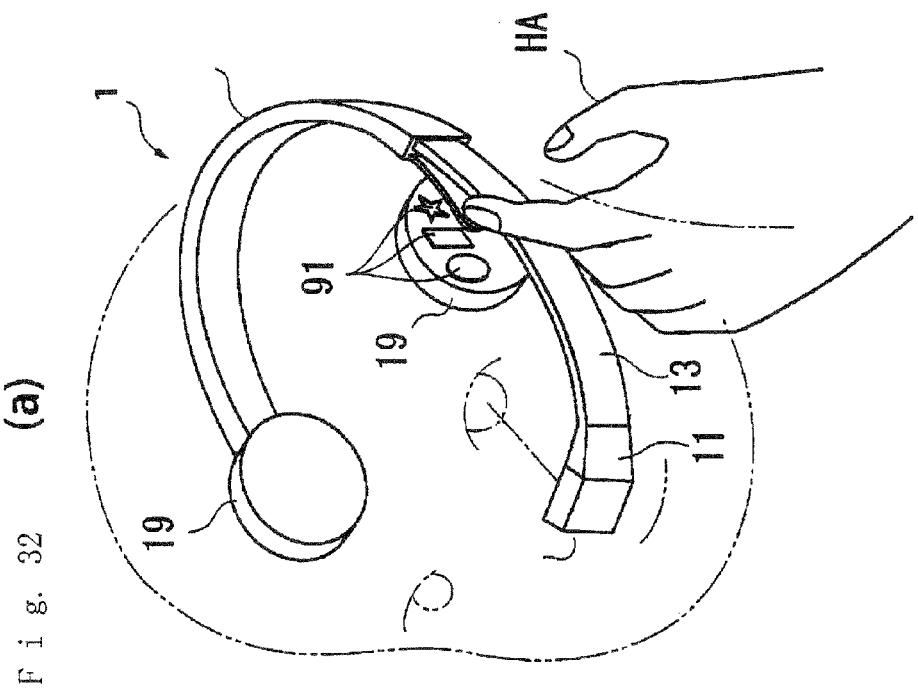
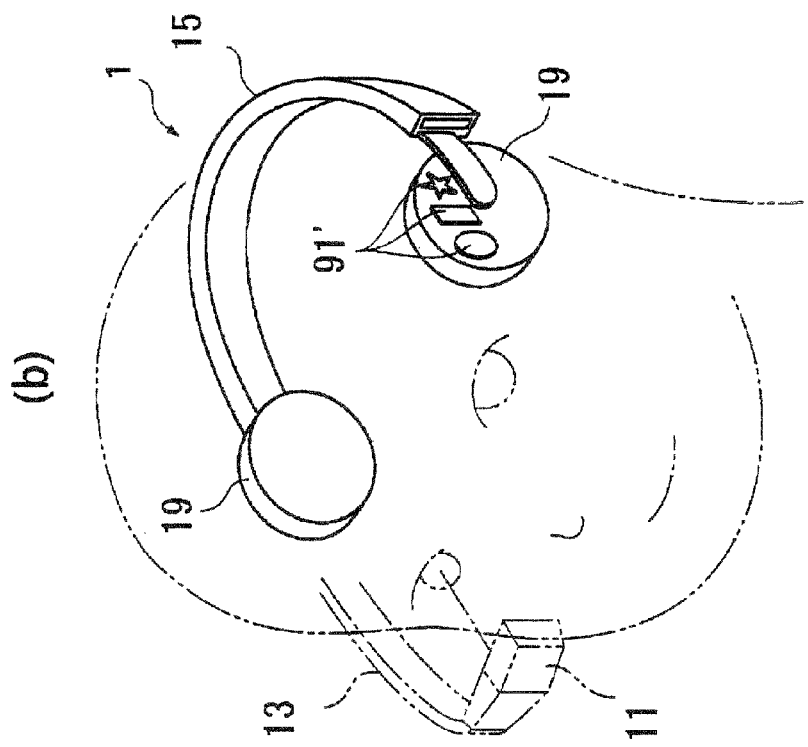

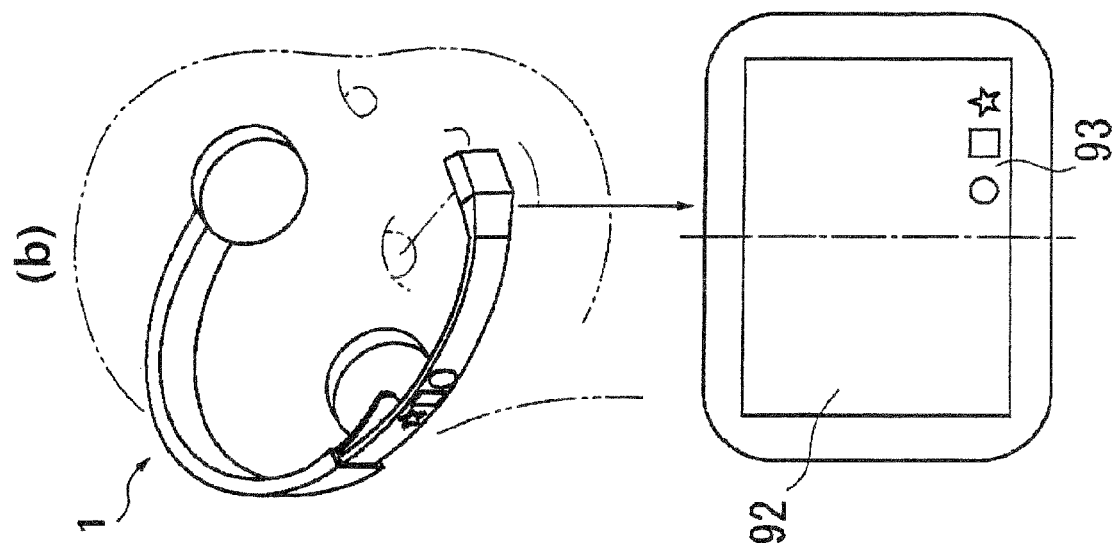
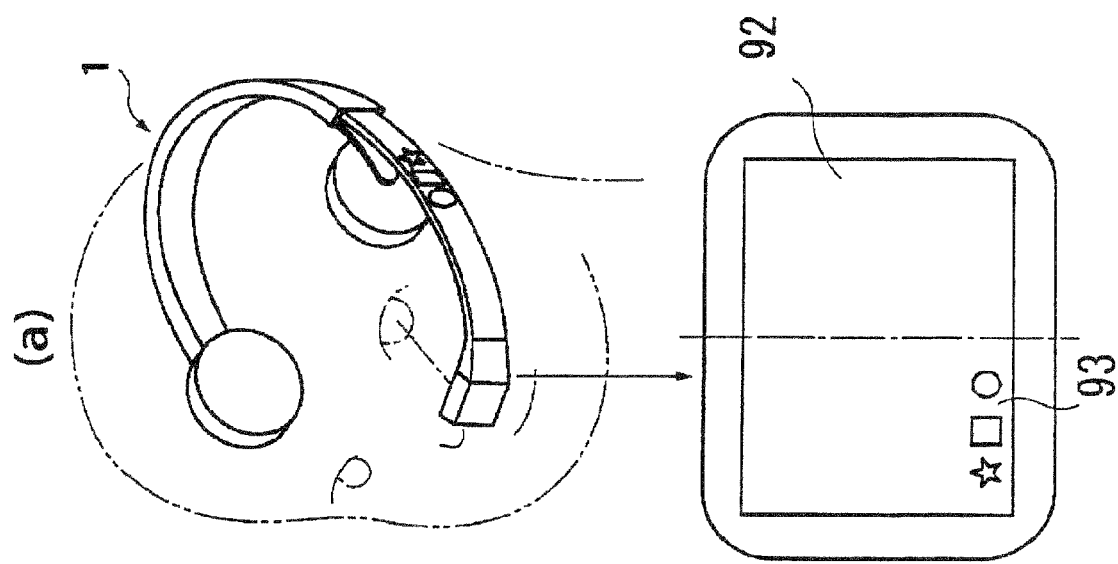
Fig. 34

Fig. 36
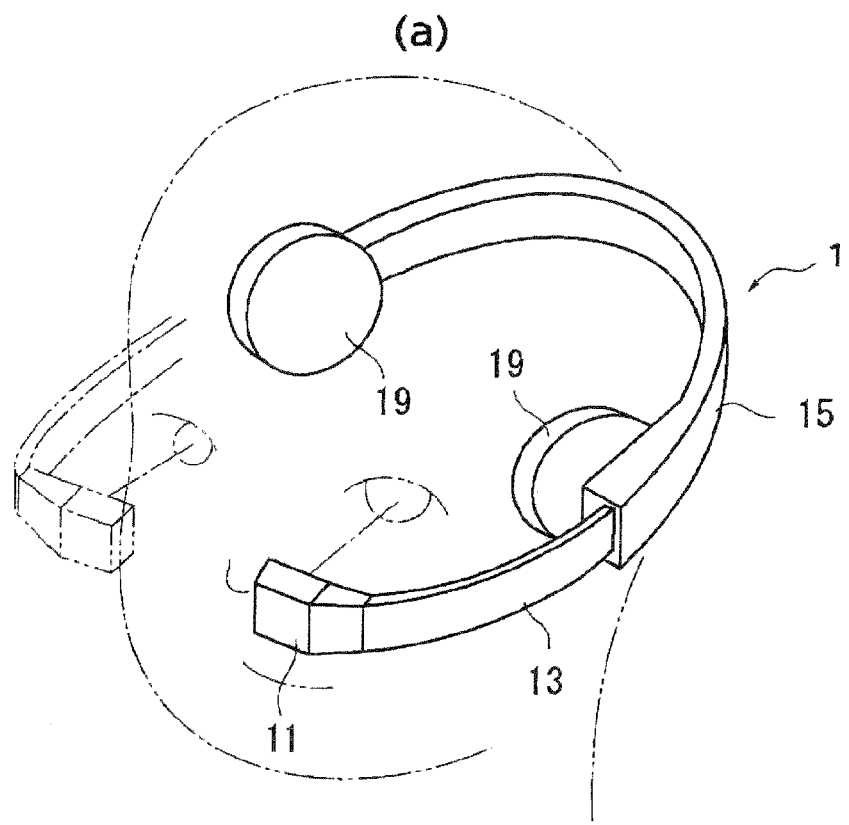
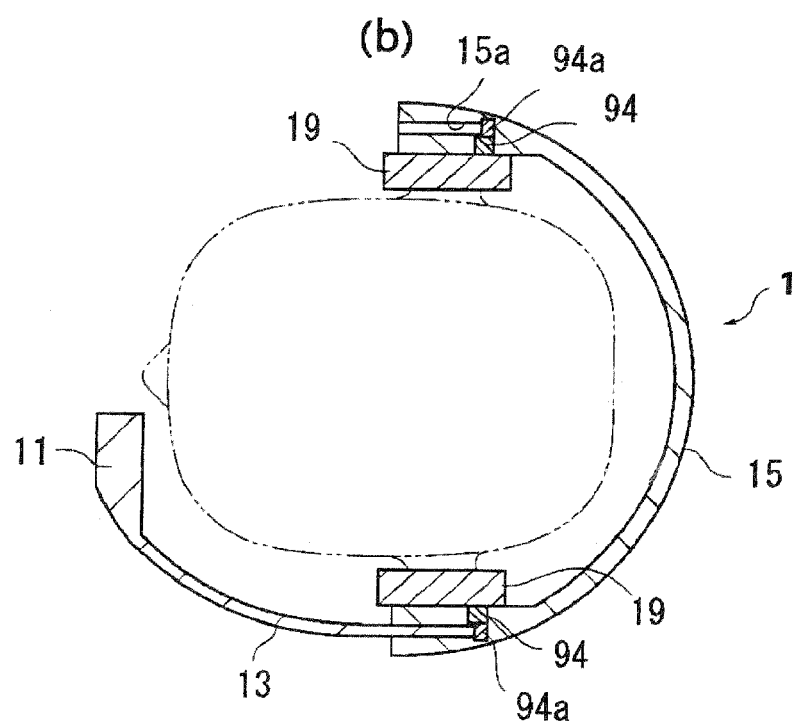

Fig. 64
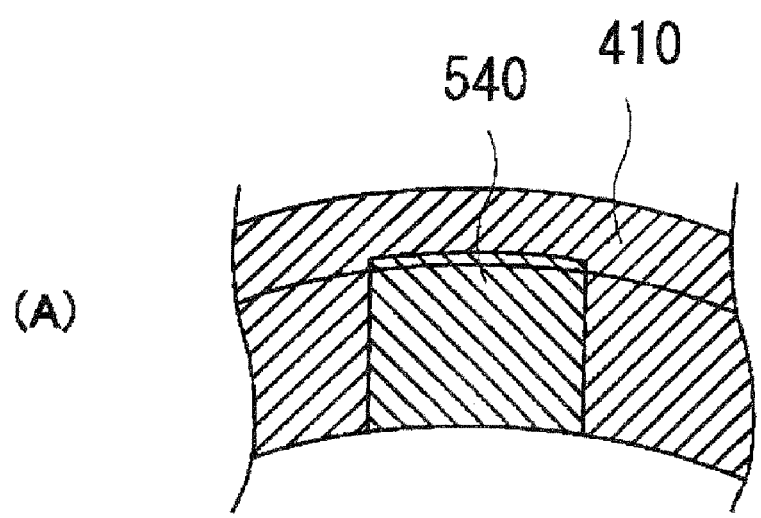
(A)
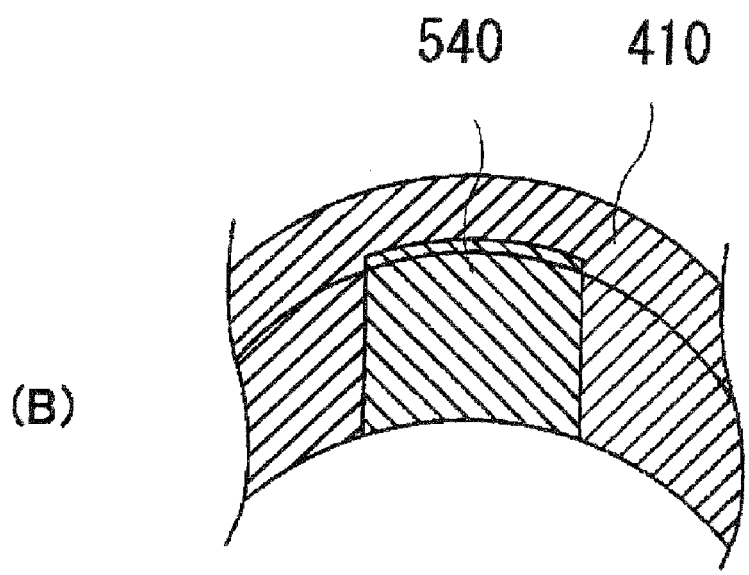
(B)

Fig. 67
(a)
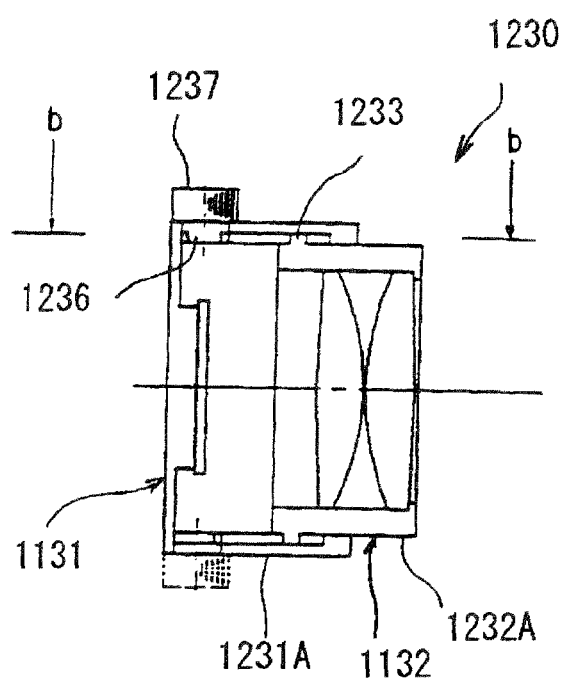
(b)
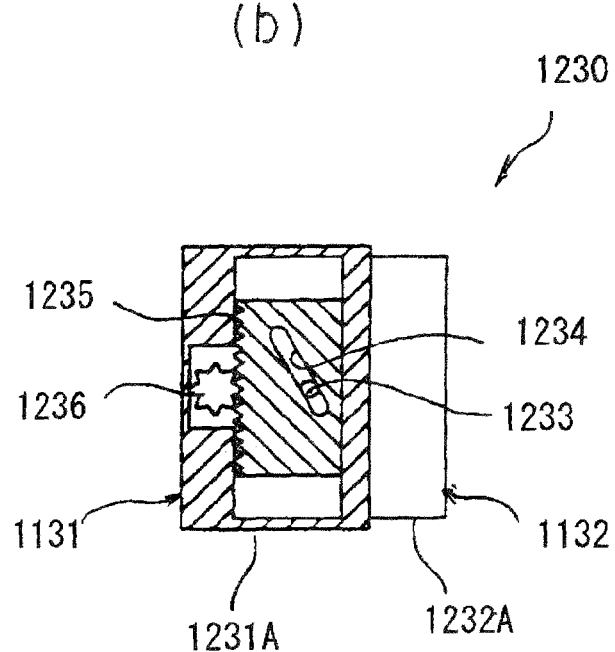

Fig. 72
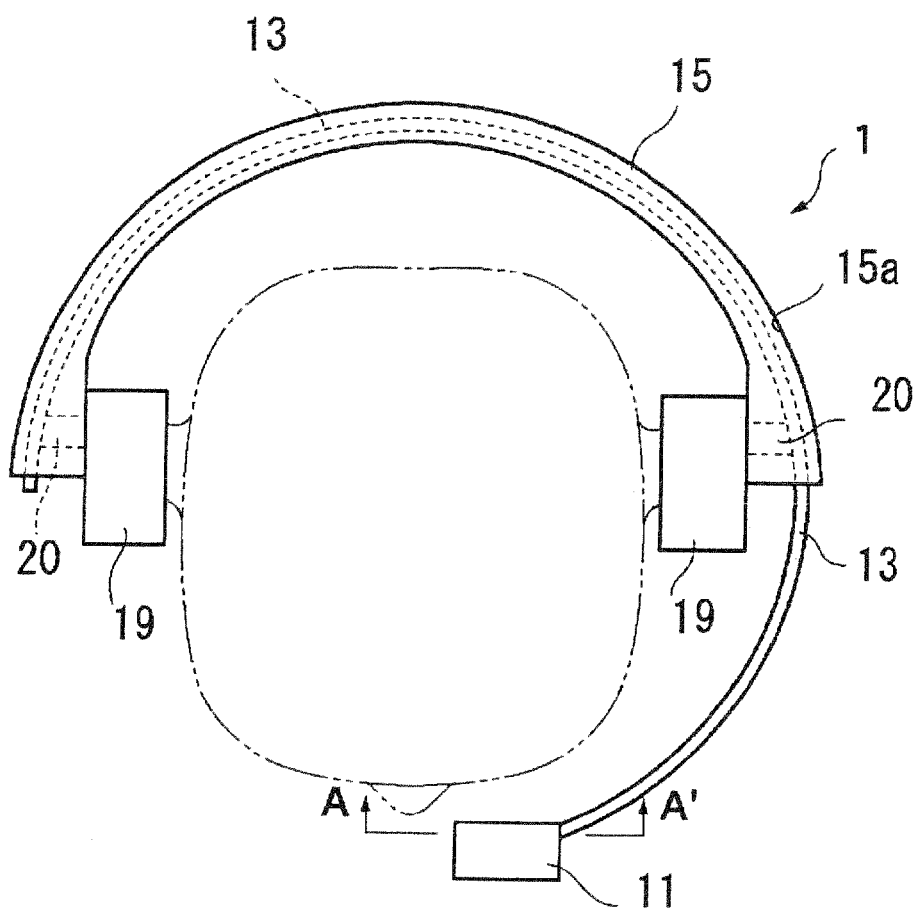
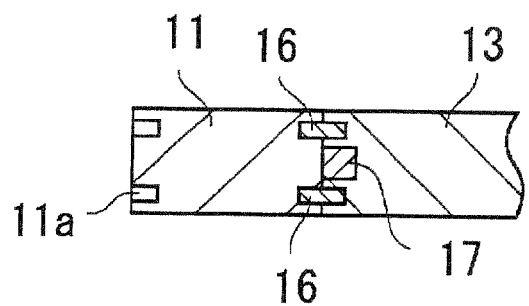

Fig. 73
(a)
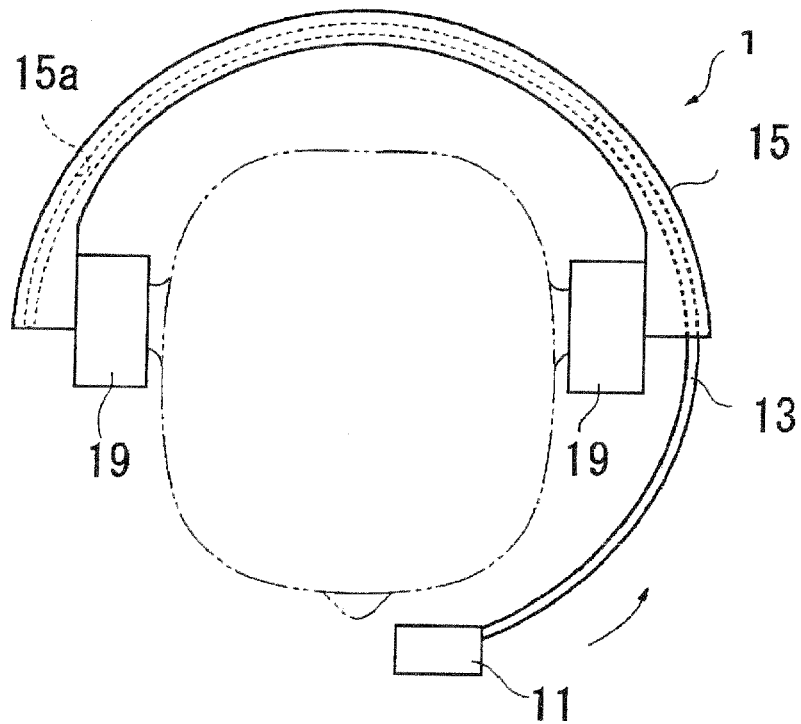
(b)
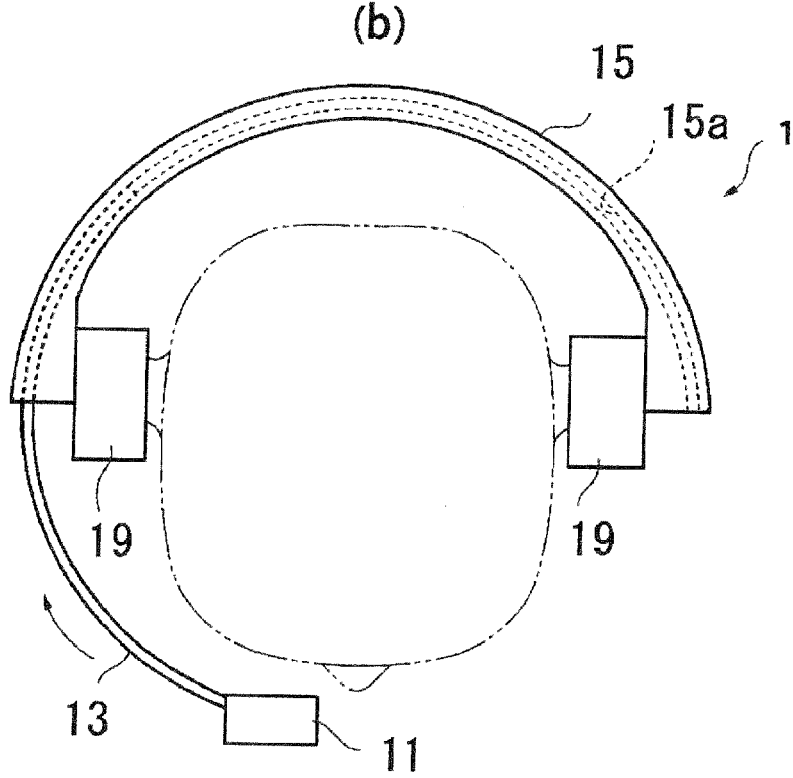

Fig. 74
(a)
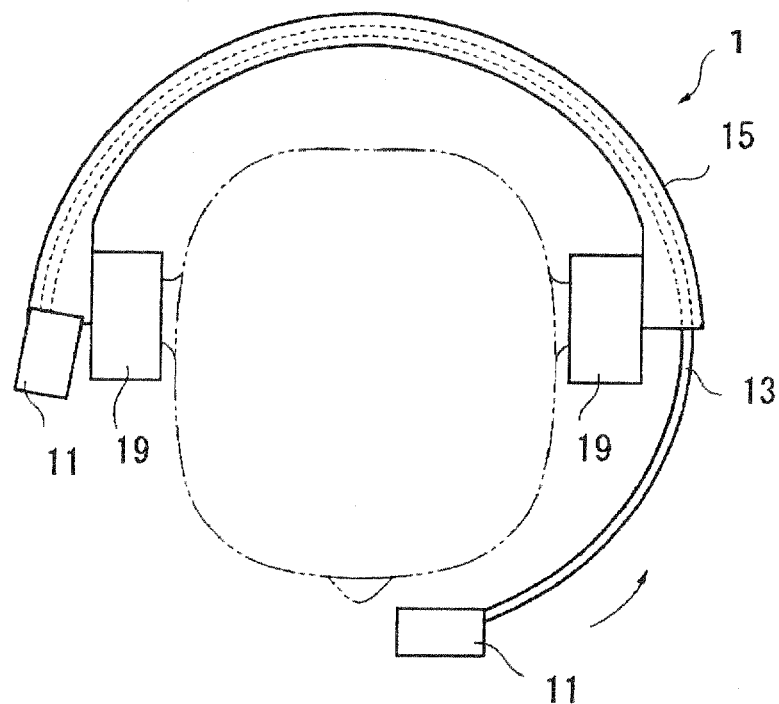
(b)
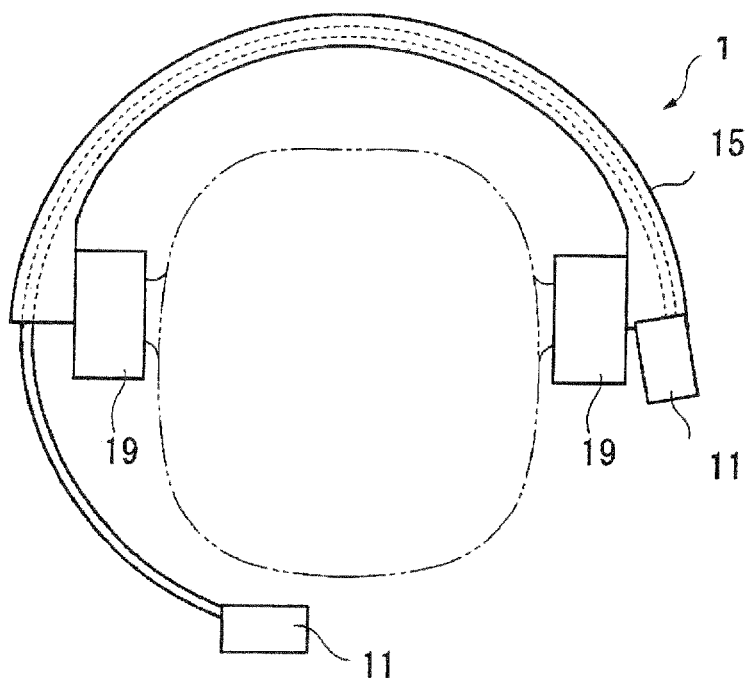

HEAD MOUNT DISPLAY

CROSS-REFERENCE TO RELATED APPLICATIONS

The present application is a Divisional Application of U.S. application Ser. No. 11/154,893 filed Jun. 16, 2005 now U.S. Pat. No. 7,542,012 which is a continuation of PCT International Application No. PCT/JP2003/016422 filed on Dec. 22, 2003, both of which are hereby incorporated by reference.

TECHNICAL FIELD

The present invention relates to a head mounted display which allows the observation of video images while mounted on the head.

BACKGROUND ART

Conventionally, video display devices which are used to observe video images while mounted on the head have been referred to as head mounted displays. For example, the displays disclosed in Japanese Patent Application Kokai No. H8-320453 and Japanese Patent Application Kokai No. H7-284041 are known as examples of such displays. In the head mounted displays disclosed in these patents, a holding part that holds a display part has a so-called hair band shape, and the display part is held in front of the eyes by mounting this holding part on the forehead.

However, in the case of such conventional head mounted displays, when the display is mounted on the head, the holding part that holds the display part is positioned laterally along the forehead; accordingly, the following problem arises: namely, the display is relatively unsightly. Furthermore, especially in the case of women, the problem of cosmetics and the like adhering to the holding part also arises.

In most cases, such a video display device is constructed so that this device is mounted on the head in a form that is wrapped around the head; such display devices include a binocular type in which a video display system is formed in positions corresponding to both eyes, and a monocular type in which a video display system is formed in a position corresponding to only one eye, i.e., either the left eye or right eye. Of these two types, the binocular type is used mainly for the enjoyment of videos. In the case of monocular type displays, for example, use as display devices or the like in wearable personal computers, or as display devices that display instructions to workers, is expected.

Furthermore, although use as display devices or the like in wearable personal computers, or use as display devices that display instructions to workers, is expected in the case of display devices of the monocular type, switching of the display screen and the like, and operating members such as operating buttons that operate the image display, are required in both cases.

In such head mounted displays, numerous operating members such as buttons are ordinarily attached to a controller that is used to operate the display device and the like, and the display is operated by an action such as the pressing of these operating members. However, in the case of a head mounted display, since video images are displayed with the line of sight of the user blocked, it is difficult for the user to ascertain where the buttons or the like are located in the controller.

In Japanese Patent Application Kokai No. H11-174991, a method is described in which this problem is solved by disposing the buttons on different surfaces making up the controller, so that visual confirmation of the positions of the buttons is unnecessary. In this case, however, it is not possible to install a very large number of buttons; furthermore, the buttons are installed on a controller that is separate from the main body of the head mounted display. Accordingly, the controller and the display main body must be connected by a cable or the like.

Furthermore, in Japanese Patent Application Kokai No. H11-136598, the operating switch of a head mounted display that projects video images onto both eyes is attached to the main body of this head mounted display. However, in the case of a monocular head mounted display, since the eye onto which the video images are projected may be switched, it is necessary to construct the operating switch so that the feeling of operation does not vary greatly as a result of such switching. Moreover, especially in the case of a head mounted display of the type in which the eye that is used is switched by mounting the display with the up/down and left/right directions reversed at the time of mounting, it is desirable that the relative positions of the operating members not vary even when the up/down and left/right directions are reversed; furthermore, it is desirable to devise the display so that this relative positional relationship is reflected in the display device.

Furthermore, in the case of monocular type head mounted displays, the outside scene can be viewed with the eye that is not viewing video images; accordingly, such head mounted displays offer the following advantage: namely, such displays are relatively safe compared to binocular type head mounted displays. On the other hand, since different images are seen by both eyes, there is a problem in that concentration on the video image is impossible; furthermore, there are problems of eye fatigue and the like due to visual field competition.

As one countermeasure against this, a head mounted display which has a member that blocks light to the eye that is not observing video images has been disclosed in Japanese Patent Application Kokai No. H4-341078.

However, in the case of the head mounted display described in Japanese Patent Application Kokai No. H4-341078, since the light blocking member constantly covers one eye, safety problems occur in the same manner as in a binocular type head mounted display.

Furthermore, in the optical design inside the display part of a conventional head mounted display, since it is a prerequisite that the eye of the observer be disposed in a predetermined position (eye point), the observer can observe images in a favorable manner by utilizing the mounting fittings to align the eye and the eye point.

However, during actual use, the eye of the observer is not necessarily disposed at the eye point. For example, an observer using eyeglasses must place the lenses of the eyeglasses between an eye and the display part; accordingly, the position of an eye is inevitably before the eye point. Furthermore, in cases where the observer moves or the like while wearing the head mounted display, an eye may be intentionally shifted from the eye point, so that the observer observes the images of the head mounted display while viewing the outside world. In cases where the display is thus used with an eye shifted from the eye point, a loss of the peripheral portions of the images is unavoidable.

Furthermore, in cases where the display device is devised so that the display part can be displaced between a protruding state and a retracted state, the user must perform an operation that causes the image output part to protrude each time that the user uses the display. Furthermore, following the completion of use, the user must perform an operation that retracts the image output part. Accordingly, a problem is predicted whereby the display will be bothersome to use.

Furthermore, when the user utilizes the head mounted display device, various utilization scenarios may be envisioned, such as outdoor use and desk work. The distance from the ordinary user to the object of observation naturally differs for each of these utilization scenarios. For example, this distance is approximately 50 cm in the case of desk work, several meters in the case of use in an electric train, and infinity in the case of outdoor applications. Utilization in which the head mounted display switches between the outside scene and video images inside the device is also conceivable; in such cases, however, the user must observe while adjusting the focus between the outside scene and the video images, so that the user easily becomes fatigued. Furthermore, the manner of feeling also varies among individuals. In addition, there are differences between the left and right in individuals.

DISCLOSURE OF THE INVENTION

The present invention was devised in order to solve such conventional problems. The first object of the present invention is to provide a head mounted display which is relatively free of unsightliness (with respect to the person mounting the display), and moreover to provide a head mounted display which allows the setting of a plurality of positions of the display part.

The second object of the present invention is to provide a head mounted display in which the operability of the operating members is improved, and a head mounted display in which the state of the operating members can be displayed in the display part.

The third object of the present invention is to provide a head mounted display in which a light blocking member can be appropriately inserted into the visual field and removed to the outside of the visual field.

The fourth object of the present invention is to provide an image display device which can prevent image dropout caused by a shift in the positional relationship between the display part and an eye.

The fifth object of the present invention is to provide a head mounted display which is devised so that the display part can be displaced between a protruding state and a retracted state, and so that this can be accomplished by means of a driving device.

The sixth object of the present invention is to provide a head mounted display which can handle all types of conditions such as various utilization scenarios, individual differences, and differences in visual acuity between the left and right.

The respective inventions described below have the object of achieving at least one of these objects.

The first invention that is used to achieve the objects described above is a head mounted display having a display part used to display images to the wearer of the display, a supporting part which supports the display part, which is fed out into a position in front of an eye from a position that is not located in front of the face, and which is moved from this position in front of an eye into this position that is not located in front of the face, and a mounting part which holds this supporting part, and which is mounted on the wearer in a position that is not located in front of the face, this head mounted display being characterized in that the supporting part is constructed so that this supporting part can move past the side of the head along the contour of the head.

Here, the term "in front of an eye" refers to a position in which the display part can be used, and, in cases where the display part can be moved with respect to the supporting part, refers to positions in a range allowing movement of the display part into a usable position as a result of this movement.

The second invention that is used to achieve the objects described above is the first invention, which is further characterized in that an accommodating part that accommodates the supporting part is attached to the mounting part.

Specifically, in the present means, an accommodating part is disposed in the mounting part, and the supporting part can be accommodated in this accommodating part. In this invention, the supporting part can be accommodated in the accommodating part when the head mounted display is not in use, so that scratching of the supporting part can be prevented.

The third invention that is used to achieve the objects described above is the second invention, which is further characterized in that the distance between the side of the accommodating part that faces the head and the supporting part accommodating part is set so that this distance is equal to or greater than the width by which the display part extends to the inside from the supporting part when the supporting part is accommodated.

In this invention, a space that is equal to or greater than the width by which the display part extends to the inside from the supporting part when the supporting part is accommodated is present between the inside of the mounting part and the accommodated portion of the supporting part. Accordingly, the display part does not interfere even in cases where the supporting part is accommodated inside the mounting part up to the tip end portion.

The fourth invention that is used to achieve the objects described above is the first invention, which is further characterized in that the curvature radius of the mounting part and the curvature radius of the supporting part are substantially the same, and this curvature radius is set at a size which is greater than the radius of a circle circumscribing the back part of the head, and which is such that the display part does not contact the face when the supporting part is accommodated.

In this invention, since the curvature radius of the mounting part and the curvature radius of the supporting part are substantially the same, the supporting part can easily be accommodated inside the mounting part. Furthermore, the display part does not contact the face when the supporting part is accommodated while mounted on the head. Furthermore, the expression "curvature radius values are substantially the same" means that these curvature radius values need not be completely identical as long as these values are in a range that allows smooth accommodation at the time of accommodation.

The fifth invention that is used to achieve the objects described above is the first invention, which is further characterized in that the curvature radius of the portion of the mounting part that accommodates the supporting part is greater than the radius of a circle circumscribing the back part of the head, and has substantially the same radius as the radius of the supporting part, while the remaining portion of the mounting part has a radius that is smaller than this.

In this invention, the portion of the mounting part that does not accommodate the supporting part is formed with a small radius; accordingly, the mounting characteristics on the head can be improved, and this part can be made more compact.

The sixth invention that is used to achieve the objects described above is the first invention, which is further characterized in that the position of the display part can be varied in accordance with commands from the control part, a plurality of set positions of the display part are stored in the control part, an input device for selecting these set positions is provided, and the set positions of the display part include an accommodated position and an intermediate position of accommodation.

In this invention, the control device positions the display part in a set position that is input from the input device. Accordingly, if an appropriate position for the display part is input into the control device beforehand, then the display part can be positioned and used in this appropriate position merely by performing a simple setting. Furthermore, "position" is a concept including not only the position of the display part in three-dimensional space, but also the attitude of the display part.

The "accommodated position" is the so-called home position of the display part of the head mounted display (e.g., position of accommodation in the accommodating part formed in the mounting part or position of accommodation in the accommodating part attached to the mounting part), which is set, for example, in a location that is relatively removed from an eye compared to the intermediate position of accommodation or emergency retraction position, such as beside the ear and the back of the head. Furthermore, "accommodated" indicates that the display part is located in a position defined as an accommodated position. Specifically, this is not always limited to cases where the display part is accommodated inside the case as shown in the figures in the following working configurations.

In this invention, the display part can be placed in the accommodated position or placed in the intermediate position of accommodation by means of a simple input from the input device. Here, the intermediate position of accommodation is a position in which the display part is positioned when it is desired to guarantee the visual field by temporarily removing the display part from the image observation position; it is desirable that this be a position in which the display part is outside the visual field.

The seventh invention that is used to achieve the objects described above is the sixth invention, which is further characterized in that the intermediate position of accommodation is set in a position which is such that the display part does not block the visual field.

In this invention, since the intermediate position of accommodation is set in a position which is such that the display part does not block the visual field, interference with the visual field can be prevented by placing the display part in the intermediate position of accommodation in cases where the observation of images is temporarily interrupted.

The eighth invention that is used to achieve the objects described above is the sixth invention, which is further characterized in that the movement of the display part from the image observation position to the intermediate position of accommodation is performed only by the pivoting operation of the display part.

In this invention, since the movement of the display part from the image observation position to the intermediate position of accommodation is accomplished only by the pivoting operation of the display part, the display part can be moved from the image observation position to the intermediate position of accommodation quickly and by means of a simple operation.

The ninth invention that is used to achieve the objects described above is the sixth invention, which is further characterized in that the movement of the display part among the image observation position, accommodated position and intermediate position of accommodation is performed at a specified speed selected from a plurality of speeds.

In this invention, since the system is devised so that the movement of the display part among the image observation position, accommodated position and intermediate position of accommodation is performed at a specified speed selected from a plurality of speeds, the display is convenient to use.

The tenth invention that is used to achieve the objects described above is the ninth invention, which is further characterized in that the system is devised so that the movement of the display part up to the point where the display part leaves the visual field is performed at a high speed, while the movement of the display part after this display part has left the visual field is performed at a lower speed.

In this invention, since the movement of the display part up to the point where the display part leaves the visual field is performed at a high speed, the visual field can be ensured in a short time.

The eleventh invention that is used to achieve the objects described above is the first invention, which is further characterized in that this display is a head mounted display of the type that is mounted on the head in a reversed attitude according to the eye used, one or more operating members that are used to operate at least the images that are displayed on the display part are attached to the portion mounted on the head, and the shape or dimensions (or both) of at least one of the operating members differ from those of the other operating members.

In this invention, the operating members are attached to the portion of the head mounted display that is mounted on the head (i.e., the head mounted display main body part). In cases where the operating members are attached to this portion, the user cannot recognize the operating members by direct visual observation during use. Accordingly, the system is devised so that the shape or dimensions (or both) of at least one of these operating members are different from those of the other operating members.

In actuality, it is desirable to devise the system so that none of the shapes or dimensions are the same in all of the operating members. If this is done, the operator can discriminate the types of the operating members by touch without searching for the positions of the operating members, so that operating buttons with good operability can be obtained.

The twelfth invention that is used to achieve the objects described above is the eleventh invention, which is further characterized in that an audio output part is present in the portion that is mounted on the head, and the operating members are disposed in this audio output part.

Since the audio output part is mounted on the ear of the human being, if the operating members are disposed on this audio output part, the person using the display can easily recognize the positions of the operating members in sensual terms, so that a display with good operability is obtained The thirteenth invention that is used to achieve the objects described above is the first invention, which is further characterized in that an actuator is provided which is used to displace the display part between the position in front of the face and the position that is not in front of the face.

It is desirable that the display part be devised so that the supporting part is in a protruding state in a state in which the mounting part is mounted on the head of the user, and so that the display part is in a state that allows images to be viewed by the user when the display part is in the position in front of the face.

The fourteenth invention that is used to achieve the objects described above is the thirteenth invention, which is further characterized in that a sensor used as a starting trigger for the actuator is further provided, and this sensor detects variations that occur in specified parts of this head mounted display.

The fifteenth invention that is used to achieve the objects described above is the fourteenth invention, which is further characterized in that the supporting part that supports the display part is free to protrude or withdraw with respect to the mounting part, and the actuator causes displacement of the display part by causing the supporting part to protrude or withdraw with respect to the mounting part.

The sixteenth invention that is used to achieve the objects described above is the fifteenth invention, which is further characterized in that the mounting part consists of at least two members which are connected so that an angular displacement of these members is possible, and a driving member which drives these two members so that these members are caused to undergo an angular displacement in the direction that reduces the angle on the side on which the head of the user is to be clamped by this head mounted display, and the sensor is a sensor that detects the angular displacement generated in the two members.

The seventeenth invention that is used to achieve the objects described above is the fourteenth invention, which is further characterized in that this display further comprises a contact part which is connected to the mounting part and which contacts the ear of the user, and the sensor is a sensor that detects the pressure that is applied between the mounting part and the contact part.

The eighteenth invention that is used to achieve the objects described above is the fourteenth invention, which is further characterized in that the sensor is a sensor that detects bending of the mounting part.

The nineteenth invention that is used to achieve the objects described above is the fourteenth invention, which is further characterized in that the sensor is a sensor that detects variation in the dielectric constant generated in the space where the head of the user on which this head mounted display is mounted is to be present.

The twentieth invention that is used to achieve the objects described above is the thirteenth invention, which is further characterized in that this display comprises a sensor that detects the presence or absence of mounting of the mounting part on the head of the user, and an actuator driving device that controls the actuator in accordance with the output of this sensor during the driving of the power supply.

The twenty-first invention that is used to achieve the objects described above is the twentieth invention, which is further characterized in that the actuator driving device controls the actuator so that the display part is positioned in the position in front of the face when mounting on the head is detected by the sensor, and controls the actuator so that the display part is positioned in the position that is not in front of the face when mounting on the head cannot be detected by the sensor.

The twenty-second invention that is used to achieve the objects described above is the twentieth invention, which is further characterized in that this display has power supply control means for controlling the driving and stopping of the power supply, and the actuator driving device controls the driving of the actuator in accordance with the output of the sensor and instructions to the power supply control means.

The twenty-third invention that is used to achieve the objects described above is the twenty-second invention, which is further characterized in that this display comprises off-delay means for stopping the power supply after a specified time has passed when an instruction to stop the power supply is input into the power supply control means, and the actuator driving device controls the actuator so that the display part is positioned in the position that is not in front of the face when an instruction to stop the power supply is input into the power supply control means and mounting on the head cannot be detected by the sensor.

The twenty-fourth invention that is used to achieve the objects described above is the twenty-third invention, which is further characterized in that the actuator driving device moves the display part to the position that is not in front of the face during a specified time set by the off-delay means.

The twenty-fifth invention that is used to achieve the objects described above is the twenty-second invention, which is further characterized in that the actuator driving device controls the actuator so that the display part is positioned in the position that is not in front of the face when an instruction to stop the power supply is input into the power supply control means and mounting on the head cannot be detected by the sensor, and the power supply control means receives an indication that the display part is positioned in the position that is not in front of the face, and stops the power supply.

The twenty-sixth invention that is used to achieve the objects described above is the twenty-second invention, which is further characterized in that the power supply is a battery or charging cell, the power supply control means has residual power detection means for detecting the residual amount of this battery's power, and the display part displays the state of the residual amount of the battery power according to the output of the residual power detection means.

The twenty-seventh invention that is used to achieve the objects described above is the twenty-sixth invention, which is further characterized in that the actuator driving device controls the actuator so that the display part is positioned in the position that is not in front of the face after the display part displays a message relating to the residual amount of the battery power when the residual amount of the battery power drops below a specified amount according to information relating to the residual amount of the battery power that is output from the residual power detection means, and the power supply control means cuts off the power supply when the display part reaches the position that is not in front of the face.

The twenty-eighth invention that is used to achieve the objects described above is the twenty-seventh invention, which is further characterized in that the actuator driving device controls the actuator so that the display part is positioned in the position that is not in front of the face in accordance with information relating to both the residual amount of the battery power and the detection of mounting on the head by the sensor.

The twenty-ninth invention that is used to achieve the objects described above is the twenty-second invention, which is further characterized in that in cases where an instruction to start the driving of the power supply is sent to the power supply control means and mounting on the head is not detected by the sensor, the actuator driving device controls the actuator so that the display part is positioned in the position that is in front of the face.

The thirtieth invention that is used to achieve the objects described above is the twenty-second invention, which is further characterized in that in cases where an instruction to start the driving of the power supply is sent to the power supply control means and mounting on the head is not detected by the sensor, the actuator driving device controls the actuator so that the display part is positioned in the second position.

The thirty-first invention that is used to achieve the objects described above is the twenty-second invention, which is further characterized in that in cases where an instruction to start the driving of the power supply is sent to the power supply control means and mounting on the head is not detected by the sensor, the actuator driving device controls the actuator so that the display part is positioned in the position that is not in front of the face if the display part is positioned in the position that is in front of the face, and controls the actuator so that the display part is positioned in the position that is in front of the face if the display part is positioned in the position that is not in front of the face.

The thirty-second invention that is used to achieve the objects described above is the twenty-second invention, which is further characterized in that in cases where an instruction to start the driving of the power supply is sent to the power supply control means and mounting on the head is not detected by the sensor, the actuator driving device controls the actuator so that the display part is placed in a state which allows the selection of either the position that is in front of the face or the position that is not in front of the face.

The thirty-third invention that is used to achieve the objects described above is the first invention, which is further characterized in that this display has light blocking means for covering the eye that is not viewing video images, and has means for prompting the respective switched use of the display part on the eye on the side on which the light blocking means is being used, and of the light blocking means on the eye on the side on which the display part is being used.

If a state is continued for an excessively long period of time in which images are observed with only one eye while the other eye is covered by the light blocking plate, eye fatigue and mental fatigue occur, so that there is a danger that such a situation is not good for one's health. In this invention, since the switching of the eye using the display part and the eye using the light blocking means is prompted at appropriate times, the occurrence of such a state can be prevented.

The thirty-fourth invention that is used to achieve the objects described above is the thirty-third invention, which is further characterized in that the means for prompting the switched use prompts this switched use on the basis of the length of time that the video images have been displayed.

In this invention, since switched use is prompted on the basis of the time for which the video images are displayed, the continued viewing of video images by the same eye for a period of time exceeding a fixed period of time can be prevented.

The thirty-fifth invention that is used to achieve the objects described above is the thirty-third invention, which is further characterized in that this display has light blocking means for covering the eye that is not observing video images, and a structure that allows switching between a state in which the eye is covered by the light blocking means and a state in which the eye is not covered by the light blocking means, and the state in which the eye is not covered by the light blocking means is formed by retracting the light blocking means to the outside of the visual field of the eye that is not observing video images.

In this invention, since the light blocking means is retracted to the outside of the visual field of the eye that is not observing video images, the system can be securely devised so that there is no interference with the visual field of the eye that is not observing video images.

The thirty-sixth invention that is used to achieve the objects described above is the thirty-fifth invention, which is further characterized in that the state in which the eye is not covered by the light blocking means is formed by retracting the light blocking means to the back surface of the display part.

In this invention, the system is devised so that a state in which the light blocking means does not cover the eye can be obtained by retracting the light blocking means to the back surface of the display part. Accordingly, the back surface of the display part can be effectively utilized.

The thirty-seventh invention that is used to achieve the objects described above is the thirty-fifth invention, which is further characterized in that this display further comprises a supporting part to which the display part is attached and the light blocking means, and a portion of the light blocking means is accommodated inside the mounting part, so that a state is produced in which the eye is not covered.

In this invention, the system is devised so that a state in which the light blocking means does not cover the eye is obtained by accommodating a portion of the light blocking means inside the mounting part. Accordingly, a state in which the light blocking means does not cover the eye can be realized using a simple structure.

The thirty-eighth invention that is used to achieve the objects described above is a head mounted display having a display part for displaying images to the wearer, and a mounting part which directly or indirectly holds the display part and is mounted on the wearer in a position other than a position in front of the face of the wearer, this head mounted display being characterized in that the display part has a two-dimensional display element and an ocular optical system that forms a false image of the display screen of this two-dimensional display element, and has the function of controlling the image data that is displayed on the two-dimensional display element in accordance with the positional relationship between the two-dimensional display element and the wearer, and, this head mounted display being further characterized in that a circuit part is present which displays images on the display screen of the two-dimensional display element, the mounting part can mount the display part on the head of the observer so that the position where the false image is formed is substantially in front of an eye of the observer, and the circuit part can alter the display magnification rate of the images on the display screen.

The thirty-ninth invention that is used to achieve the objects described above is the thirty-eighth invention, which is further characterized in that an adjustment mechanism that is used to adjust the positional relationship between an eye of the observer and the display part is disposed in the mounting means.

The fortieth invention that is used to achieve the objects described above is the thirty-ninth invention, which is further characterized in that this display further comprises measurement means for acquiring data relating to the positional relationship between an eye of the observer and the display part and data relating to the variation in this positional relationship, and the circuit part alters the display magnification rate in accordance with the data acquired by the measurement means.

The forty-first invention that is used to achieve the objects described above is the thirty-ninth invention, which is further characterized in that the measurement means acquires the data on the basis of the state of the adjustment mechanism.

The forty-second invention that is used to achieve the objects described above is the thirty-eighth invention, which is further characterized in that this display further comprises a circuit part that displays images on the display screen of the two-dimensional display element, the mounting part can mount the display part on the head of the observer so that the position where the false image is formed is substantially in front of an eye of the observer, input means for inputting instructions from the observer is provided, and the circuit part can alter the display magnification rate in accordance with instructions that are input via the input means.

The forty-third invention that is used to achieve the objects described above is the forty-second invention, which is further characterized in that an adjustment mechanism for adjusting the positional relationship of an eye of the observer and the display part is disposed in the mounting means.

The forty-fourth invention that is used to achieve the objects described above is a head mounted display device comprising a display part consisting of a two-dimensional display element for displaying video images, an ocular optical system that forms a false image from this two-dimensional display element, and an outer covering part that accommodates the two-dimensional display element part and ocular optical system, this head mounted display being characterized in that the distance between the two-dimensional display element and the ocular optical system can be displaced in relative terms, and this head mounted display being characterized in that this display comprises driving means for causing the displacement of the distance between the two-dimensional display element and the ocular optical system in relative terms, storage means for storing information relating to the distance between the display device part and the optical lens part, and control means for controlling the driving means on the basis of information relating to the distance between the two-dimensional display element and the ocular optical system from the storage means.

The forty-fifth invention that is used to achieve the objects described above is the forty-fourth invention, which is further characterized in that detection means for detecting up and down in the display part, or setting means for setting the distance between the two-dimensional display element part and the ocular optical system, or both, are provided, and in accordance with the output of the detection means or the setting means, the control means obtains information relating to the distance between the two-dimensional display element and the ocular optical system stored in the storage means, and sets the driving means.

BRIEF DESCRIPTION OF THE DRAWINGS

FIG. 21 shows explanatory diagrams illustrating an eighteenth working configuration of the present invention.

FIG. 32 shows schematic diagrams illustrating a twenty-fifth working configuration of the present invention in which operating buttons are attached to the head mounted display main body.

FIG. 34 shows schematic diagrams illustrating an example which is devised so that the layout of the operating buttons is displayed on the screen of the display device.

FIG. 36 shows schematic diagrams illustrating how the head mounted display main body part of a head mounted display constituting a twenty-eighth working configuration of the present invention is mounted on the head, with FIG. 36(*a*) showing a perspective view, and FIG. 36(*b*) showing a sectional plan view.

FIG. 64 shows explanatory diagrams illustrating the detection operation of the detection sensor used in the head mounted display constituting a forty-first working configuration of the present invention.

FIG. 67(a) is a schematic diagram showing a section of the video image display part of a head mounted display device constituting a forty-third working configuration of the present invention. FIG. 67(b) is a sectional view along line b-b in FIG. 67(a).

FIG. 72 shows a plan view (seen from the upper surface of the head part) and a partial sectional view of the mounted state of the head mounted display main body part shown in FIG. 71.

FIG. 73 shows schematic diagrams illustrating the mounted state in a case where the main body part of a head mounted display constituting a forty-seventh working configuration of the present invention is mounted on the head.

FIG. 74 shows schematic diagrams illustrating the mounted state in a case where the main body part of a head mounted display constituting a forty-eighth working configuration of the present invention is mounted on the head.

BEST MODE FOR CARRYING OUT THE INVENTION

Working configurations of the present invention will be described in detail below with reference to the figures.

(First Working Configuration)

Figure 1:
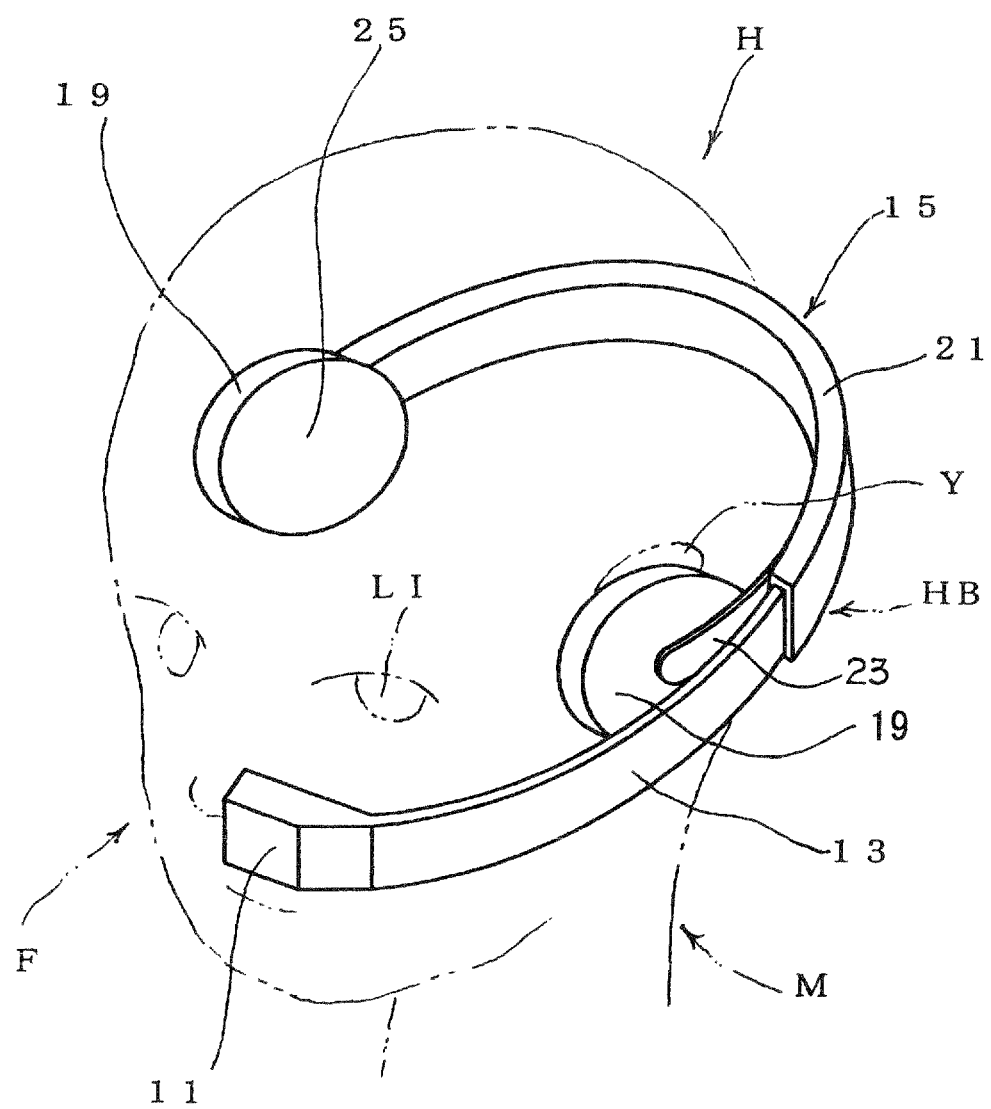
FIG. 1 is a perspective view showing a first working configuration of the display device of the present invention.

FIG. 1 shows a first working configuration of the display device of the present invention.

The display device of this working configuration has a display part 11 constituting display means for displaying images to the wearer M. In this working configuration, the display part 11 displays images only to the left eye LI of the wearer M. The display part 11 is supported on a mounting part 15 via a supporting part 13 constituting supporting means. The mounting part 15 can be mounted in a position that does not cover the front surface of the head H, i.e., the face F. The mounting part 15 has holding parts 19 in two places disposed on the head H of the wearer M, and a linking part 21 that links the holding parts 19. In this working configuration, the holding parts 19 are fastened to the linking part 21 via connecting parts 23, and are disposed in the positions of the ears Y on both sides of the face F.

Furthermore, the linking part 21 is positioned in the back part of the head HB on the opposite side from the face F. The linking part 21 is formed with a curvilinear shape that conforms to the back part of the head HB. For example, the linking part 21 is formed from a synthetic resin that has elasticity. In this working configuration, speakers 25 constituting voice output means are disposed on the holding parts 19.

Figure 2:
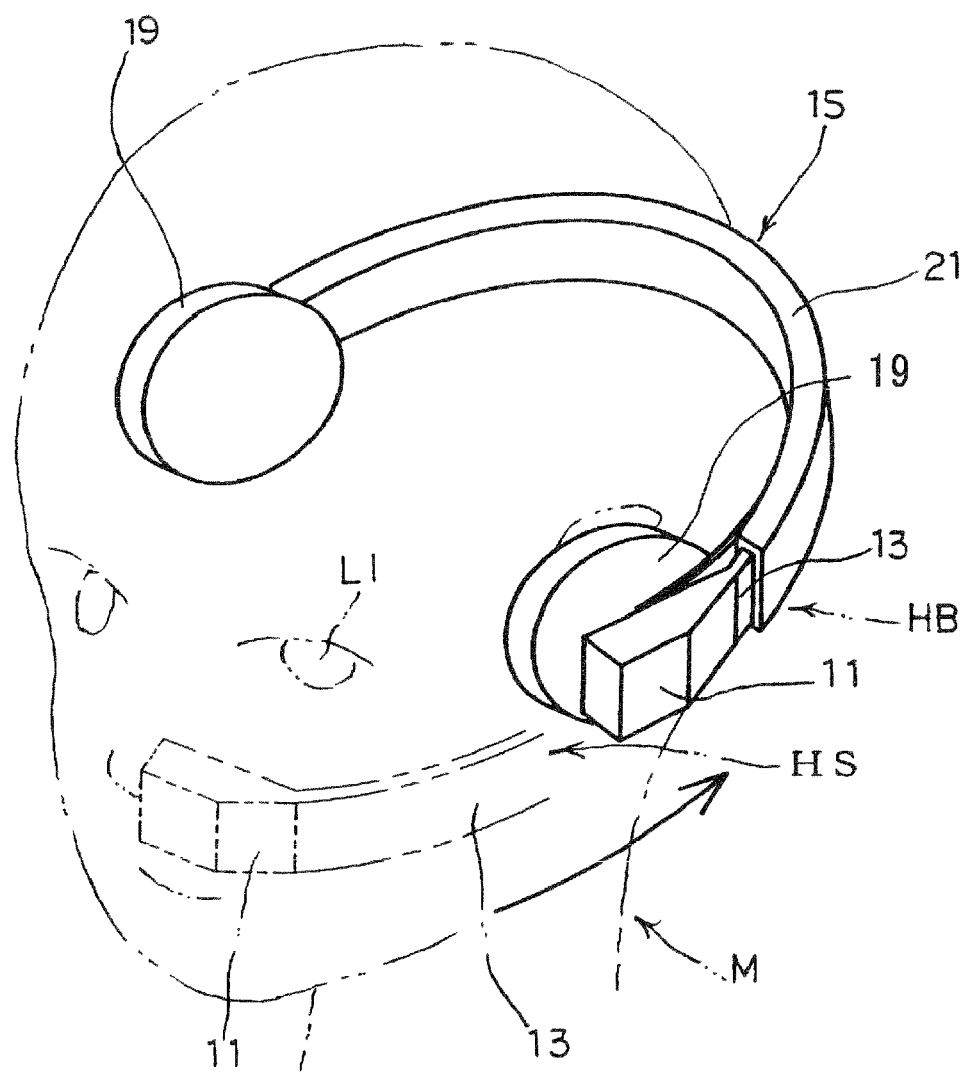
FIG. 2 is a perspective view showing a state in which the supporting part is accommodated in the linking part in the display device shown in FIG. 1.

Moreover, as is shown in FIG. 2, the supporting part 13 is arranged so that the display part 11 can be moved horizontally toward the back part of the head HB from the position disposed in front of the left eye LI of the wearer M via the side part of the head HS. The supporting part 13 is formed with a curvilinear shape that conforms to the side part of the head HS. For example, the supporting part 13 is formed from a synthetic resin that has elasticity.

Figure 3:
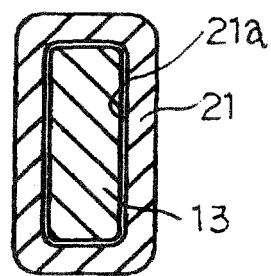
FIG. 3 is a sectional view showing the supporting part accommodated in the linking part shown in FIG. 1.

In addition, the supporting part 13 can be moved along the side part of the head HS. In this working configuration, the supporting part 13 can be accommodated in the linking part 21 of the mounting part 15, and can be moved along the linking part 21. Specifically, in this working configuration, as is shown in FIG. 3, a hole part 21a with a rectangular cross-sectional shape is formed along the linking part 21.

Furthermore, the supporting part 13 with a rectangular cross-sectional shape is inserted into this hole part 21a, and the supporting part 13 can be moved along the hole part 21a.

Figure 4:
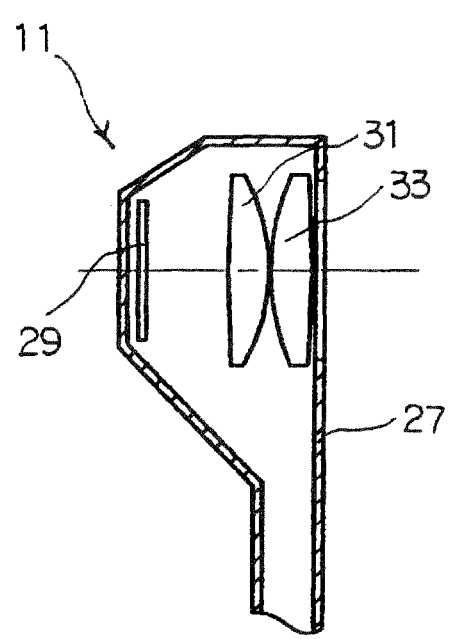
FIG. 4 is a sectional view showing the display part shown in FIG. 1.

FIG. 4 shows the details of the display part 11; here, a liquid crystal panel 29 which displays images, and lenses 31 and 33 which are used to enlarge the images of the liquid crystal panel 29 and display these images to the left eye LI of the wearer M, are disposed inside a main body part 27.

As is shown in FIG. 1, the display device described above is mounted on the head H of the wearer M by causing the holding parts 19 in two places to contact the ears Y so that the linking part 21 of the mounting part 15 is on the side of the back part of the head HB of the wearer M. Furthermore, in this state, as a result of the elasticity of the linking part 21, the holding parts 19 in two places are pressed lightly against the ears Y, so that the display device is securely mounted on the head H of the wearer M.

Moreover, in cases where the wearer M views the images of the display part 11, as is shown in FIG. 1, the wearer M pulls out the display part 11 with the fingers so that the supporting part 13 is pulled out from the linking part 21 of the mounting part 15, and the display part 11 is disposed in front of the left eye LI.

On the other hand, in cases where the display part 11 is not viewed, the display part 11 is pushed rearward with the fingers as shown in FIG. 2, so that the supporting part 13 is accommodated in the linking part 21 of the mounting part 15, and the display part 11 is disposed on the outside of the holding part 19.

In the display device described above, the mounting part 15 that is mounted on the head H can be mounted in a position that does not cover the front surface of the face F, and the supporting part 13 that supports the display part 11 moves the display part 11 from the position disposed in front of the eye of the wearer M via the side part of the head HS; accordingly, a display device which is relatively free of unsightliness with respect to the wearer M can be provided.

Specifically, in the display device described above, when the device is mounted on the head H, the mounting part 15 is mounted in a position that does not cover the front surface of the face F; accordingly, the unsightliness of the mounting part 15 can be reduced.

Furthermore, especially in the case of women, the adhesion of cosmetics to the mounting part 15 can be eliminated. Moreover, since the supporting part 13 that supports the display part 11 moves the display part 11 via the side part of the head HS from the position disposed in front of the eye of the wearer M, the unsightliness of the display part 11 and supporting part 13 during movement can be reduced.

In addition, in the display device described above, since the supporting part 13 moves toward the back part of the head HB along the side part of the head HS, the movement of the display part 11 and supporting part 13 can easily be accomplished. Moreover, in the display device described above, since the supporting part 13 moves along the contour of the head H, the movement of the display part 11 and supporting part 13 can be accomplished in a smooth manner.

Furthermore, in the display device described above, since the supporting part 13 moves along the linking part 21, the supporting part 13 can be disposed in a compact manner when the display part 11 is not in use. Moreover, in the display device described above, since the system is devised so that the supporting part 13 is accommodated in the linking part 21, the supporting part 13 can be accommodated in the linking part 21 in a compact manner when the display part 11 is not in use.

Furthermore, in the display device described above, since the holding parts 19 are disposed in positions on both sides of the head H, the mounting part 15 can be securely held on the head H. Moreover, in the display device described above, since the holding parts 19 are disposed on both ears Y, the mounting part 15 can be held more securely on the head H. In addition, in the display device described above, since speakers 25 are combined with the holding parts 19, voice recognition can be accomplished along with image recognition.

(Second Working Configuration)

Figure 5:
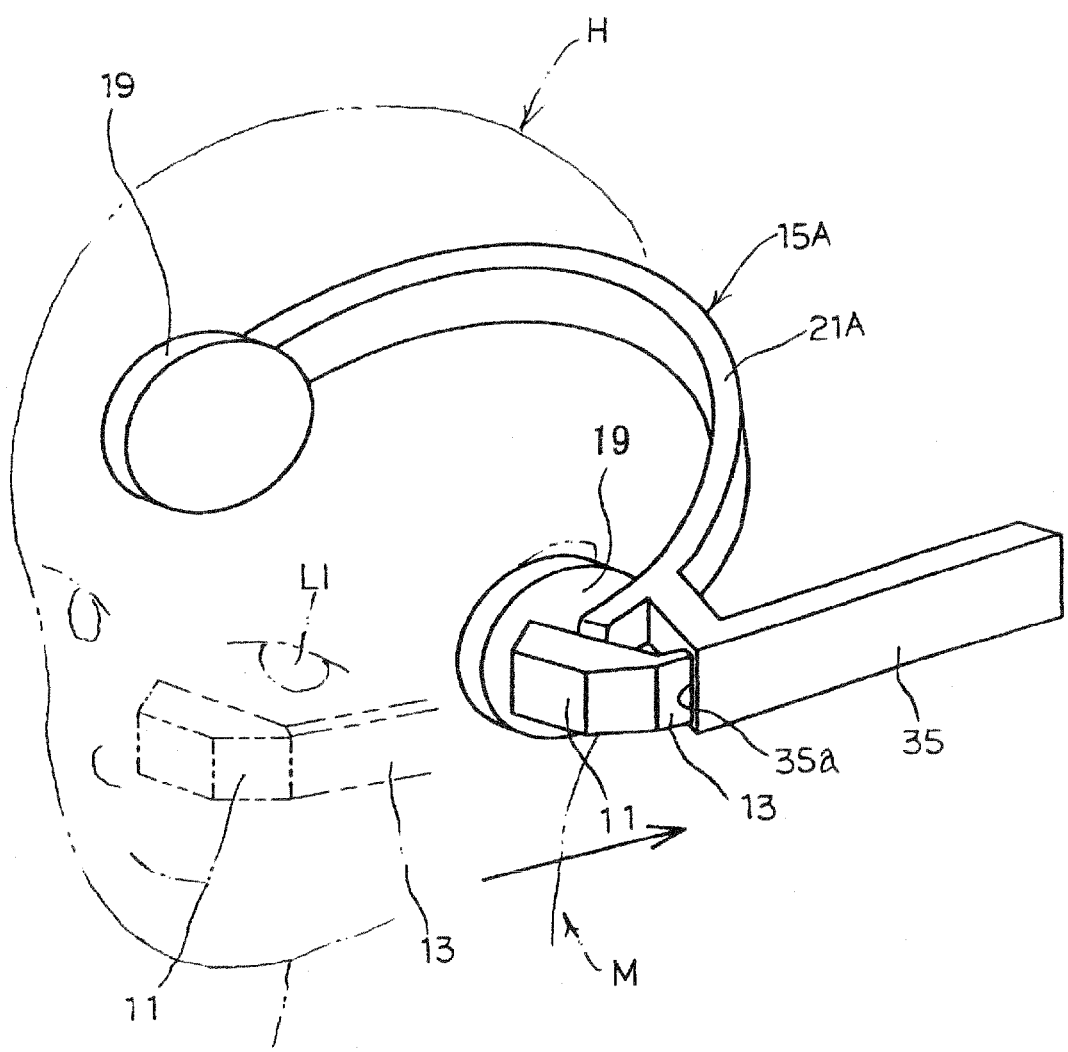
FIG. 5 is a perspective view showing a second working configuration of the display device of the present invention.

FIG. 5 shows a second working configuration of the display device of the present invention. In the display device of this working configuration, an accommodating part 35 that accommodates the supporting part 13 is formed in a separate position from the linking part 21A of the mounting part 15A. This accommodating part 35 is formed as an integral unit with the linking part 21A, and extends toward the back of the head H.

A hole part 35a is formed in the accommodating part 35, and the supporting part 13 that supports the display part 11 is inserted into this hole part 35a. Furthermore, the supporting part 13 is constructed so that this supporting part 13 can move along the hole part 35*a*. Moreover, in this working configuration, members that are the same as in the first working configuration are labeled with the same symbols, and a detailed description of such members is omitted.

In this display device, in cases where the wearer M views the images of the display part 11, the display part 11 is pulled out with the fingers as indicated by the two-dot chain line in the figure, so that the supporting part 13 is pulled out from the accommodating part 35, and the display part 11 is disposed in front of the left eye LI. On the other hand, in cases where the display part 11 is not viewed, the display part 11 is pushed rearward with the fingers as indicated by the solid line in the figure, so that the supporting part 13 is accommodated in the accommodating part 35, and the display part 11 is disposed in the vicinity of the outside of the holding part 19. Substantially the same effect as that of the first working configuration can also be obtained in this second working configuration.

(Third Working Configuration)

Figure 6:
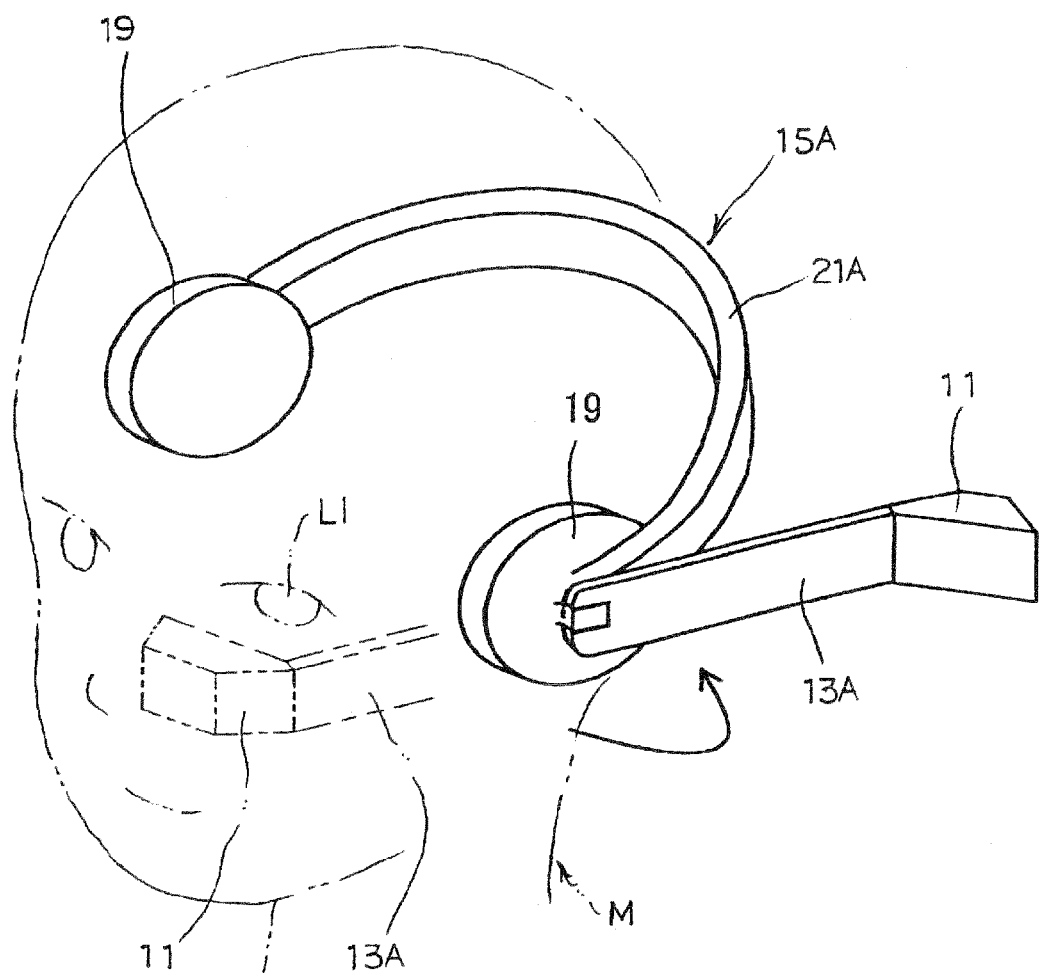
FIG. 6 is a perspective view showing a third working configuration of the display device of the present invention.

FIG. 6 shows a third working configuration of the display device of the present invention. In the display device of this working configuration, the end part of the supporting part 13A on the opposite side from the display part 11 is linked and connected with the end part of the linking part 21A of the mounting part 15A so that bending in the forward-rearward direction is possible.

Specifically, the end part of the supporting part 13A on the opposite side from the display part 11 is linked to the end part of the linking part 21A of the mounting part 15A via a publicly known hinge mechanism so that swinging is possible. Furthermore, in this working configuration, members that are the same as in the second working configuration are labeled with the same symbols, and a detailed description of such members is omitted. In this display device, in cases where the wearer M views the images of the display part 11, the supporting part 13A is pushed over toward the front with the fingers as indicated by the two-dot chain line in the figure, so that the display part 11 is disposed in front of the left eye LI.

On the other hand, when the display part 11 is not viewed, the display part 11 is pushed rearward with the fingers as indicated by the sold line in the figure, so that the supporting part 13A is pushed over toward the rear, and the display part 11 is disposed to the rear of the holding part 19. Substantially the same effect as that of the first working configuration can also be obtained in this third working configuration.

Furthermore, in the working configuration shown in FIG. 6, the end part of the supporting part 13A on the opposite side from the display part 11 is linked and connected with the end part of the linking part 21A of the mounting part 15A so that bending in the forward-rearward direction is possible; here, however, it would also be possible to couple the end part of the supporting part 13A on the opposite side from the display part 11 with the end part of the linking part 21A of the mounting part 15A by means of a pin, and to devise the system so that the display part 11 can be disposed to the rear of the holding part 19 by making it possible to pivot the supporting part 13A about this pin with respect to the linking part 21A.

(Fourth Working Configuration)

Figure 7:
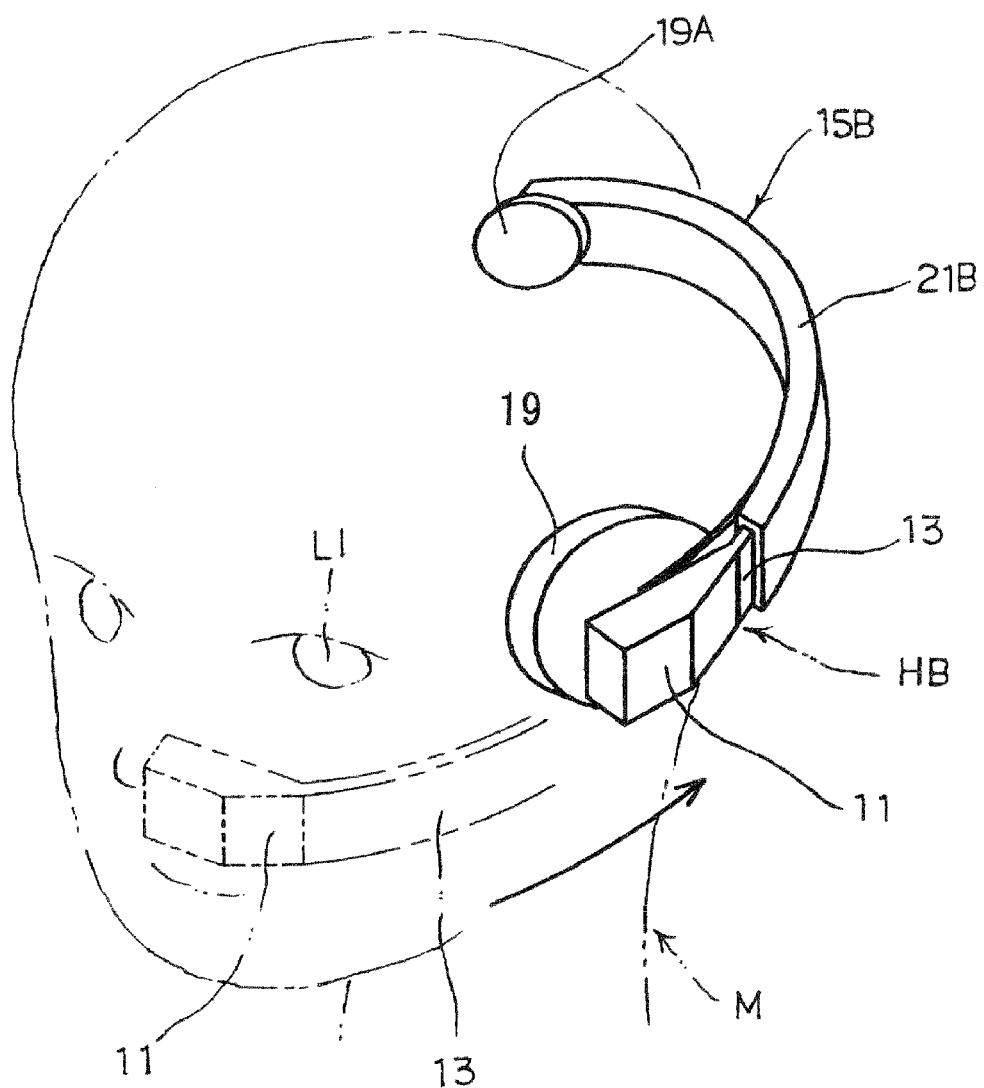
FIG. 7 is a perspective view showing a fourth working configuration of the display device of the present invention.

FIG. 7 shows a fourth working configuration of the display device of the present invention. In the display device of this working configuration, the length of the linking part 21B of the mounting part 15B is shortened, and a holding part 19A is disposed on the end part of the linking part 21B on the opposite side from the holding part 19.

Furthermore, this holding part 19A is disposed so as to contact a position toward the ear Y on the right side of the back part of the head HB. Moreover, in this working configuration, members that are the same as in the first working configuration are labeled with the same symbols, and a detailed description of such members is omitted. In this display device, in cases where the wearer M views the images of the display part 11, the wearer M pulls out the display part 11 with the fingers as indicated by the two-dot chain line in the figure, so that the supporting part 13 is pulled out from the linking part 21B of the mounting part 15B, and the display part 111 is disposed in front of the left eye LI.

On the other hand, when the display part 11 is not viewed, the display part 11 is pushed rearward with the fingers as indicated by the solid line in the figure, so that the supporting part 13 is accommodated in the linking part 21B of the mounting part 15B, and the display part 111 is disposed in the vicinity of the outside of the holding part 19. Substantially the same effect as that of the first working configuration can also be obtained in this fourth working configuration.

(Fifth Working Configuration)

Figure 8:
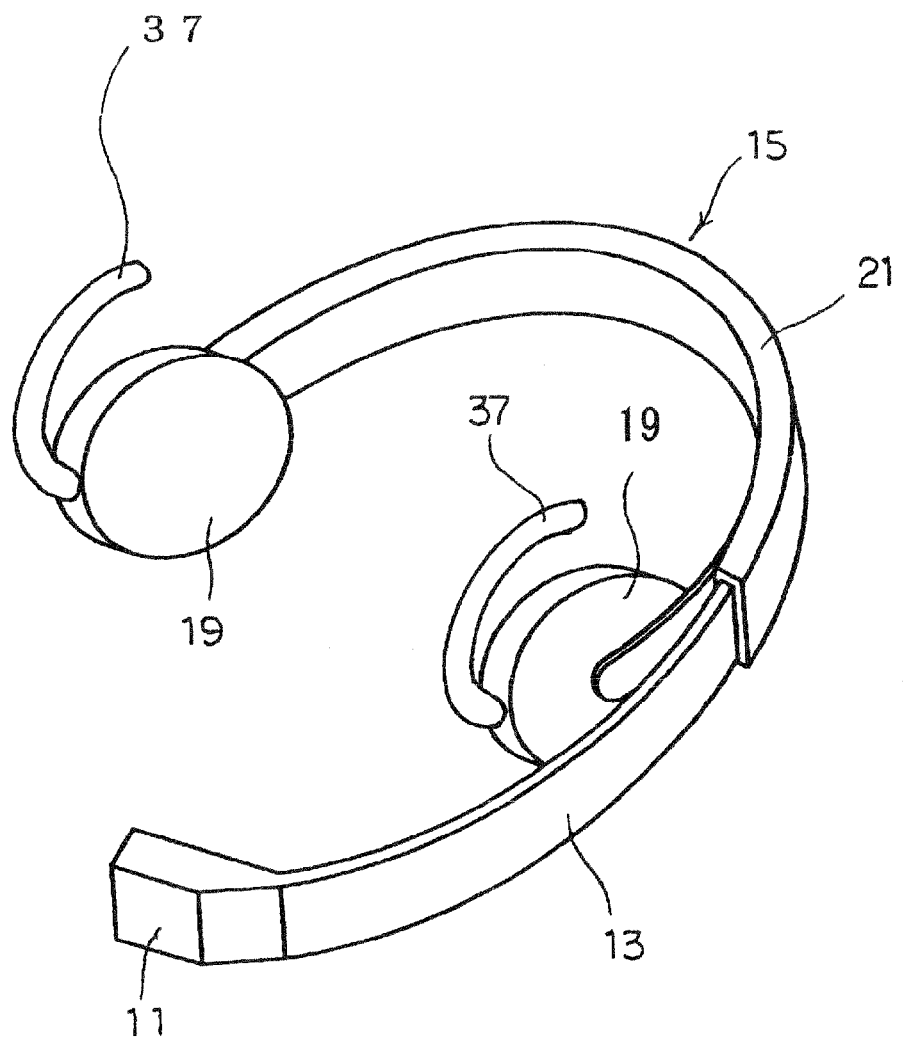
FIG. 8 is an explanatory diagram showing a fifth working configuration of the display device of the present invention.

FIG. 8 shows a fifth working configuration of the display device of the present invention. In the display device of this working configuration, ear mounting members 37 that mount the holding parts 19 on the ears are disposed on the holding parts 19. For example, these ear mounting members 37 consist of an elastomer resin, and are formed with a curvilinear shape that is deformed along the upper sides of the ears. Furthermore, in this working configuration, members that are the same as in the first working configuration are labeled with the same symbols, and a detailed description of such members is omitted. In this display device, the holding parts 19 can be securely mounted by means of the ears.

Moreover, the ear mounting members 37 may also be disposed on the holding parts 19 so that these members are free to pivot along the outer ear parts. In this case, the ear mounting members 37 undergo elastic deformation along the lower sides of the ears (i.e., the earlobes), so that the display device can be securely mounted.

(Sixth Working Configuration)

Figure 9:
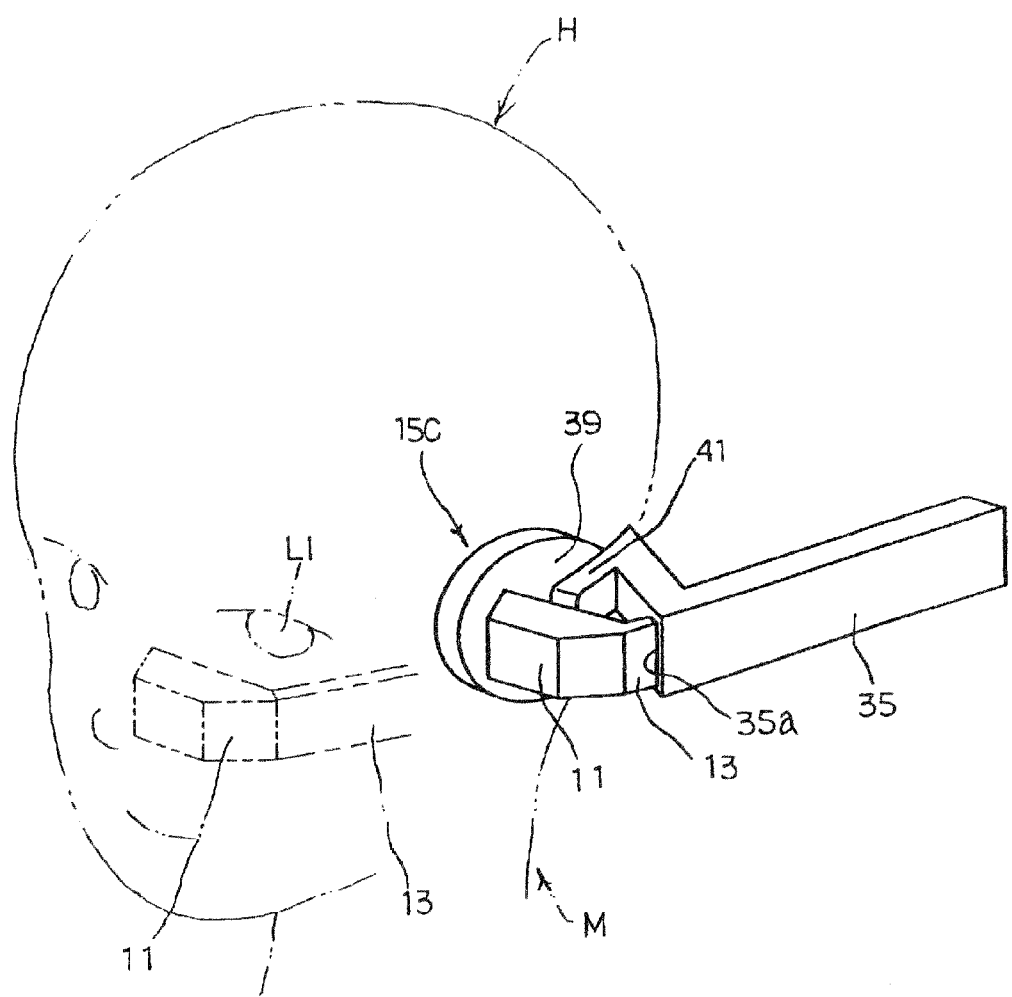
FIG. 9 is an explanatory diagram showing a sixth working configuration of the display device of the present invention.

FIG. 9 shows a sixth working configuration of the display device of the present invention. In the display device of this working configuration, the mounting part 15C is formed by a mounting member 39 that is mounted on only one ear of the wearer M. This mounting member 39 is constructed so that it can be mounted on the ear by clamping the external ear as a whole. An accommodating part 35 that accommodates the supporting part 13 is linked to the mounting member 39 via a connecting part 41.

Furthermore, in this working configuration, members that are the same as in the first working configuration are labeled with the same symbols, and a detailed description of such members is omitted. In this display device, the accommodating part 35, supporting part 13 and display part 11 are held on the head H of the wearer M by the mounting of the mounting member 39 on only one ear of the wearer M. Moreover, in cases where the wearer M views the images of the display part 11, the wearer M pulls out the display part 11 with the fingers as indicated by the two-dot chain line in the figure, so that the supporting part 13 is pulled out from the accommodating part 35, and the display part 11 is disposed in front of the left eye LI.

On the other hand, when the display part 11 is not viewed, the display part 11 is pushed rearward with the fingers as indicated by the solid line in the figure, so that the supporting part 13 is accommodated in the accommodating part 35, and the display part 11 is disposed in the vicinity of the outside of the mounting part 15C. Substantially the same effect as that of the first working configuration can also be obtained in this sixth working configuration.

Furthermore, in the respective working configurations described above, examples were described in which the display part 11 was constructed so that the images were displayed only to the left eye LI of the wearer M. However, the present invention is not limited to such working configurations; for example, it would also be possible to construct the display device so that images are displayed only to the right eye of the wearer M, or to construct the display device so that images are displayed to both eyes.

(Seventh Working Configuration)

Figure 10:
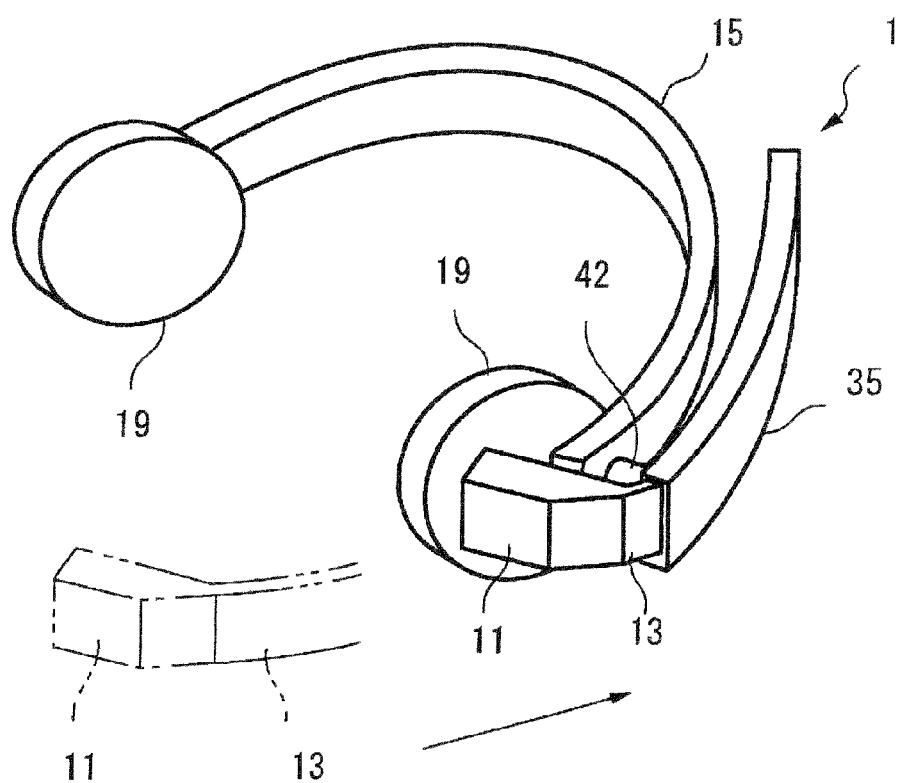
FIG. 10 is an explanatory diagram showing a seventh working configuration of the present invention.

FIG. 10 is a schematic diagram showing the portion of a head mounted display constituting a seventh working configuration of the present invention that is mounted on the head (head mounted display main body part). The head mounted display main body part 1 is mounted on the back part of the head, and is constructed with a mounting part 15 possessing elasticity that clamps the head, left and right holding parts 19 which are attached to the mounting part 15, a supporting part 13 which has the display part 11 attached to the tip end part, and a supporting part accommodating part 35 which is attached to the mounting part 15 via a shaft 42 so that this supporting part accommodating part 35 can pivot, as the main constituent parts.

This head mounted display main body part 1 is mounted on the head so that both ears are clamped by the holding parts 19, and is used in a state in which the supporting part 13 and display part 11 are pulled out from the supporting part accommodating part 35 as indicated by the two-dot chain line in FIG. 10 so that the display part 11 is positioned in front of the eye. The solid line indicates a state in which the supporting part 13 is moved from this state in the direction indicated by the arrow, and is accommodated in the supporting part accommodating part 35. In this state, the supporting part accommodating part 35 is caused to pivot about the shaft 42, so that the relative angle of the mounting part 15 and supporting part 13 is varied, thus positioning the display part 11 in front of the eye during use.

(Eighth Working Configuration)

Figure 11:
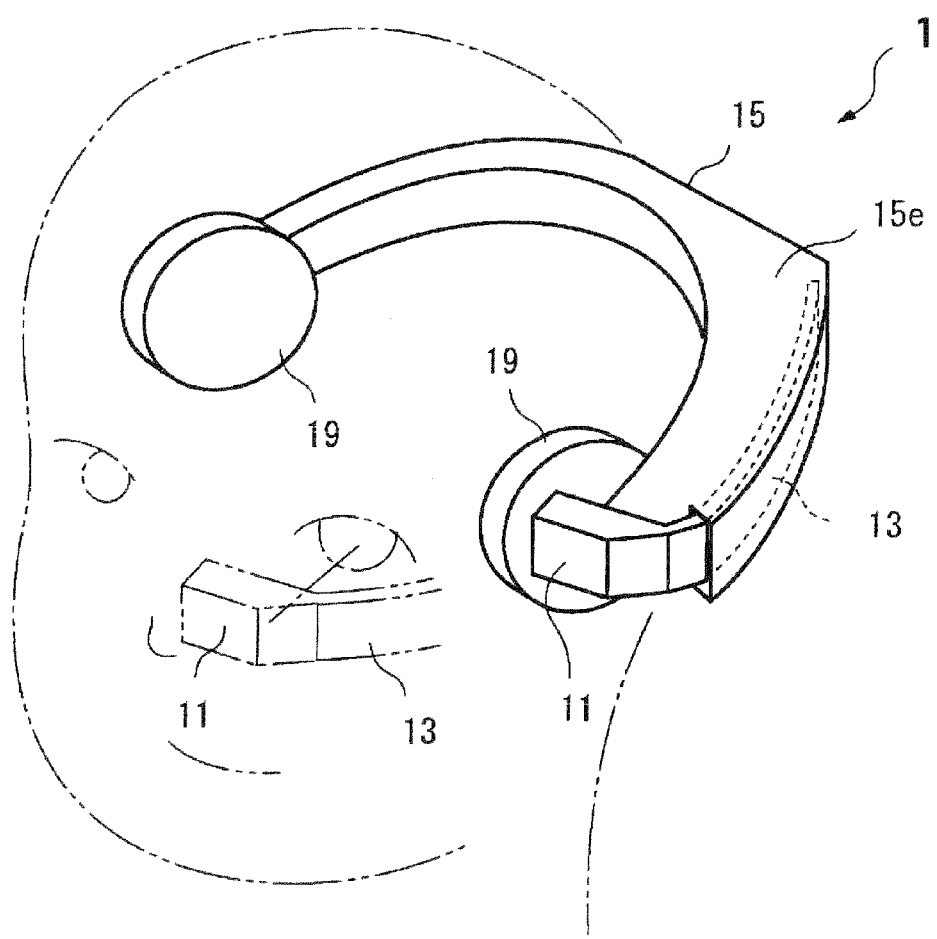
FIG. 11 is an explanatory diagram showing an eighth working configuration of the present invention.

FIG. 11 is a schematic diagram showing how the head mounted display main body part of a head mounted display constituting an eighth working configuration of the present invention is mounted on the head. In this working configuration, an accommodating part for the supporting part 13 is provided in the mounting part 15. Specifically, in FIG. 11, the right side of the mounting part 15 constitutes a supporting part accommodating part 15e, so that the supporting part 13 is accommodated inside this supporting part accommodating part 15e. A space equal to the lateral width of the display part 11 is formed between the inside edge part (side facing the head) of the mounting part 15 and the portion where the supporting part 13 is accommodated so that the display part 11 does not interfere with the accommodation of the supporting part 13 during this accommodation as a result of the display part 11 contacting the holding part 19. Accordingly, the supporting part 13 can be pulled into the mounting part 15 until the display part 11 contacts the mounting part 15.

In this working configuration, the relative angle of the display surface of the display part 11 and the supporting part 13 is maintained "as is"; however, a case in which the relative angle of the display surface of the display part 11 and the supporting part 13 varies during accommodation is also conceivable. In such a case, the space described above is set as a space with dimensions which are such that the display part 11 does not contact the holding part 19 or the like so that accommodation is hindered in a state in which accommodation is accomplished with the relative angle of the display surface of the display part 11 and the supporting part 13 showing such variation.

(Ninth Working Configuration)

Figure 12:
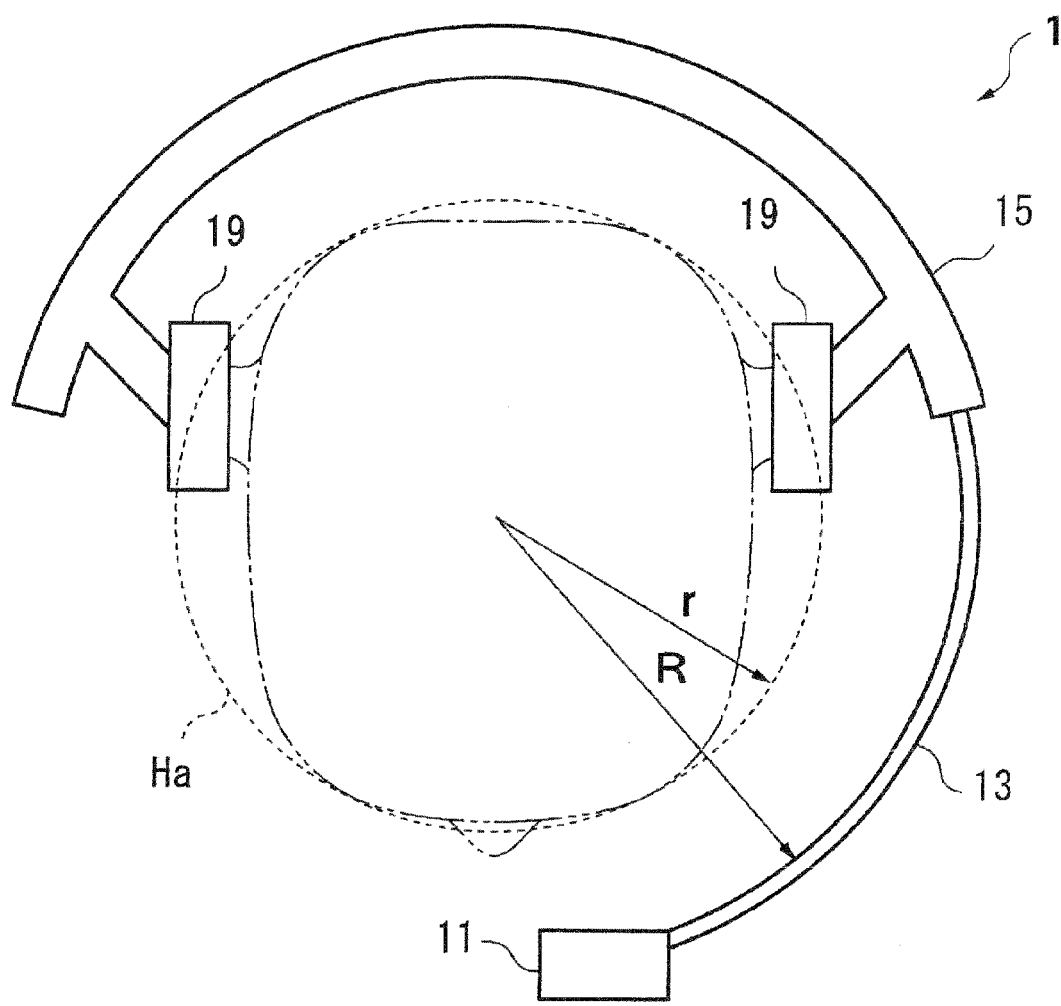
FIG. 12 is an explanatory diagram showing a ninth working configuration of the present invention.

FIG. 12 is a schematic diagram showing how the head mounted display main body part of a head mounted display constituting a ninth working configuration of the present invention is mounted on the head. In this case as well, the head mounted display main body part 1 is mounted on the head via holding parts 19. Furthermore, the mounting part 15 and supporting part 13 have circular arc-form shapes that have the same radius R; this radius R is greater than the radius r of a circumscribed circle Ha around the back part of the head. Accordingly, even when the supporting part 13 is accommodated inside the mounting part 15, the display part 11 does not contact the face. Or speaking conversely, the radius R is set at a size which is such that the display part 11 does not contact the face when the supporting part 13 is accommodated inside the mounting part 15.

(Tenth Working Configuration)

Figure 13:
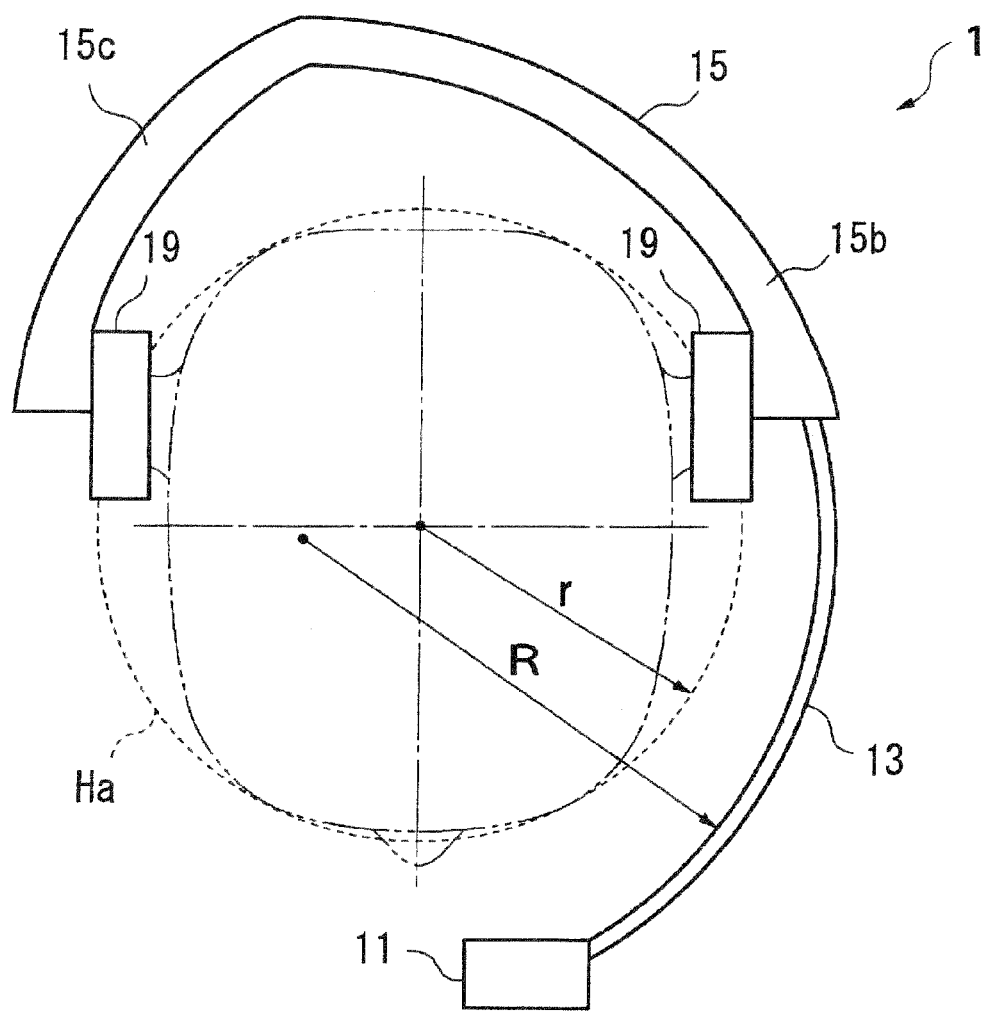
FIG. 13 is an explanatory diagram showing a tenth working configuration of the present invention.

FIG. 13 is a schematic diagram which shows how the head mounted display main body part of a head mounted display constituting a tenth working configuration of the present invention is mounted on the head. In this case as well, the head mounted display main body part 1 is mounted on the head via holding parts 19. Furthermore, the mounting part 15 is divided into a part 15b which has a shape with the same radius R as the supporting part 13, and a part 15c with a smaller radius. Moreover, the supporting part 13 is accommodated in the part 15b which has a shape with the same radius R as the supporting part 13. The radius R is set at a value that is greater than the radius r of a circumscribed circle Ha around the back part of the head, so that the display part 11 does not contact the face even when the supporting part 13 is accommodated inside the mounting part 15.

On the other hand, in the part 15c that has a small radius, since the radius is small, there is no increase in the size of the head mounted display main body part 1, and the feeling of mounting is good. Furthermore, as is shown in the figure, the center of the circular arcs of the supporting part 13 and the mounting part 15 is offset from the center of the circumscribed circle Ha. As a result of this as well, an increase in the size of the head mounted display main body part 1 can be avoided.

It is desirable that this offset be devised so that the center of the circular arc of the supporting part 13 is located on the side that is further removed from the supporting part 13 (on the left side of the center line in the figure) than the center of the circumscribed circle around the back part of the head (indicated by the center line), and further to the front (on the lower side of the center line in the figure). As a result, the external dimensions of the head mounted display main body part 1 in the state in which this part is mounted on the head can be reduced.

(Eleventh Working Configuration)

Figure 14:
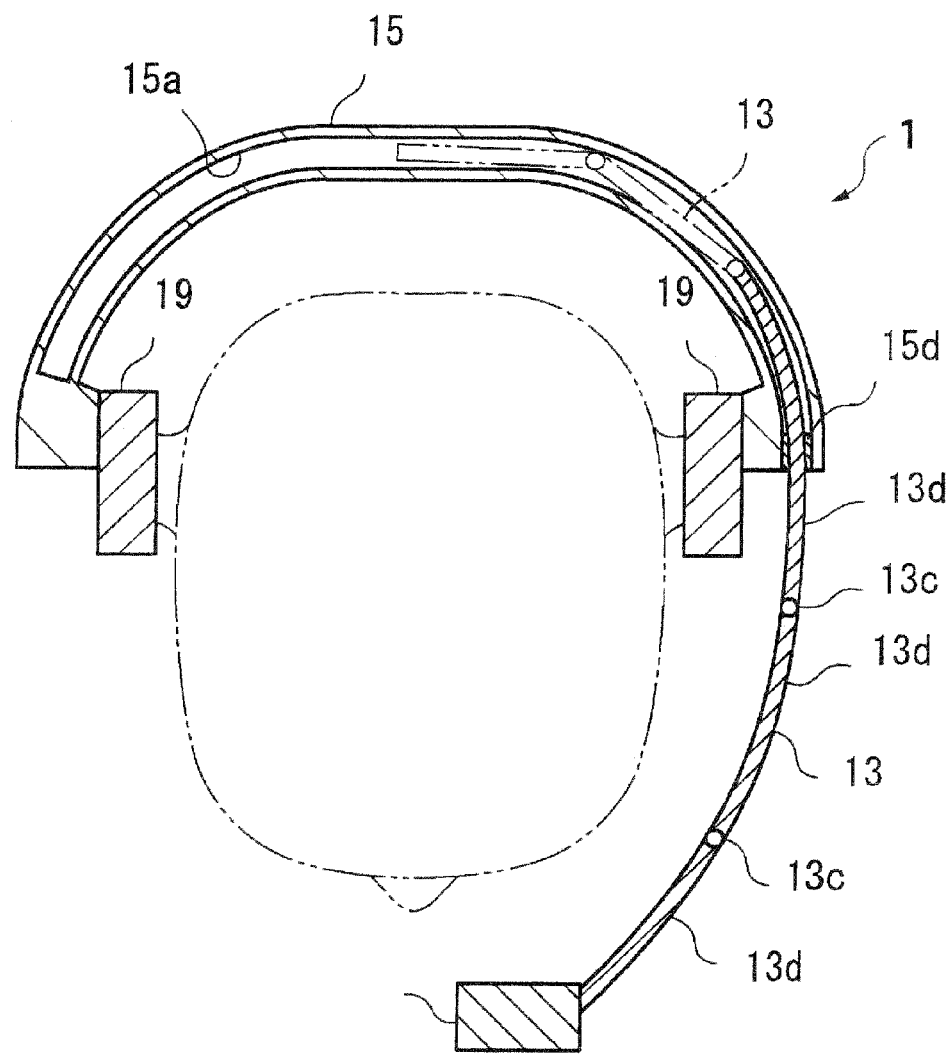
FIG. 14 is an explanatory diagram showing an eleventh working configuration of the present invention.

FIG. 14 is a schematic sectional view which shows how the head mounted display main body part of a head mounted display constituting an eleventh working configuration of the present invention is mounted on the head. In this case as well, the head mounted display main body part 1 is mounted on the head via holding parts 19.

The mounting part 15 has a shape that conforms to the shape of the back part of the head, and a hole 15a that is used to accommodate the supporting part 13 is formed inside this mounting part 15. Furthermore, a guide part 15d that is used to guide the supporting part 13 is formed in the exit port of the mounting part 15, and a hole that is formed in the guide part 15d is formed with substantially the same cross-sectional shape as the supporting part 13, so that the supporting part 13 is guided and accommodated inside the hole 15a.

Meanwhile, the supporting part 13 is formed by connecting small parts 13d that are coupled by pins 13c, and the small parts 13d can be mutually bent about these pins 13c. Accordingly, when the display part 11 is positioned in front of the eye, the small parts 13d are placed in an extended state as indicated by the solid line in the figure, so that the device is used in a state in which the curvature radius of the supporting part 13 is increased. When the supporting part 13 is to be accommodated, if the supporting part 13 is pushed into the interior of the mounting part 15, the supporting part 13 is guided by the guide part 15d and enters the interior of the hole 15a; this supporting part 13 assumes a state in which the part is bent about the pins 13c, and is accommodated inside so as to conform to the hole 15a.

Thus, while the curvature radius of the supporting part 13 during use is increased, the supporting part 13 can be accommodated inside the mounting part 15 which has a portion with a small curvature radius that differs in shape from the supporting part 13 during accommodation. As a result, the overall construction of the head mounted display main body part is compact, and the feeling of mounting can be improved.

(Twelfth Working Configuration)

Figure 15:
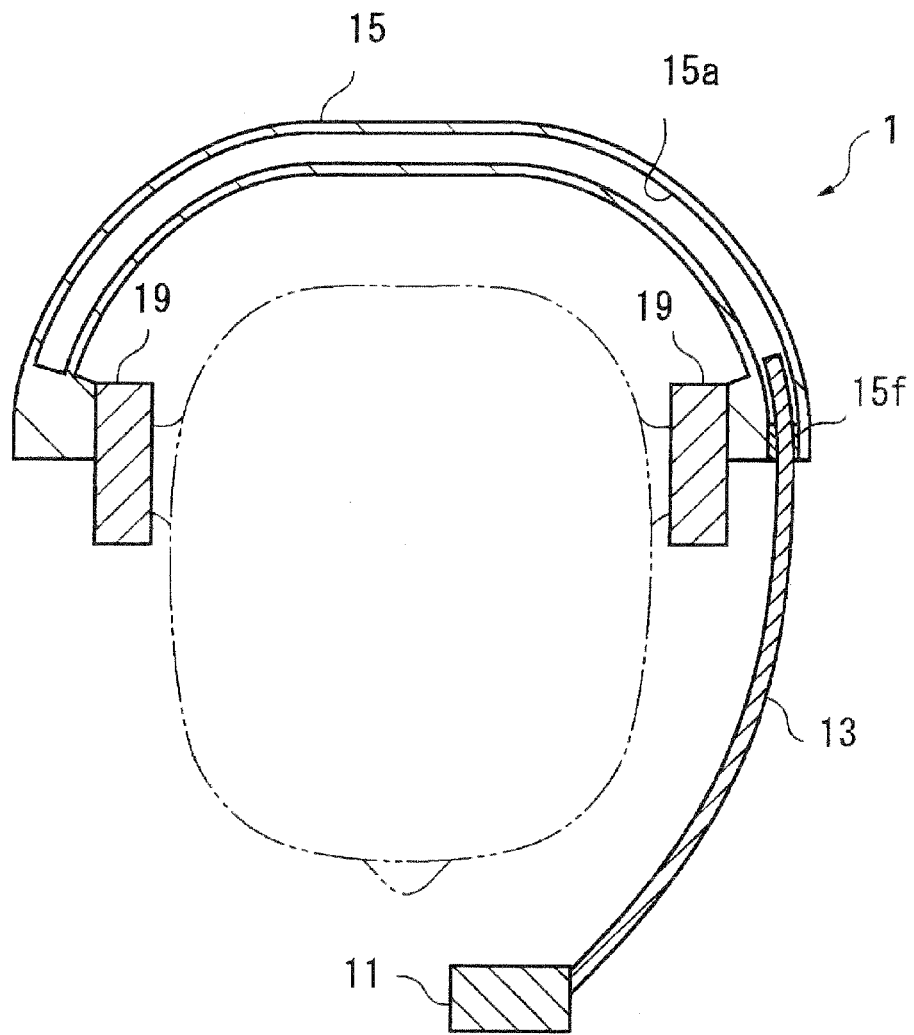
FIG. 15 is an explanatory diagram showing a twelfth working configuration of the present invention.

FIG. 15 is a schematic diagram showing how the head mounted display main body part of a head mounted display constituting a twelfth working configuration of the present invention is mounted on the head; this diagram shows a partial sectional view. In this case as well, the head mounted display main body part 1 is mounted on the head via holding parts 19.

In this working configuration, the structure of the mounting part 15 is the same as that of the mounting part shown in FIG. 14; however, this mounting part 15 differs in that a heating part 15f that also serves as a guide part is installed instead of the guide part 15d, and in that the supporting part 13 is formed from a single shape memory alloy.

The extended state during the use of the display part 11 is stored in the supporting part 13 consisting of a shape memory alloy, or the state conforming to the hole 15a during accommodation in the hole 15a is stored in this supporting part 13. Generally, the shape of the hole 15a is complex, and the supporting part 13 is constrained; accordingly, it is desirable to store the extended state during the use of the display part 11.

In cases where the extended state during the use of the display part 11 is stored, the supporting part 13 is accommodated in the hole 15a while being pushed into the mounting part 15 and caused to undergo deformation. When the supporting part 13 is pulled out of the hole 15a, heating is performed by means of the heating part 15f so that the supporting part 13 is pulled out while being returned to the stored shape. As a result, the supporting part 13 is pulled out with the shape of this supporting part 13 assuming a shape that causes the display part 111 to be positioned in front of the eye.

In cases where the state conforming to the hole 15a is stored following accommodation in the hole 15a, the supporting part 13 is accommodated inside the hole 15a while being heated by the heating part 15f during accommodation. As a result, the supporting part 13 is accommodated while being returned to the stored shape. When the supporting part 13 is pulled out, the supporting part 13 is pulled out while conforming to the curvature of the hole of the heating part 15f, and thus assumes a shape that has a large curvature, so that the display part 11 is positioned in front of the eye.

(Thirteenth Working Configuration)

Figure 16:
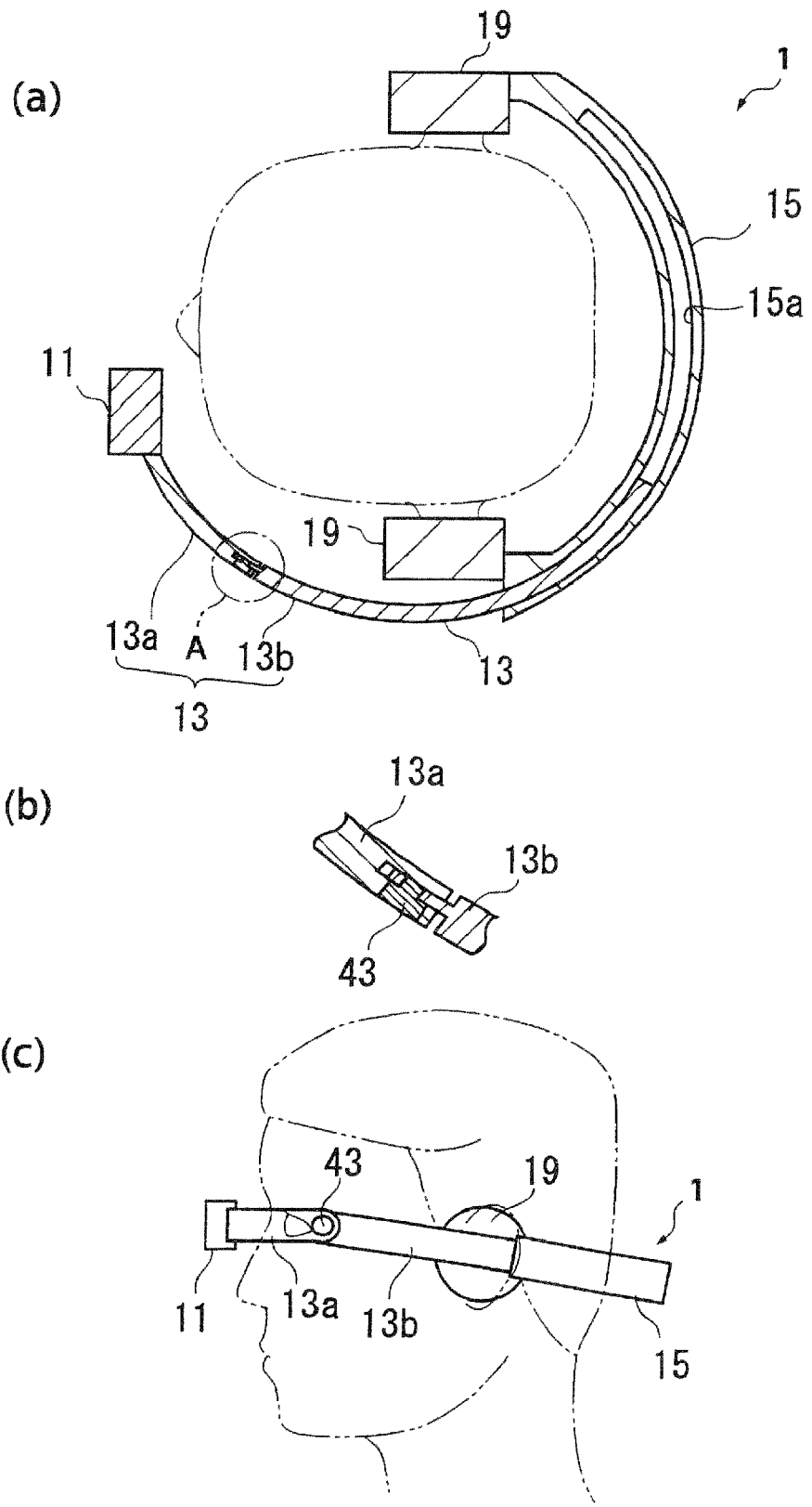
FIG. 16 shows explanatory diagrams illustrating a thirteenth working configuration of the present invention.

FIG. 16 shows schematic diagrams illustrating how the head mounted display main body part of a head mounted display constituting a thirteenth working configuration of the present invention is mounted on the head; FIG. 16(a) is a sectional plan view, FIG. 16(b) is an enlarged view of part A, and FIG. 16(c) is a diagram showing the mounted state as seen from the left side of the head. In this case as well, the head mounted display main body part 1 is mounted on the head via holding parts 19.

The present working configuration is substantially the same as the working configuration shown in FIG. 12, with the supporting part 13 having a circular arc shape with the same radius as the mounting part 15. However, this working configuration differs in that the supporting part 13 is divided into two parts, i.e., a tip end part 13a and a rear end part 13b. Furthermore, as is shown in FIG. 16(b), a motor 43 is attached to the end part of the tip end part 13a, and the rear end part 13b is attached to the rotating shaft of this motor 43. Accordingly, the tip end part 13a can pivot in the upward and downward directions with the rotating shaft of the motor 43 as a pivoting axis.

Generally, when the mounting part 15 is mounted on the head, the feeling of mounting is better if the mounting part 15 is mounted in a state in which the front of the mounting part 15 is raised slightly upward as shown in FIG. 16(c). In this state, however, if the mounting part 15 and supporting part 13 are positioned on a straight line, the display part 11 is positioned above the eye. Accordingly, the display part 11 is more easily viewed if the motor 43 is rotated so that the tip end part 13a is caused to pivot downward, thus placing the tip end part 13a in a substantially horizontal state as shown in FIG. 16(c) so that the display part 11 is positioned in front of the eye.

When the supporting part 13 is accommodated inside the mounting part 15, the tip end part 13a is caused to pivot so that the tip end part 13a and rear end part 13b are positioned on the same plane, and the supporting part 13 is pushed into the hole 2a of the mounting part 15. Since the rear end part 13b and mounting part 15 are positioned on the same plane, the area up to the tip end part 13a can be smoothly accommodated inside the hole 2a if this is done.

(Fourteenth Working Configuration)

Figure 17:
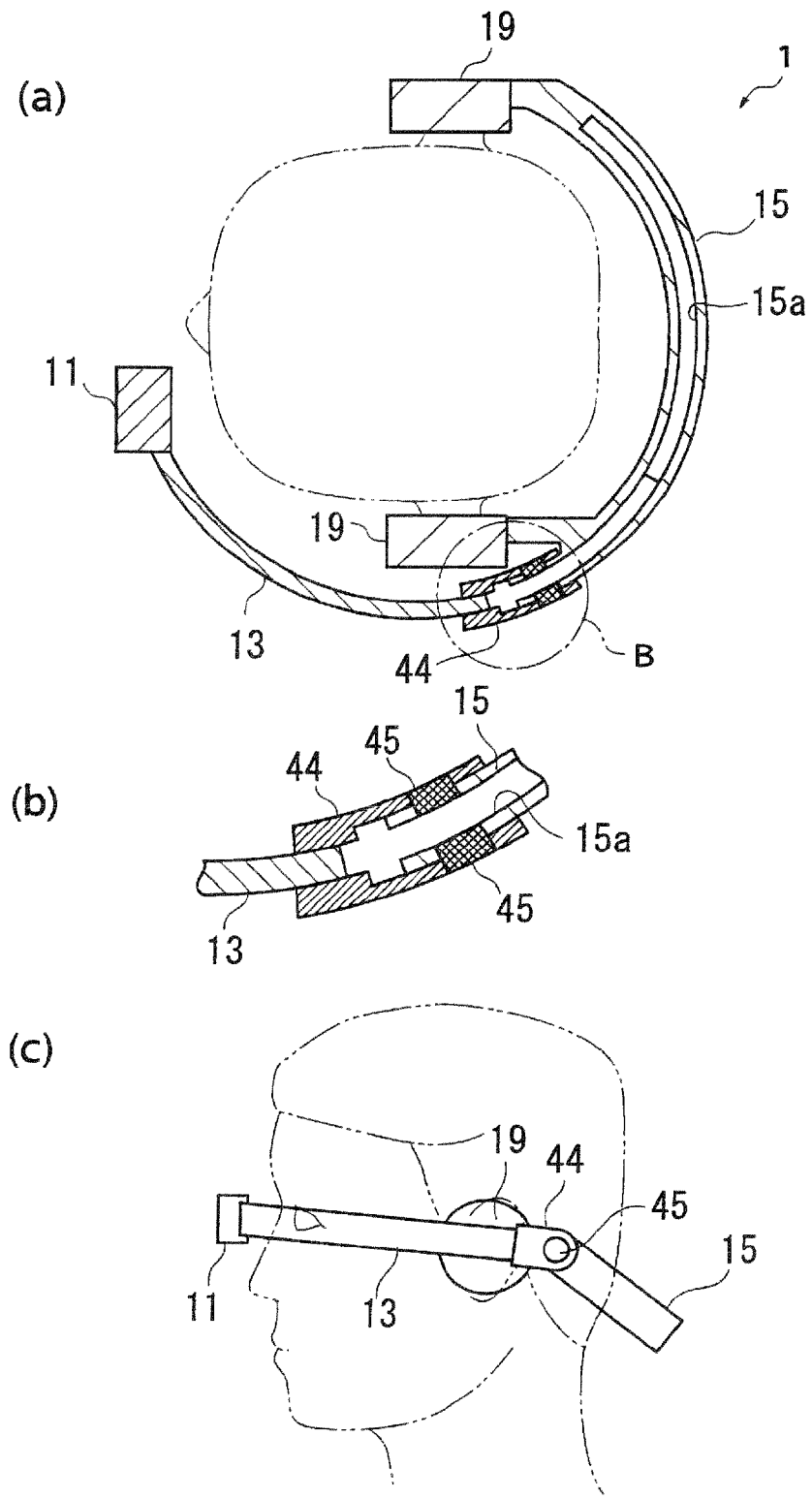
FIG. 17 shows explanatory diagrams illustrating a fourteenth working configuration of the present invention.

FIG. 17 shows schematic diagrams illustrating how the head mounted display main body part of a head mounted display constituting a fourteenth working configuration of the present invention is mounted on the head; FIG. 17(a) is a sectional plan view, FIG. 17(b) is an enlarged view of part B, and FIG. 17(c) is a diagram showing the mounted state as seen from the left side of the head. In this case as well, the head mounted display main body part 1 is mounted on the head via holding parts 19.

In this working configuration, a coupling member 44 is attached to the tip of the mounting part 15, and the supporting part 13 is attached to this coupling member 44. Specifically, as is shown in FIG. 17(b), the coupling member 44 is coupled with the mounting part 15 by two pins 45 at the tip end part of the mounting part 15, and the coupling member 44 is arranged so that this member can pivot with these pins 45 as the pivoting axis. Accordingly, the supporting part 13 attached to the coupling member 44 and the display part 11 attached to the tip end of the supporting part 13 can pivot with the pins 45 as a pivoting center.

Specifically, in the mounted state, as is shown in FIG. 17(c), the display part 11 can be positioned in front of the eye in a state in which the supporting part 13 and display part 11 are made substantially horizontal by mounting the mounting part 15 with the front raised upward, and pivoting the coupling member 44 downward.

When the supporting part 13 is to be accommodated inside the mounting part 15, the coupling member 44 is caused to pivot so that the supporting part 13 and mounting part 15 are located in substantially the same plane, and then the supporting part 13 is pushed into the interior of the hole 2*a* of the mounting part 15. If this is done, the supporting part 13 can be smoothly accommodated inside the hole 15*a*.

Furthermore, in FIG. 17, as a result of the coupling member 44 being pivoted with the pins 45 as a pivoting axis, the supporting part 13 can be held in a state in which the rear end part of the supporting part 13 is present inside the coupling member 44 so that the supporting part 13 can pivot with respect to the mounting part 15. However, it would also be possible to split the coupling member 44 into two parts, i.e., a coupling part front part and a coupling part rear part, and to devise the system so that the coupling part rear part is coupled to the mounting part 15, the coupling part front part is arranged to be pivotable with respect to the coupling part rear part with the pins as a pivoting axis, and the coupling part front part is caused to pivot with respect to the coupling part rear part after the supporting part 13 is pulled out to a position in which the rear end part of the supporting part 13 is present in the coupling part front part.

When the supporting part 13 is to be accommodated inside the mounting part 15, the coupling part front part is caused to pivot so that the supporting part 13 and mounting part 15 are positioned in the same plane, and the supporting part 13 is pushed into the hole 15*a* of the mounting part 15. If this is done, the supporting part 13 can be smoothly accommodated inside the hole 15*a*. As a result, the supporting part 13 can be accommodated in the mounting part 15, and can be caused to pivot with respect to the mounting part 15 in a state in which the supporting part 13 is pulled out from the mounting part 15, so that an effect similar to that of the working configuration shown in FIG. 17 can be obtained.

(Fifteenth Working Configuration)

Figure 18:
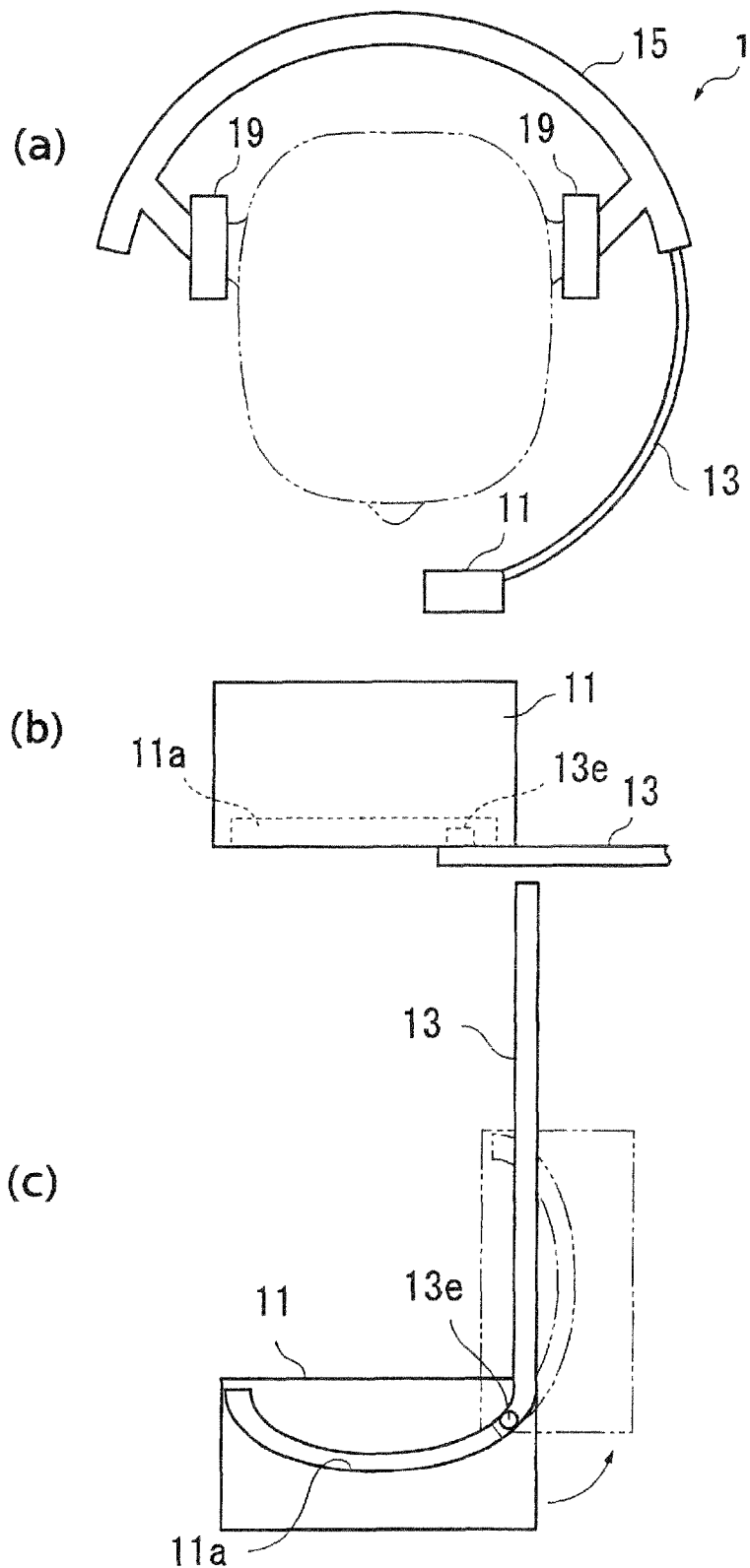
FIG. 18 shows explanatory diagrams illustrating a fifteenth working configuration of the present invention.

FIG. 18 shows schematic diagrams illustrating how the head mounted display main body part of a head mounted display constituting a fifteenth working configuration of the present invention is mounted on the head; FIG. 18(*a*) is a plan view, FIG. 18(*b*) is a front view of the vicinity of the display part, and FIG. 18(*c*) is a diagram showing the display part as seen from below. In this case as well, the head mounted display main body part 1 is mounted on the head via holding parts 19. In this working configuration, as in the working configuration shown in FIG. 12, the supporting part 13 is accommodated inside the mounting part 15. In this working configuration, however, the system is arranged so that the tip end part of the supporting part 13 is accommodated inside the display part 11 as well.

Specifically, as is shown in FIGS. 18(*b*) and 18(*c*), a crescent moon-shaped groove 11*a* is formed in the lower part of the display part 11, and a pin 13*e* disposed on the tip end part of the supporting part 13 is fitted into this groove 11*a*. Accordingly, as is shown in FIG. 18(*c*), when the display part 11 is caused to rotate 90° from the image observation position indicated by the solid line, the pin 13*e* moves along the groove 11*a*, and as a result, the display part 11 assumes the position indicated by the two-dot chain line. Consequently, the tip end part of the supporting part 13 is accommodated inside the display part 11. Furthermore, in order to facilitate description in the figures, a depiction is shown in which the supporting part 13 is exposed in the state in which the supporting part 13 is accommodated in the display part 11; however, if a cover is disposed on the lower part of the display part 11, and the system is devised so that the supporting part 13 enters the interior of this cover, the supporting part 13 can be protected in the accommodated state.

(Sixteenth Working Configuration)

Figure 19:
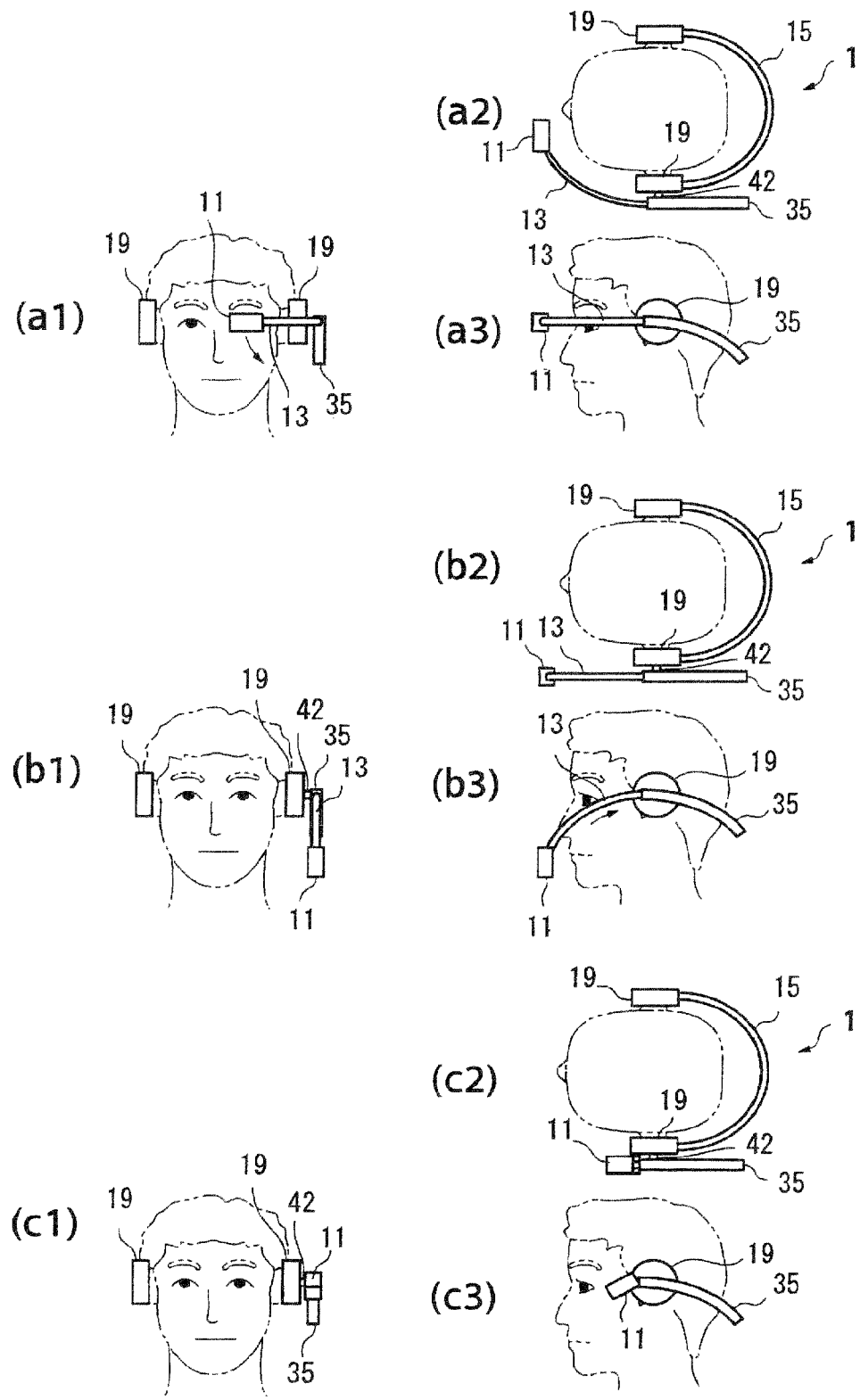
FIG. 19 shows explanatory diagrams illustrating a sixteenth working configuration of the present invention.

FIG. 19 shows schematic diagrams illustrating how the head mounted display main body part of a head mounted display constituting a sixteenth working configuration of the present invention is mounted on the head. In this working configuration, a supporting part accommodating part 35 is attached to the mounting part 15 via a shaft 42 as shown in FIG. 10; however, this supporting part accommodating part 35 has a circular arc-form shape within the vertical plane.

Furthermore, the supporting part 13 also has a circular arc-form shape; however, in the use state, as is shown in (a1) through (a3), the supporting part 13 has a circular arc-form shape in the horizontal direction; as a result, the display part 11 is positioned in front of the surface of the eye. Moreover, in the state in which the supporting part 13 is pulled out from the supporting part accommodating part 35, the supporting part 13 is arranged to be pivotable with respect to the supporting part accommodating part 35, with the axis in the forward-rearward direction as a pivoting axis.

When the supporting part 13 is to be accommodated in the supporting part accommodating part 35, the supporting part 13 is caused to pivot 90° downward from this state with respect to the supporting part accommodating part 35 as shown in (b1) through (b3). Then, the circular arc of the supporting part 13 and the circular arc of the supporting part accommodating part 35 are positioned in the same plane, thus assuming shapes that have the same radius and the same center. When the supporting part 13 is pushed in from this state in the direction indicated by the arrow shown in (b3), the supporting part 13 is accommodated inside the supporting part accommodating part 35 as shown in (c1) through (c3).

(Seventeenth Working Configuration)

Figure 20:
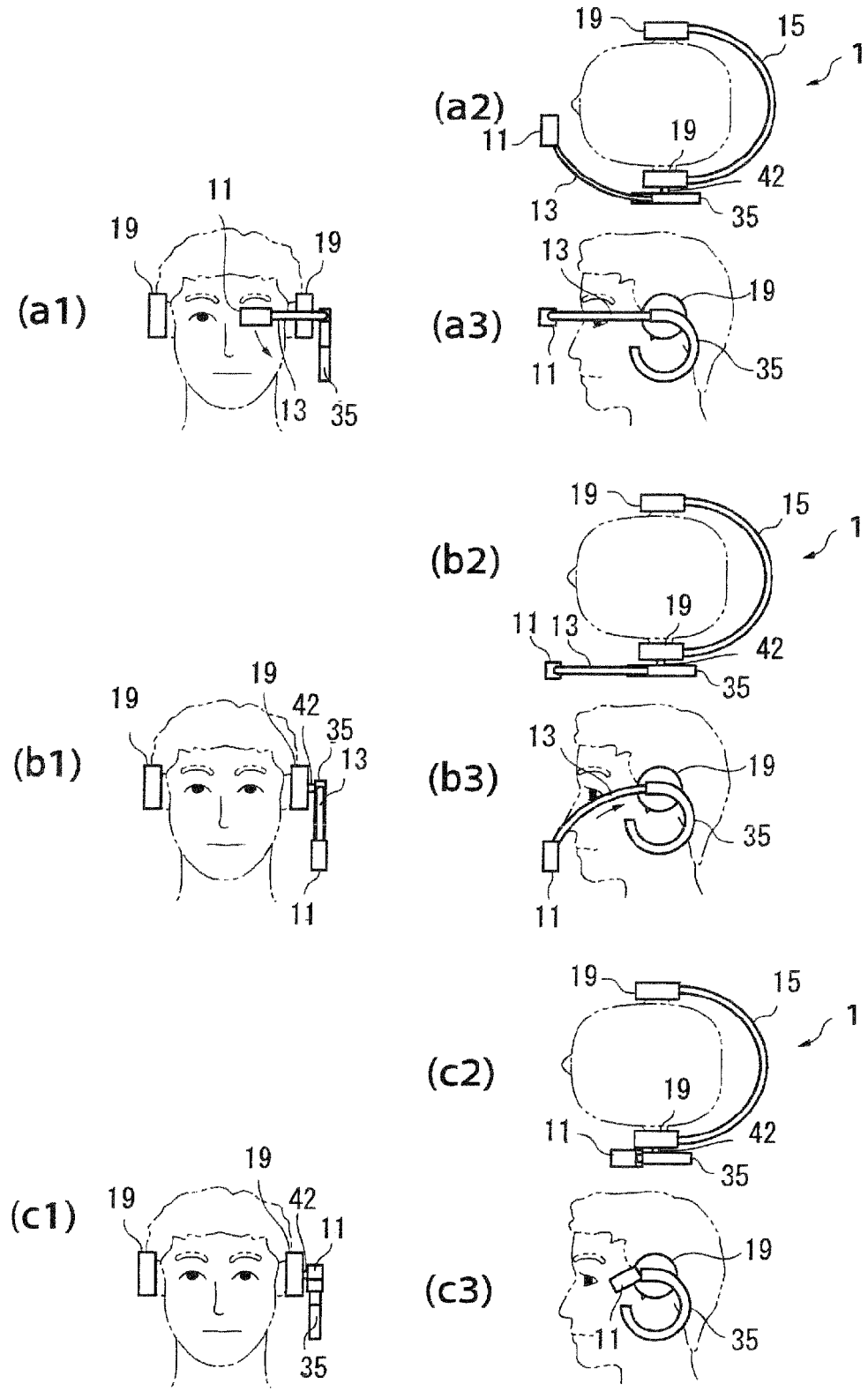
FIG. 20 shows explanatory diagrams illustrating a seventeenth working configuration of the present invention.

FIG. 20 shows schematic diagrams illustrating how the head mounted display main body part of a head mounted display constituting a seventeenth working configuration of the present invention is mounted on the head. In this working configuration, a supporting part accommodating part 35 is attached to the mounting part 15 via a shaft 42 as shown in FIG. 10; however, this supporting part accommodating part 35 has a circular arc-form shape within the perpendicular plane. Furthermore, in the state in which the supporting part 13 is pulled out from the supporting part accommodating part 35, the supporting part 13 is arranged to be pivotable with respect to the supporting part accommodating part 35, with the axis in the forward-rearward direction as a pivoting axis.

The basic concept of this working configuration is the same as that of the working configuration shown in FIG. 19; however, the supporting part accommodating part 35 is formed with a compact shape by reducing the curvature radius of the supporting part accommodating part 35. Furthermore, the rigidity of the supporting part 13 in the longitudinal direction and the rigidity in the lateral direction are caused to differ, so that deformation can easily be caused to take place in one direction, and so that deformation does not readily occur in the direction perpendicular to this first direction. For example, this supporting part 13 can be formed from a thin metal part such as a coil spring.

(a1) through (a3) are diagrams showing the condition of the display part 11 in the image observation position; here, the supporting part 13 has a shape that depicts a curved line in the lateral direction, and holds the display part 11 in front of the eye. In this case, the supporting part 13 is arranged so that the rigidity is strong and deformation tends not to occur in the vertical direction.

When the supporting part 13 is to be accommodated in the supporting part accommodating part 35, the supporting part 13 is rotated 90° downward from this state with respect to the supporting part accommodating part 35 as shown in (b1) through (b3). Then, the rigidity of the supporting part 13 is small in the vertical direction, so that deformation readily occurs. When the supporting part 13 is pushed in from this state in the direction indicated by the arrow, the supporting part 13 enters the interior of the supporting part accommodating part 35 while undergoing deformation along the supporting part accommodating part 35, and the supporting part 13 is ultimately accommodated inside the supporting part accommodating part 35 as shown in (c1) through (c3). Thus, the supporting part accommodating part 35 can be made more compact, and the overall size of the head mounted display main body part 1 can be reduced in the state in which the supporting part 13 is accommodated.

(Eighteenth Working Configuration)

FIG. 21 shows diagrams illustrating how a head mounted display main body part (portion mounted on the head) constituting an eighteenth working configuration of the present invention is mounted on the head. FIG. 21(*a*) is a sectional plan view, FIG. 21(*b*) is an enlarged sectional plan view of part A in FIG. 21(*a*), FIG. 21(*c*) is an enlarged longitudinal sectional view of part B in FIG. 21(*a*), FIG. 21(*d*) is an enlarged longitudinal sectional view of part C in FIG. 21(*a*), and FIG. 21(*e*) is a sectional view along line D-D in FIG. 21(*a*).

The head mounted display main body part 1 is constructed with a mounting part 15 which is mounted on the back part of the head, a supporting part 13 which is attached to the mounting part 15 so that this supporting part 13 can be accommodated in a hole 15*a* inside the mounting part 15 and extended from the mounting part 15, a display part 11 which is attached to the tip end part of the supporting part 13, and which displays images, and left and right holding parts 19 which are attached to the mounting part 15, as the main constituent parts. In the example shown in FIG. 21, the head mounted display main body part 1 is mounted on the head by means of the holding parts 19. Furthermore, the supporting part 13 consists of three parts, i.e., a tip end part 13*a*, a central part 13*b*, and a rear end part 13*c*. Moreover, a supporting part 11*a* is disposed on the display part 11.

As is shown in FIG. 21(*b*), a motor 50 is attached to a supporting part 4*a*, and the rotating shaft of this motor 50 is attached to the display part 11; the display part 11 is arranged to be pivotable with this rotating shaft as the pivoting center. Accordingly, by causing the motor 50 to rotate, it is possible to vary the angle of inclination of the display part 11 with respect to the vertical direction. Furthermore, a motor 51 is attached to the tip end part 13*a*, and the supporting part 11*a* is attached to the rotating shaft of this motor 51. Specifically, the supporting part 11*a* is arranged to be pivotable with this rotating shaft as the pivoting center. Accordingly, it is possible to vary the angle of inclination of the display part 11 with respect to the left-right direction by causing the motor 51 to rotate.

Moreover, as is shown in FIG. 21(*c*), a motor 52 is attached to the other end of the tip end part 13*a*, and the rotating shaft of this motor 52 is fastened to the central part 13*b*. Specifically, the tip end part 13*a* is arranged to be pivotable with this rotating shaft as the pivoting center. Accordingly, the tip end part 13*a* can be bent in the vertical direction with respect to the central part 13*b* by causing the motor 52 to rotate; as a result, the display part 111 can be moved upward and downward in the form of a circular arc in front of the face, and can be positioned in front of the eye.

Furthermore, as is shown in FIG. 21(*d*), a motor 53 is attached to the tip end of the rear end part 13*c*, and the rotating shaft of this motor 53 is fastened to the central part 13*b*. Specifically, the central part 13*b* is arranged to be pivotable with this rotating shaft as the pivoting center. Accordingly, the central part 13*b* can be bent in the left-right direction with respect to the rear end part 13*c* by causing the motor 53 to rotate; as a result, the display part 11 can be moved to the left and right in the form of a circular arc in front of the face, and can be positioned in front of the eye.

When the supporting part 13 is in the state shown in FIG. 21(*a*), the tip end part 13*a*, central part 13*b* and rear end part 13*c* constituting the supporting part 13 are located on a single circular arc, and the radius of this circular arc is set so that this radius is the same as the radius of the circular arc formed by the mounting part 15.

Meanwhile, a motor 54 is attached to the mounting part 15, and a circular disk 55 is attached to the rotating shaft of this motor 54. The circular disk 55 is made of an elastic material such as a synthetic rubber, or a material having a smooth surface such as a fluororesin, and the outer circumference of this circular disk 55 contacts the inner circumference of the rear end part 13*c* (or successively contacts the inner circumference of the central part 13*b* or tip end part 13*a* depending on the position of the supporting part 13). Accordingly, when the motor 54 is caused to rotate, the circular disk 55 rotates, and the supporting part 13 is pulled into the interior of the hole 15*a* or extended from the hole 15*a* by the frictional force with the rear end part 13*c*. As a result, the display part 11 can be positioned in front of the face or positioned to the side of the head along the circular arc formed by the supporting part 13.

In this example, the display part 11 has five degrees of freedom, i.e., inclination in the vertical direction (by means of the motor 50), inclination in the left-right direction (by means of the motor 51), positioning in the vertical direction (by means of the motor 52), positioning in the left-right direction (by means of the motor 53), and positioning in the forward-rearward direction (by means of the motor 54); these can all be positioned by the motors.

Furthermore, the circular disk 55 is made of an elastic material such as a synthetic rubber, or a material having a smooth surface such as a fluororesin; accordingly, if a resistance force that is equal to or greater than a specified value is applied when the supporting part 13 is pulled in or extended, slipping occurs between the circular disk 55 and the supporting part 13, so that forcible driving of the supporting part 13 is prevented.

Figure 22:
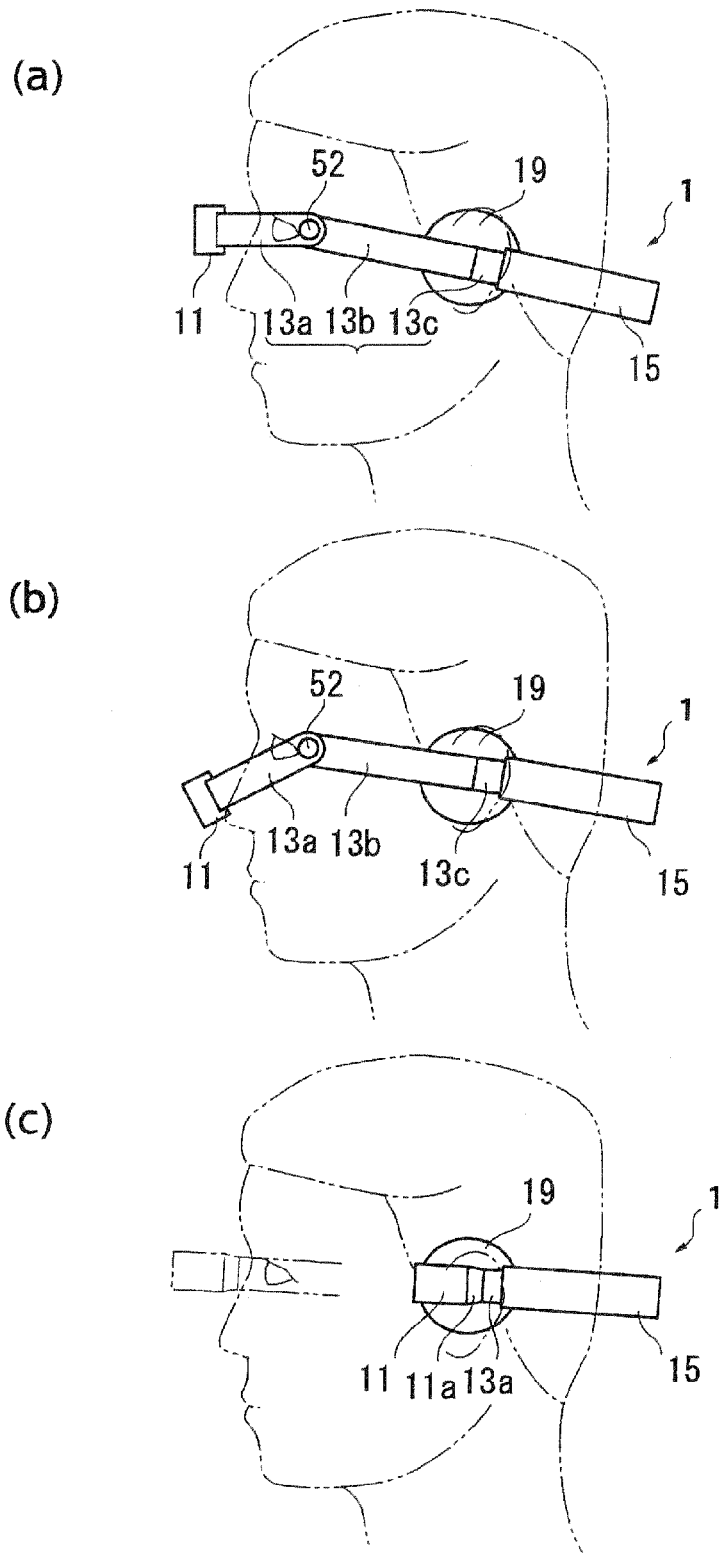
FIG. 22 shows explanatory diagrams illustrating a state in which the head mounted display main body shown in FIG. 21 is mounted on the head, as seen from the left side of the face.

FIG. 22 shows schematic diagrams illustrating a state in which the head mounted display main body part 1 shown in FIG. 21 is mounted on the head, as seen from the left side of the face.

FIG. 22(*a*) is a diagram showing the image observation state in which images are observed; here, the supporting part 13 is extended so that the display part 11 is positioned in front of the face. Generally, the feeling of mounting is better if the mounting part 15 is mounted with an inclination so that the front of the mounting part 15 is raised slightly upward. On the other hand, the feeling of mounting is better if the tip end part 13*a* is placed in a horizontal state; accordingly, the tip end part 13*a* is placed in a state in which this part is bent slightly downward with respect to the orientation of the central part 13*b*, so that the tip end part 13*a* is horizontal. Furthermore, although this is not shown in the figures, by appropriately bending the central part 13*b* inward, the display part 11 is positioned in front of the eye, and the inclination of the display part 11 in the vertical and left-right directions is then adjusted so that the images are easily observed.

FIG. 22(*b*) is a diagram showing the conditions when the display part 11 is placed in the retracted position or emergency retracted position. Here, the tip end part 13*a* is bent downward as a result of the rotation of the motor 52; consequently, the display part 111 is shifted from in front of the eye, so that the forward visual field is placed in an open state. The retracted position is generally a position in which the display part 11 is positioned when the observation of images is temporarily interrupted, while the emergency retracted position is a position in which the display part 11 is positioned in order to ensure an open forward visual field by moving the display part 11 from in front of the eye in cases where an object has approached so that danger is predicted. In this example, the position of the display part 11 shown in FIG. 22(*b*) is used as both the retracted position and the emergency retracted position.

FIG. 22(*c*) is a diagram showing how the display part 11 is moved to the accommodated position. The accommodated position is a position which is devised so that the shape of the head mounted display main body part 1 is made compact to facilitate carrying. In order to place this display part 11 in this position, the motor 51 shown in FIG. 21 is first caused to rotate so that the display part 11 is placed in an open state from in front of the eye (a state indicated by the two-dot chain line in FIG. 22(*c*)), and the motors 52 and 53 in FIG. 21 are caused to rotate so that the tip end part 13*a*, central part 13*b* and rear end part 13*c* are caused to assume the form of a circular arc; then, the motor 54 is caused to rotate so that the supporting part 13 is pulled into the hole 15*a* of the mounting part 15. In cases where the head mounted display main body part 1 is not used for a long period of time, or in cases where the head mounted display main body part 1 is removed from the mounted state, the head mounted display main body part 1 is thus placed in a state in which the display part 11 is moved into the accommodated position.

Figure 23:
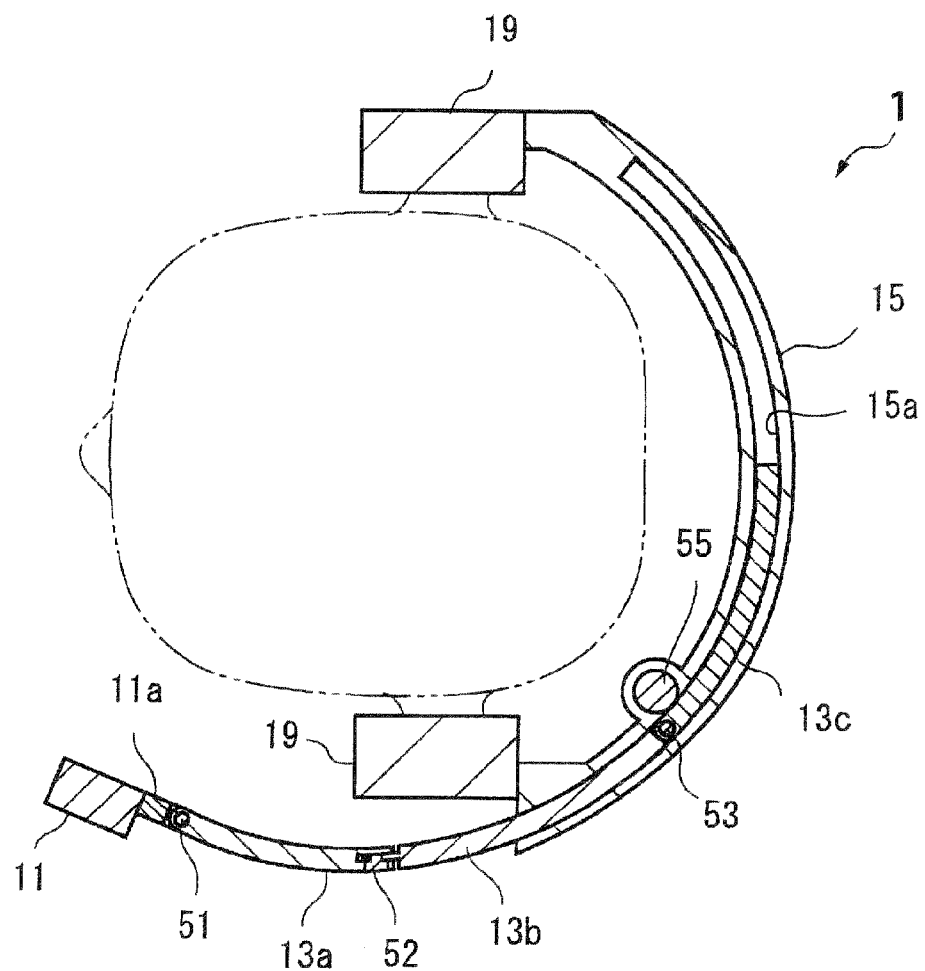
FIG. 23 is a diagram showing a state in which the display part has been moved to the intermediate position of accommodation or separate emergency retraction position in the head mounted display main body shown in FIG. 21.

FIG. 23 is a diagram showing a state in which the display part 11 has been moved to the intermediate position of accommodation or a separate emergency retracted position in the head mounted display main body part 1 shown in FIG. 21. This diagram is a sectional plan view. This state is a state in which the display part 11 has been stopped in an intermediate position of the movement of the display part 11 from the image observation position shown in FIG. 21(*a*) to the accommodated position shown in FIG. 22(*c*). Thus, if there is a position where the display part 11 does not block the visual field between the image observation position and the accommodated position, this position can be used instead of the retracted position or emergency retracted position described above.

In the working configuration described above, the display part 11 is provided with a total of five degrees of freedom, and the system is devised so that these respective degrees of freedom are controlled by motors; however, it is not absolutely necessary to provide the display part 11 with such a large number of degrees of freedom. Moreover, instead of using the motive force of motors or the like to provide all of the degrees of freedom, it would also be possible to move some of these degrees of freedom manually. In particular, it would also be possible to devise the system so that free coupling means using, for example, spherical bearings is used in the coupling parts between the display part 11 and supporting part 13, thus making it possible to set the attitude of the display part 11 with respect to the supporting part 13 manually with a certain degree of freedom. A working configuration of the head mounted display with few degrees of freedom will be described below.

In cases where an accommodated position or waiting position is provided, beginning with this working configuration, it is desirable that this accommodated position or waiting position be disposed beside the ear of the user. Generally, the mounting part 15 is fastened to the head by attaching the holding parts 19 to the ears; however, as is shown in FIG. 2, it would also be possible to dispose the accommodated position or waiting position beside such a holding part 19 or in the vicinity of this holding part 19, or to form a recessed part in the outside of one of the holding parts 19, and to fit the display part 11 into this recessed part at the time of accommodation. Furthermore, it would also be possible to dispose the waiting position on the side of the back part of the head as shown in FIG. 6.

(Nineteenth Working Configuration)

Figure 24:
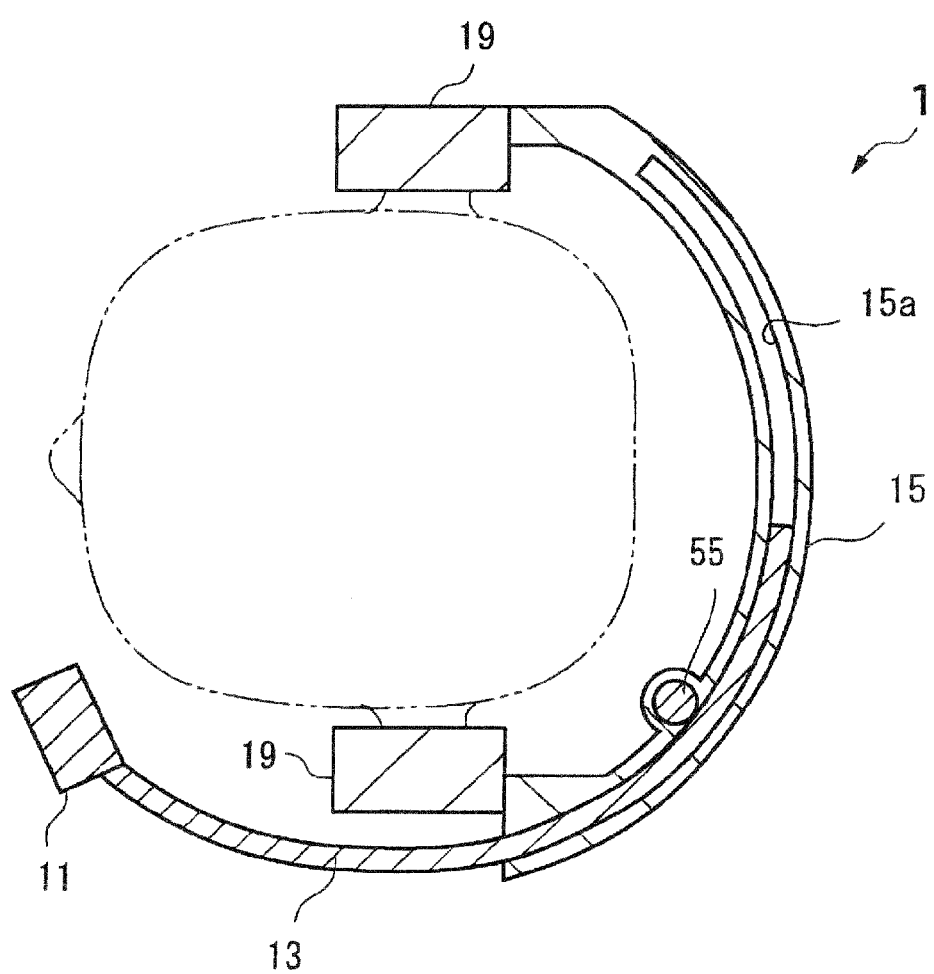
FIG. 24 is an explanatory diagram showing a nineteenth working configuration of the present invention.

FIG. 24 is a diagram showing how a head mounted display main body part constituting a nineteenth working configuration of the present invention is mounted on the head; this diagram is a sectional plan view. In this working configuration, the supporting part 13 is not divided into three parts, and the display part 111 is also directly connected to the supporting part 13. The supporting part 13 is accommodated inside the hole 15*a* by means of a circular disk 55 directly connected to a motor as shown in FIG. 21, and is driven so that this supporting part 13 is extended from the hole 15*a*. Specifically, in this working configuration, the degree of freedom of the position of the display part 11 is one. The figure shows how the display part 11 is located in the intermediate position of accommodation or the emergency retracted position; if the supporting part 13 is further extended from this position, the display part 11 is positioned in the image observation position, and if the supporting part 13 is further accommodated inside the hole 15*a* from this position, the display part 11 is positioned in the accommodated position.

(Twentieth Working Configuration)

Figure 25:
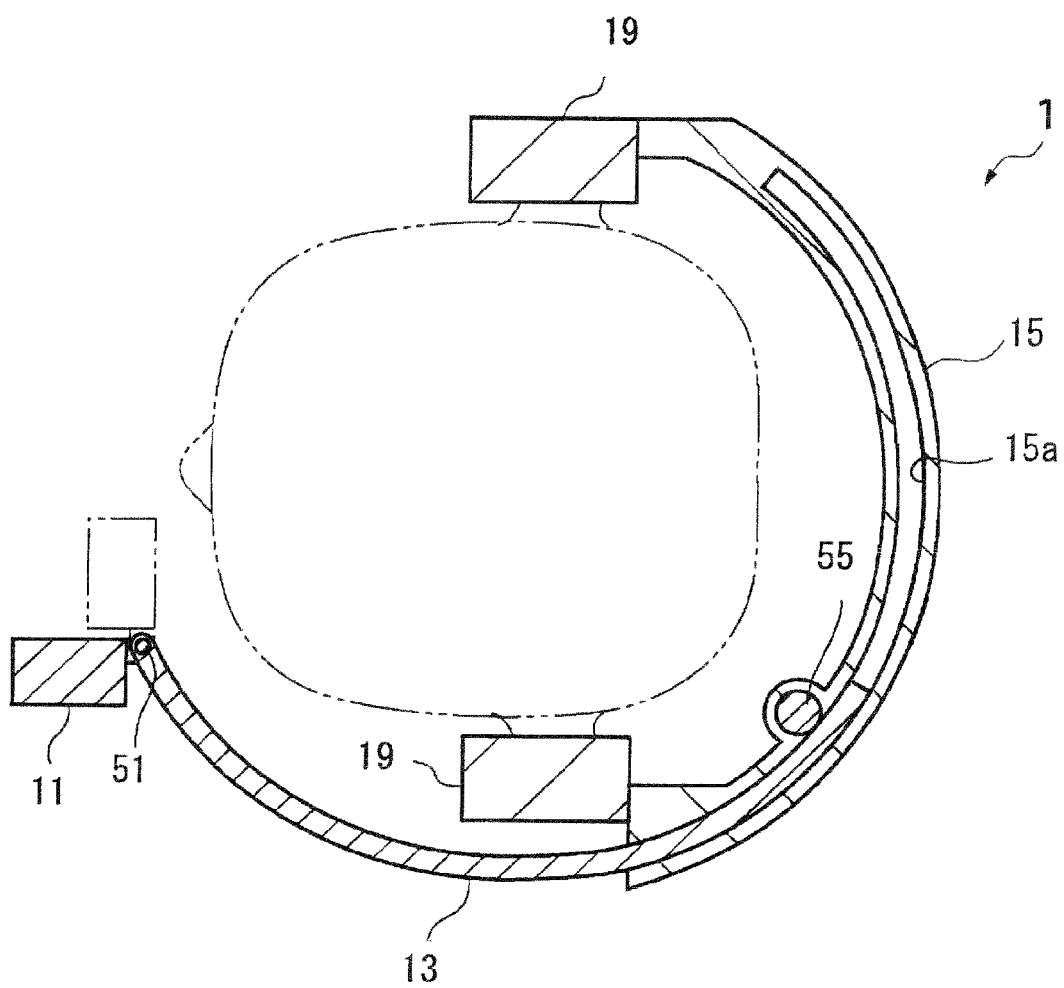
FIG. 25 is an explanatory diagram showing a twentieth working configuration of the present invention.

FIG. 25 is a diagram which shows how a head mounted display main body part constituting a twentieth working configuration of the present invention is mounted on the head; this diagram is a sectional plan view. This working configuration is a working configuration in which pivoting of the display part 111 is added to the working configuration shown in FIG. 24. Specifically, a motor 51 corresponding to the motor 51 shown in FIG. 21 is attached to the tip end part of the supporting part 13, and the system is devised so that only the inclination of the display part 111 in the left-right direction is varied by means of a construction similar to the construction shown in FIG. 21(*b*) (however, there is no pivoting caused by the motor 50).

Figure 26:
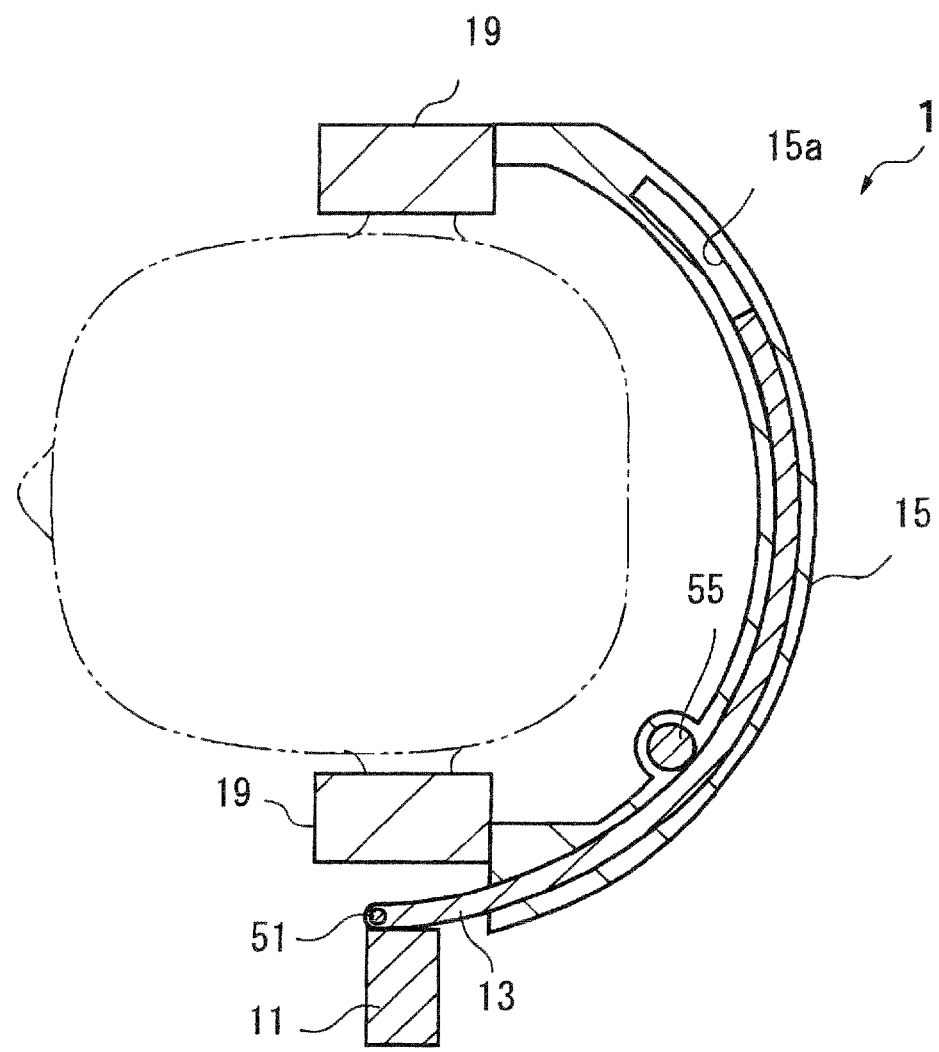
FIG. 26 is a diagram showing how the display part of the head mounted display shown in FIG. 25 is placed in the accommodated state.

The state of the display part 11 indicated by a two-dot chain line in FIG. 25 is the image observation state (use state); by causing the motor 51 to rotate from this state, the display part 11 is pivoted so that this display part 11 is positioned in the position indicated by the solid line. This position corresponds to the intermediate position of accommodation or emergency retracted position. Specifically, in this working configuration, the system is devised so that freedom of the forward visual field can be ensured by the pivoting of the display part 11 alone. When the supporting part 13 is accommodated inside the hole 15*a* as a result of the circular disk 55 being caused to rotate from this position by the motor 54, the display part 111 is positioned in the accommodated position shown in FIG. 26.

(Twenty-First Working Configuration)

Figure 27:
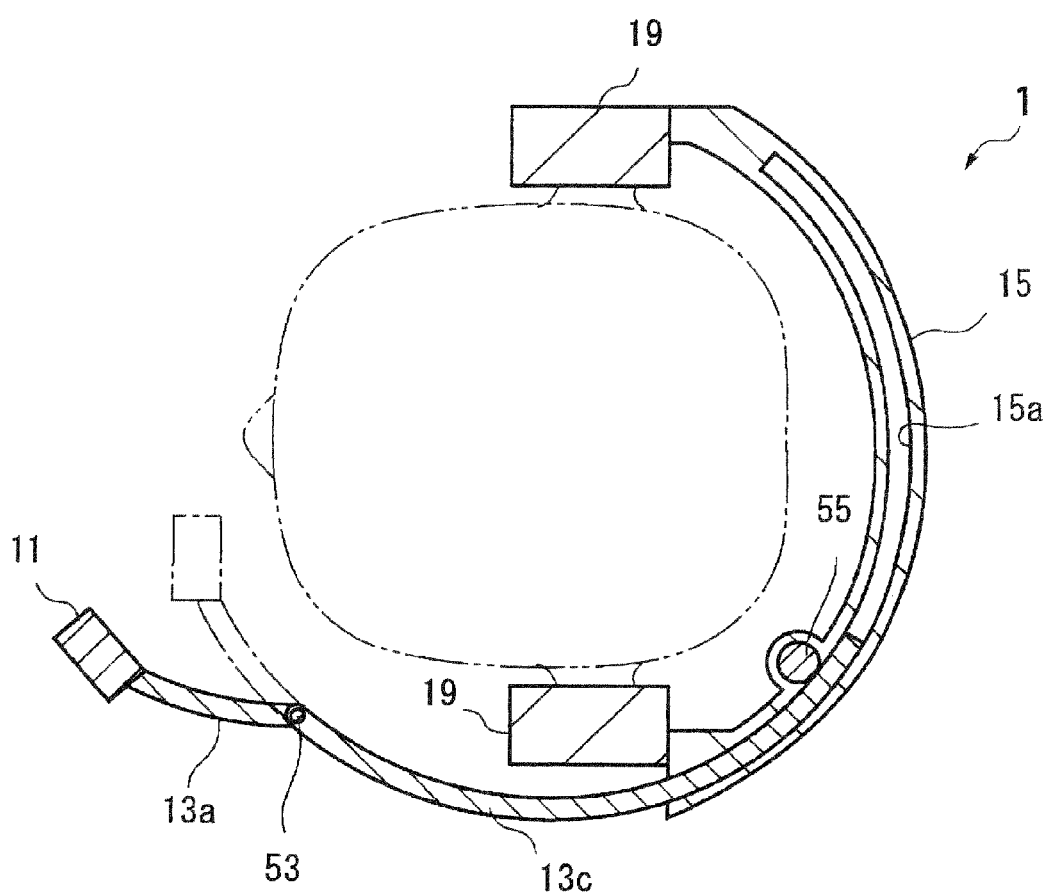
FIG. 27 is an explanatory diagram showing a twenty-first working configuration of the present invention.

FIG. 27 is a diagram showing how a head mounted display main body part constituting a twenty-first working configuration of the present invention is mounted on the head; this diagram is a sectional plan view. This working configuration is a working configuration which is devised so that in the working configuration shown in FIG. 24, the supporting part 13 is divided into two parts, i.e., a tip end part 13a and a rear end part 13c, and the tip end part 13a is caused to pivot in the horizontal direction with respect to the rear end part 13c by the rotation of the motor 53 shown in FIG. 21.

The state of the display part 11 indicated by the two-dot chain line in FIG. 27 is the image observation state; by causing the motor 53 to rotate from this state, the display part 11 is caused to pivot so that this display part 11 is positioned in the position indicated by the solid line. This position corresponds to the emergency retracted position. Specifically, in this case, the display part 11 is caused to move into the accommodated position as follows: namely, with the display part 11 placed in the state indicated by the two-dot chain line, the circular disk 55 may be caused to rotate by the motor 54 so that the supporting part 13 is pulled into the hole 15a; the intermediate position of accommodation is also disposed at an intermediate point in this path. The placing of the tip end part 13a in an open state is performed only for the purpose of emergency retraction. In this working configuration, the system is devised so that freedom of the forward visual field can be ensured by the pivoting of the display part 11 alone.

If the circular disk 55 is caused to rotate from this position by the motor 54 so that the tip end part 13a is caused to pivot and is positioned on the same circular arc shape as the rear end part 13c while the supporting part 13 is accommodated inside the hole 15a, the display part 111 can be positioned in the accommodated position.

Figure 28:
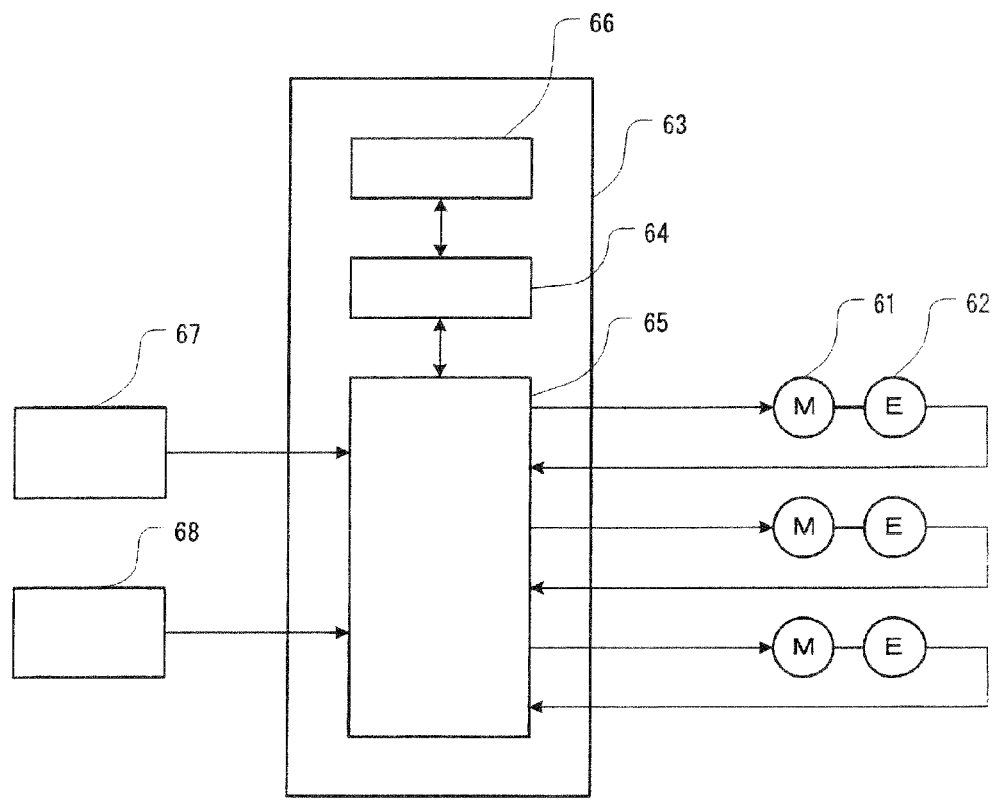
FIG. 28 is a diagram showing an example of construction of the control device.

Thus, in cases where the position of the display part 111 is controlled using the motive force of motors or the like, it is desirable to perform position control by means of a control device. FIG. 28 is a diagram showing an example of the construction of such a control device. In FIG. 28, an example is shown in which three motors 61 are controlled; an encoder 62 is attached to each motor 61, so that the rotational angle of each motor (pivoting angle of the object of pivoting) can be detected.

The control device 63 is constructed around an MPU 64, and has a memory 65 and an input-output device 66. Furthermore, an input device 67 and a sensor 68 (an ultrasonic sensor, infrared sensor or the like, or an infrared camera such as that described later) are connected to the input-output device 66 of the control device 63.

The rotational angles of the respective motors 61 in the image observation position, accommodated position, retracted position, emergency retracted position, intermediate position of accommodation, and the like are stored in memory in the control device 63. Furthermore, since there may be cases in which the appropriate positions for the image observation position, retracted position, emergency retracted position and intermediate position of accommodation vary according to the person using the display device, a plurality of rotational angles of the respective motors 61 are stored in memory in accordance with these positions. Moreover, with regard to the image observation position, even in cases where the same person is using the display device, there may be cases in which there are differences in the method of use; accordingly, in such cases, rotational angles of the respective motors 61 corresponding to a plurality of positions are stored in memory.

When the position (among these positions) in which the display part 111 is to be positioned is input from the input device 67, the MPU 64 extracts the rotational angles of the respective corresponding motors 61 from the memory 65, and drives the motors 61 according to a sequence stored in the memory 65 as necessary, so that the display part 11 is positioned in the target position. Input from the encoders 62 is used for feedback of this position control.

The movement of the display part 111 to a specified position by the control device 63 is also performed by input from the sensor 68. For example, in cases where an object approaches during the observation of images by the display part 11, or in cases where an object contacts the display part 1, it is desirable that the necessary freedom of the forward visual field be ensured by moving the display part 11. In such a case, a contact sensor or distance sensor is attached to some point on the head mounted display main body part 1, preferably the display part 11, and such situations are sensed and input into the control device 63. Accordingly, the control device 63 causes the display part 11 to retract to the emergency retracted position, so that the freedom of the forward visual field can be ensured.

Furthermore, the system may also be devised so that a sensor that detects the pivoting of the display part 11 is installed as the sensor 68, the manual movement of the display part 11 from the image observation position to the retracted position is detected, and in this case, the control device 63 causes the display part 11 to move to the accommodated position or intermediate position of accommodation.

Moreover, the system may also be devised so that the rotational speeds of the respective motors 61 can be switched in multiple stages; for example, the system may be devised so that this switching is performed in accordance with input from the input device 67. In addition, the system may also be devised so that during the movement of the display part 11, the display part 11 is caused to move at a high speed until a specified freedom of the forward visual field is ensured, after which the display part 11 is caused to move at a slower speed. It goes without saying that in the case of an emergency, it is preferable that the display part 11 be caused to move to the emergency retracted position at the highest speed possible. Furthermore, it would also be possible to increase the precision of positioning by moving the display part 11 at a high speed in cases where the display part 11 is distant from the target position, and by lowering the speed when the distance from the target position is equal to or less than a specified value. Moreover, in the head mounted display, if there is an abrupt variation in speed when the members are driven by a motive force, a force is applied to the head by the resulting reaction; accordingly, it is desirable to prevent the application of an excessively large force to the head by means of speed control and acceleration control.

(Twenty-Second Working Configuration)

Figure 29:
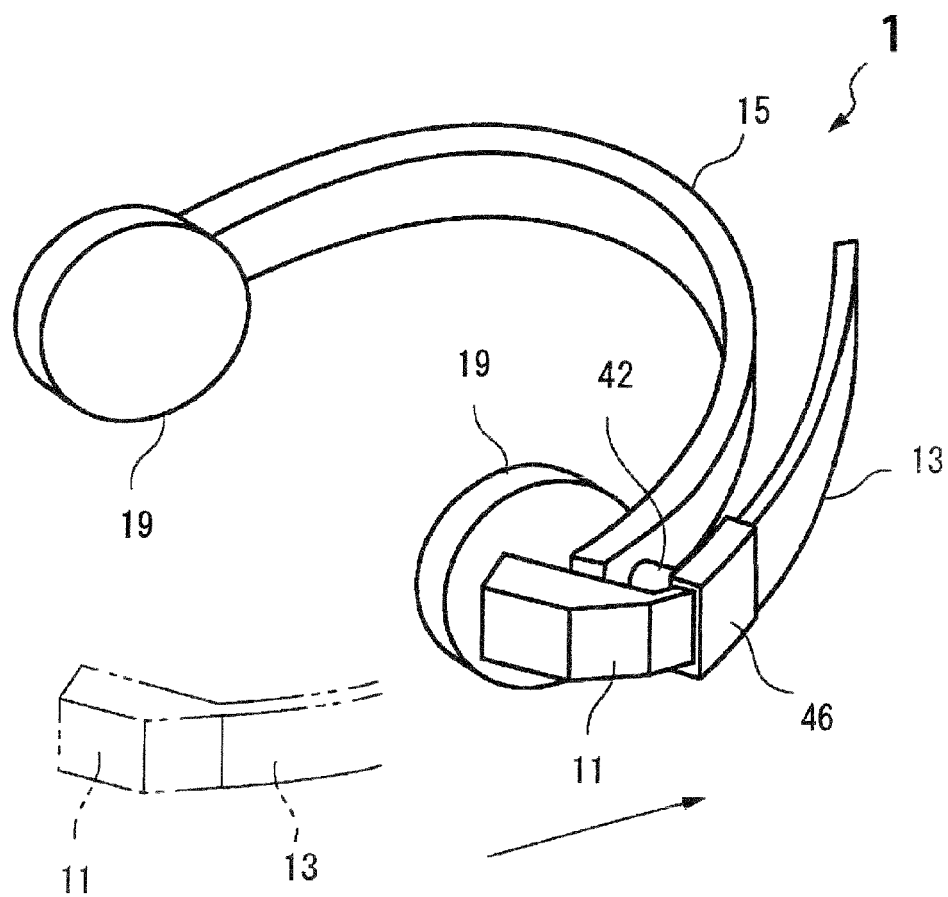
FIG. 29 is an explanatory diagram showing a twenty-second working configuration of the present invention.

FIG. 29 is a schematic diagram showing the head mounted display main body part of a head mounted display constituting a twenty-second working configuration of the present invention. The working configuration shown in FIG. 2 differs from the working configuration shown in FIG. 10 only in that there is no accommodating part for the supporting part, with the supporting part 13 instead being supported by a holder 46, so that the supporting part 13 can be moved forward and rearward through the holder 46.

The holder 46 can pivot with respect to the mounting part 2 by means of a shaft 42, and the extension angle of the supporting part 13 can be varied by causing the holder 46 to pivot in the vertical direction, so that the position where the display part 11 is positioned in front of the face can be varied. This is the same as in the working configuration shown in FIG. 10. The indication of the position of the use state of the display part 11 by the two-dot chain line is also the same as in FIG. 10. The solid line indicates the positioning of the display part 111 in the retracted position.

(Twenty-Third Working Configuration)

Figure 30:
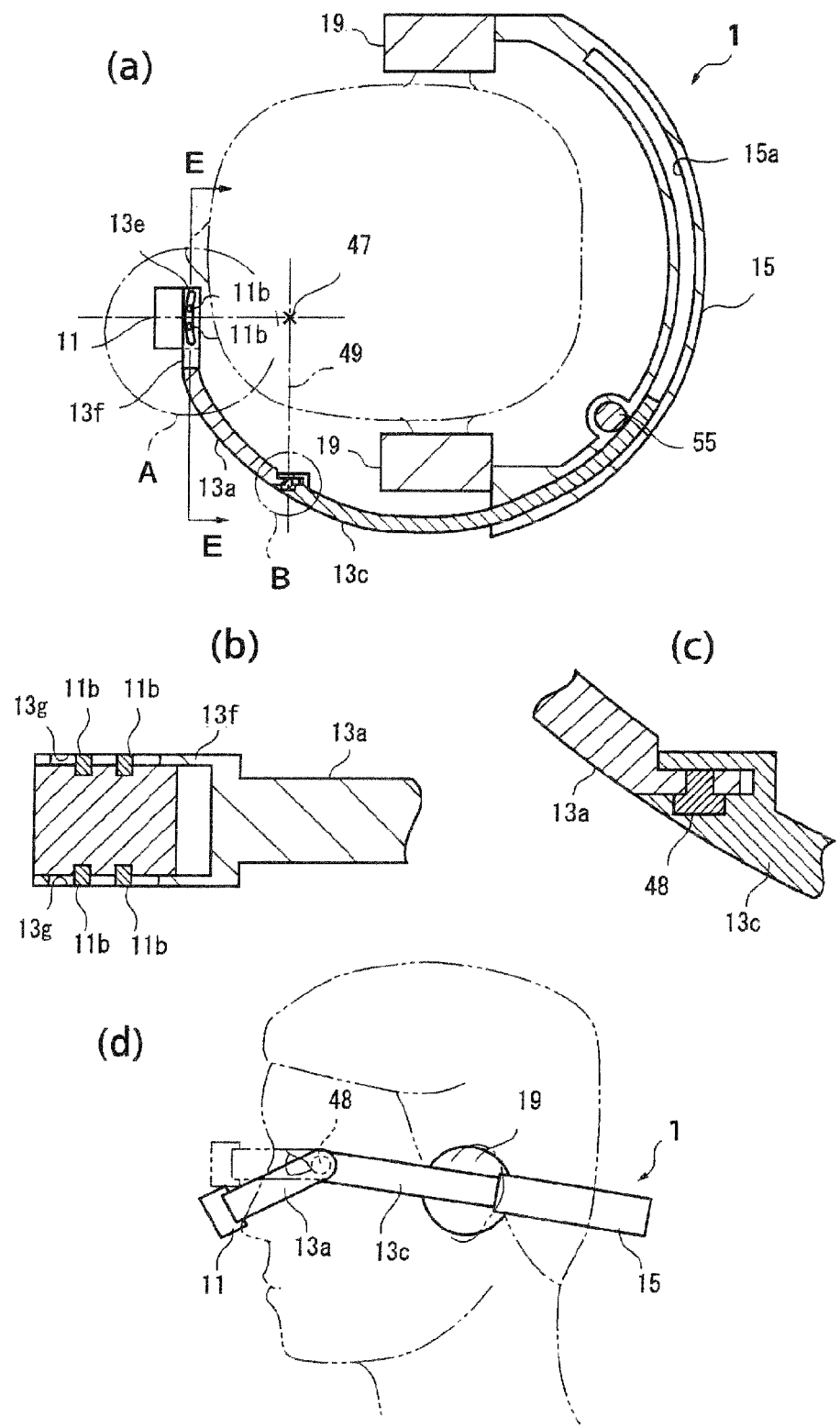
FIG. 30 shows explanatory diagrams illustrating a twenty-third working configuration of the present invention.

FIG. 30 shows diagrams illustrating how a head mounted display main body part constituting a twenty-third working configuration of the present invention is mounted on the head; FIG. 30(*a*) is an overall sectional plan view (one portion being a plan view), FIG. 30(*b*) is a longitudinal sectional view of part A along line E-E, FIG. 30(*c*) is an enlarged view of part B, and FIG. 30(*d*) is a view of the mounted state as seen from the left side of the face.

In this working configuration, a C-shaped part 13*f* is disposed on the tip end portion of the tip end part 13*a*, and circular arc-form slots 13*g* are formed in the upper and lower portions of this C shape. Furthermore, as is shown in FIG. 30(*b*), two pins 11*b* each are disposed in the left-right direction above and below on the display part 11, and these pins 11*b* fit into the slots 13*g*. Accordingly, the display part 11 can swing in the left-right direction; here, since the pins 11*b* are constrained by the slots 13*g*, pivoting occurs with the curvature centers of the slots 13*g* as pivoting centers.

The curvature centers of the slots 13*g* are arranged so that the positions of these centers coincide with the center of rotation 47 of the eyeball when the head mounted display main body part 1 is mounted on the head. Of course, the distance between the display part 11 and the center of rotation 47 of the eyeball varies according to individuals, and according to the mounted state of the head mounted display main body part 1; accordingly, the system is designed so that these values coincide when an average person performs an average mounting operation. Consequently, in the actual mounted state, a slight deviation may occur between these values.

Since the swinging of the display part 11 in the left-right direction is a pivoting operation about the center of rotation 47 of the eyeball, the left-right position of the display part 11 is altered; as result, even if the direction of the following line of sight varies, the relative positional relationship of the line of sight and the display part 11 is kept substantially constant.

In part B, a motor 48 is attached to the rear end part 13*c*, and the tip end part 13*a* is attached to the rotating shaft. Accordingly, the tip end part 13*a* is caused to pivot in the vertical direction by the rotation of the motor 48. This axis of rotation is located exactly to the side of the center of rotation 47 of the eyeball in the mounted state of the head mounted display main body part 1, so that an extension line 49 of the axis of rotation passes through the center of rotation 47 of the eyeball. Accordingly, when the motor 48 is caused to rotate, the tip end part 13*a* and display part 11 pivot; here, the center of pivoting coincides with the center of rotation 47 of the eyeball. Consequently, as is shown in FIG. 30(*d*), even if the position of the display part 11 varies in the vertical direction, the relative positional relationship between the line of sight and the display part 11 is maintained as a fixed relationship. In actuality, the fact that there is some deviation according to individual differences and mounting conditions is the same as in the pivoting that accompanies the left-right swinging of the display part 11.

The other parts of this working configuration are almost identical to the corresponding parts of the working configuration shown in FIG. 21; accordingly, a description of these parts is omitted.

(Twenty-Fourth Working Configuration)

Figure 31:
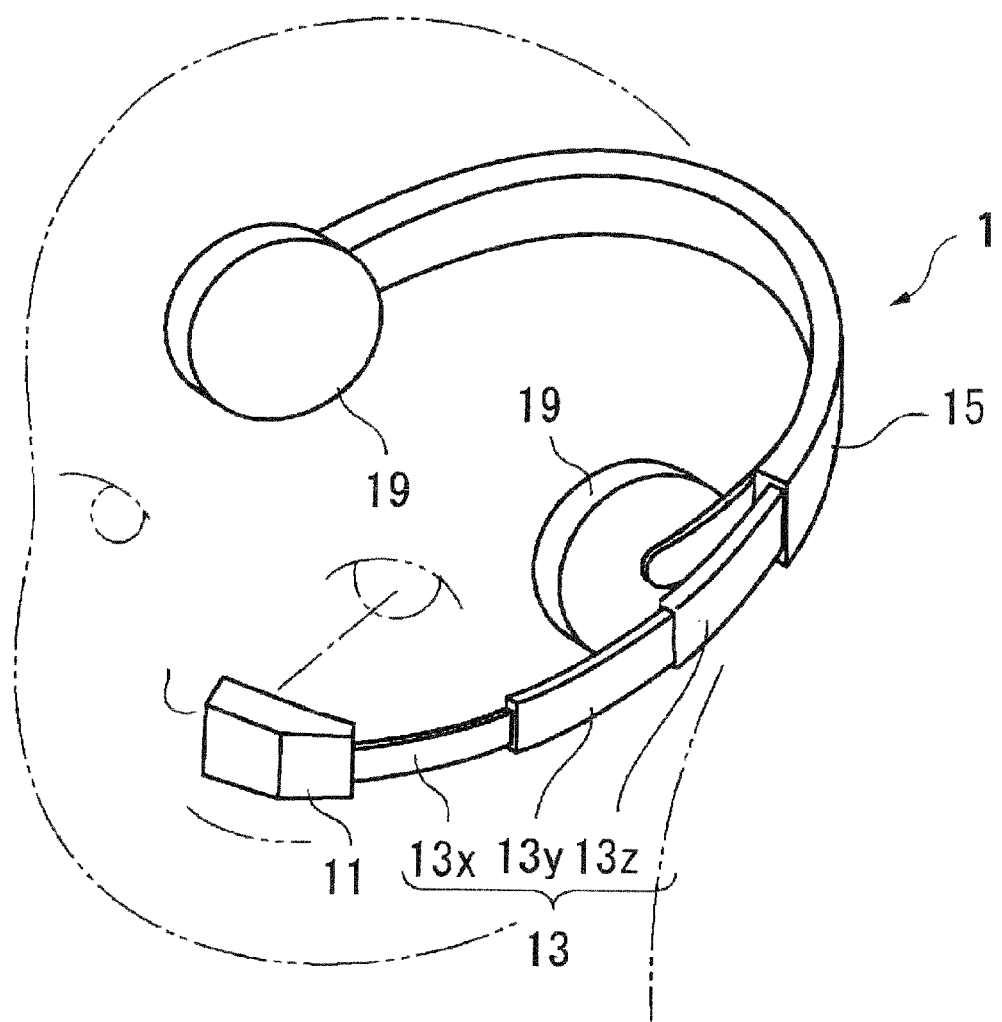
FIG. 31 is an explanatory diagram showing a twenty-fourth working configuration of the present invention.

FIG. 31 is a diagram illustrating how a head mounted display main body part constituting a twenty-fourth working configuration of the present invention is mounted on the head. In FIG. 31, the supporting part 13 consists of three members 13*x*, 13*y* and 13*z*, and the member 13*z* is attached to the mounting part 15. Furthermore, the member 13*y* is disposed so that this member 13*y* can slide through the member 13*z*, and the member 13*x* is disposed so that this member 13*x* can slide through the member 13*y*. A display part 11 is attached to the member 13*x*; the fact that the display part 11 can pivot with respect to the member 13*x* is the same as in the previously described working configurations. In this structure, the supporting part 13 can be extended or retracted by causing the members 13*x*, 13*y* and 13*z* (which have a telescoping structure) to slide with respect to each other.

FIG. 31 is a diagram in which the supporting part 13 is extended, so that the display part 11 is positioned in front of the left eye. When the display part 11 is desired to be retracted to the outside of the visual field from the position shown in the figure, the display part 11 is caused to pivot into a position that is close to parallel with the tip end part of the member 13*x*; subsequently, the supporting part 13 is retracted by causing the members 13*x*, 13*y* and 13*z* to slide with respect to each other, so that the display part 11 is positioned to the side of the head, and is thus retracted to the outside of the visual field.

In this structure, there is no need for any special structure to accommodate the supporting part 13; furthermore, the supporting part 13 can be extended and retracted by means of an extremely simple telescoping structure, so that the display part 11 can be positioned in front of the eye, or retracted to the outside of the visual field. Furthermore, in this structure, in order to allow the members 13*x*, 13*y* and 13*z* to slide with respect to each other, it is necessary that these members have a rectilinear form, or a circular arc shape having the same radius.

A method in which the supporting part 13 is formed with a pantograph structure or a folding structure is conceivable as a method of obtaining an operational effect comparable to that of this structure.

In the respective working configurations described above, there is no need to perform an image display when the display part 11 is not in the use position. Accordingly, when it is detected that the display part 11 is not in the use position, it is desirable that the power supply to the display part 11 be switched off. As a result, the useful life of the battery can be prolonged.

Furthermore, it would also be possible to devise the system so that it is detected whether or not the head mounted display main body part is mounted on the head of the user, for example, by attaching a proximity sensor to the mounting part 15 or the like, and so that power is supplied to the display part 11 and respective driving parts only in cases where this main body part is mounted. Alternatively, it would also be possible to devise the system so that in cases where it is detected by such a sensor that the head mounted display main body part has been mounted on the head of the user, driving is performed so as to move the display part 11 into a position in front of the eye. Conversely, it would also be possible to devise the system so that the display part 11 is moved into the standby position when it is detected by such a sensor that the head mounted display main body part is not mounted on the head of the user. Moreover, it would also be possible to provide an off-delay timer for these movements, and to devise the system so that the display part 111 is moved into a position in front of the eye in cases where it is detected that the head mounted display main body part has been mounted on the head of the user for a specified time, and so that the display part 11 is conversely moved to the standby position when it is detected that the head mounted display main body part has not been mounted on the head of the user for a specified time.

Furthermore, it is desirable to attach a detection device that detects the position of the pupil of the eyeball to the display part 11, and to provide a mechanism that moves the position of the image display device in the display part 11 so that this device is aligned with the position of the pupil according to this detection. In addition, there may be cases in which it is desirable to make an adjustment in accordance with the direction of the line of sight of the detected pupil, and to set the content of the displayed image as a content that is suited to the orientation of this line of sight.

(Twenty-Fifth Working Configuration)

FIG. 32 shows schematic diagrams of a first example of a system in which operating buttons 91 which are operating members that are used to manipulate the images displayed on the display part 11 are attached to the head mounted display main body part 1. FIG. 32(*a*) is a diagram showing a case in which the head mounted display main body part 1 is mounted so that the display part 11 is positioned in front of the left eye. The head mounted display main body part 1 is fastened to the head by a mounting part 15. Furthermore, a supporting part 13 is pulled out from here, and is aligned with the position of the left eye for use.

In the figure, the operating buttons 91 are attached to a holding part 19, and do not move even when the display part 11 moves. In the figure, three operating buttons 91 are installed, and the shapes of these operating buttons are respectively different. Accordingly, when these operating buttons 91 are operated by hand HA, the operating button 91 that is being touched cannot be directly confirmed by visual confirmation; however, these operating buttons 91 can be distinguished by sense of touch when the operating buttons 91 are touched.

FIG. 32(*b*) is a diagram showing a case in which the head mounted display main body part 1 is mounted so that the display part 11 is positioned in front of the right eye. In this case, the supporting part 13 is attached on the right side, and the display part 11 can be positioned in front of the right eye by pulling this supporting part 13 out from the mounting part 15. In this state, the holding part 19 that was located on the left ear is moved to the right ear, and the holding part 19 that was located on the right ear is moved to the left ear; here, operating buttons 91' are also attached to the holding part 19 that newly covers the left ear.

Furthermore, the positions and shapes of these parts are the same as those attached to the holding part 19 on the left ear in FIG. 32(*a*), and the functions of these parts are also the same. Accordingly, the wearer can operate the operating buttons 91 and 91' by exactly the same operation in the case of FIG. 32(*a*) and the case of FIG. 32(*b*).

The roles of such operating buttons 91 and 91' include on-off switching of the video images, changeover switching of the types of video images, adjustment of the audio volume, on-off switching of the power supply, and the like. Furthermore, in cases where the extension and retraction of the supporting part 13 from and into the mounting part 15 is accomplished by electrical driving, an operating button can also be caused to perform this role of operating switching.

(Twenty-Sixth Working Configuration)

Figure 33:
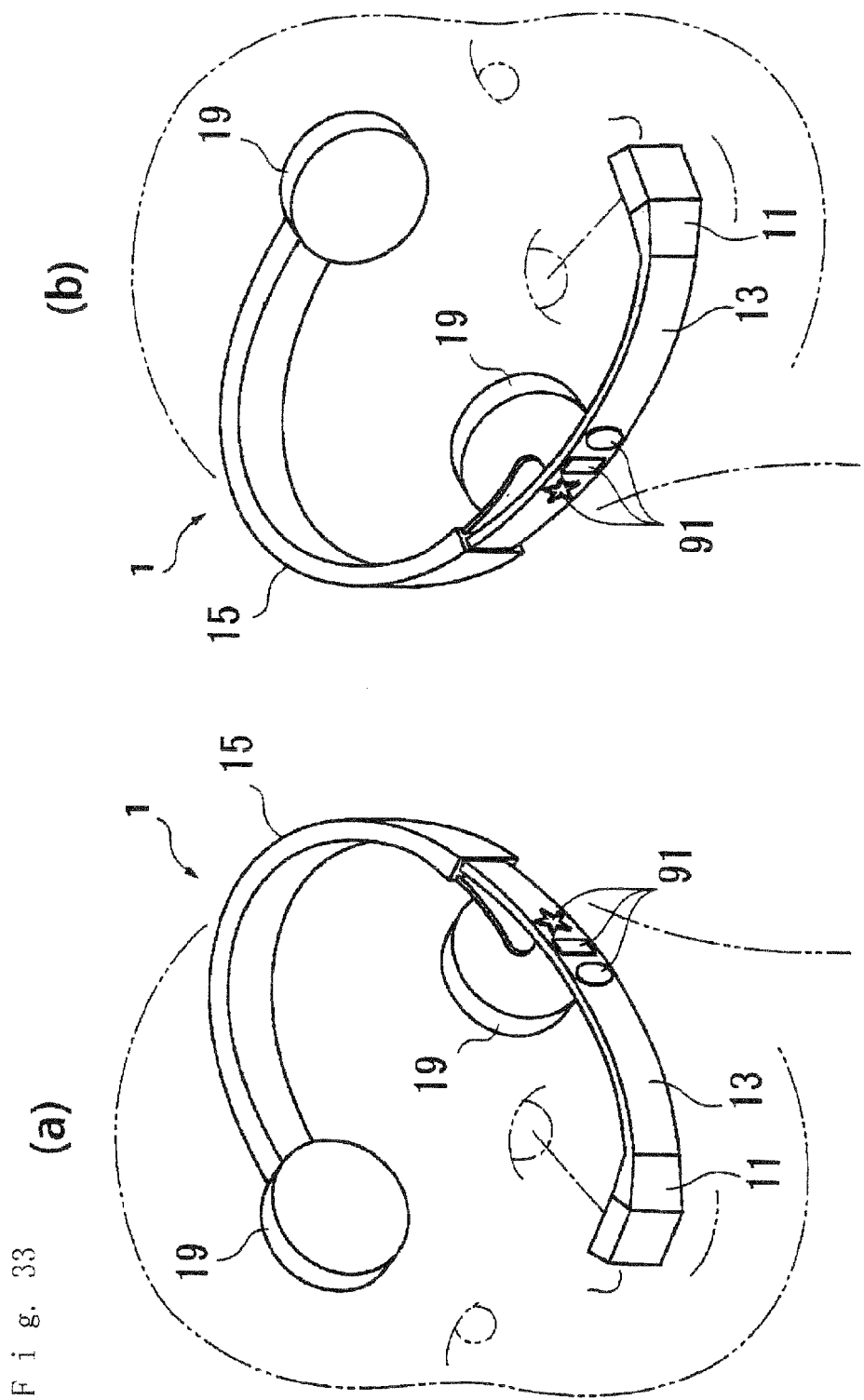
FIG. 33 shows schematic diagrams illustrating a twenty-sixth working configuration of the present invention in which operating buttons are attached to a display arm.

Meanwhile, FIG. 33 shows schematic diagrams of a second example of a head mounted display main body part 1 in which operating buttons 6 constituting operating members that manipulate the images displayed on the display part 11 are attached to the supporting part 13. In FIG. 33, the operating buttons 91 are attached to the supporting part 13. FIG. 33(*a*) shows the conditions in a case in which the head mounted display main body part 1 is mounted so that the display part 11 is positioned in the left eye position. In this working configuration, the operating buttons 91 are attached to the supporting part 13.

In the figures, three operating buttons 91 are installed; the shapes of these operating buttons 91 are respectively different. Accordingly, when these operating buttons 91 are operated by hand, the operating button 91 that is being touched cannot be directly confirmed by visual confirmation; however, these operating buttons 91 can be distinguished by sense of touch when the operating buttons 91 are touched.

FIG. 33(*b*) shows the conditions in a case in which the head mounted display main body part 1 is mounted so that the display part 11 is positioned in the right eye position. In this case, as the supporting part 13 is moved to the right side, the operating buttons 91 are also attached on the right side of the face. Accordingly, the operation of the operating buttons 91 is accomplished using the right hand. However, since the forward-rearward disposition relationship of the operating buttons 91 does not change, the positional relationship is easily grasped; furthermore, since the shapes of the operating buttons 91 are respectively different as was described above, the operating buttons 91 can easily be discriminated by sense of touch.

Furthermore, in the example shown in FIG. 33, the shapes of the operating buttons 91 are designed as circle, square and star shapes. The circle and square show vertical symmetry, while the star does not show vertical symmetry. Accordingly, if this star shape is changed to a vertically symmetrical shape, e.g., a regular hexagonal shape, then the shapes of the operating buttons 91 will be the same with respect to the vertical direction in both FIG. 33(*a*) and FIG. 33(*b*).

Moreover, the shapes of these operating buttons 91 were varied so that the operating buttons were made distinguishable by sense of touch; however, for example, it would also be possible to make these buttons distinguishable by sense of touch by differentiating the dimensions of the buttons from each other.

Incidentally, with regard to the disposition of these operating buttons 91, in a case where a disposition was tried in which the forward-rearward relationship was kept the same, but the left-right relationship was centered on the center of the face, the left-right relationship was reversed, so that users who were not accustomed to this disposition became confused in some cases. In order to prevent such confusion, it is desirable to display the disposition of the operating buttons 91 on the display part 11. An example of this is shown in FIG. 34.

FIG. 34(*a*) shows the conditions in a case in which the head mounted display main body part 1 is mounted so that the display part 11 is located in the left eye position. In this case, the operating buttons 91 are located on the left side as seen from the center of the face, and the operating buttons 91 are lined up in the order circle, square, star from the center of the face. Accordingly, on the display screen 92 of the display part 11, an operating button display 93 is displayed on the left side with the operating buttons lined up in the order circle, square star from the central part.

Furthermore, in cases where there is a relative size relationship among the respective operating buttons 91, the layout of the operating buttons can be made much clearer by devising the system so that the display of the operating button display 93 on the display screen 92 of the display part 11 reflects this size relationship.

Incidentally, FIG. 34(*b*) shows the conditions in a case in which the head mounted display main body part 1 is mounted so that the display part 11 is located in the right eye position. In this case, the operating buttons 91 are located on the right side as seen from the center of the face, and the operating button display 91 are lined up in the order circle, square, star from the center of the face. Accordingly, on the display screen 8 of the display part 11, the operating button display 93 is displayed on the right side with the operating buttons lined up in the order circle, square star from the central part.

As one example of a method for detecting whether the head mounted display main body part 1 is in the position shown in FIG. 34(*a*) or in the position shown in FIG. 34(*b*), it is possible to discriminate between the two positions by attaching a gravity sensor to the head mounted display main body part 1, and discriminating the direction in which gravity acts (as was described above). Furthermore, the same is also true in cases where a sensor that detects the attachment position is present. Moreover, as was described above, the supporting part 13 has a jointed structure, and can move the display part 11 in the upward and downward directions. In the case of such a structure, it is possible to distinguish the two positions according to the direction of bending of the joint parts.

Furthermore, it would also be possible to install touch sensors (pressure sensors, push button switches, or the like may also be used) on the respective operating buttons 91, and to devise the system so that the images of buttons touched by hand can be distinguished from other images (by varying the color or brightness, causing a flashing display to be performed, or the like). If this is done, the operating button 91 that is to be operated can be confirmed on the display screen of the display part 11; accordingly, fewer operating mistakes are made.

Moreover, if touch sensors that can detect the positions touched by the fingers are used on the operating buttons or parts to which the operating buttons are fastened, the relative positions of the fingers with respect to the operating buttons can be detected. If the detected finger positions are displayed on the screen, operating mistakes can be prevented to an even greater degree.

In addition, in order to allow the viewing of other images, it is more desirable that the display 93 of these operating buttons 91 not be performed under ordinary conditions. Accordingly, the system may also be devised so that the image 93 of all of the operating buttons 91 or the image 93 of only the operating button 91 that is touched by the hand is displayed only when one of the operating buttons 91 is touched by the hand using the touch sensor.

Furthermore, although this is not shown in the figures, these operating buttons 91 may be attached to the mounting part 15 instead of the supporting part 13. Since the operating positions of the operating buttons 91 are located on the rear side in this case, the operability drops to some extent; however, since the mounting part 15 is a fixed part, an effect of having fixed positions is obtained.

(Twenty-Seventh Working Configuration)

Figure 35:
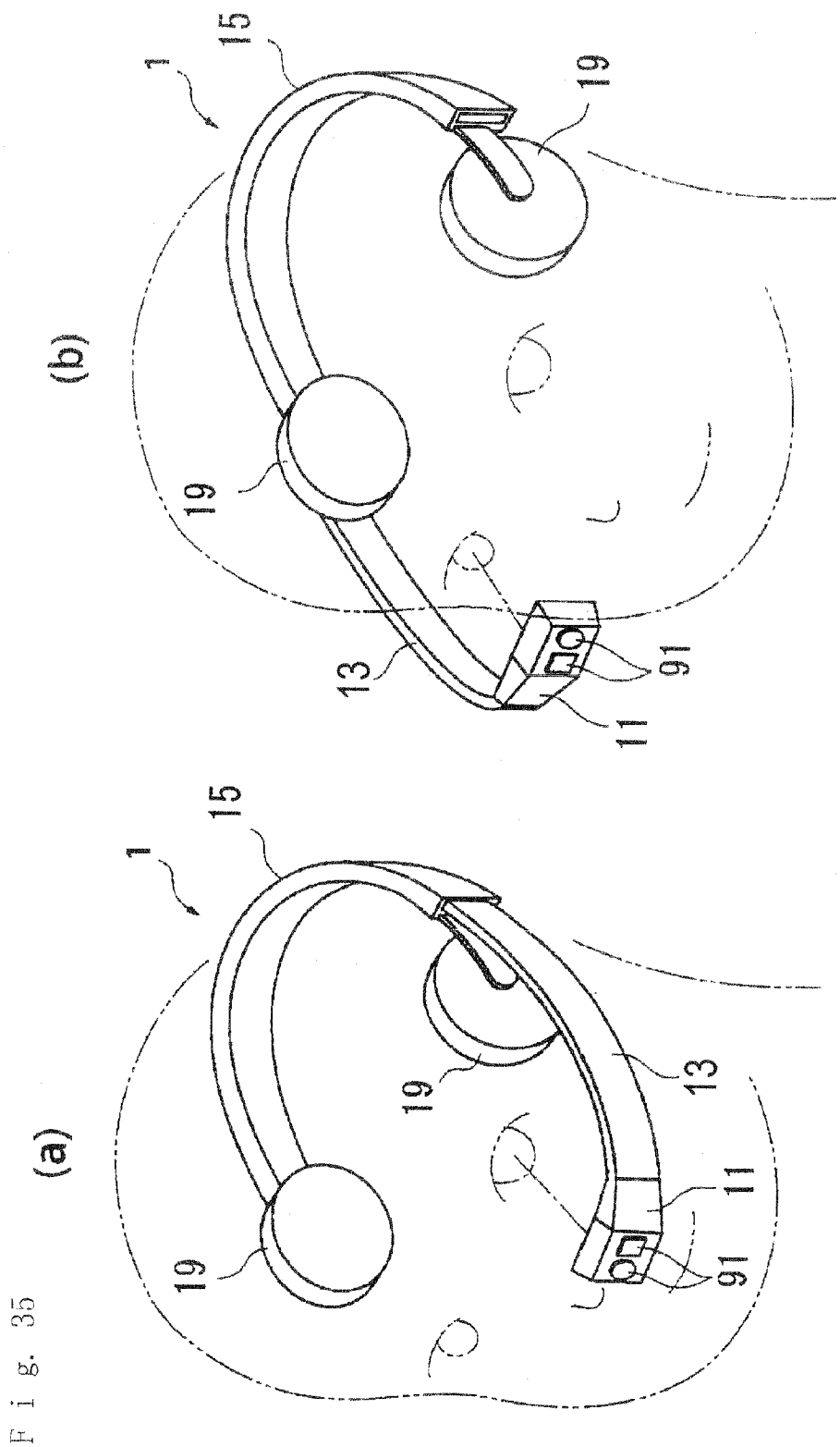
FIG. 35 shows diagrams illustrating a twenty-seventh working configuration of the present invention in which the operating buttons are attached to the back surface of the display part.

FIG. 35 shows diagrams illustrating an example in which the operating buttons 91 are attached to the back surface of the display part 11. Here, the operating buttons 91 are attached to the back surface of the display part 11 in two places, and have circle and square shapes. FIG. 35(*a*) shows a case in which the device is mounted so that the display part 11 is positioned in the left eye position, while FIG. 35(*b*) shows a case in which the device is mounted so that the display part 11 is positioned in the right eye position. As is shown in the figures, the operating buttons 6 have circle and square shapes, and the shapes are the same in both cases; however, the left-right positions are reversed. Accordingly, in cases where the disposition of the operating buttons 91 is shown in an image display as shown in FIG. 34, it is strongly necessary to reverse the left and right.

Furthermore, in the example described above, the display image is rotated 180° between a case where the device is used on the left eye and a case where the device is used on the right eye. Accordingly, depending on the method of use that is adopted, it is necessary to rotate the image display 180°. As was described above, this can be realized, for example, by making a judgment by means of a sensor as to whether the device is mounted for use on the left eye or mounted for use on the right eye, and performing switching by means of the image processing device accordingly.

(Twenty-Eighth Working Configuration)

FIG. 36 shows schematic diagrams illustrating how the portion that is mounted on the head in a head mounted display constituting a twenty-eighth working configuration of the present invention (i.e., the head mounted display main body part) is mounted on the head; FIG. 36(*a*) is a perspective view, and FIG. 36(*b*) is a sectional plan view. The head mounted display main body part 1 is constructed with a mounting part 15 which is mounted on the back part of the head, and which possesses elasticity so as to clamp the head, a supporting part 13 which is fitted into the mounting part 15 so that this supporting part 13 can move into and out of the mounting part 15, a display part 11 which is attached to the tip end part of the supporting part 13, and which displays images, and left and right holding parts 19 which are attached to the mounting part 15, as essential parts.

Holes 15*a* are formed in the left and right tip end parts of the mounting part 15. Switches 94 are installed in the back of the holes 15*a*, and the attachment of the supporting part 13 can be detected by the contact parts 94*a* of the switches 94 contacting the supporting part 13. It is ascertained by means of these switches 94 whether the head mounted display is being used on the left eye or being used on the right eye, and the image display can be controlled accordingly.

Figure 37:
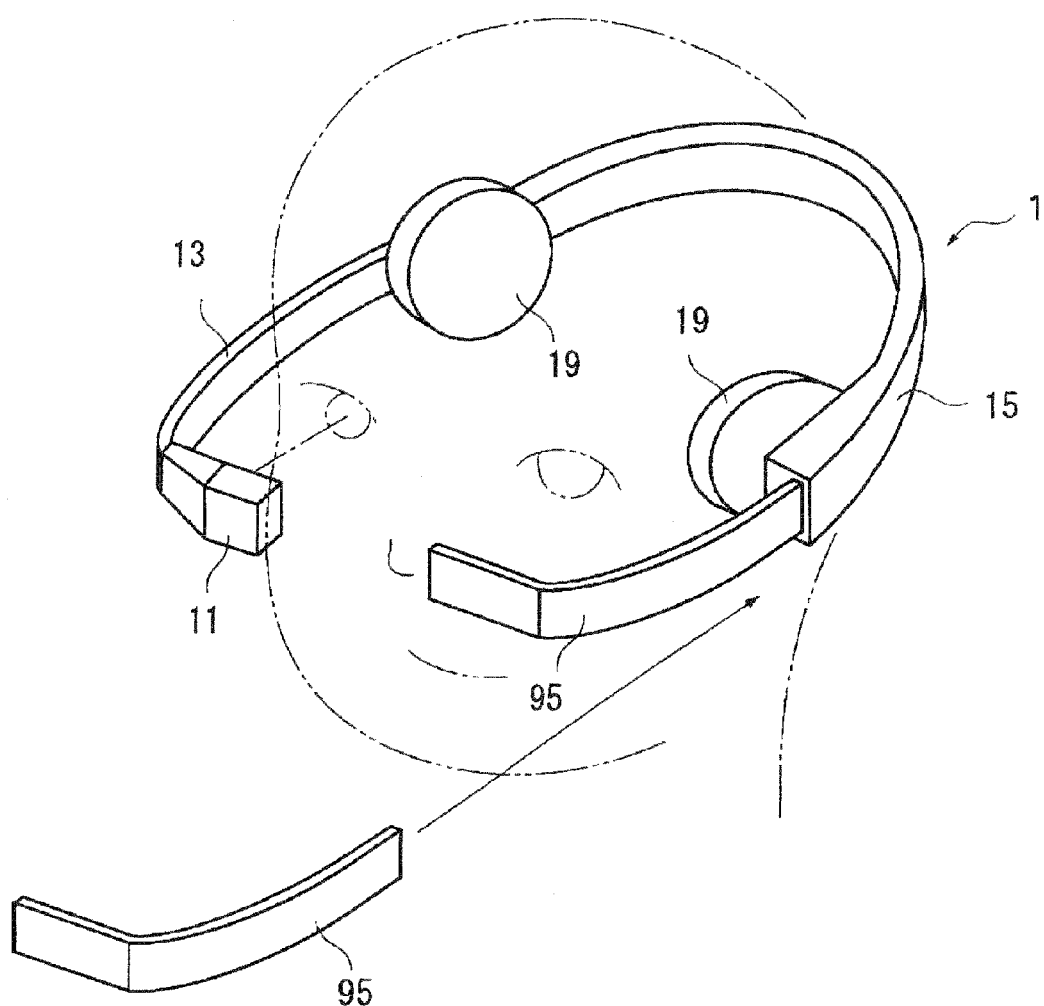
FIG. 37 is a diagram showing a state in which the display part of the head mounted display main body part shown in FIG. 1 is used on the right eye, and the left eye is covered by an eye covering member.

FIG. 37 shows a state in which the display part 11 is used on the right eye, and the left eye is covered by an eye covering member. In this working configuration, the system is devised so that the eye covering member 95 is attached using the hole 15*a* in the mounting part 15 on the left side of the face, which is left open.

Specifically, the end part of the eye covering member 95 is inserted into the hole 15*a* of the mounting part 15, and the eye covering member 95 is fastened to the mounting part 15. The figure shows a state in which the display part 11 is used on the right eye; it goes without saying that in cases where the display part 11 is used on the left eye, the supporting part 13 is attached to the hole 15*a* on the left side of the face, and the eye covering member 95 is attached to the hole 15*a* on the right side of the face. In this way, the eye covering member 95 can either be used or not used by attaching the eye covering member 95 to the hole 15*a* of the mounting part 15 or removing the eye covering member 95 from the hole 15*a*.

Figure 38:
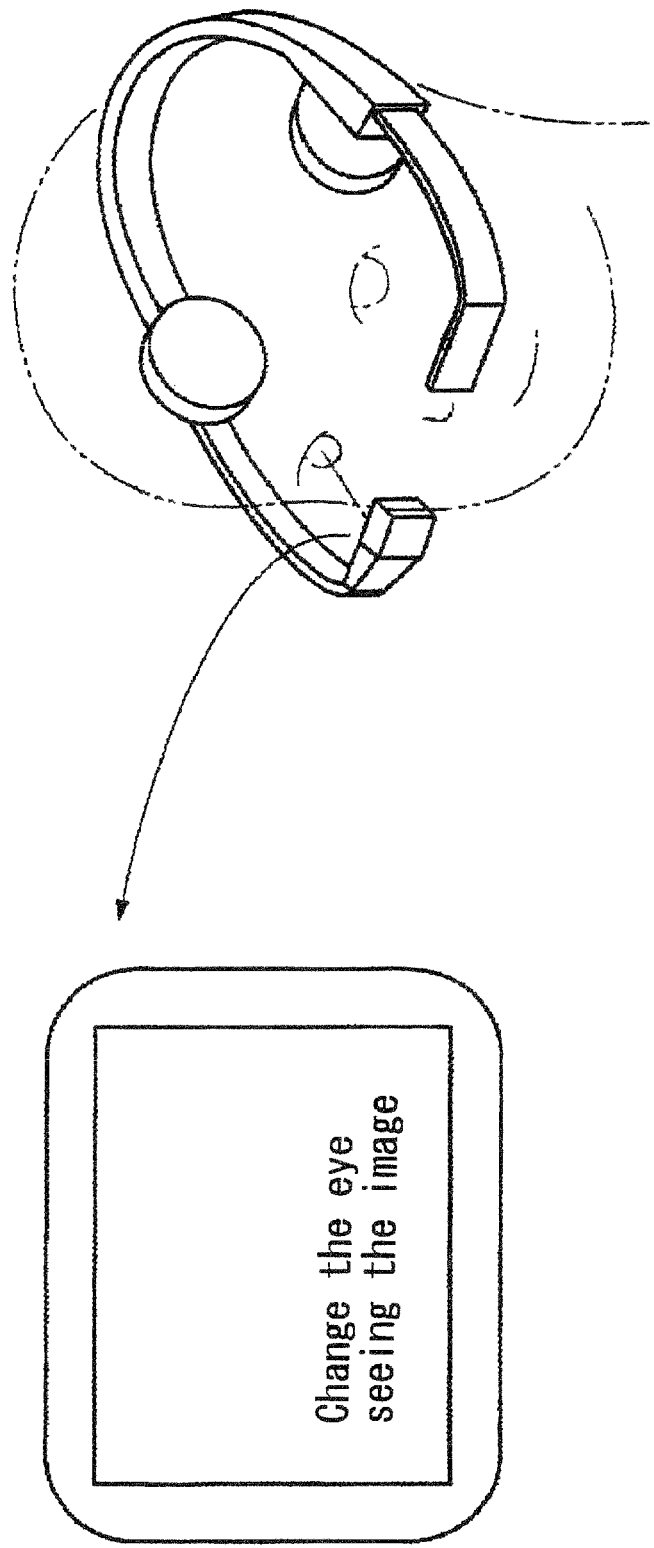
FIG. 38 is a diagram showing a state in which a message that prompts the switching of the eye viewing images is displayed on the display part 4 in a case where the viewing of images is continued for a specified period of time.

FIG. 38 shows a state in which the display part 11 is caused to display a message that urges the user to change the eye viewing the images in cases where the user has continued to view images for a specified period of time during the observation of the images of the display part 11 in a state in which the eye covering member 95 is mounted on the mounting part 15 as shown in FIG. 37. If the viewing of images is continued using only one eye, the eye may become fatigued, or a state of mental fatigue may result. In cases where the viewing of images is continued with one eye for a specified period of time, it is desirable to devise the system so that such a message is displayed. Of course, in cases where headphones are provided, such a message may be transmitted by voice.

(Twenty-Ninth Working Configuration)

Figure 39:
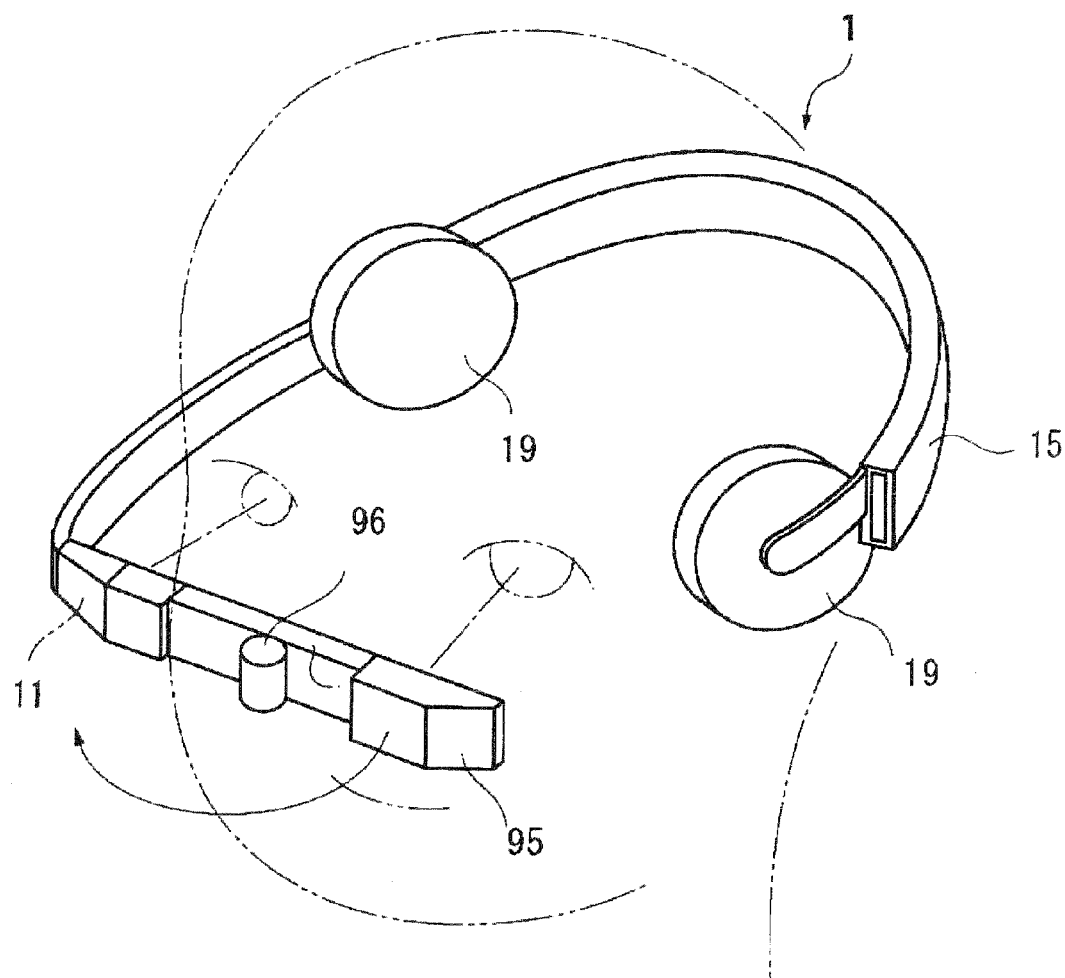
FIG. 39 is a schematic diagram showing how the head mounted display main body part of a head mounted display constituting a twenty-ninth working configuration of the present invention is mounted on the head.

FIG. 39 is a schematic diagram showing how the head mounted display main body part 1 of a head mounted display constituting a twenty-ninth working configuration of the present invention is mounted on the head.

In this working configuration, an eye covering member 95 is attached to the tip end of the display part 11 via a hinge 8. In the state shown in the figure, the hinge 96 is open, and the eye covering member 95 is positioned in front of the left eye in a state in which this member covers the left eye. If the eye covering member 95 is caused to rotate in the direction indicated by the arrow about the hinge 96 from this state, the eye covering member 95 is positioned on the back side of the display part 11, and does not enter the visual field of the left eye. Thus, by moving the eye covering member 95, it is possible either to use the eye covering member 95 or not to use the eye covering member 95.

(Thirtieth Working Configuration)

Figure 40:
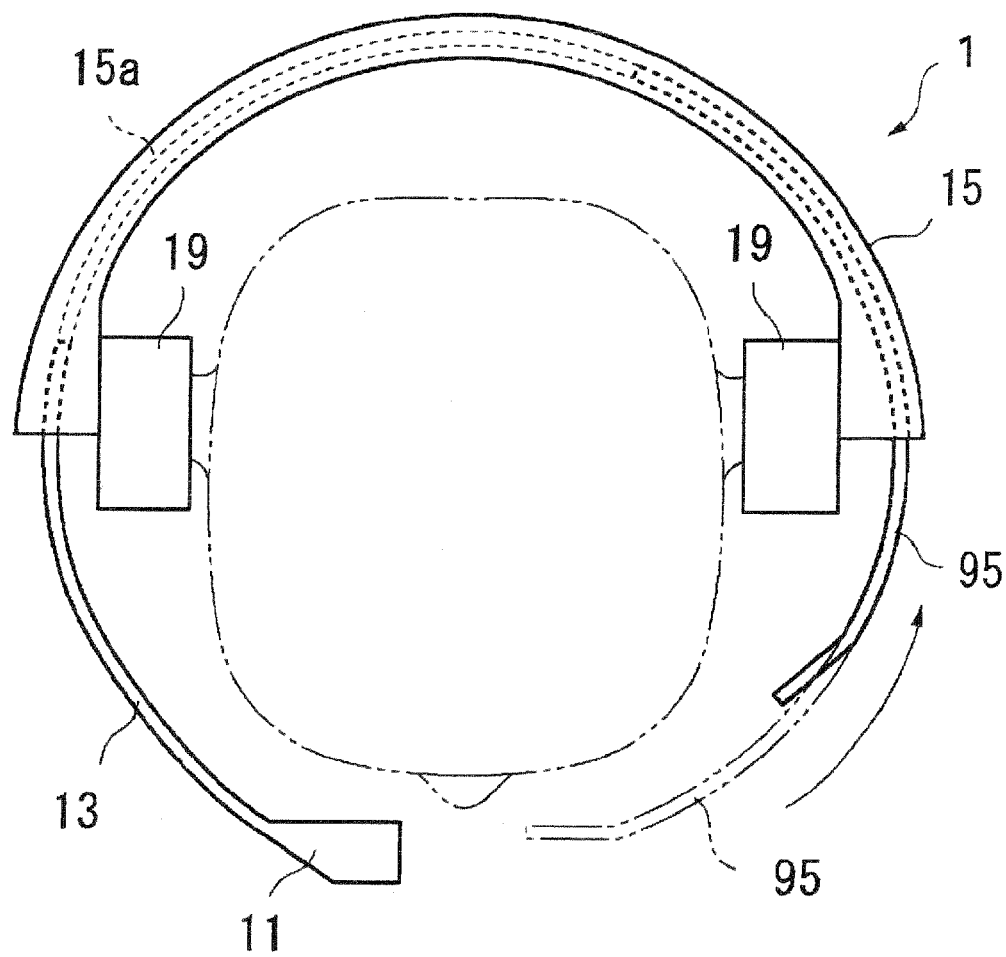
FIG. 40 is a plan view showing how the head mounted display main body part of a head mounted display constituting a thirtieth working configuration of the present invention is mounted on the head.

FIG. 40 is a plan view showing how the head mounted display main body part 1 of a head mounted display constituting a thirtieth working configuration of the present invention is mounted on the head. The schematic construction of the head mounted display main body part 1 of this working configuration is the same as that shown in FIG. 37; however, the holes 15*a* are formed as far as the deep inside parts of the mounting part 15, and the system is devised so that the handle part of the eye covering member 95 is inserted deeply into the interior of the corresponding hole 15*a*. Accordingly, by pushing the eye covering member 95 in the direction indicated by the arrow from the use state shown by the two-dot chain line in the figure so that the handle portion is pushed into the hole 15*a*, the eye covering member 95 is positioned in the position indicated by the solid line in the figure, and is thus removed from the visual field of the left eye. By thus moving the eye covering member 95, it is possible either to use the eye covering member 95 or not to use the eye covering member 95. Furthermore, the system may be devised so that the driving mechanism such as a motor that is used to drive the eye covering member 95 is installed internally, and the eye covering member 95 is moved by the driving force of this driving mechanism.

Figure 41:
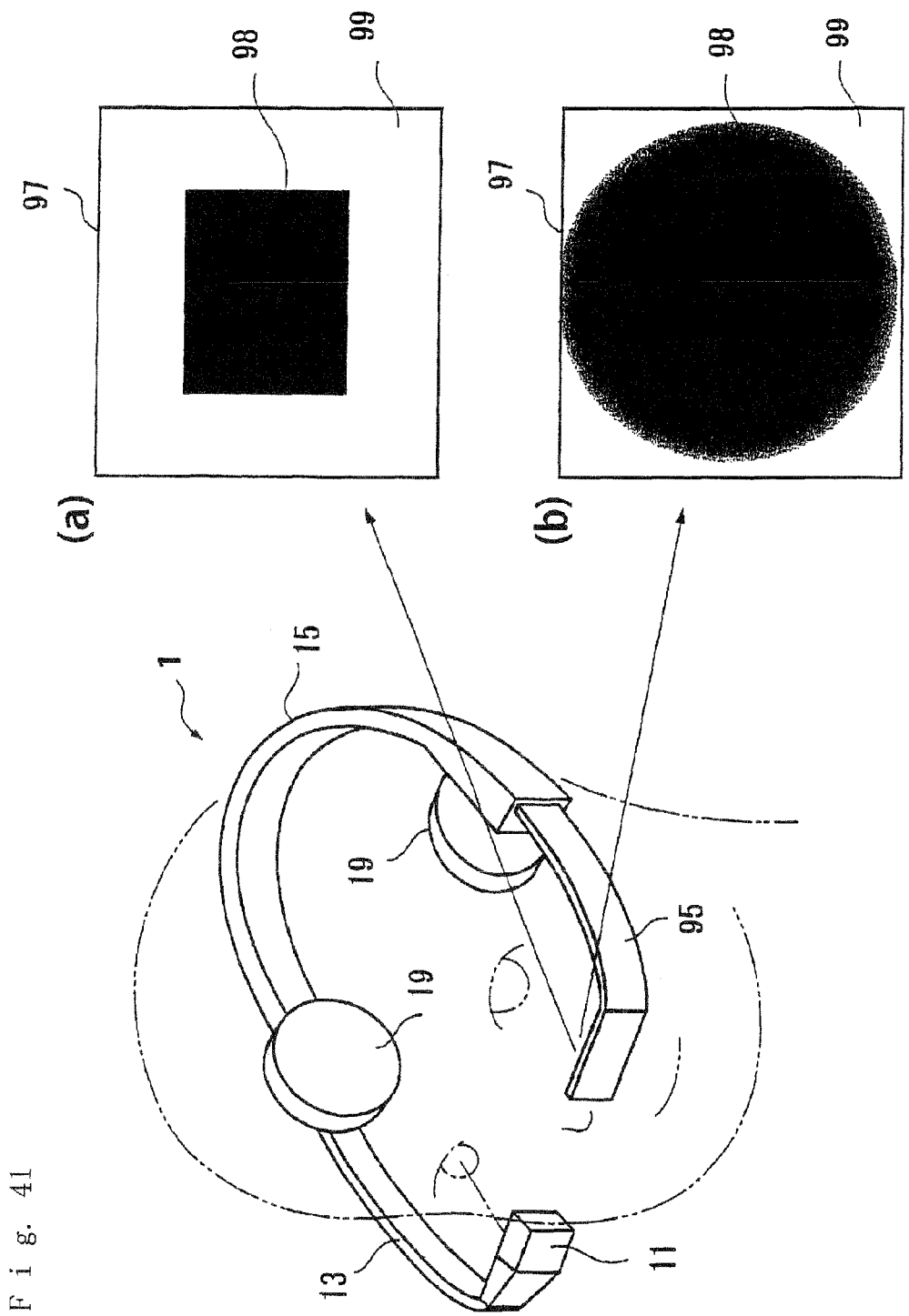
FIG. 41 shows diagrams illustrating an example of the light blocking state of the eye covering member in the mounted state of the eye covering member shown in FIG. 37.

FIG. 41 shows diagrams illustrating examples of the light blocking state of the eye covering member 95 shown in FIG. 37 in the mounted state of this eye covering member 95. In the figure, 97 indicates the blocking portion of the eye covering member; this shows the shape of the eye covering member 95 as seen from the side of the eye. A light blocking part 98 is disposed in the vicinity of the central part of the blocking portion 97 of the eye covering member; this part is a part that blocks light completely. The size of the light blocking part 98 is set so that this size is the same as the size (in the visual field) of the image that is displayed on the display part 11, or larger than this size. As a result, the image can be clearly seen. The reason that the size of the light blocking part 98 is set at a size that is larger than the size of the image in the visual field is to ensure that the image fits securely within the light blocking part 98 even in cases where the visible positions of the image and the light blocking part 98 are not completely superimposed, but are rather slightly shifted.

In FIG. 41(*a*), a semi-transparent part 99 is disposed on the outside of the light blocking part 98. As a result of this semi-transparent part 99 thus being disposed, the conditions of the outside world can be visually confirmed to some extent compared to cases where all of the blocking portion 99 of the eye covering member is formed as a light blocking part 98; thus, the degree of safety can be enhanced. Moreover, in cases where the area surrounding the image is extremely bright, the brightness of the displayed image can be adjusted.

In FIG. 41(*b*), the semi-transparent part 99 is devised so that the transmissivity in the vicinity of the periphery of the light blocking part 98 is low, and so that the transmissivity increases toward the periphery. As a result, abrupt variations in brightness in the peripheral edge parts of the light blocking part 99 can be moderated, so that eye fatigue can be reduced.

Furthermore, in cases where it is permissible for the display image to be viewed with this image overlapping the outside image to some extent, all of the blocking portion 97 of the eye covering member may be made semi-transparent.

Moreover, in cases where an eye covering member 95 such as that described above is not installed, if the amount of light that is incident on the eye observing the image and the amount of light that is incident on the eye on the opposite side that is not observing the image are different, problems arise such as the image becoming difficult to see. Accordingly, it is desirable to install a brightness sensor that detects the quantity of ambient light, and to devise the system so that the brightness of the image that is formed on the display part 11 is controlled on the basis of the output of this sensor.

As one example, the system may be devised so that the brightness of the image that is displayed on the liquid crystal panel 29 shown in FIG. 4 is controlled, or a light-reducing, filter may be installed between the liquid crystal panel 29 and the lens 31, and the system may be devised so that the transmissivity of this light-reducing filter is controlled. It is sufficient if the light-reducing filter[1] is a filter whose transmissivity can be varied in accordance with an instruction signal from the outside; for instance, a liquid crystal, an EC element (electrochromic element), or the like can be used.

[1]Translator's note: actually, the term "light-reducing filter" is erroneously repeated in the original.

(Thirty-First Working Configuration)

Below, a thirty-first working configuration of the present invention will be described with reference to FIGS. 42, 43 and 44.

The head mounted display 110 comprises a display part 111, a circuit part 113, and a mounting fitting (mounting part) 112. Furthermore, the circuit part 113 may be fastened to the display part 111, fastened to some location on the mounting fitting 112, or provided as a part that is separate from the main body of the head mounted display 110 (not shown in FIG. 42).

A two-dimensional display element (hereafter defined as a liquid crystal display element and abbreviated as "LCD") 111*a* and an ocular optical system 111*b* are disposed in the display part 111.

The circuit part 113 is a circuit that is used to display an image I on the display screen E of the LCD 111*a*. A control circuit 113*a*, an analog processing circuit 113*c*, an A/D conversion circuit 1113*d*, frame memories 113*e* and 113*f*, an image processing circuit 113*g*, and the like are disposed in the circuit part 113.

The image signals (moving image signals or still image signals) that are input into the circuit part 113 from the outside are input into the frame memory 113*e* via the analog processing circuit 113*c* and A/D conversion circuit 113*d*. After the image signals input into the frame memory 113*e* are subjected to image processing by the image processing circuit 113*g*, these image signals are sent out to the LCD 111*a* of the display part 111 via the frame memory 113*f*.

This series of processing steps inside the circuit part 113 is controlled by the control circuit 113*a*. An image I based on the image signals input from the circuit part 113 is displayed on the display screen E of the LCD 111*a* inside the display part 111. The ocular optical system 111*b* inside the display part 111 forms a virtual image of the display screen E of the LCD 111*a* behind the LCD 111*a*.

Specifically, the ocular optical system 111*b* causes the light beams emitted from various positions on the display screen E of the LCD 111*a* to approach respective parallel light beams, and conducts these light beams to a specified position (eye point E.P.). The mounting fitting 112 has a structure which allows the mounting of the display part 111 on the head of the observer so that the eye point E.P. is positioned in the position of the pupil of the eye 102 of the observer.

In a state in which the eye point E.P. is disposed in the position of the pupil of the eye 102, the display screen E of the LCD 111a appears to the observer to be more distant than the actual position.

Incidentally, in the present working configuration, the image processing that is performed by the image processing circuit 113g inside the circuit part 113 includes processing that alters the display magnification S of the image I on the display screen E of the LCD 111a in addition to general processing such as halftone conversion processing, and the like. The value of the display magnification S is appropriately set by the sending of instructions to the image processing circuit 113g by the control circuit 113a.

Figure 44:
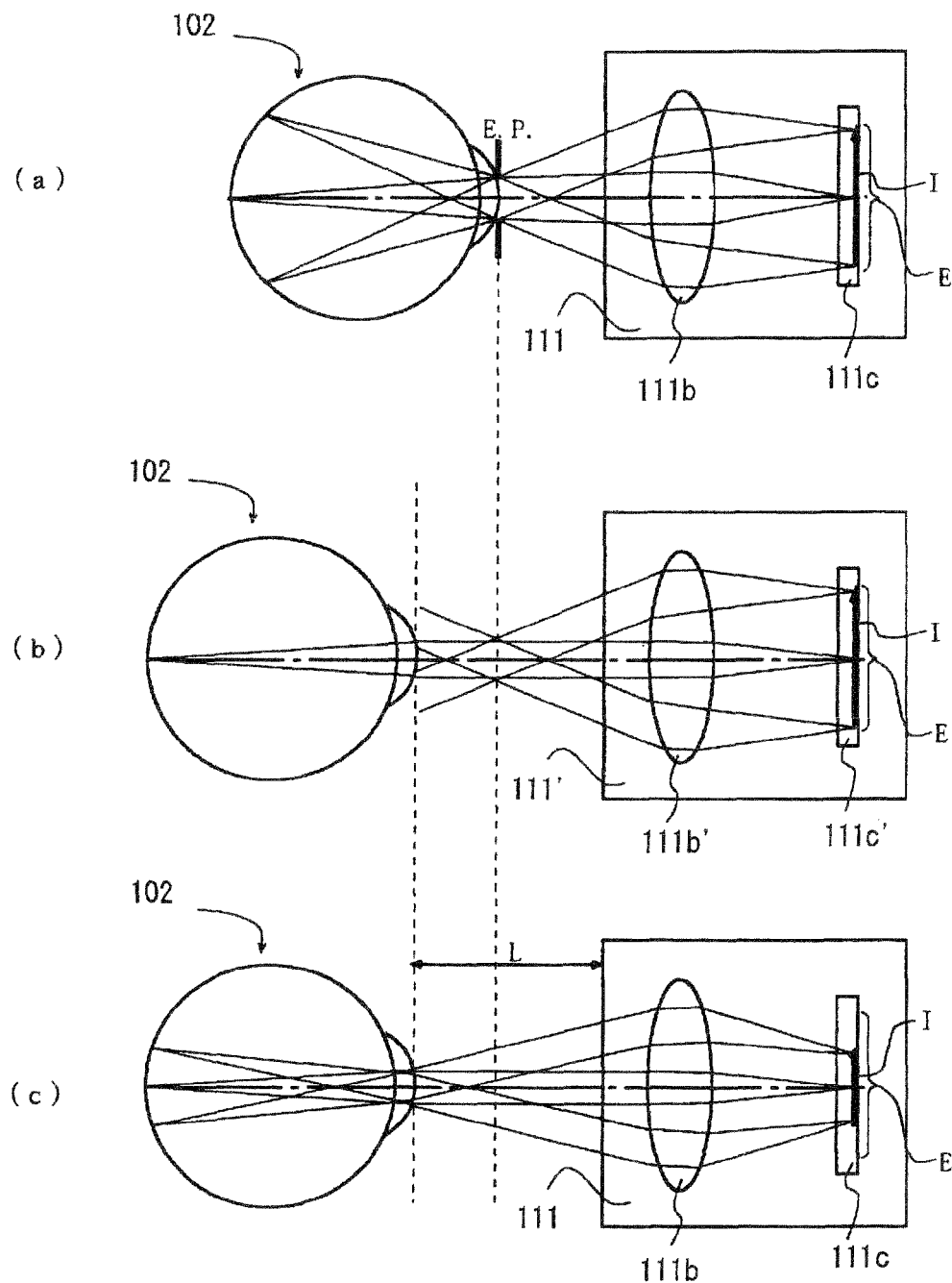
FIG. 44 shows diagrams illustrating the operation of the head mounted display constituting a thirty-first working configuration of the present invention.

FIG. 44 shows diagrams that illustrate the operation of the head mounted display 110 of the present working configuration. FIG. 44(a) shows a state in which the pupil of the eye 102 is disposed at the eye point E.P., and FIGS. 44(b) and 44(c) show states in which the eye 102 is disposed in positions that are more distant than the eye point E.P.

FIG. 44(b) shows the display part 111' of a conventional head mounted display, while FIG. 44(c) shows the display part 111 of the head mounted display 110 of the present working configuration 111a' is an LCD, and 111b' is an ocular optical system. In a conventional head mounted display, as is shown in FIG. 44(b), if the pupil is disposed at a greater distance than the eye point E.P., light beams emitted from the periphery of the image I cannot be incident on the pupil, so that the periphery of the image I drops out as seen from the eye 102 of the observer.

On the other hand, in the head mounted display 110 of the present working configuration, the display magnification S of the image I is variable; accordingly, even if the eye 102 is disposed at a greater distance than the eye point E.P., light beams emitted from the periphery of the image I can also be caused to be incident on the pupil if the display magnification S is set at a small value as shown in FIG. 44(c). Consequently, dropout of the image I can be prevented.

In other words, in the head mounted display 110 of the present working configuration, dropout of the image I caused by a shift in the distance between the face or eye 102 of the observer and the display part 111 can be prevented. Furthermore, as a result of this, the degree of freedom of the positional relationship of the display part 111 with respect to the eye 102 is increased.

Accordingly, in the head mounted display 110 of the present working configuration, adjustment mechanisms (indicated by the symbols 116, 117, 118 and 119 in FIG. 42) are disposed in the mounting fitting 112 so that the observer can deliberately alter the positional relationship of the display part 111 with respect to the eye 102.

Figure 42:
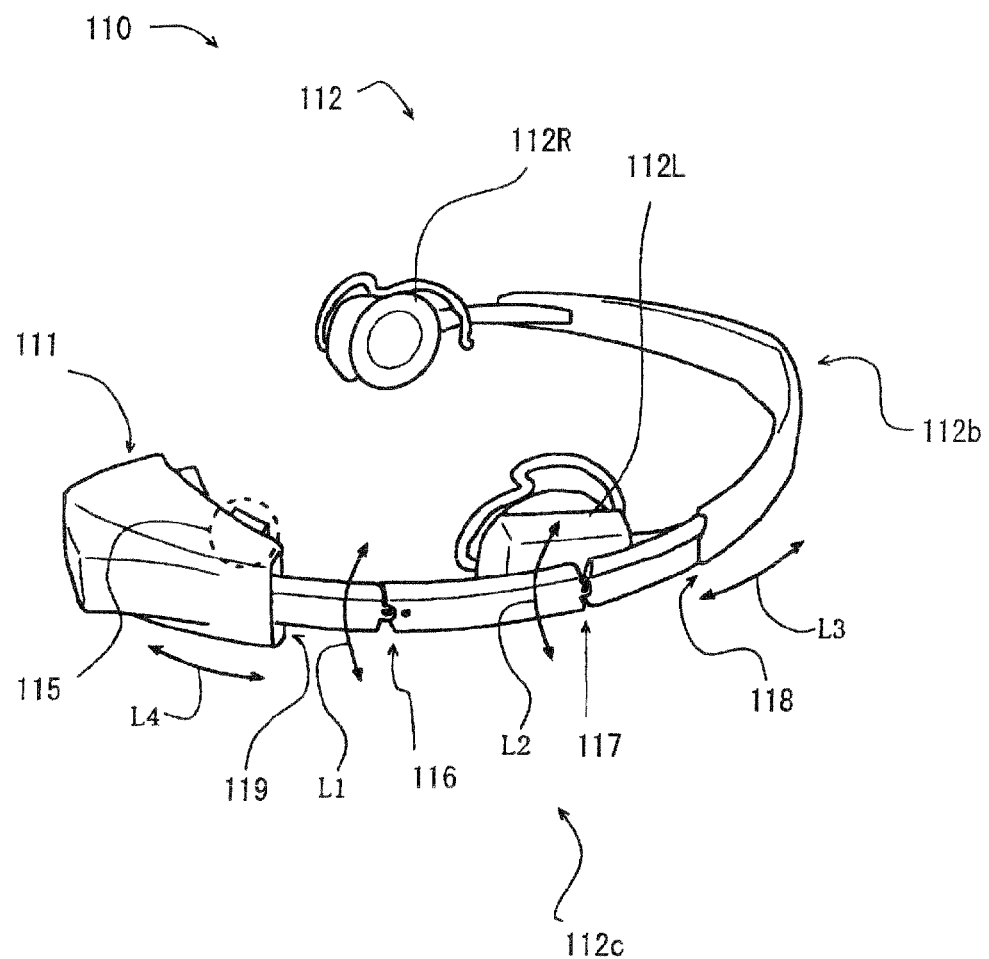
FIG. 42 is an external view of a head mounted display constituting a thirty-first working configuration of the present invention.
Figure 43:
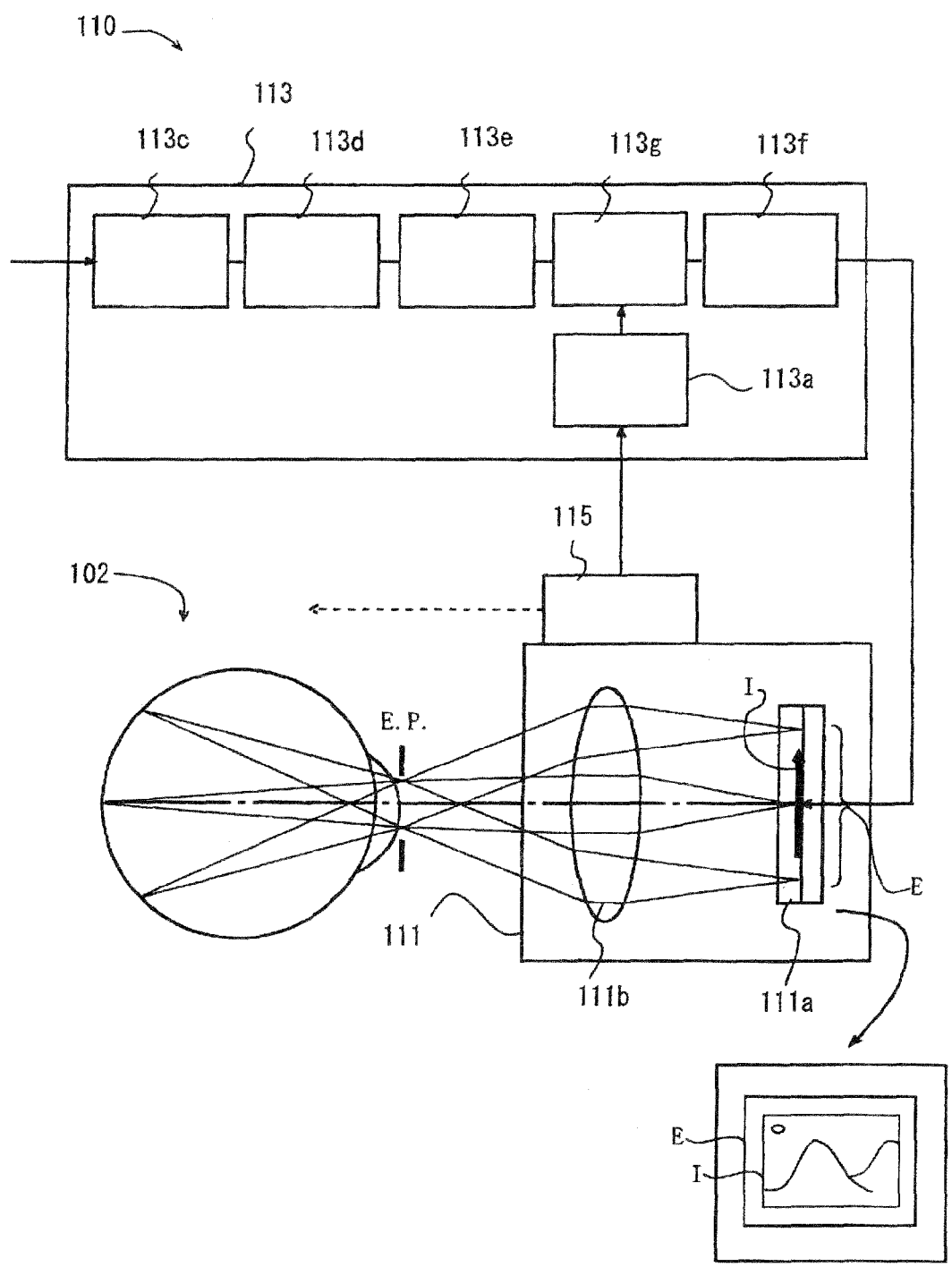
FIG. 43 is a structural diagram of the head mounted display constituting a thirty-first working configuration of the present invention.

The parts indicated by the symbols 116 and 117 in FIG. 42 are hinge mechanisms, and the parts indicated by the symbols 118 and 119 in FIG. 42 are slide mechanisms. For example, the mounting fitting 112 comprises ear mounted type headphones (mounting part holding parts) 112L and 112R that are respectively mounted on the left and right ears of the observer, a rear arm (mounting part linking part) 112b that links the left and right headphones 112L and 12R, and a display arm (supporting part) 12c that is linked to the rear arm 112b. The display part 111 is fastened to the tip end part of the display arm 12c.

The display arm 12c can be bent in the directions indicated by the arrows L1 and L2 by means of the hinge mechanisms 116 and 117. The display arm 12c can also be extended or retracted in the directions indicated by the arrows L3 and L4 by means of the slide mechanisms 118 and 119. By utilizing the hinge mechanisms 116 and 117 and slide mechanisms 118 and 119, the observer can freely vary the position and angle of the display part 111 with respect to the eye 102.

Furthermore, by utilizing the hinge mechanisms 116 and 117 and slide mechanisms 118 and 119, it is also possible (in the case of an emergency or the like) to immediately remove the display part 111 alone from in front of the eye 102 while leaving the head mounted display 110 in a mounted state. Moreover, even if only some of these mechanisms, i.e., the hinge mechanisms 116 and 117 and slide mechanisms 118 and 119, are installed, it is possible to vary the position and angle of the display part 111 with some degree of freedom.

In addition, if the number of hinge mechanisms and slide mechanisms is increased, it is possible to vary the positional relationship with even greater flexibility. Moreover, it would also be possible to utilize ball joint mechanisms instead of the hinge mechanisms 116 and 117.

The relationship between the distance L from a specified location on the display part 111 to the face or eye 102 of the observer and the optimal value of the display magnification S of the image I (hereafter referred to as the "optimal magnification") can be determined in advance from the optical design data of the display part 111. Here, the term "optimal magnification" refers to the maximum display magnification that allows the eye 102 of the observer to view the image I without any dropout, i.e., that allows the light emitted from various positions of the image I to be incident in sufficient quantities on the pupil of the eye 102 of the observer. In other words, this "optimal magnification" is the maximum display magnification that allows light emitted from various positions of the image I to be incident on the pupil in sufficient quantities event if the eye 102 shows movement of the eyeball, as long as this movement is within a specified range.

Accordingly, an automatic control function is added to the head mounted display 110 of the present working configuration as described below. First, the control circuit 113a inside the circuit part 113 stores the relationship between the optimal magnification and the distance L to the face or eye 102 of the observer beforehand as a numerical formula or look-up table. Furthermore, a distance sensor (indicated by the symbol 115 in FIG. 42) that measures the distance L is installed on the head mounted display 110.

For example, as is shown in FIG. 42, the distance sensor 115 is fastened to the display part 111 in a position that is slightly shifted from the position facing the eye 102. Data indicating the distance L is acquired by this distance sensor 115. The acquired data is input into the circuit part 113 as shown in FIG. 43, so that the distance L is recognized by the control circuit 113a.

Then, the control circuit 113a determines the optimal magnification for the distance L on the basis of the distance L and the pre-stored relationship. Then, the determined optimal magnification is set in the image processing circuit 113g as the display magnification S.

Thus, in the head mounted display 110 of the present working configuration, the image I is always displayed at the optimal magnification (here, the maximum display magnification of the range in which there is no dropout of the image I) in spite of any shift in the positional relationship between the display part 111 and eye 102.

Furthermore, in the present working configuration, the control circuit 113a may also be operated so that a magnification that is close to the optimal magnification among a limited number of values that are prepared beforehand (i.e., an approximate magnification) is set as the display magnification S. However, since it is desirable that the display magnification S be set at a value that allows the eye 102 of the observer to view the image I without any dropout, it is desirable that an approximate magnification that is on the low side be selected.

(Thirty-Second Working Configuration)

Figure 45:
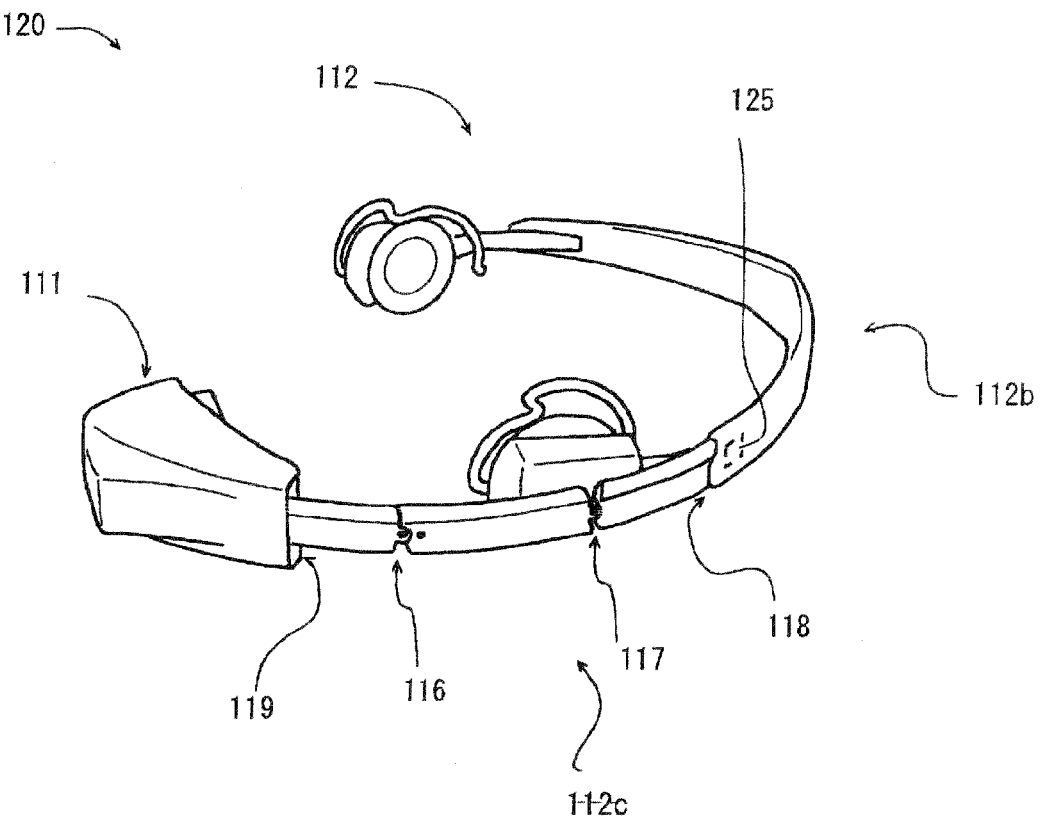
FIG. 45 is an external view of a head mounted display constituting a thirty-second working configuration of the present invention.
Figure 46:
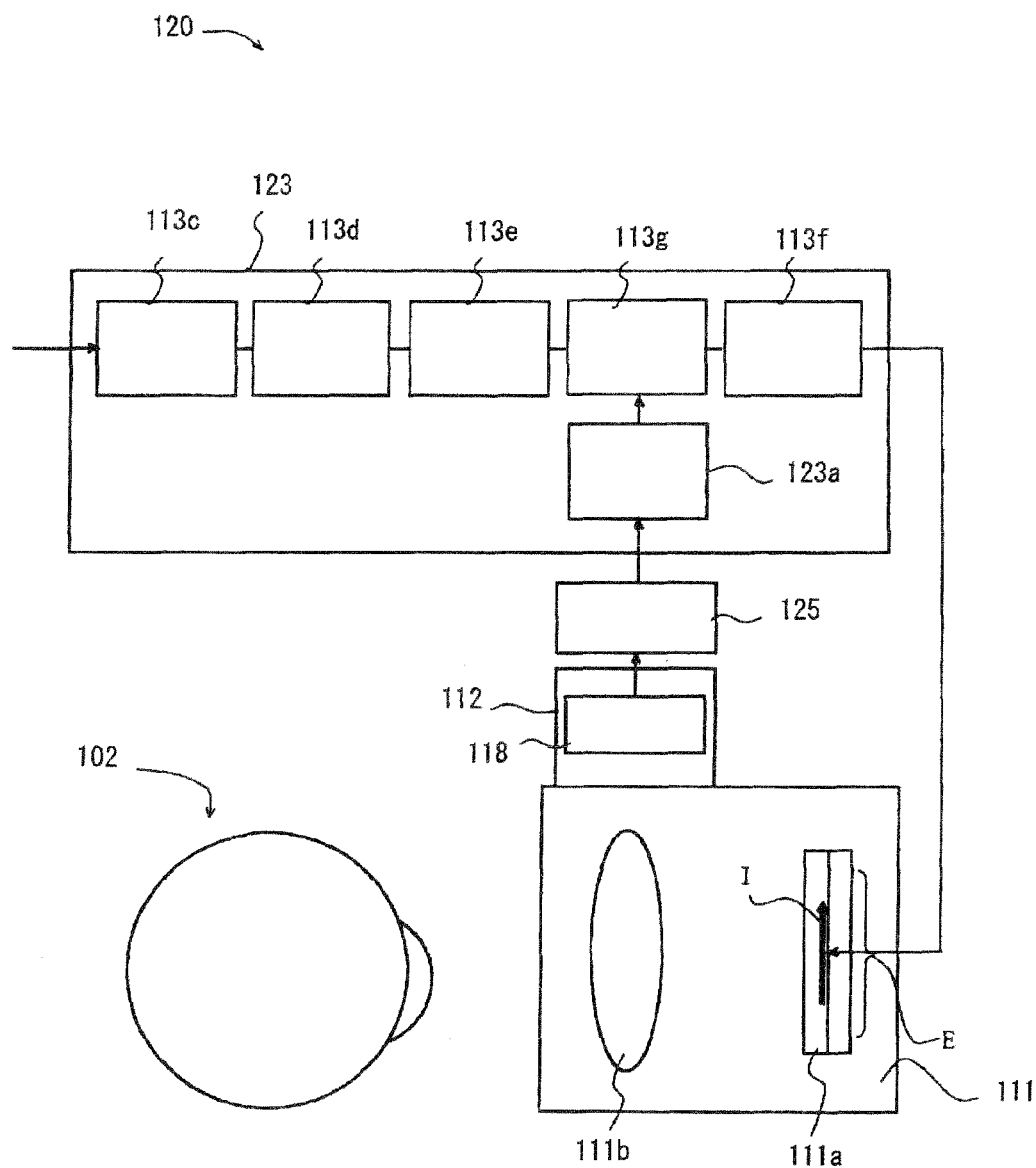
FIG. 46 is a structural diagram of the head mounted display constituting a thirty-second working configuration of the present invention.

A thirty-second working configuration of the present invention will be described with reference to FIGS. 45 and 46. Here, only points of difference from the head mounted display of the thirty-first working configuration will be described; a description of other parts will be omitted.

The head mounted display 120 of this working configuration is a head mounted display in which a position sensor (encoder or the like) 125 is provided instead of the distance sensor 115, and a circuit part 123 is provided instead of the circuit part 113, in the head mounted display 110 of the first working configuration. The circuit part 123 is a circuit part in which a control circuit 123a is provided instead of the control circuit 113a in the circuit part 113.

Like the control circuit 113a, the control circuit 123a stores the relationship between the distance L and the optimal magnification beforehand. The position sensor 125 is installed, for example, in the vicinity of the slide mechanism 118, and produces data that indicates the extended or retracted position of the display arm 112c.

Accordingly, data indicating the distance L from the display part 111 to the eye 102 is indirectly acquired by this position sensor 125. If this position sensor 125 is used, the precision is not as high as that of the distance sensor 115 of the first working configuration; nevertheless, the distance L can be measured. The acquired data is input into the circuit part 123 as shown in FIG. 46, so that the distance L is recognized by the control circuit 123a.

On the basis of the recognized distance L and the pre-stored relationship, the control circuit 123a determines the optimal magnification for the distance L. Then, the determined optimal magnification is set as the display magnification S in the image processing part 113g.

Thus, in the head mounted display 120 of the present working configuration as well, the image I is always displayed at the optimal magnification (here, the maximum display magnification of the range in which there is no dropout of the image I) in spite of any shift in the positional relationship between the display part 111 and eye 102.

Furthermore, in the present working configuration, a sensor (position sensor) was installed only in the vicinity of the slide mechanism 118; however, it would also be possible to improve the measurement precision of the distance L by installing a sensor in the vicinity of at least one of the following parts: namely, the hinge mechanism 116, hinge mechanism 117 or slide mechanism 119 (incidentally, an angle sensor is used as a sensor that detects the pivoting angle of the hinge mechanism).

(Thirty-Third Working Configuration)

Figure 47:
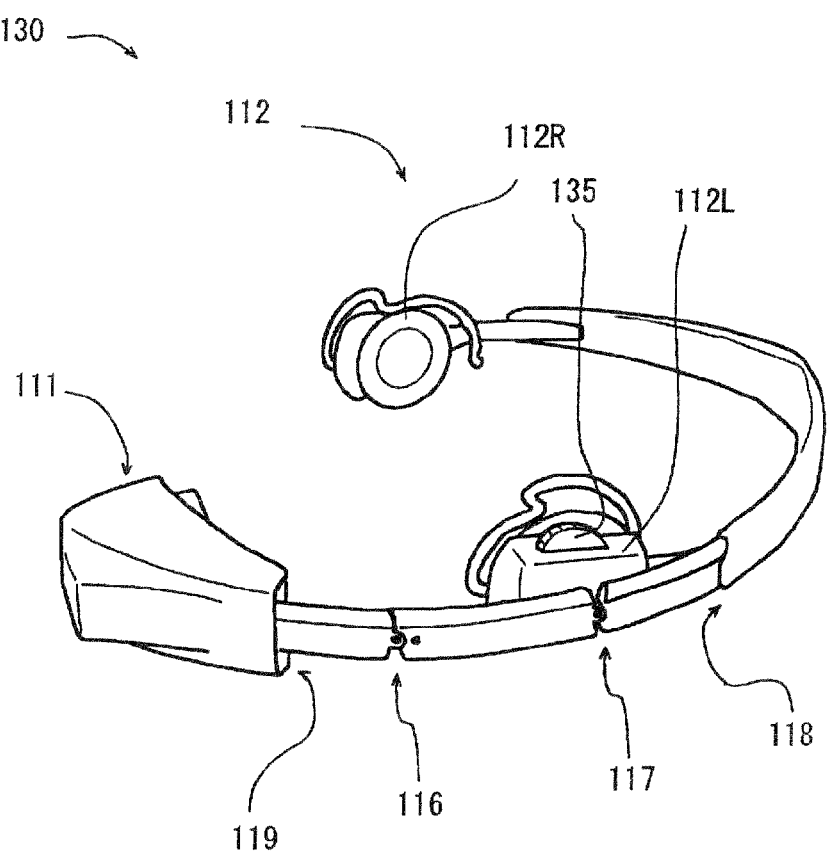
FIG. 47 is an external view of a head mounted display constituting a thirty-third working configuration of the present invention.

A thirty-third working configuration of the present invention will be described below with reference to FIGS. 47 and 48. Here, only points of difference from the head mounted display of the thirty-first working configuration will be described; a description of other parts will be omitted.

The head mounted display 130 of the present working configuration is a head mounted display in which a magnification setting dial 135 is provided instead of the distance sensor 115, and a circuit part 133 is provided instead of the circuit part 113, in the head mounted display 110 of the thirty-first working configuration.

The circuit part 133 is a circuit part in which a control circuit 133a is provided instead of the control circuit 113a in the circuit part 113. For example, the magnification setting dial 135 is disposed on one of the headphones (the headphone 112L in FIG. 47) or the like. The magnification setting dial 135 is a dial type switch, and produces signals in accordance with a dial turning operation performed by the observer.

Figure 48:
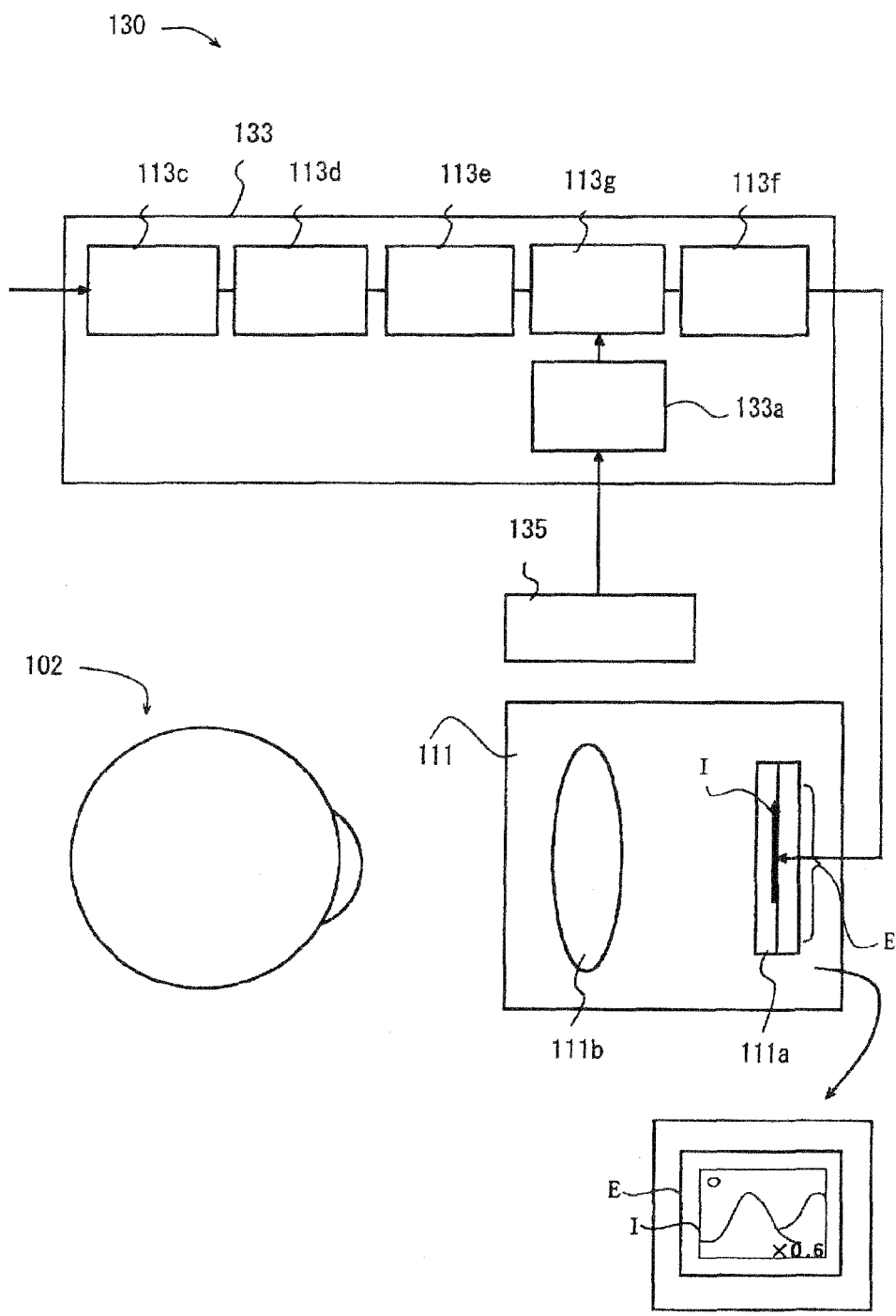
FIG. 48 is a structural diagram of the head mounted display constituting a thirty-third working configuration of the present invention.

The signals thus produced are input into the circuit part 133 as shown in FIG. 48, and the content of the operation of the magnification setting dial 135 is recognized by the control circuit 133a. The control circuit 133a sets a value corresponding to the content of the operation of the magnification setting dial 135 in the image processing circuit 133g as the display magnification S. Accordingly, the observer can cause the image I to be displayed at the desired magnification merely by operating the magnification setting dial 135.

Consequently, even if the positional relationship between the display part 111 and the eye 102 should shift, the observer can eliminate dropout of the image I by operating the magnification setting dial 135 so that the observer can view the entire image I. Furthermore, in the head mounted display 130 of the present working configuration, as is shown at the lower right in FIG. 48, the control circuit 133a may also be operated so that character information indicating the display magnification S during setting (e.g., "×0.6") is displayed on the display screen E of the LCD 111a along with the image I.

Moreover, it goes without saying that some other type of switch such as a pushbutton type switch may also be used for the magnification setting dial 135. Furthermore, in the present working configuration, it was indicated that a magnification setting dial 135 was used as the input means, and that the observer could designate the display magnification. However, it would also be possible to devise the system so that the information that can be input by the observer is only the designation of an alteration of the display magnification (in this case, a "magnification alteration dial" or the like is used as the input means).

(Other) In the head mounted display 130 of the present working configuration, a magnification setting dial 135 is used as the input means, and it was indicated that the information that can be designated by the observer is the display magnification ("OO×"). However, the information that can be designated by the observer may also be the distance ("OO cm" or the like) between the face or eye 102 of the observer and the display part 11.

If the system is thus devised so that "distance," which is a physical quantity that is used on an everyday basis, can be designated, the observer can operate the input means intuitively. In this case, furthermore, a "display distance setting dial" is used as the input means. The control circuit 133a inside the circuit part 133 determines the optimal magnification for the designated distance, and this determined optimal magnification can be set in the image processing circuit 113g as the display magnification S.

Furthermore, information that can be designated by the observer may also be the state ("extended or retracted position +OO cm of the display arm 112c" or the like) of at least one of the adjustment mechanisms (116, 117, 118 and 119). In this case, a "state setting dial" is used as the input means. The control circuit 133a inside the circuit part 133 determines the optimal magnification for the designated state, and this determined optimal magnification can be set as the display magnification S in the image processing circuit 113g.

Moreover, information that can be designated by the observer may also be the virtual display size ("appears as OO inches at a distance of OO cm" or the like). In this case, a "display size setting dial" is used as the input means. The control circuit 133a inside the circuit part 133 determines the optimal magnification for the designated virtual display size, and this determined optimal magnification can be set as the display magnification S in the image processing circuit 113g.

Furthermore, the relationship between the virtual display size and the optimal magnification can be determined beforehand from the optical design data of the display part 111 and the like.

(Thirty-Fourth Working Configuration)

Below, a thirty-fourth working configuration of the present invention will be described with reference to FIGS. 49 and 50. Here, only the points of difference from the head mounted display of the thirty-first working configuration will be described; a description of other parts will be omitted.

The head mounted display 140 of the present working configuration is a head mounted display in which an offset button 145 and a magnification setting dial 135 are provided in the head mounted display 110 of the thirty-first working configuration, and a circuit part 143 is provided instead of the circuit part 113.

The circuit part 143 is a circuit part in which a control circuit 143a is provided instead of the control circuit 113a in the circuit part 113. The magnification setting dial 135 is installed, for example, on one of the headphones (the headphone 112L in FIG. 49). The magnification setting dial 135 is a dial type switch, and produces signals in accordance with a turning operation performed by the observer.

Figure 49:
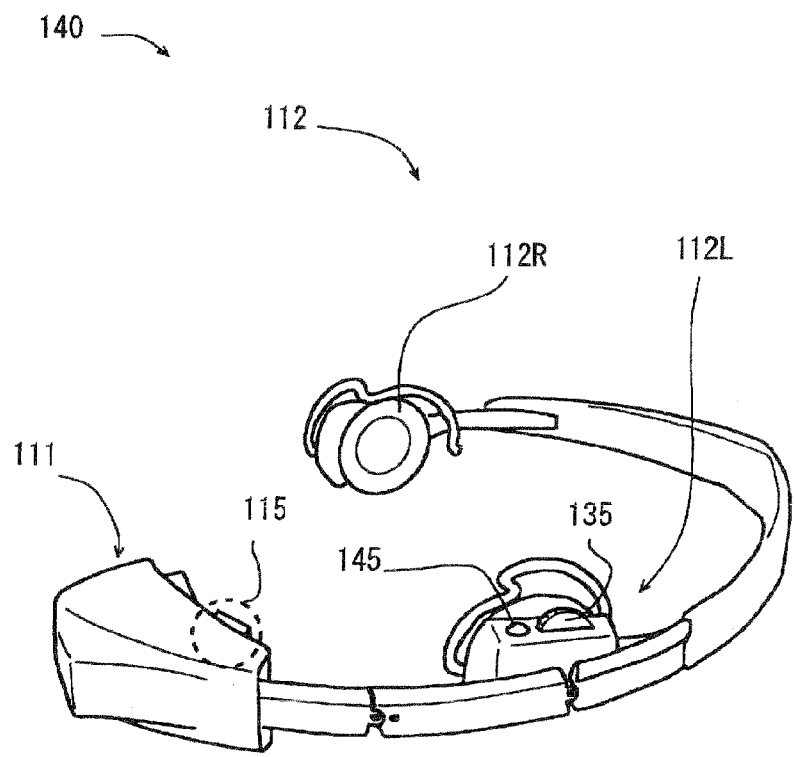
FIG. 49 is an external view of a head mounted display constituting a thirty-fourth working configuration of the present invention.
Figure 50:
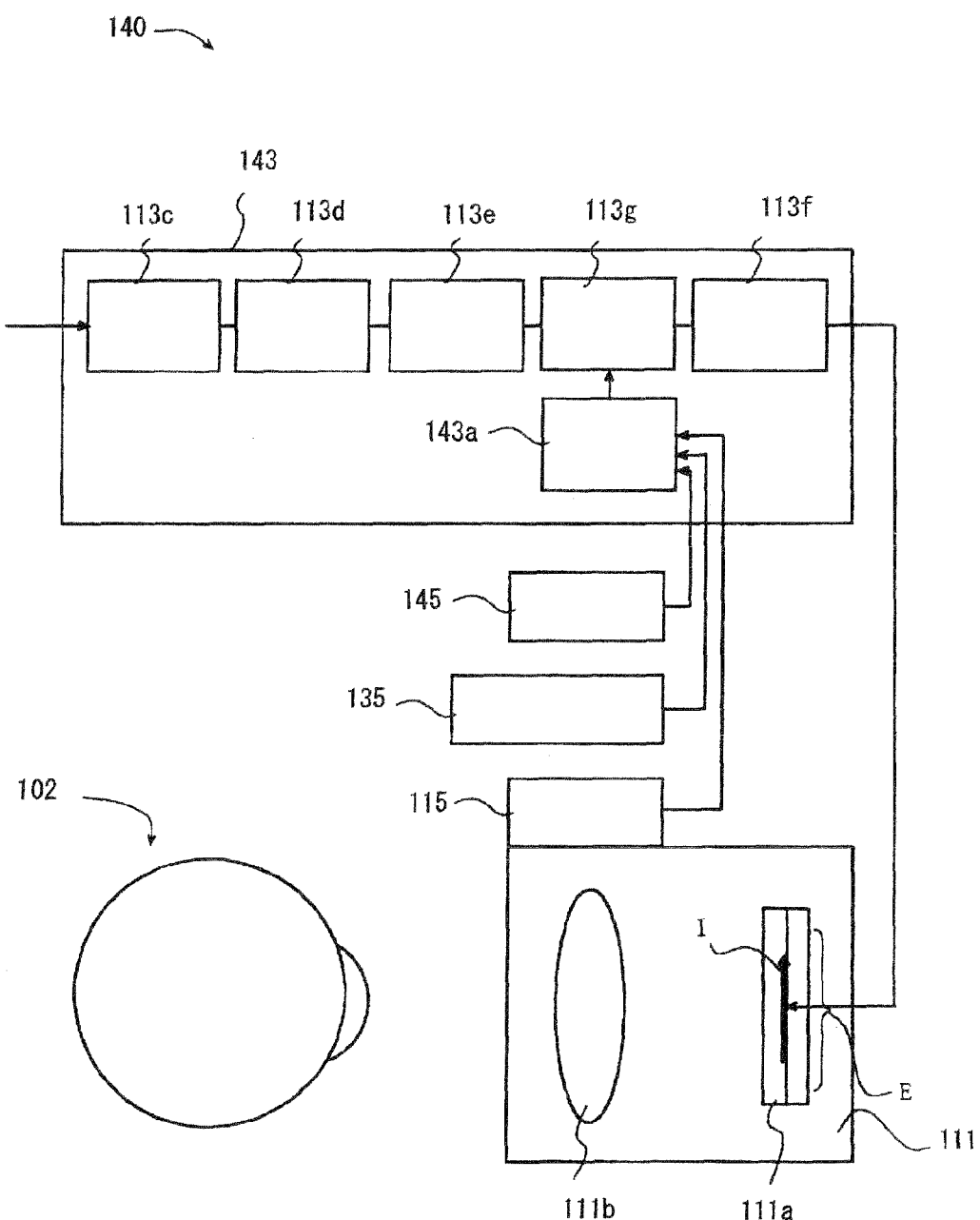
FIG. 50 is a structural diagram of the head mounted display constituting a thirty-fourth working configuration of the present invention.

The offset button 145 is installed, for example, on one of the headphones (the headphone 112L in FIG. 49). The offset button 145 is a pushbutton type switch, and produces signals when operated by the observer. Furthermore, another type of switch such as a pushbutton type switch may also be used for the magnification setting dial 135.

Moreover, a single switch which has the functions of both the offset button 145 and the magnification setting dial 135 (jog dial or the like) may also be used. The signals produced by the magnification setting dial 135 and offset button 145 are input into the circuit part 143 as shown in FIG. 50, and are respectively recognized by the control circuit 143a.

In the head mounted display 140 constructed as described above, when the power supply (not shown in the figures) is switched on, the control circuit 143a sets a value corresponding to the operation of the magnification setting dial 135 as the display magnification S in the image processing circuit 113g. The image I is displayed on the display screen E at the display magnification S. The observer on whom the head mounted display 140 is mounted adjusts the display magnification S by operating the magnification setting dial 135, and adjusts the angle and position of the display part 111 by adjusting respective parts of the mounting fitting 112. Furthermore, at the point in time at which the image I can be visually recognized comfortably (i.e., the point in time at which the entire image I can be seen, so that it is recognized that the image I is displayed with a sufficiently large size), the observer operates the offset button 145.

The control circuit 143a views the display magnification S at the point in time at which the offset button 145 is operated as the reference magnification S0. Furthermore, the control circuit 143a recognizes the distance L from the display part 111 to the eye 102 at the point in time at which the offset button 145 is operated from the output of the distance measurement sensor 115, and views this recognized distance L as the reference distance L0.

Subsequently, in cases where the distance L is greater than the reference distance L0, the control circuit 143a sets the display magnification S at a value that is smaller than the reference magnification S0, and in cases where the distance L is less than the reference distance L0, the control circuit 143a sets the display magnification S at a value that is greater than the reference magnification S0. In the case of such a head mounted display 140, the image I can be displayed at a display magnification that allows comfortable visual recognition by the observer regardless of any shift in the positional relationship between the display part 111 and the eye 102.

Furthermore, a distance measurement sensor 115 similar to that used in the head mounted display 110 of the thirty-first working configuration was used in the head mounted display 140 of the present working configuration; however, it would also be possible to use a position sensor 125 similar to that of the head mounted display 120 of the second working configuration instead of this distance measurement sensor 115.

Moreover, in the head mounted display 140 of the present working configuration, the control circuit 143a may also be operated so that character information indicating the display magnification S during setting (e.g., "×0.6") is displayed on the display screen E of the LCD 111a along with the image I.

Furthermore, the operation of the head mounted display 140 of the present working configuration can be realized as long as data indicating the variation of the distance L from the point in time at which the offset button 145 is operated can be acquired, even if data indicating the distance L cannot be acquired. Accordingly, in the case of the head mounted display 140 of the present working configuration, the position sensor or distance measurement sensor may also be simplified.

In addition, in the present working configuration, it was indicated that a magnification setting dial 135 is used as the input means, and that the observer could designate the display magnification. However, the system may also be devised so that the information that can be input by the observer is only the designation of changes in the display magnification (in this case, a "magnification alteration dial" or the like is used as the input means).

(Other) In the head mounted display 140 of the present working configuration, it was indicated that a magnification setting dial 135 was used as the input means, and that the information that could be designated by the observer in this case was the display magnification ("OO×"). However, the information that can be designated by the observer may also be the distance ("OO cm" or the like) between the face or eye 102 of the observer and the display part 111.

If the system is thus devised so that "distance," which is a physical quantity used on an everyday basis, can be designated, the observer can operate the input means intuitively. In this case, furthermore, a "display distance setting dial" is used as the input means. The control circuit 143a inside the circuit part 143 determines the optimal magnification for the designated distance, and this determined optimal magnification can be set in the image processing circuit 113g as the display magnification S.

Moreover, information that can be designated by the observer may also be the state ("expansion-retraction position of the display arm 112c+OO cm" or the like) of at least one of the adjustment mechanisms (116, 117, 118 and 119) shown in FIG. 42. In this case, a "state setting dial" is used as the input means. The control circuit 143a inside the circuit part 143 determines the optimal magnification for the designated state, and this determined magnification can be set in the image processing circuit 113g as the display magnification S.

Furthermore, information that can be designated by the observer may also be the virtual display size ("appears as OO inches at a distance of OO cm" or the like). In this case, a "display size setting dial" is used as the input means. The control circuit 143a inside the circuit part 143 determines the optimal magnification for the designated virtual display size, and this determined optimal magnification can be set as the display magnification S in the image processing circuit 13g.

(Thirty-Fifth Working Configuration)

Figure 51:
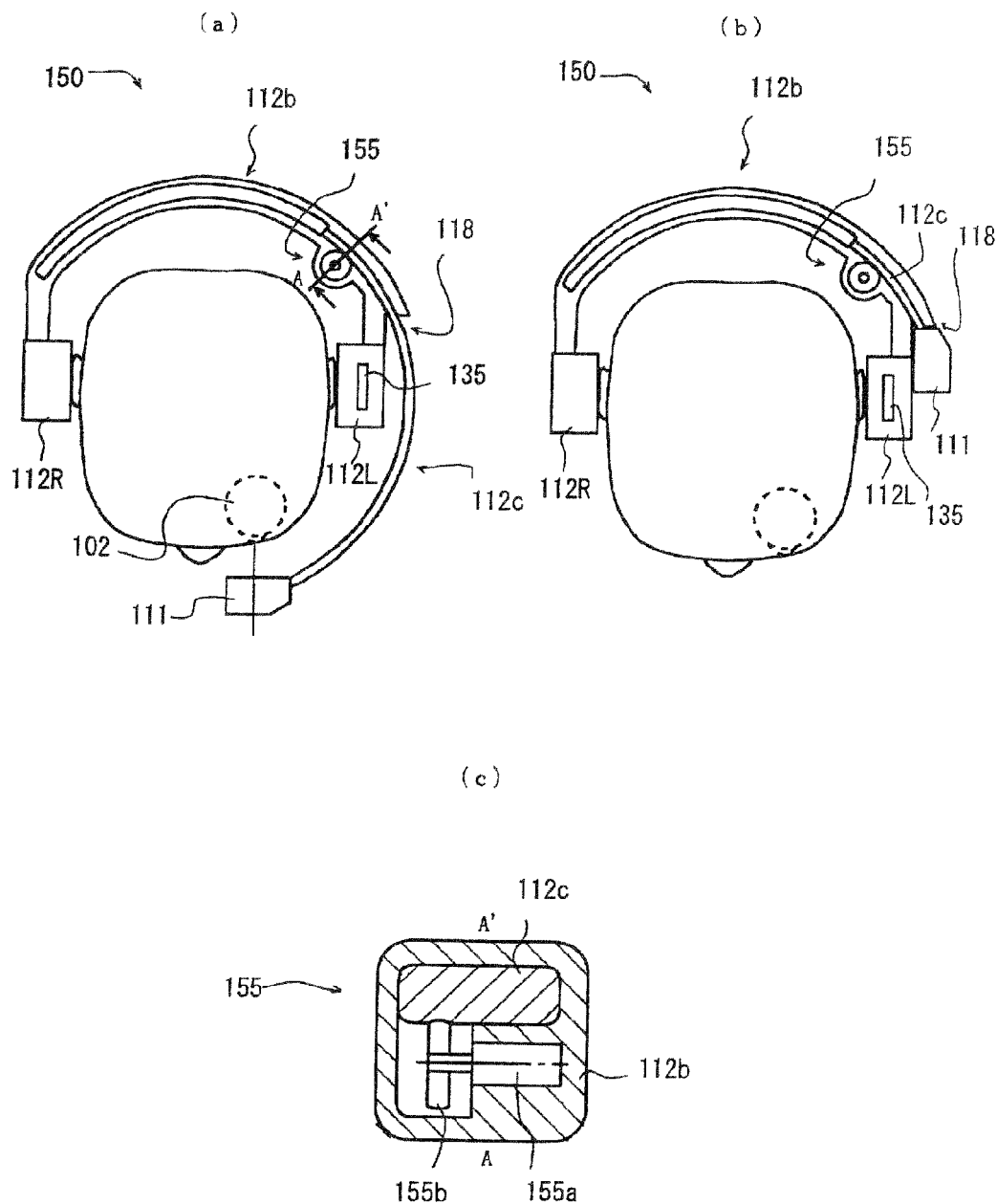
FIG. 51 shows external views of a head mounted display constituting a thirty-fifth working configuration of the present invention.

A thirty-fifth working configuration of the present invention will be described below with reference to FIGS. 51 and 52. Here, only the points of difference from the head mounted display of the thirty-third working configuration will be described; a description of other parts will be omitted. FIGS. 51(a) and 51(b) are model diagrams of the head mounted display 150 of the present working configuration, and FIG. 51(c) is a sectional view along line A-A' (driving mechanism 155) in FIG. 51(a).

Furthermore, FIGS. 51(a) and 51(b) are diagrams in which the head mounted display 150 mounted on the head of the observer is seen from the direction above the head of the observer. FIG. 52 is a structural diagram of the head mounted display 150.

In addition to a magnification setting dial 135, a driving mechanism 155 which drives the adjustment mechanisms (116, 117, 118 and 119) shown in FIG. 42 is added to the head mounted display 150 of the present working configuration.

A case will be described below in which a driving mechanism 155 is added for the slide mechanism 118 (mechanism which causes the extension and retraction of the display arm 112c) in particular among the adjustment mechanisms as shown in FIGS. 51(a) and 51(b). As is shown in FIG. 51(c), the driving mechanism 155 comprises a driving motor 155a and a cam member 155b and the like interposed between the display arm 112c and rear arm 112b of the slide mechanism 118.

When the driving motor 155a rotates, the cam member 155b that is linked to this motor is driven, and the display arm 112c is fed out from the rear arm 112b in accordance with the driving of this cam member 155b, so that the extension-retraction position varies. Accordingly, the positional relationship of the display part 111 with respect to the face or eye 102 of the observer is caused to vary by the driving of the driving motor 155a.

FIG. 51(a) shows the conditions when the extension-retraction position of the display arm 112c is the maximum position, while FIG. 51(b) shows the conditions when the extension-retraction position of the display arm is the minimum position.

Figure 52:
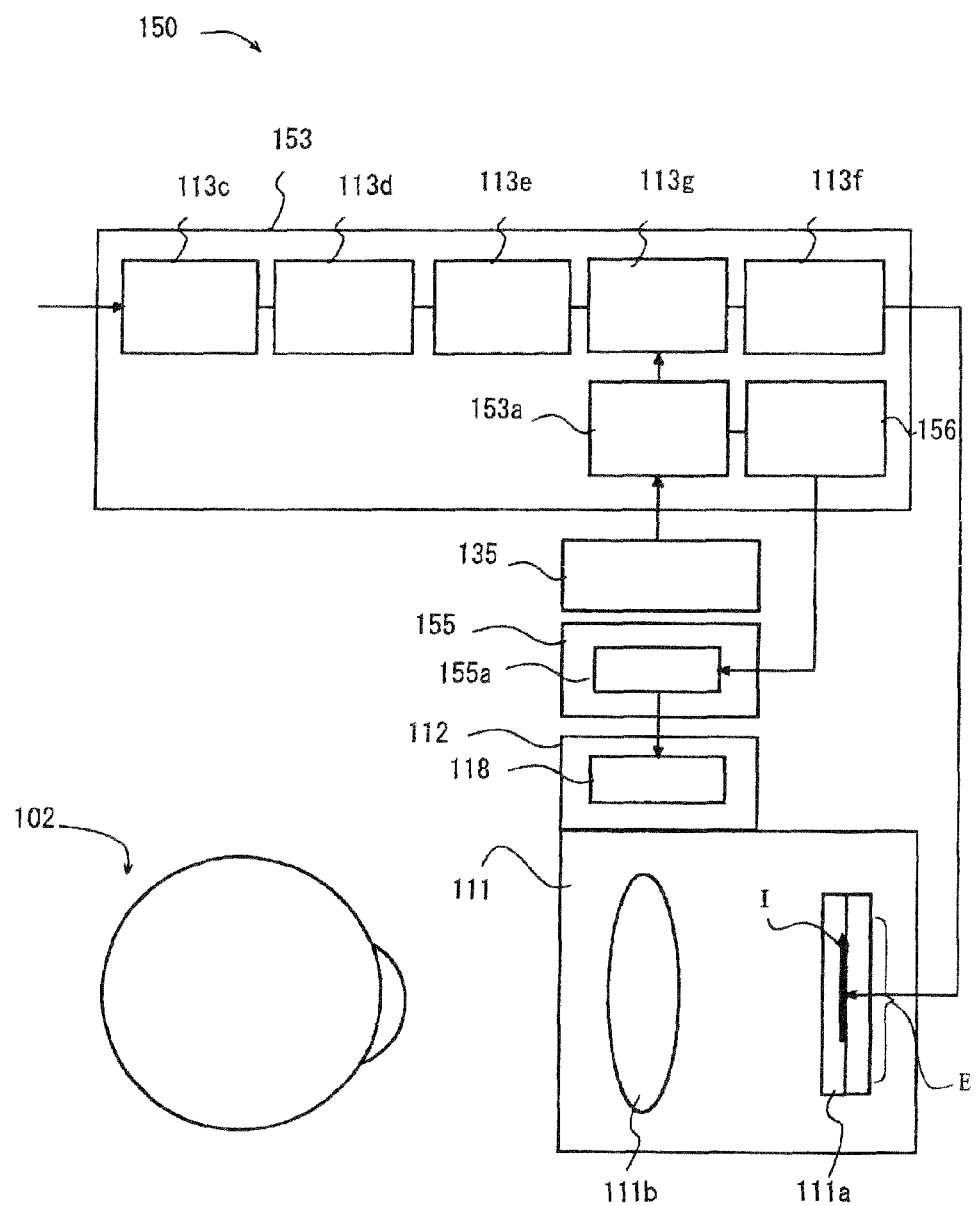
FIG. 52 is a structural diagram of the head mounted display constituting a thirty-fifth working configuration of the present invention.

A motor controller 156 that controls the driving motor 155a is disposed in the circuit part 153 inside the head mounted display 150 of the present working configuration as shown in FIG. 52. This motor controller 156 is controlled by the control circuit 153a inside the circuit part 153.

Here, the relationship between the display magnification S of the image I and the optimal extension-retraction position of the display arm 112c for this display magnification S (hereafter referred to as the "optimal extension-retraction position") is determined beforehand from the design data or the like of the head mounted display 150. The term "optimal extension-retraction position" refers to an extension-retraction position that allows the eye 102 of the observer to view the image I without any dropout, and at as large a size as possible.

The control circuit 153a inside the circuit part 153 stores the relationship between the display magnification S and the optimal extension-retraction position corresponding to this display magnification S beforehand as a numerical formula or lookup table. The control circuit 153a sets a value corresponding to the content of the operation of the magnification setting dial 135 in the image processing circuit 113g as the display magnification S, and determines the optimal extension-retraction position for this display magnification S on the basis of the relationship described above. Then, the driving mechanism 155 is driven via the motor controller 156 so that the display arm 112c is fed out to the determined optimal extension-retraction position.

Thus, in the head mounted display 150 of the present working configuration, not only can the observer alter the display magnification of the image I, but the positional relationship of the display part 111 with respect to the face or eye 102 of the observer in this case is also automatically adjusted so that the observer can visually recognize the image I without any dropout.

Furthermore, in the present working configuration, a driving mechanism was installed only in the vicinity of the slide mechanism 118; however, it would also be possible to install a driving mechanism in the vicinity of at least one of the other mechanisms, [i.e.,] the hinge mechanism 116, hinge mechanism 117 or slide mechanism 1119, so that the position of the display part 111 can be automatically adjusted with even greater flexibility.

Moreover, in the present working configuration, it was indicated that a magnification setting dial 135 was used as the input means, so that the observer could designate the display magnification. However, the system may also be devised so that the information that can be input by the observer is only the designation of changes in the display magnification (in this case, a "magnification alteration dial" or the like is used as the input means).

(Other) In the head mounted display 150 of the present working configuration, it was indicated that a magnification setting dial 135 was used as the input means, and that the information that could be designated by the observer in this case was the display magnification ("OO×"). However, the information that can be designated by the observer may also be the distance ("OO cm" or the like) between the face or eye 102 of the observer and the display part 111. If the system is thus devised so that "distance," which is a physical quantity used on an everyday basis, can be designated, the observer can operate the input means intuitively.

In this case, furthermore, a "display distance setting dial" is used as the input means. The control circuit 153a inside the circuit part 153 determines the optimal magnification for the designated distance, and this determined optimal magnification can be set in the image processing circuit 113g as the display magnification S; furthermore, the positional relationship of the display part 111 with respect to the face or eye 102 of the observer can be automatically adjusted so that the designated distance can be realized.

Furthermore, information that can be designated by the observer may also be the state ("expansion-retraction position of the display arm 112c+OO cm" or the like) of at least one of the adjustment mechanisms (116, 117, 118 and 119). In this case, a "state setting dial" is used as the input means. The control circuit 153a inside the circuit part 153 determines the optimal magnification for the designated state, and this determined optimal magnification can be set in the image processing circuit 113g as the display magnification S; furthermore, the positional relationship of the display part 111 with respect to the face or eye 102 of the observer can be automatically adjusted so that the designated state can be realized.

Moreover, information that can be designated by the observer may also be the virtual display size ("appears as OO inches at a distance of OO cm" or the like). In this case, a "display size setting dial" is used as the input means. The control circuit 153a inside the circuit part 153 determines the optimal magnification for the designated virtual display size, and this determined optimal magnification can be set as the display magnification S in the image processing circuit 113g; furthermore, the positional relationship of the display part 111 with respect to the face or eye 102 of the observer can be automatically adjusted so that the designated virtual display size can be realized.

(Thirty-Sixth Working Configuration)

A thirty-sixth working configuration of the present invention will be described below with reference to FIG. 53. Here, only the points of difference from the head mounted display of the thirty-third working configuration will be described; a description of other parts will be omitted. In the head mounted display 160 of the present working configuration, measurement means which detects the positional relationship between the eye 102 and the display part 111 is added in addition to the magnification setting dial 135.

Figure 53:
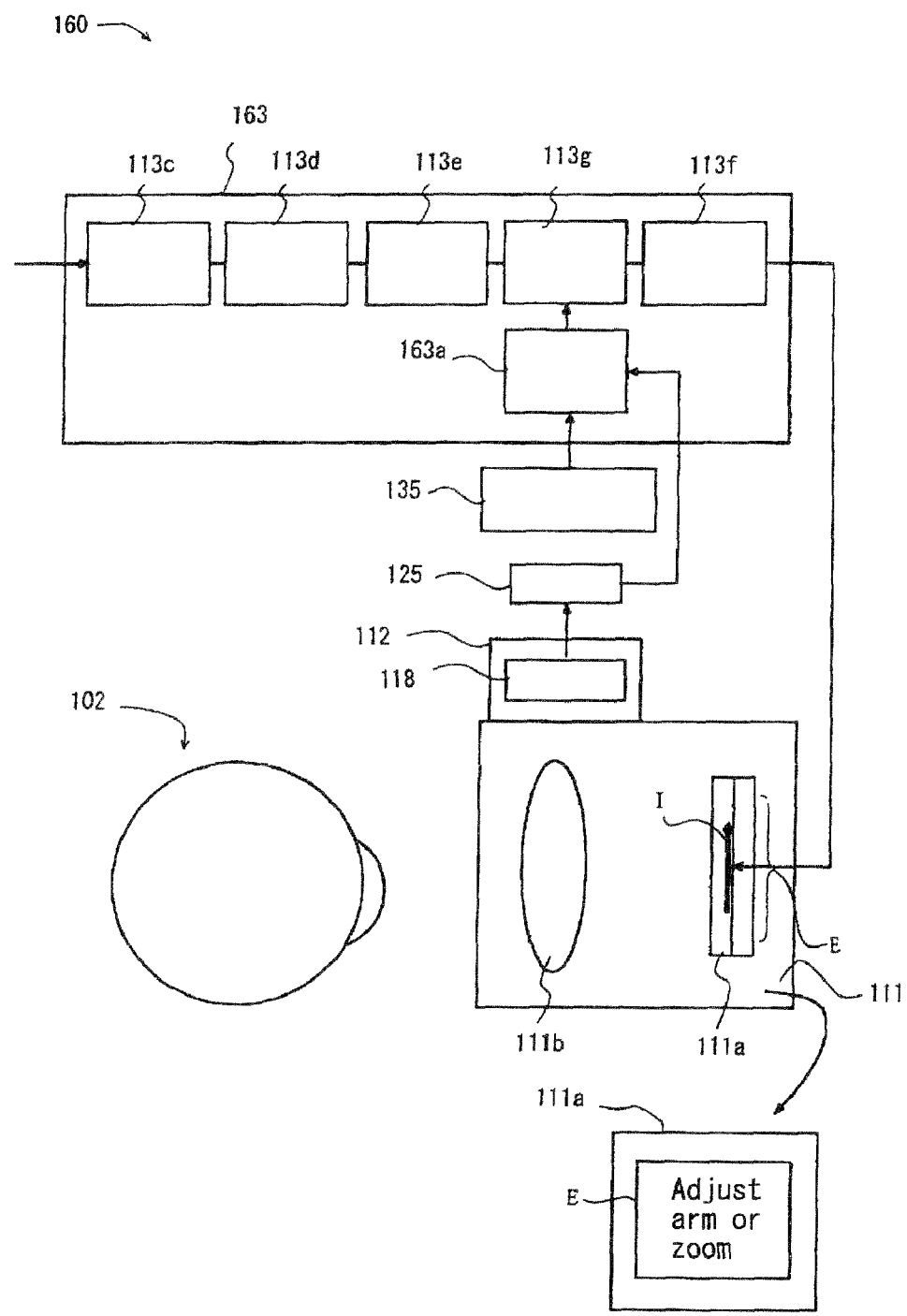
FIG. 53 is a structural diagram of a head mounted display constituting a thirty-sixth working configuration of the present invention.

Below, a case will be described in which a position sensor 125 that produces data indicating the extension-retraction position of the display arm 12c (see FIG. 45 of the thirty-second working configuration) is added in the vicinity of the slide mechanism 118 as the measurement means as shown in FIG. 53.

The acquired data is input into the circuit part 163, so that the extension-retraction position is recognized by the control circuit 163a. Accordingly, the positional relationship of the display part 111 with respect to the face or eye 102 of the observer is detected from the output of the position sensor 125. The control circuit 163a stores the relationship between the display magnification S and the optimal extension-retraction position for this display magnification beforehand as a numerical formula or lookup table.

The control circuit 163a sets a value corresponding to the content of the operation of the magnification setting dial 135 in the image processing circuit 113g as the display magnification S, and determines the optimal extension-retraction position for this display magnification S on the basis of this relationship. Then, the current extension-retraction position of the display arm 112c indicated by the position sensor 125 and the determined optimal extension-retraction position are compared, and in cases where the two positions do not agree with sufficient precision, instructions are sent to the image processing circuit 113g so that a specified warning display (e.g., a display of character information such as "please adjust arm or magnification" as shown in the lower-right part of FIG. 53) is displayed on the display screen E.

Thus, in the head mounted display 160 of the present working configuration, not only can the observer alter the display magnification of the image I, but a warning display is also automatically performed in this case when the observer is in a state that does not allow visual recognition of the image I without any dropout. Furthermore, in the present working configuration, a sensor was installed only in the vicinity of the slide mechanism 118; however, it would also be possible to install a sensor in the vicinity of at least one of the other mechanisms, [i.e.,] the hinge mechanism 116, hinge mechanism 117 or slide mechanism 119, so that the positional relationship of the display part 111 with respect to the face or eye 102 of the observer can be detected with even higher precision.

Furthermore, in the present working configuration, it was indicated that a magnification setting dial 135 was used as the input means, so that the observer could designate the display magnification. However, the system may also be devised so that the information that can be input by the observer is only the designation of changes in the display magnification (in this case, a "magnification alteration dial" or the like is used as the input means).

(Other) In the head mounted display 160 of the present working configuration, it was indicated that a magnification setting dial 135 was used as the input means, and that the information that could be designated by the observer in this case was the display magnification ("OO×"). However, the information that can be designated by the observer may also be the distance ("OO cm" or the like) between the face or eye 102 of the observer and the display part 111. If the system is thus devised so that "distance," which is a physical quantity used on an everyday basis, can be designated, the observer can operate the input means intuitively.

In this case, furthermore, a "display distance setting dial" is used as the input means. The control circuit 163a inside the circuit part 163 determines the optimal magnification for the designated distance, and this determined optimal magnification can be set in the image processing circuit 113g as the display magnification S; furthermore, a judgment is made as to whether or not the current extension-retraction position of the display arm 112c indicated by the position sensor 125 realizes the designated distance, and in cases where it is judged that this distance is not realized, a warning display may be performed.

Furthermore, information that can be designated by the observer may also be the state ("expansion-retraction position of the display arm 112c+OO cm" or the like) of at least one of the adjustment mechanisms (116, 117, 118 and 119). In this case, a "state setting dial" is used as the input means. The control circuit 163a inside the circuit part 163 determines the optimal magnification for the designated state, and this determined optimal magnification can be set in the image processing circuit 113g as the display magnification S; furthermore, a judgment is made as to whether or not the current extension-retraction position of the display arm 112c indicated by the position sensor 125 realizes the designated state, and in cases where it is judged that this state is not realized, a warning display may be performed.

Moreover, information that can be designated by the observer may also be the virtual display size ("appears as OO inches at a distance of OO cm" or the like). In this case, a "display size setting dial" is used as the input means. The control circuit 163a inside the circuit part 163 determines the optimal magnification for the designated virtual display size, and this determined optimal magnification can be set as the display magnification S in the image processing circuit 113g; furthermore, a judgment is made as to whether or not the current extension-retraction position of the display arm 112c indicated by the position sensor 125 realizes the designated virtual display size, and in cases where it is judged that this display size is not realized, a warning display may be performed.

(Other) Furthermore, in any of the head mounted displays of the working configurations described above, if a nonvolatile memory is used in the circuit part, the setting (display magnification S) immediately prior to the switching off of the power supply can be stored, and the control circuit can be actuated so that this setting is reproduced immediately after the power supply is switched on. Furthermore, in the head mounted display 150 of the fifth working configuration described above, since the adjustment mechanism (slide mechanism 118) is electrically driven by the driving motor 155 and the like, the control circuit 153a can be actuated so that not only the display magnification S, but also the setting of the position of the display part 111, can be stored and reproduced.

(Thirty-Seventh Working Configuration)

Figure 54:
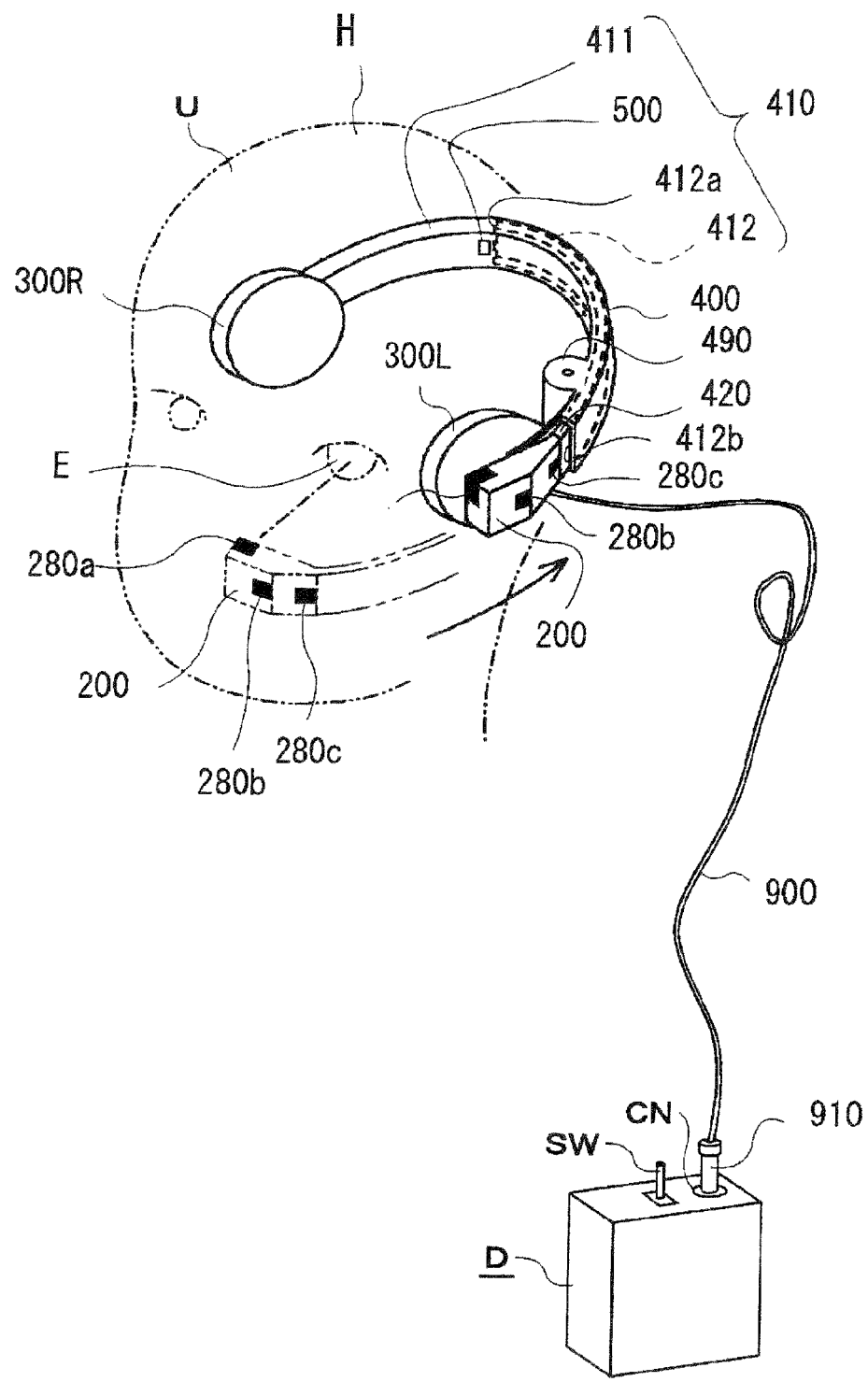
FIG. 54 is a perspective view showing the external appearance of a head mounted display constituting a thirty-seventh working configuration of the present invention.

FIG. 54 shows the schematic construction of a head mounted display constituting a thirty-seventh working configuration of the present invention.

As is shown in FIG. 54, the head mounted display has an image output part (display part) 200 which has the function of outputting images to the user U, audio output parts (holding parts of the mounting part) 300 which have the functions of holding the head mounted display and generating audio such as voice, music and effect sounds, and a mounting part 400 which includes the image output part 200 and audio output parts 300 (300R and 300L, same below), and which is used to mount these parts in a freely detachable manner on the head H of the user U. Furthermore, detection sensors 280 (280a through 280c, same below) that measure the distance between the display part 200 and outside obstructions are also present.

Furthermore, this head mounted display has a driving unit D which outputs image display signals and audio output signals to the respective members mounted on the head; this can be actuated by being connected via a cable 900.

The respective constituent elements of this head mounted display will be described below.

Figure 56:
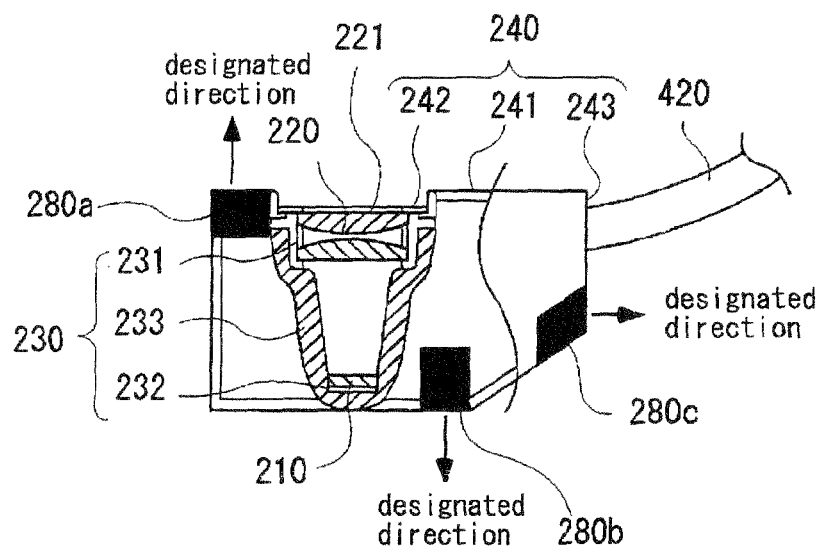
FIG. 56 is a partially sectional plan view showing the construction of the image output part used in the head mounted display constituting a thirty-seventh working configuration of the present invention.
Figure 57:
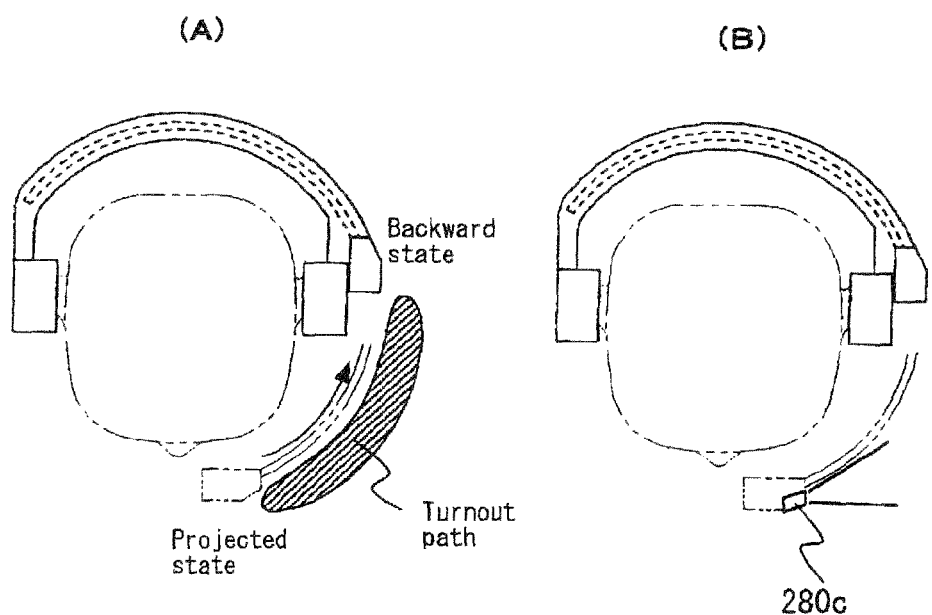
FIG. 57 shows plan views illustrating the structure of a head mounted display constituting modification 3 of the thirty-seventh working configuration of the present invention.

As is shown in FIG. 56, the display part 200 has an electro-optical converter 210 which is a two-dimensional display element that forms an image by converting image display signals that express an image into optical signals, a lens system 221 constituting an ocular optical system that enlarges the formed image, an optical system 220 with a lens barrel 230 that accommodates this lens system 221, detection sensors 280, and a case 240 that accommodates all of these elements.

The electro-optical converter 210 used in the present working configuration can be constructed by means of a display element that forms an image. There are two main types of such electro-optical converters. The first type is a device with a configuration in which a cell whose transmissivity or reflectivity varies in accordance with the image output signal is disposed corresponding to each pixel, and an image is formed by varying the transmissivity or reflectivity of each pixel for light from another light source. The second type is a device with a configuration in which an element that emits light itself is disposed corresponding to each pixel, and an image is formed by varying the brightness of the light emitted by the respective elements in accordance with the image output signal. For instance, a liquid crystal display element in which liquid crystal cells whose transmissivity or reflectivity can be varied are disposed in a two-dimensional arrangement may be cited as an example of a device having the former configuration. Furthermore, for instance, an organic EL element in which light-emitting elements that are caused to emit light themselves by an electrical signal are disposed in a two-dimensional arrangement may be cited as an example of a device having the latter configuration. In the present invention, a device having either of these configurations may be used.

Moreover, in the electro-optical converter 210, for example, an image can be formed as on the display screen of an information processing device. Of course, moving images can also be displayed.

In the present working configuration, the optical system 220 has a lens system 221 which has a construction such as that shown in FIG. 56. The lens system 221 enlarges the image that is formed by the electro-optical converter 210. In concrete terms, a false image is formed. By focusing this false image on the retina of the naked eye of the user, it is possible to display the image, for example, as though the user were viewing the image over the entire visual field.

The lens barrel 230 has a lens accommodating part 231 that accommodates the lens system 221 described above, a converter accommodating part 232 that accommodates the electro-optical converter 210, and a light blocking part 233 that maintains the distance from the electro-optical converter 210 at a constant value, and that blocks light so that external light is prevented from entering. The lens barrel 230 is formed from a light blocking material.

For example, the case 240 is formed from a light blocking plastic. An opening part 242 is formed in the surface of the case 240 that faces the user U. The lens system 221 is accommodated inside this opening part 242. Furthermore, one end of the case 240 forms a linking part that is linked to the supporting arm 420 (which constitutes a supporting part).

Figure 55:
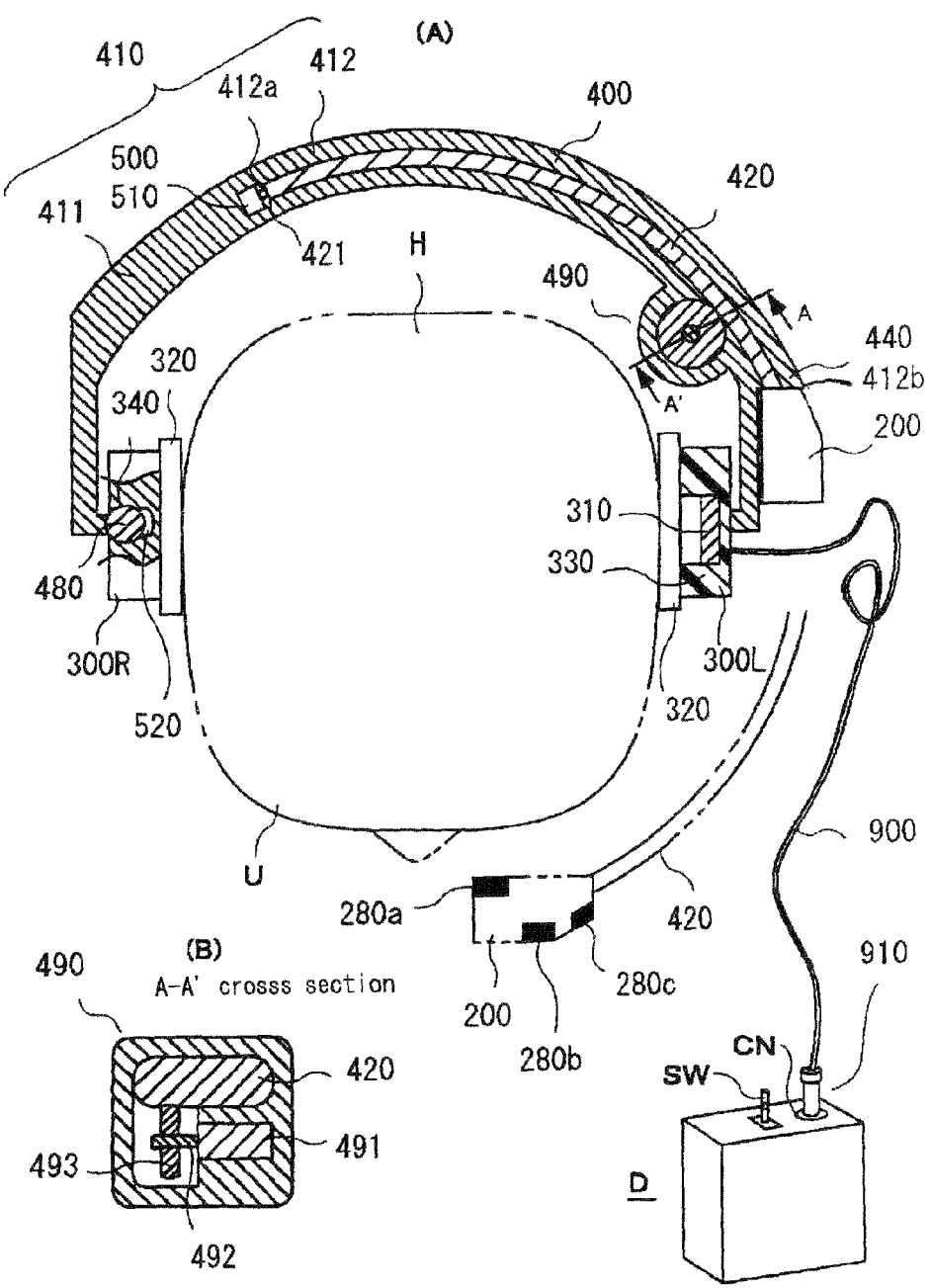
FIG. 55 shows a plan view and a partial sectional view of the head mounted display constituting a thirty-seventh working configuration of the present invention.

As is shown in FIGS. 54 and 55, the detection sensor 280a is disposed on the surface of the display part 200 that faces the user U, and the detection region of this sensor is the space where the presence of the user U might be predicted when the head mounted display is mounted on the head. The outputs of the detection sensors 280a and 280b are sent to the state detection device 955 (see FIG. 58) of the driving unit D via the cable 900.

For example, distance sensors which use an infrared LED as a light-emitting element, which use a PSD element as a light-receiving sensor, and which apply the principle of active auto-focus, can be utilized as the detection sensors. Furthermore, the detection sensor 280a may also be a contact sensor or a proximity sensor.

The audio output parts 300 convert an audio output signal into sound. In the present working configuration, a left audio output part 300L and a right audio output part 300R are installed.

Ordinarily, parts that have been formed into commercial products as headphones can be used as such audio output parts 300. As will be described later, the audio output parts 300L and 300R are driven by the mounting part 400 in a direction that causes these parts to approach each other. Furthermore, in the present working configuration, the audio output parts 300 may also function (in terms of structure) as contact parts that contact the ears when this head mounted display is mounted on the head H of the user U, together with the mounting part 400 (described later).

Furthermore, in the present working configuration, a connecting part (not shown in the figures) that connects the cable 900 and internal wiring is disposed on the side of the audio output part 300L.

As is shown in FIG. 54, the mounting part 400 has a band (linking part) 410 that links the left and right audio output parts 300L and 300R, and an image output part supporting arm 420 which is disposed on one end of the band 410. In the present working configuration, the display part supporting arm 420 is linked and fastened at one end of the band 410 to a supporting arm supporting part 440 that is adjacent to the audio output part 300L. The band 410 has a shape that is bent so that the head H of the user U can be clamped from the rear.

Furthermore, the band 410 is constructed from a main body 411, a display part supporting arm accommodating part 412 which accommodates the display part supporting arm 420 so that this arm can freely protrude and retract, and a supporting arm actuator 490 which drives the display part supporting arm 320. Moreover, the audio output parts 300L and 300R are linked and fastened to both ends of the band 410.

In addition, wiring (not shown in the figures) that is connected to the cable 900 from the driving unit D is disposed on the band 410. A portion of this wiring passes through the display part 200, while another portion of the wiring passes through the left and right audio output parts 300L and 300R.

Furthermore, there is also wiring that passes through the supporting arm actuator 490 and detection sensor 280a. The wiring that passes through the display part 200 is connected with the wiring that is disposed inside the display part supporting arm 420.

In the present working configuration, an opening part 412b is formed in the display part supporting arm accommodating part 412 adjacent to the audio output part 300L. The display part supporting arm 420 can protrude from and retract into this opening part 412b. Furthermore, as is shown in FIG. 55(A), the supporting arm actuator 490 is disposed in the display part supporting arm accommodating part 412.

FIG. 55(B) is a sectional view along the section A-A' of the supporting arm actuator 490 (described later) which can vary the position of the image output part 200. As is shown in FIG. 55(B), the supporting arm actuator 490 has a motor 491, a motor shaft 492, and a roller 493 which is disposed on the motor shaft 492 and which rotates simultaneously and coaxially with the motor shaft 492. The side surface of the roller 493 contacts one side surface of the display part supporting arm 420 with a sufficient frictional force. Accordingly, the display part supporting arm 420 can move through the display part supporting arm accommodating part 412 and emerge from or retract into the opening part 412b in accordance with the rotation of the roller 493.

Furthermore, the supporting arm actuator 490 is controlled by a supporting arm control device 959 that is disposed in the driving unit D. A motor (e.g., a pulse motor) which can realize an angular speed that corresponds to commands from the control device 959 may also be used as the supporting arm actuator 490.

Moreover, by using a pulse motor or the like, it is possible to set the amount by which the supporting arm 420 is fed out with fine precision; accordingly, the position of the display part 200 can be finely adjusted.

In addition, a stopper (not shown in the figures) is disposed in the opening part 412b. As a result, the display part supporting arm 420 does not fall out when this arm is pulled out; moreover, contact between the side surface of the roller 493 and one side surface of the display part supporting arm 420 can be constantly maintained.

A guide rail (not shown in the figures) is installed in the display part supporting arm accommodating part 412 so that the extension and retraction of the display part supporting arm 420 can be performed in a smooth manner. As a result, the mounting part supporting arm 420 can be caused to slide in a smooth manner.

Accordingly, when the display part supporting arm 420 is placed in a usable state, or when the position of the display part 200 is varied in accordance with the detection results of the detection sensor 280a, the extension or retraction operation that is performed by the driving force of the motor 491 is facilitated.

(Driving Unit and the Like)

The respective members of the head mounted display of the present working configuration that are mounted on the head are operated by the connection of these members via the cable 900 with the driving unit D that outputs image display signals and audio output signals, and that also outputs control signals to the supporting arm actuator 490.

Figure 58:
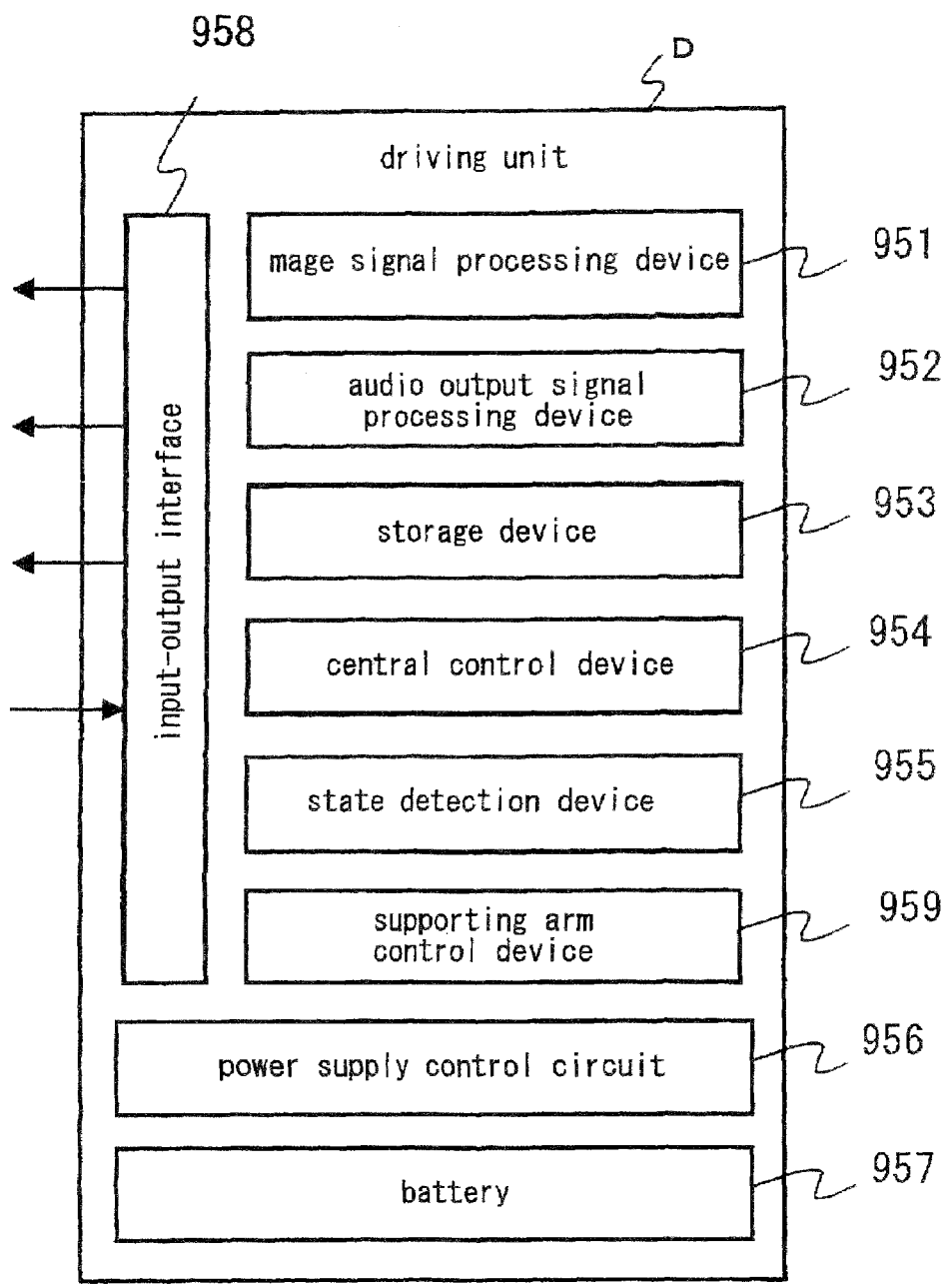
FIG. 58 is a block diagram showing the structural elements of a head mounted display driving unit that can be used in the respective working configurations.

As is shown in FIG. 58, the driving unit D has an image output signal processing device 951 which processes image display signals in order to send these image display signals to the display part 200, an audio output signal processing device 952 which is used to send audio output signals to the audio output part 300, a storage device 953, a central control device 954 which manages the driving unit as a whole, a supporting arm actuator control device 959 which controls the supporting arm actuator 490, a power supply control circuit 956 which is used to control the on-off switching and power saving mode of the power supply, and a battery 957. Furthermore, this driving unit D has a state detection device 955 which receives the detection results from the detection sensor 280a. Moreover, the driving unit D has an input-output interface 958 which exchanges information, signals, and the like with the respective members mounted on the head mounted display head part. The driving unit D also has a main switch SW that is used to perform on-off switching of the power supply. Furthermore, a connector CN is provided which is used to connect the plug 910 of the cable 900 that is used to exchange signals with the head mounted display. Moreover, a rechargeable battery 957 is provided as a power supply.

The connector CN has a multi-pin structure that is used to connect image output signals, audio output signals, light adjustment control signals, light sensor detection signals, and the like. Furthermore, with regard to the shape of the connector, this shape is not limited to a shape that is circular in cross section. An angular shape or a connector in which the pins have an arrangement such as single in-line or dual in-line may also be used. Furthermore, in cases where the respective signals are transferred by means of packets or the like, pins that can handle high frequencies are advisable. In such cases, various types of signals are sent as data according to a fixed communication protocol. In this case, a communication control device is further provided.

In addition to programs, image information, audio information, and the like that are the basis for producing image display signals and audio output signals are stored in the storage device 953. For example, a hard disk device is used as the storage device 953. Of course, the present invention is not limited to this. Other storage media may also be used.

The state detection device 955 calculates the distance between the detection sensor 280a and the object on the basis of the detection results sent from the detection sensor 280a, and sends the results of these calculations to the central control device 954. The construction of a head mounted display to which the present working configuration is applied has been described above.

Next, the operation of the head mounted display constructed as described above will be described. In a state in which the user U is using the head mounted display of the present working configuration, the head mounted display is mounted on the head H, and the display part 200 protrudes from the supporting part 400, and is fixed in place in front of the eye. Here, a case will be considered in which the distance between the user U and the image output part 200 is a distance that results in contact or a distance that is substantially close to a state of contact.

First, the detection sensor 280a acquires information relating to the position relative to the user U, and transmits these results to the state detection device 955 of the driving unit D via the cable 900 and input-output interface 958.

The state detection device 855 estimates the positional relationship between the detection sensor 280a and object from the information obtained from the detection sensor 280a, and sends the results to the central control device 954.

The central control device 954 judges whether or not the estimated positional relationship is such that the distance between the two parts is closer than a predetermined safe distance at which the detection sensor 280a and object do not contact each other, or are not too close to each other. In cases where the central control device 954 judges that contact may be predicted, the central control device 954 sends a command to the supporting arm control device 959 so that the image output part 420 is moved.

On the basis of this command, the supporting arm control device 959 sends a control signal to the supporting arm actuator 490, and thus controls the supporting arm actuator 490.

On the basis of this control signal, the supporting arm actuator 490 drives the display part supporting arm 420; as a result, the display part 200 is caused to move.

The operation of a head mounted display constituting one example of the present working configuration has been described above.

The following effects are obtained by means of the head mounted display constituting one example of the present working configuration. By using the present working configuration, it is possible to detect close proximity or contact of a portion of the body of the user U (head or face) with the display part 100, and to automatically move the display part.

(Thirty-Eighth Working Configuration)

A head mounted display constituting a thirty-eighth working configuration of the present invention will be described with reference to FIGS. 54 through 56 and FIG. 58. As is shown in FIGS. 54 and 55, the head mounted display of the present working configuration makes it possible to vary the position of the display part 200 between a state in which this display part 200 is disposed in front of the face of the user, and a state in which this display part 200 is retracted from in front of the face. In FIG. 55A, there are two states according to the position of the display part 200, [i.e.,] a state in which the display part 200 protrudes from the mounting part 400 and is fixed in a position in front of the eye (first state), and a state in which the display part 200 is caused to approach the mounting part 400 and is retracted rearward from this position in front of the eye of the user (second state).

As is shown in FIGS. 54 and 55, the head mounted display has a display part 200 which has the function of outputting images to the user U, an audio output part (holding part) 300 which has the functions of holding the head mounted display on the head and generating sound such as voice, music or effect sounds, and a mounting part 400 which contains the display part and audio output part, and which is used to mount these parts on the head of the user in a freely detachable manner. Furthermore, the head mounted display has a sensor 500 which is used to gather information that is used when it is inferred that this head mounted display is in a state of non-use.

This head mounted display is mounted on the head H of the user U so that this display clamps the head H. Specifically, the head mounted display is mounted on the head H as a result of the mounting part 400 clamping the head H of the user U by means of the elastic force of this mounting part itself in a state in which the audio output parts 300 contact the ears of the user U. Furthermore, the head mounted display has a driving unit D which outputs image output signals and audio output signals; this driving unit D is connected via the cable 900 to the various devices mounted on the head. The driving unit D has a power supply, a circuit that produces and outputs image signals, and a circuit that produces and outputs audio signals. A plug 910 is disposed on the tip end of the cable 900, and is detachably connected to the connector of the driving unit D. Accordingly, by mounting the head mounted display on the head H, the user U can view and listen to images and sound formed by the image output signals and audio output signals supplied from the driving unit D, via the display part 200 or audio output part 300.

As is shown in FIG. 58, the driving unit D has an image signal processing device 951 which processes image output signals in order to send these image output signals to the display part 200, an audio output signal processing device 952 which is used to send audio output signals to the audio output part 300, a central control device 954 which manages the driving unit as a whole, a state detection device 955 which receives information relating to the displacement of specified parts of the head mounted display, a power supply control circuit 956 which is used to control the on-off switching of the power supply, and a supporting arm driving control device 959 which controls the supporting arm actuator 490. Furthermore, the driving unit D has an input-output interface 958 that exchanges information signals with the respective means mounted on the head. Moreover, this driving unit D has a main switch SW used to perform on-off switching of the power supply. Furthermore, a connector CN is provided in order to connect the plug 910 of the cable 900 that is used to exchange signals with the head mounted display. Moreover, a rechargeable battery 957 is provided as a power supply.

A storage device 953 that stores image information and audio information that constitute a base for the production of image output signals and audio output signals is provided in the driving unit D. In addition to these parts, a communication device for receiving image information and audio information from outside can also be provided as needed.

As is shown in FIG. 56, the display part 200 has an electro-optical converter 210 constituting a two-dimensional display element which forms images by converting image output signals that express these images into optical signals, a lens system 221 constituting an ocular optical system that enlarges the formed images, an optical system 220 which has a lens barrel 230 that accommodates this lens system 221, and a case 240 that accommodates all of these parts.

The electro-optical converter 210 used in the present working configuration can be constructed from a display element that forms images of bit map images. Electro-optical converters 210 of this type can be divided into two main categories: namely, devices having a configuration in which images are formed by varying the transmissivity or reflectivity for light from another light source, and devices having a configuration in which the device itself emits light, and images are formed by varying the brightness of this emitted light. For instance, liquid crystal display elements in which liquid crystal cells whose transmissivity or reflectivity can be varied are disposed in a two-dimensional layout may be cited as an example of devices having the former configuration. Furthermore, for instance, organic EL elements in which light-emitting elements that emit light themselves in accordance with electrical signals are disposed in a two-dimensional layout may be cited as an example of devices having the latter configuration. Devices of either configuration may be used in the present invention.

Moreover, in the electro-optical converter 210, for example, a screen can be formed in the same manner as the display screen of an information processing device. For instance, a menu window or the like can be displayed. Of course, moving images can also be displayed.

In the present working configuration, the optical system 220 has a lens system 221. The lens system 221 enlarges the images that are formed by the electro-optical converter 210. In concrete terms, false images are formed. By focusing such false images on the retina of the naked eye of the user, it is possible to display images as though the user were viewing these images over the entire visual field.

The lens barrel 230 has a lens accommodating part 231 that accommodates the lens system 221 described above, a converter accommodating part 232 that accommodates the electro-optical converter 210, and a light blocking part 233 that maintains the distance from the electro-optical converter 210 at a fixed distance, and that blocks external light so that such light is prevented from entering. The lens barrel 230 is formed from a light blocking material.

The case 240 is formed from a cover plate 241 as shown in FIG. 56. For example, the cover plate 241 is formed from a light-blocking plastic. An opening part 242 is formed in the surface of the cover plate 241 that faces the user U. The lens system 221 is accommodated inside this opening part 242. Furthermore, one end of the case 240 constitutes a linking part 243.

The audio output part 300 converts audio output signals into sound. In the present working configuration, a left audio output part 300L and a right audio output part 300R are provided. As is shown in FIG. 55, each audio output part 300 has an audio converter 310 that converts electrical signals into sound, a case 330 that accommodates this converter, and an ear pad 320 which is disposed on the surface of the case 330 that faces the user U, and which contacts the ear of the user.

Ordinarily, parts that have been formed into commercial products as headphones can be used as the audio output parts 300. Furthermore, in the present working configuration, the audio output parts 300 also function (in terms of structure) as contact parts that contact the ears when this head mounted display is mounted on the head H of the user U together with the mounting part 400 (described later).

Audio output parts of this type include closed type, open type and semi-closed type parts. Any of these types may be used in the present invention. In the present working configuration, a close type case 330 is used. The audio converter 310 is disposed inside this case 330.

Furthermore, in the present working configuration, a connection part that links the cable 900 and internal wiring is disposed on the side of the audio output part 300L.

As will be described later, the audio output parts 300L and 300R are driven by the mounting part 400 in a direction that causes these audio output parts to approach each other. Accordingly, the ear pads 320 are mounted in order to relieve the pressing against the ears by the mounting part 400, and in order to improve the tight adhesion to the ears.

As is shown in FIG. 55A, the mounting part 400 has a band 410 that links the left and right audio output parts 300L and 300R, and a display part supporting arm 420 that is disposed on one end of this band 410.

The band 410 has a bent shape in order to allow clamping of the head H of the user U from the rear. Furthermore, the band 410 is constructed from a main body 411, a display part supporting arm accommodating part 412 that accommodates the display part supporting arm (supporting part, display arm) 420 so that this arm can freely protrude and retract, and a supporting arm actuator 490 that drives the display part supporting arm 420.

Moreover, as is shown in the cut-out part of the right audio output part 300R in FIG. 55A, the band 410 and audio output parts 300 are linked by a ball joint mechanism. As a result of this mechanism, the audio output parts 300 are free to pivot within a specified angular range. To describe this in greater detail, spherical ball head parts 480 are disposed on both ends of the band 410. Hollow cavity parts 340 that envelop these ball head parts 480 are formed in the audio output parts 300. The ball head parts 480 are fitted into the hollow cavity parts 340. A fixed gap is formed between the ball head parts 480 and the hollow cavity parts 340, so that the audio output parts 300 can pivot in a specified range about the ball head parts 480.

In addition, wiring (not shown in the figures) that is connected to the cable 900 from the driving unit D is disposed in the band 410. Some of this wiring communicates with the display part 200, while other portions of the wiring communicate with the left and right audio output parts 300L and 300R. Furthermore, there is also wiring that communicates with the supporting arm actuator 490 and sensor 500 described later. The wiring that communicates with the display part 200 is connected to the wiring that is disposed inside the display part supporting arm 420.

Furthermore, although this is not shown in the figures, it goes without saying that wiring between the audio output parts 300 and band 410 is performed in a state that does not interfere with the pivoting of the audio output parts 300.

In the present working configuration, an opening part 412b is formed adjacent to the audio output part 300L in the display part supporting arm accommodating part 412. The display part supporting arm 320 can protrude and retract via this opening part 412b.

Furthermore, as is shown in FIGS. 55A and 55B, the supporting arm actuator 490 is disposed in the display part supporting arm accommodating part 412.

FIG. 55B is a sectional view along section A-A' of the supporting arm actuator 490 (described later) that makes the position of the display part 200 variable. As is shown in FIG. 55B, the supporting arm actuator 490 has a motor 491, a motor shaft 492, and a roller 493 that is disposed on the motor shaft 492, and that rotates simultaneously and coaxially with the motor shaft 492. The side surface of the roller 493 contacts one side surface of the display part supporting arm 420 with a sufficient frictional force. Consequently, in accordance with the rotation of the roller 493, the display part supporting arm 420 moves through the display part supporting arm accommodating part 412, and can protrude or retract via the opening part 412b.

Moreover, the supporting arm actuator 490 is controlled by a supporting arm driving control device 959 disposed in the driving unit D. A motor (e.g., a pulse motor) that can realize an angular speed in accordance with commands from the driving control device 959 may also be used as the supporting arm actuator 490.

Furthermore, a stopper (not shown in the figures) is disposed in the opening part 412b. As a result, the display part supporting arm 420 does not fall out when this arm is pulled out; furthermore, contact between the side surface of the roller 493 and one side surface of the display part supporting arm 420 can be constantly maintained.

In order to allow smooth protrusion and retraction of the display part supporting arm 420, guide rails (not shown in the figures) are disposed on the display part supporting arm accommodating part 412. As a result, the display part supporting arm 420 can be caused to slide in a smooth manner.

Thus, the protrusion and retraction operation, which is performed by the driving force of the motor 491 in order to place the display part supporting arm 420[2] in a use state, and in order to retract this arm following the completion of use, is facilitated.

[2]Translator's note: the original text actually reads "display part indicating arm 420," but this obvious error is ignored in our translation because it is clearly caused by word processing error of the terms "indicating" and "supporting," which are homophonous in Japanese.

A sensor 500 that detects the presence or absence of the display part supporting arm 420 is attached to the bottom part 412a of the display part supporting arm accommodating part 412.

The sensor 500 gathers information that is used to recognize that this head mounted display is in a non-use state. Incidentally, direct detection that the head mounted display is in a non-use state is not easy. Accordingly, in the present invention, note is taken of specified changes in the head mounted display that are caused by specified operations of the user. Specifically, among changes that occur with respect to the head mounted display, those changes which are such that it appears that there is a high probability that the head mounted display has shifted to a non-use state when these changes occur are used as information for recognizing that the head mounted display is in a non-use state.

In the present working configuration, note is taken of changes that occur in the members of the head mounted display that are mounted on the head. Therefore, the occurrence of specified changes in the members of the head mounted display that are mounted on the head is detected by a sensor. In concrete terms, note is taken of two types of changes in the present working configuration. The first change is the following change: namely, the display part supporting arm 420 is accommodated in the display part supporting arm accommodating part 412 of the mounting part 400. The second change is the following change: namely, the head mounted display of the present working configuration is mounted on the head.

First, the first change is detected. For this purpose, a limit switch 510 constituting a sensor is disposed in the bottom part 412a of the display part supporting arm accommodating part 412 as shown in FIG. 55(A). For example, when the display part supporting arm 420 is accommodated in the display part supporting arm accommodating part 412 so that the end part 421 of the arm 420 contacts this limit switch 510, the limit switch detects this contact. Accordingly, the limit switch 510 is set, for example, so that the limit switch 510 is switched off when the end part 421 of the arm 420 contacts this limit switch 510, and is switched on when this end part 421 is not in contact with this limit switch 510. As a result, in cases where the display part supporting arm 320 is pulled out, the end part 421 of this arm 420 is not in contact with the limit switch 510; consequently, the limit switch 510 is switched on. Conversely, in cases where the arm 420 is in contact with the limit switch 510, the limit switch 510 is switched off.

In the present working configuration, in cases where the display part supporting arm 420 is completely accommodated in the display part supporting arm accommodating part 412, the limit switch 510 is switched off.

Furthermore, even an intermediate state in which the display part supporting arm 420 is not completely accommodated in the display part supporting arm accommodating part 312, it can be judged to be a state in which the head mounted display is not in use. In this case, the position in which the sensor 500 is installed is a different position. For example, disposition in an intermediate position of the display part supporting arm accommodating part 412 or in the area of the opening part is conceivable.

Next, the shape change of the head mounted display of the present working configuration being mounted on the head, which is the second shape variation, is detected. As is shown in FIG. 55A, a pressure sensor 520 is present as a sensor. The position in which this sensor is installed is a position on the wall surface of the hollow cavity part 340 of the audio output part 300a facing the ball head part 480. The pressure sensor 520 outputs an "on" signal when a constant pressure is applied. As a result, pressing applied between the band 410 and the audio output parts 300 can be detected.

When the head mounted display is mounted, two forces oriented in mutually opposite directions act between the band 410 and audio output parts 300. One of these forces is a force which is generated by the driving force of the band, and which is oriented in a direction that causes the two audio output parts 300R and 300L to approach each other. The other force is a force which is generated by the two ears of the user, and which is oriented in a direction that tends to increase the distance between the two audio output parts 300R and 300L. Pressing is applied between the band 410 and audio output parts 300 by these two forces oriented in mutually opposite directions. This pressing is detected by the pressure sensor, so that the mounted state is detected.

On the other hand, when the head mounted display is not mounted, the force oriented in a direction that tends to increase the distance between the audio output parts 300R and 300L does not act. Accordingly, the pressure between the band 410 and audio output parts 300 drops. This pressure drop is detected by the pressure sensor 520, and it is thus detected that the device has assumed a non-mounted state.

Furthermore, instead of the pressure sensor 520 that is installed on one of the audio output parts 300, it would also be possible to mount, on the audio output parts 300L and 300R, detectors that comprise at least two electrodes, and that detect the mounting of the head mounted display on the head from changes in the dielectric constant between these two electrodes.

Next, the operation of the head mounted display constructed as described above when the user U utilizes this head mounted display will be described.

For example, the operation (mode 1) of the head mounted display in a case where the user U mounts the head mounted display in a non-use state (second state) on the head, and then switches on the main switch SW, will be described.

First, immediately after the main switch SW is switched on, the sensor 500 (which is a limit switch) detects that the end part 421 of the display part supporting arm 420 is in the vicinity of the bottom part 412a. Then, a limit switch "off" signal is transmitted to the state detection device 955 provided in the driving unit D via the cable 900 and input-output interface 958. Similarly, the pressure switch 520 provided on the audio output part 300 transmits its measurement value to the state detection device 955. On the basis of the signals transmitted from the sensor 500 and pressure switch 520, the state detection device 955 detects that the head mounted display is mounted on the head in a non-use state (second state). Receiving these detection results, the central control device 954 issues a command to drive the supporting arm actuator 490 to the supporting arm driving control device 959. The supporting arm driving control device 959 sends a signal that controls the supporting arm actuator 490 to the supporting arm actuator 490. The motor 491 is started by the control signal from the supporting arm driving control device 959, and the roller 493 is caused to rotate at the same angular speed by the rotation of the motor shaft 492. The side surface of the roller 493 and the side surface of the display part supporting arm 420 contact each other with a sufficient frictional force so that there is no slipping between these surfaces. Accordingly, the display part supporting arm 420 is pulled out from the display part supporting arm accommodating part 412 by the rotation of the roller 493. Specifically, the positional relationship between the display part 200 and the audio output parts 300 is controlled.

As a result, the head mounted display of the present working configuration shifts from the second state in which the display part supporting arm 420 is stored in the display part supporting arm accommodating part 412 to the first state in which the display part supporting arm 420 is pulled out from the display part supporting arm accommodating part 412.

The operation of a head mounted display constituting one working configuration of the present invention was described above. The following effects are obtained using the head mounted display to which this working configuration is applied.

In the head mounted display of the present invention, a sensor 500 detects the state of the image display part 1, and detects whether or not the head mounted display is mounted on the head. The state of the image display part 1 can be varied by the driving force of the motor 391 in accordance with this mounted state. Accordingly, the user can place the image display part 1 in the optimal state in accordance with the conditions, without performing any special operation.

One working configuration has been described above.

(Thirty-Ninth Working Configuration)

Next, a thirty-ninth working configuration will be described with reference to FIGS. 59 through 62.

Figure 59:
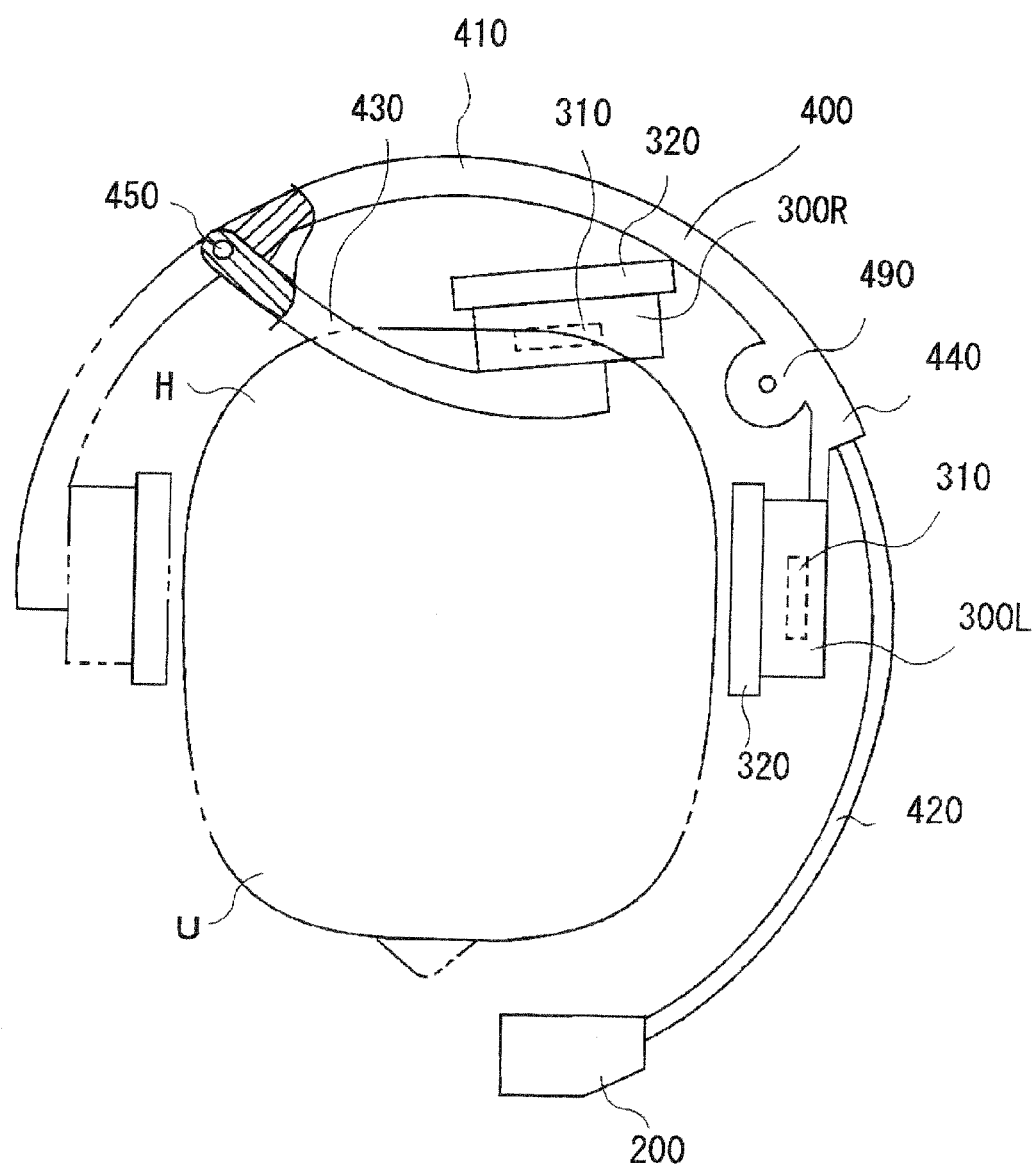
FIG. 59 is a partially sectional plan view showing the structure of a head mounted display constituting a thirty-ninth working configuration of the present invention.

The present working configuration has a structure that differs from that of the thirty-eighth working configuration in that the audio output part 300R is retracted from the mounting part 400 using a hinge part when not in use. The remaining structure is the same as in the thirty-eighth working configuration. Accordingly, in order to avoid redundant description, the description here will focus on points of difference from the thirty-eighth working configuration. FIG. 59 is a plan view showing the shape and construction of the head mounted display of the present working configuration when mounted and when not mounted. FIG. 60(A) is an external perspective view showing the shape of the device when not mounted. FIG. 60(B) is an external perspective view showing the shape of the head mounted display of the present working configuration when this head mounted display is mounted on the head. Furthermore, the cable 900 and driving unit D are not shown in the present working configuration.

Figure 60:
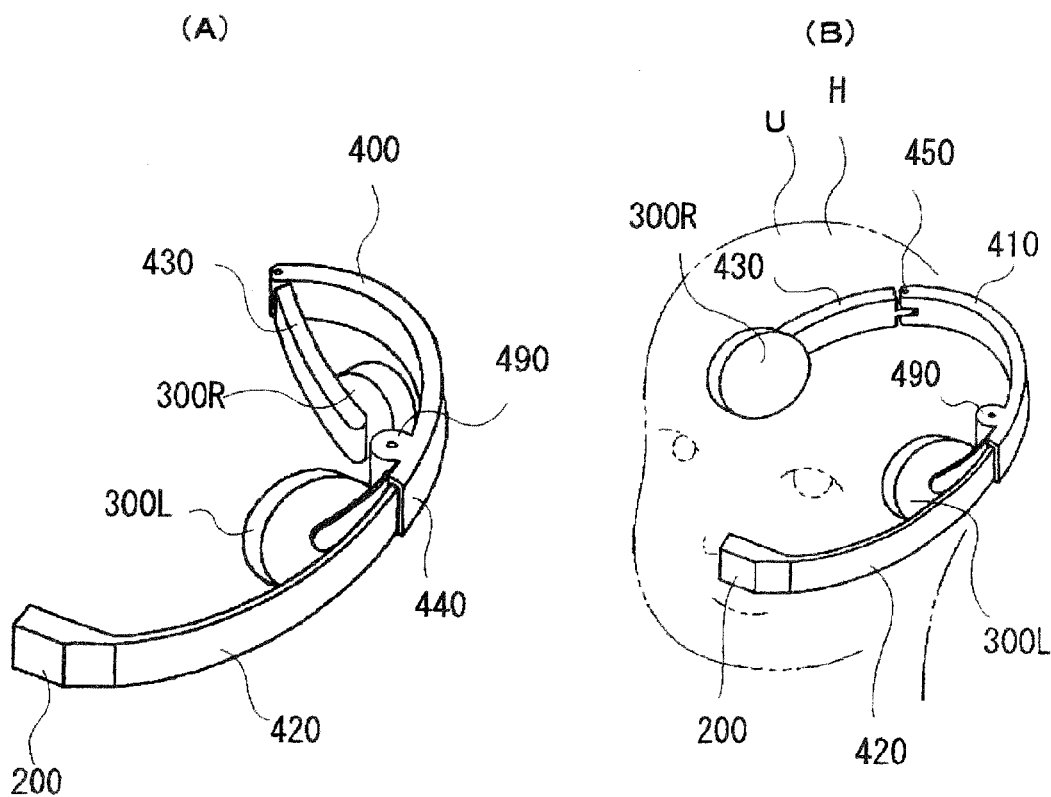
FIG. 60 shows external perspective views of the head mounted display constituting a thirty-ninth working configuration of the present invention.

As is shown in FIGS. 59 and 60, the head mounted display of the present working configuration has a display part 200, audio output parts 300 and a mounting part 400.

As is shown in FIGS. 59 and 60, the mounting part 400 comprises a plurality of fastening members. Specifically, the mounting part 400 has a band 410 and an audio output part supporting arm 430 that link the left and right audio output parts 300L and 300R, and a display part supporting arm 420. The display part supporting arm 420 is linked and fastened to a supporting arm supporting part 440 on one end of the band 410. Furthermore, as in the thirty-eighth working configuration, a limit switch is provided on the bottom part 412*a* of the display part supporting arm accommodating part 412.

The band 410 and audio output part supporting arm 420 have a bent shape so that the head H of the user U can be clamped from the rear.

Furthermore, a pivoting part 450 constituting a rotating member is disposed on one end of the band 410, i.e., toward the audio output part 400R in the present working configuration. The band 410 and the audio output part supporting arm 430 are linked in a pivotable manner by this pivoting part 450.

Figure 61:
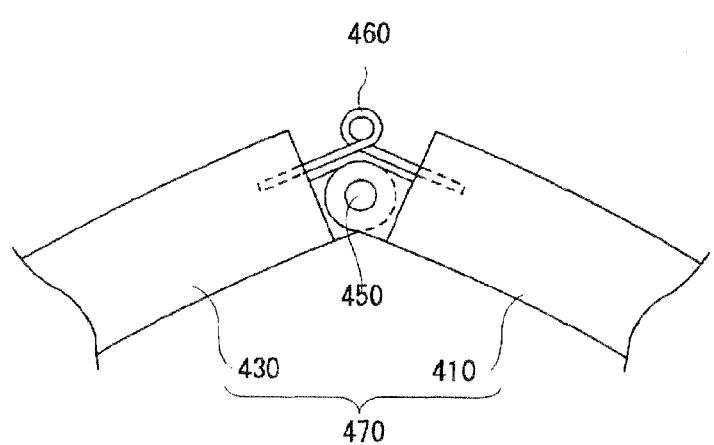
FIG. 61 is a partial plan view showing the driving structure in the bent part of the band used in the head mounted display constituting a thirty-ninth working configuration of the present invention.

As is shown in FIG. 61, a driving member 460 is disposed on a hinge part 470 constructed from one end of the band 410, one end of the audio output part supporting arm 430 and the pivoting part 450. This driving member 460 is disposed in a state in which a force acts to maintain the mounting part 400 in a folded state as shown in FIGS. 59 and 60 when the head mounted display is not mounted. As a result, in the mounted state, the hinge part 470 assumes an open state against the driving force of the driving member 460. In the non-mounted state, the hinge part 470 is caused to assume a folded state by the driving force of the driving member 460.

Furthermore, although this is not shown in the figures, it goes without saying that wiring is performed between the audio output part supporting arm 430 and band 410 in a state that does not hinder pivoting.

In the present working configuration, sensors 500 are disposed in two locations. The first disposition position of the sensors 500 is the bottom part 412*a* of the display part supporting arm accommodating part 412. By disposing a sensor 500 in this position, it is possible to obtain information that allows recognition of the state (second state or first state) of the display part supporting arm 420 in the same manner as in the thirty-eighth working configuration. If a limit switch 510 is used as the sensor 500 in this position, this limit switch 510 can be switched from "off" to "on" in a state in which the end part 421 of the supporting arm 420 is in contact with the bottom part 412*a*. Accordingly, in cases where the end part 421 of the image output part supporting arm 420 contacts the limit switch 510, it is recognized that the image output part supporting arm 420 is accommodated. As a result, the central control device 954 provided in the driving unit D can more reliably judge whether the head mounted display is in a use state or non-use state on the basis of the signal from the limit switch 510.

Figure 62:
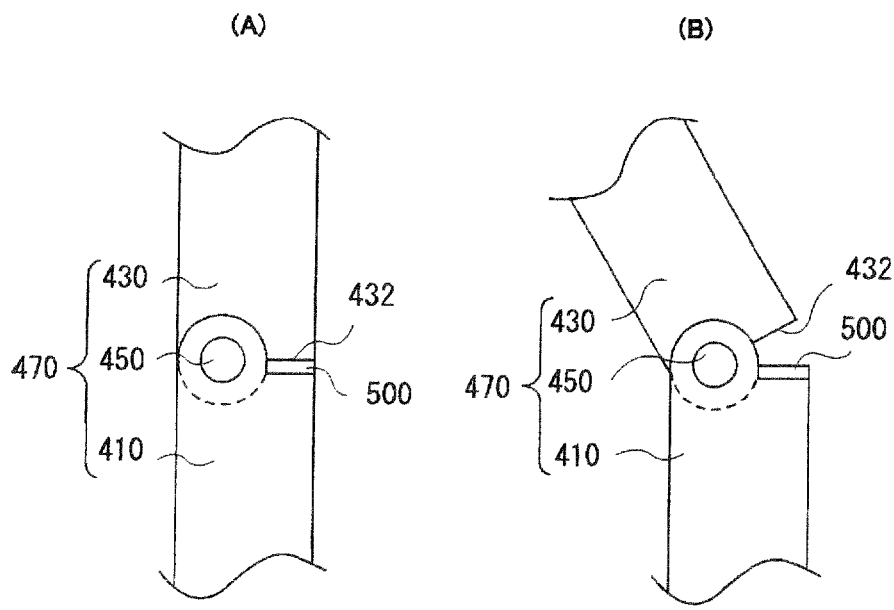
FIG. 62 shows explanatory diagrams illustrating the use state in the bent part of the band used in the head mounted display constituting a thirty-ninth working configuration of the present invention.

Furthermore, the second disposition position of the sensors 500 is the hinge part 470; as is shown in FIG. 62, this is a position where the hinge part (when open, see FIG. 62(A)) contacts the side part 432 on one end of the audio output part supporting arm 430. The sensor 500 is disposed in this position, and is set, for example, so that this sensor 500 outputs an "on" signal when the side part 432 on one end of the audio output part supporting arm contacts the sensor (FIG. 62(A)), and outputs an "off" signal when this side part is removed from the sensor. As a result, information that allows the recognition of a non-mounted state can be obtained utilizing this detection by the sensor 500.

A switch, contact sensor, pressure sensor, or the like can also be used as the sensor 500 in cases where this sensor 500 is disposed in the position shown in FIG. 62. Preferably, a pressure sensor is used. If a pressure sensor is used, then this sensor can be switched from "off" to "on" when a fixed pressure is applied to the sensor 500 during mounting. Accordingly, since the power supply is not switched on in cases where the side part 432 of the audio output part supporting arm 430 simply contacts the sensor 500, erroneous operation can be prevented. As a result, a judgment can be made more reliably as to whether or not the head mounted display is mounted and being used by the user.

Next, the operation of the head mounted display in cases where the user U utilizes the head mounted display of the thirty-ninth working configuration will be described.

For example, the operation of the head mounted display (mode 1) in a case where the user U mounts the head mounted display in a non-use state (second state) on the head, and subsequently switches on the main switch SW, will be described.

A difference in construction between the thirty-eighth working configuration and the present working configuration is found only in the portions of the mechanism that detects the mounting of the head mounted display on the head. Accordingly, the difference in operation between the two working configurations is also only a difference in the operation used to detect the mounting of the head mounted display; the remaining operations are common to both working configurations. In order to avoid any redundant description, the following description will center on the operation that detects the mounting of the head mounted display in the thirty-ninth working configuration on the head.

First, in the initial state, as in the thirty-eighth working configuration, the state detection device 955 detects that the image output part supporting arm 420 is accommodated in the supporting arm accommodating part 412 based on the signal from the limit switch 510.

Meanwhile, the state detection device 955 detects that the sensor 500 and side part 432 are in contact at a sufficient pressure based on the measurement signal from the sensor 500 disposed on the hinge part 470.

From these two sets of detection results, the state detection device 955 judges that the user U has mounted the head mounted display (in a non-use state (second state)) on the head. The subsequent operation of feeding out the image output part supporting arm 420 is the same as in the thirty-eighth working configuration.

Next, the effects of the thirty-ninth working configuration will be described. In the present working configuration, the structure of the audio output part 300 is made lighter and simpler by changing the pressure sensor of the thirty-eighth working configuration in the audio output part 300 to the pressure sensor 500 in the hinge part 470. As a result, the present working configuration is advantageous in that this working configuration can be produced inexpensively. Furthermore, in the present working configuration, since the head mounted display is constructed with a folding structure using the audio output part supporting arm 430 and hinge part 470, it is expected that the portability of the device as a whole will be improved.

(Fortieth Working Configuration)

Next, a fortieth working configuration of the present invention will be described with reference to FIGS. 63 and 64.

The present working configuration has a structure which differs from that of the thirty-eighth working configuration in that a bending sensor is used as the mounting detection means. The remaining structures are the same as in the thirty-eighth working configuration. Accordingly, in order to avoid any redundant description, the description here will center on points that differ from the thirty-eighth working configuration. Furthermore, in the present working configuration, the cable 900 and driving unit D are not shown in the figures.

Figure 63:
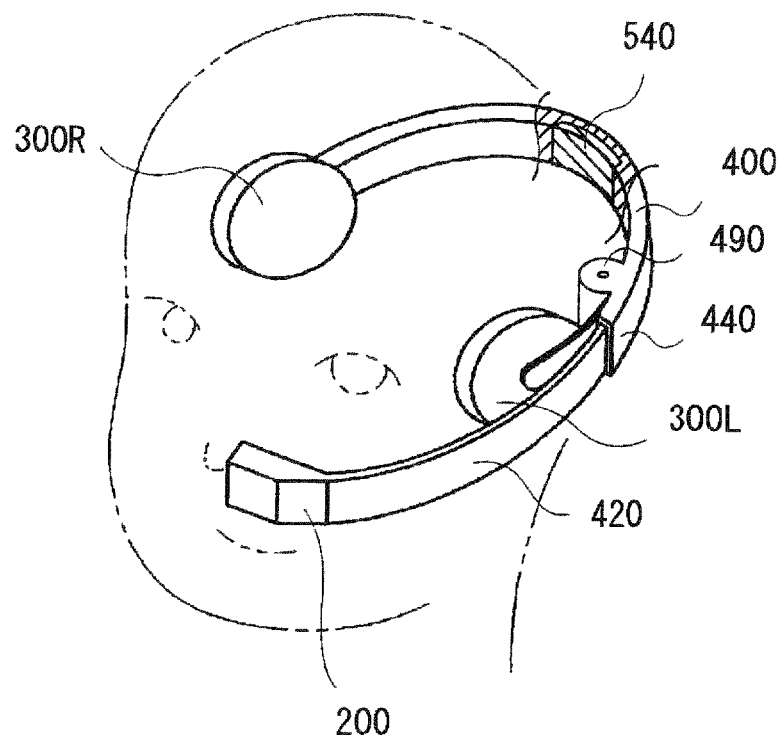
FIG. 63 is a partially sectional plan view showing the structure of a head mounted display constituting a forty-first working configuration of the present invention.

As is shown in FIG. 63, the head mounted display of the present working configuration has a display part 200, audio output parts 300, and a mounting part 400.

As is also shown in FIG. 63, the mounting part 400 has a band 410 that links the left and right audio output parts 300L and 200R and a display part supporting arm 420 that is disposed on one end of the band 410. The mounting part 400 also has a supporting arm actuator 490 that drives the display part supporting arm 320. The display part supporting arm 420 is linked and fastened to a supporting arm support part on one end of the band 410. The band 410 has a bent shape so that the head H of the user U can be clamped from the rear. Furthermore, audio output parts 300L and 300R are linked and fastened to both ends of the band 410.

A bending sensor 540 is embedded in the vicinity of the central portion of the band 410. The bending sensor 440 bends in linkage with the bending of the band 410. The bending sensor 540 detects the degree of bending of the band 410, and outputs an "on" signal in cases where this bending exceeds a certain degree of bending.

As is shown in FIG. 64, the degree of bending of the band 410 is small in cases where the head mounted display is mounted on the head (FIG. 64A), and is large in cases where the head mounted display is not mounted on the head (FIG. 64B). Specifically, as a result of this bending sensor 540 being disposed on the band 410, the degree of bending of the band 410 is detected, and a judgment as to whether or not the head mounted display is mounted is made in accordance with the detection results.

A sensor that can be used as the bending sensor 540 is any sensor as long as this sensor can be disposed on the band 410, and can distinguish the degree of bending of the band 410 when the head mounted display is mounted and when the head mounted display is not mounted. For example, a publicly known bending sensor such as a sensor that utilizes a metal resistor and detects bending by outputting the variation in resistance in accordance with the degree of strain can be used.

Next, the operation of the head mounted display that takes place when the user U utilizes the fortieth working configuration constructed as described above will be described.

For example, the operation of the head mounted display (mode 1) in a case where the user U mounts the head mounted display on the head in a non-use state (second state), and subsequently switches on the main switch SW, will be described.

The difference in construction between the thirty-eighth working configuration and the present working configuration is found only in the portion of the mechanism that detects the mounting of the head mounted display on the head. Accordingly, the difference in operation between the two working configurations is likewise only the difference in the operation that detects the mounting of the head mounted display; the remaining operation is common to both working configurations. In order to avoid any redundant description, the following description will center on the operation that detects the mounting of the head mounted display on the head in the fortieth working configuration.

First, in the initial state, as in the thirty-eighth working configuration, the state detection device 955 detects that the image output part supporting arm 420 is accommodated in the supporting arm accommodating part 412 based on a signal from the limit switch 410.

Meanwhile, the state detection device 955 detects that the degree of bending of the band 410 in which the bending sensor 540 is mounted is reduced based on the measurement signal from this bending sensor 540 that is provided in the band 410.

From these two sets of detection results, the state detection device 955 judges that the user U has mounted the head mounted display in a non-use state (second state) on the head. The subsequent operation of feeding out the image output part supporting arm 420 is the same as in the thirty-eighth working configuration.

Next, the effects of the fortieth working configuration will be described. In the head mounted display of the present working configuration, a head mounted display is provided in which the mounted state or non-mounted state can be detected reliably by means of a simple structure.

Above, mode 1 in the thirty-eighth through fortieth working configurations was described.

Furthermore, in addition to mode 1 described above, modes 2 through 10 indicated below are possible in accordance with the conditions involved. Moreover, an even larger number of modes can be realized by appropriately combining these various modes.

Mode 2: the head mounted display of the present working configuration need not make a transition to the use state (first state: state in which the display part supporting arm 420 is fed out) when the power supply is switched on in the non-use state (second state: state in which the display part supporting arm 420 is accommodated) in cases where the head mounted display is not mounted on the head.

Mode 3: the head mounted display of the present working configuration may make a transition to the first state when the power supply is switched on in the non-use state (second state) in cases where the head mounted display is not mounted on the head.

Mode 4: in the head mounted display of the present working configuration, a selection may be made as to whether or not the head mounted display makes a transition to the first state when the power supply is switched on in the non-use state (second state) in cases where the head mounted display is not mounted on the head.

Mode 5: the head mounted display of the present working configuration may make a transition to the second state when the power supply is switched on in the use state (first state) in cases where the head mounted display is not mounted on the head.

Mode 6: the head mounted display of the present working configuration may remain in the first state when the power supply is switched on in the use state (first state) in cases where the head mounted display is not mounted on the head.

Mode 7: in the head mounted display of the present working configuration, a selection may be made as to whether or not the head mounted display makes a transition to the second state when the power supply is switched on in the use state (first state) in cases where the head mounted display is not mounted on the head.

Mode 8: the head mounted display of the present working configuration may perform an operation such as the following when the power supply is cut off in the use state (first state) in cases where the head mounted display is mounted on the head. Namely, after the main switch is switched off, a voice message may be issued from the audio output parts 300, or an image message may be issued to the user U from the video output part 1; then, the display part supporting arm 420 may be returned to the non-use state (second state), after which the power supply may be cut off following a delay.

Mode 9: the head mounted display of the present working configuration may perform an operation such as the following when the main switch is switched off in the use state (first state) in cases where the head mounted display is not mounted on the head. Namely, after the main switch is switched off, the display part supporting arm 420 may be returned to the non-use state (second state), after which the power supply may be cut off following a delay.

Mode 10: the head mounted display of the present working configuration may be devised so that the head mounted display makes a transition to the use state (first state) when the head mounted display is mounted on the head in the non-use state (second state) with the power supply switched on.

The respective modes above have the following effects: In mode 2, the unintentional jumping out of the display part supporting arm 420 can be prevented, so that the encountering of accidental situations can be prevented. In mode 3, the display part supporting arm 420 protrudes; accordingly, the fact that the head mounted display has been driven can be ascertained in a simple manner. In mode 4 and mode 7, the device can be set according to the preferences of the user; accordingly, a head mounted display that is suited to the environment in which the user uses this display can be provided.

In mode 5, the non-mounted state of the head mounted display is the same as the non-use state; accordingly, transport and the like of the head mounted display in a non-use state is facilitated. Furthermore, since the display part supporting arm 420 is accommodated, the fact that the head mounted display has been driven can be ascertained in a simple manner. In mode 6, if the head mounted display is mounted immediately, the trouble of an operation that causes the display part supporting arm 420 to protrude can be omitted, so that unneeded operations can be reduced.

In mode 8, the user can be clearly informed that the power supply has been cut off while the head mounted display is mounted, and the power supply is cut off with advance notification; accordingly, even in cases where the user unintentionally cuts off the power supply as a result of an erroneous operation, it is clear that there is no failure.

In mode 9, since the power supply is stopped after the display part supporting arm 420 is accommodated following an instruction to stop the power supply, a state that allows easy transport or the like is obtained, so that the convenience of the head mounted display is enhanced. In mode 10, since a state that allows use is obtained as soon as the power supply is driven, the convenience of the head mounted display is improved.

Furthermore, the present invention is not limited to the working configurations described above; various modifications are possible within the scope of the gist of the present invention.

For example, in the thirty-eighth through fortieth working configurations described above, a modified example is conceivable in which the position or state of the image display part 1 can be varied in accordance with the amount of remaining battery power. This modified example has remaining battery power detection means that detects the amount of remaining battery power by measuring the voltage or the like of the battery disposed in the driving unit D via the cable 900. In this operation, first of all, the head mounted display of this modified example issues a voice or image message relating to the amount of remaining battery power to the user U via the display part 110 or audio output parts 300 in cases where the head mounted display is mounted on the head, and it is detected that the amount of remaining battery power has dropped below a predetermined value. Next, if the state of the head mounted display is the first state (use state), this state of the head mounted display is changed to the second state (non-use state), and the power supply is cut off.

Furthermore, in cases where [i] it is detected that the amount of remaining battery power has dropped below a predetermined value, [ii] the head mounted display is not mounted on the head, and [iii] the head mounted display is in the first state (use state), the head mounted display of this modified example makes a transition to the second state, after which the power supply is immediately cut off.

(Forty-First Working Configuration)

Figure 65:
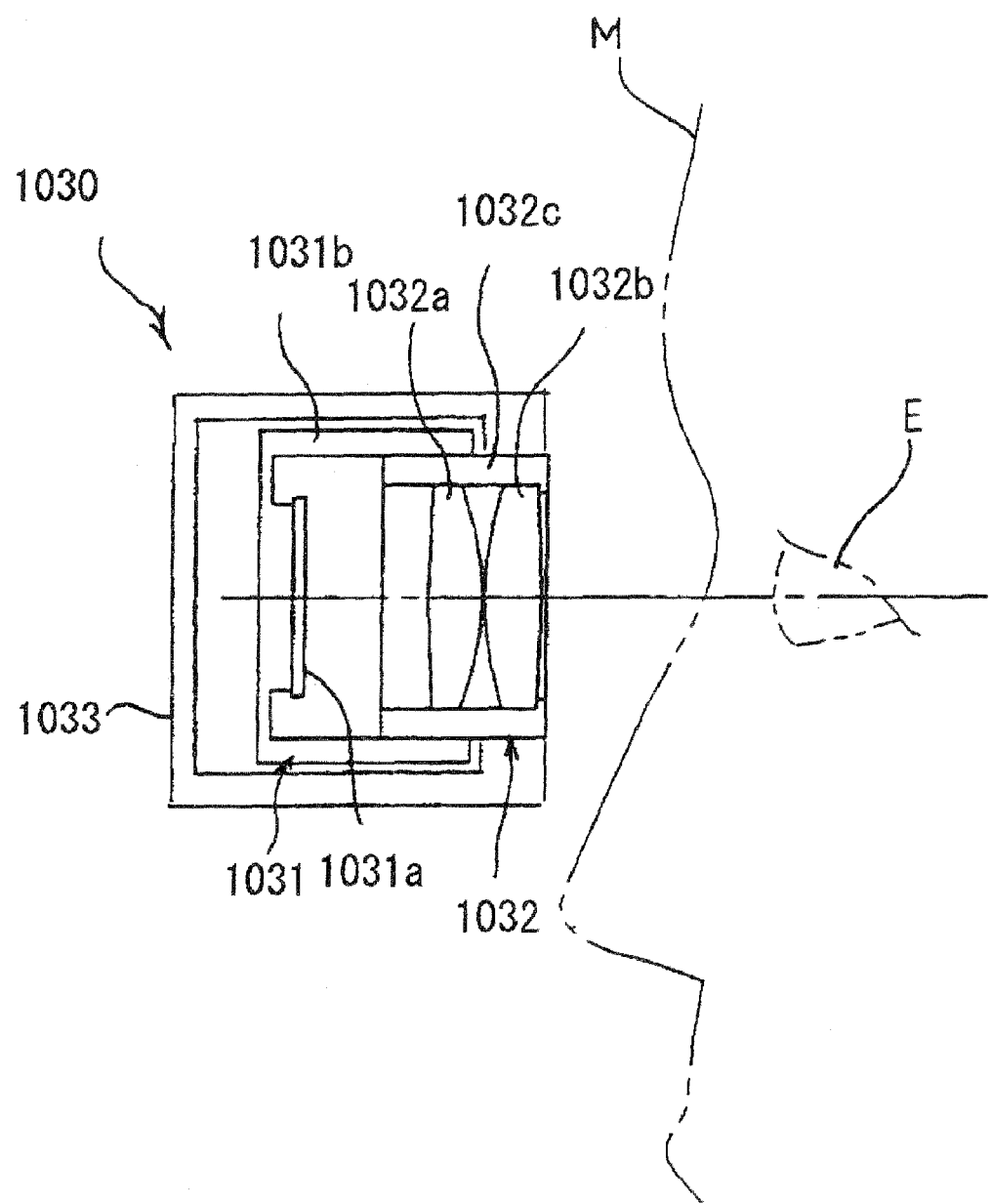
FIG. 65 is a schematic diagram showing a section of the video image display part of the head mounted display device constituting a forty-first working configuration of the present invention.

FIG. 65 is a schematic diagram showing a section of the video display part of a head mounted display device constituting a forty-first working configuration of the present invention. The video display part (display part) 1030 of this head mounted display device is disposed in front of the eye E of the user M.

The video display part (display part) 1030 comprises a display device part 1031, an optical lens part 1032, and an outer packaging part 1033. The outer packaging part 1033 accommodates the display device part 1031 and optical lens part 1032. The outer packaging part 1033 is integrally formed on one end of the display arm 1020 (see FIG. 70).

The optical lens part 1032 constitutes an ocular optical system. The optical lens part 1032 comprises two lenses 1032*a* and 1032*b* and a holding frame 1032*c*. The holding frame 1032*c* is fastened to the outer packaging part 1033.

The display device part 1031 comprises a liquid crystal panel 1031*a* and a holding frame 1031*b* that holds this liquid crystal panel 1031*a*. The holding frame 1031*b* is supported on the holding frame 1032c so that this holding frame 1031b can move in the direction of the optical axis.

In this head mounted display device, the video image that is output to the liquid crystal panel 1031a of the display device part 1031 is formed via the lenses 1032a and 1032b as a false image at a distance that allows clear viewing by the user M, so that this false image can be seen by the user M.

Since the visual acuity of the user M varies from individual to individual, the system is devised so that the display device part 1031 is moved in the direction of the optical axis with respect to the optical lens part 1032 by operating an operating mechanism (not shown in the figure) from the outside, thus causing a false image to be formed in a position that is suited to the individual user.

In this working configuration, an image can be formed in a position that is suited to the individual user.

(Forty-Second Working Configuration)

Figure 66:
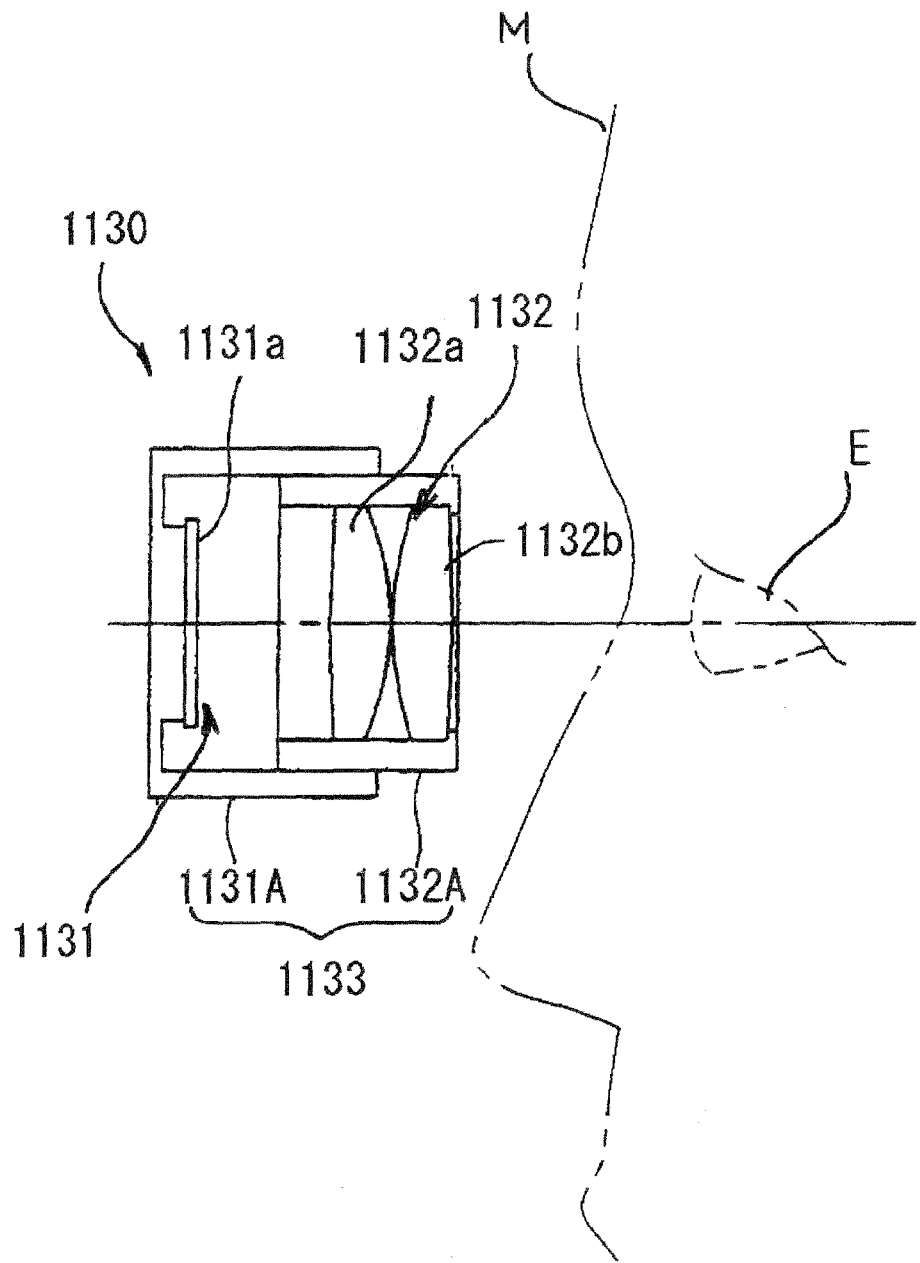
FIG. 66 is a schematic diagram showing a section of the video image display part of a head mounted display device constituting a forty-second working configuration of the present invention.

FIG. 66 is a schematic diagram showing a section of the video display part of a head mounted display device constituting a forty-second working configuration of the present invention. Parts that are common to this working configuration and the forty-first working configuration are labeled with the same symbols, and a description of such parts is omitted.

The video display part (display means) 1130 of this head mounted display device is disposed in front of the eye E of the user M.

The video display part (display means) 1130 comprises a display device part 1131, an optical lens part 1132, and an outer packaging part 1133.

The outer packaging part 1133 has a first outer packaging part 1131A and a second outer packaging part 1132A. The second outer packaging part 1132A is integrally formed on one end of the display arm 1020 (see FIG. 70).

The optical lens part 1132 constitutes an ocular optical system. The optical lens part 1132 is constructed from two lenses 1132a and 1132b. The lenses 1132a and 1132b are held in the second outer packaging part 1132A.

The display device part 131 is constructed from a liquid crystal panel 1131a. This liquid crystal panel 1131a is held in the first outer packaging part 1131A. The first outer packaging part 1131A is supported on the second outer packaging part 1132A so that this first outer packaging part 1131A can move in the direction of the optical axis.

In this head mounted display device, the video image that is output to the liquid crystal panel 1131a of the display device part 1131 is formed via the lenses 1132a and 1132b as a false image at a distance that allows clear viewing by the user M, so that this false image can be seen by the user M.

In this case, the first outer packaging part 1131A (display device part 1131) is moved in the direction of the optical axis with respect to the second outer packaging part 1132A (optical lens part 1132) by operating an operating mechanism (not shown in the figure), so that a false image is formed in a position that is suited to the individual user.

In this forty-second working configuration, effects similar to those of the forty-first working configuration are manifested; furthermore, since the outer packaging part 1033 shown in FIG. 65 is omitted, the size of the video display part 1130 can be reduced.

Moreover, if the first outer packaging part 1131A and second outer packaging part 1132A are moved in a direction that causes the display device part 1131 and optical lens part 1132 to approach each other, the size of the video display part 1130 can be reduced even further. In particular, if the size of the video display part 1130 is thus reduced when the video images are not being viewed, then this video display part will not create an obstruction.

(Forty-Third Working Configuration)

FIG. 67(a) is a schematic diagram showing a section of the video display part of a head mounted display device constituting a forty-third working configuration of the present invention, and FIG. 67(b) is a sectional view along line b-b in FIG. 67(a).

The video display part 1230 comprises two outer packaging parts 1231A and 1232A.

Figure 70:
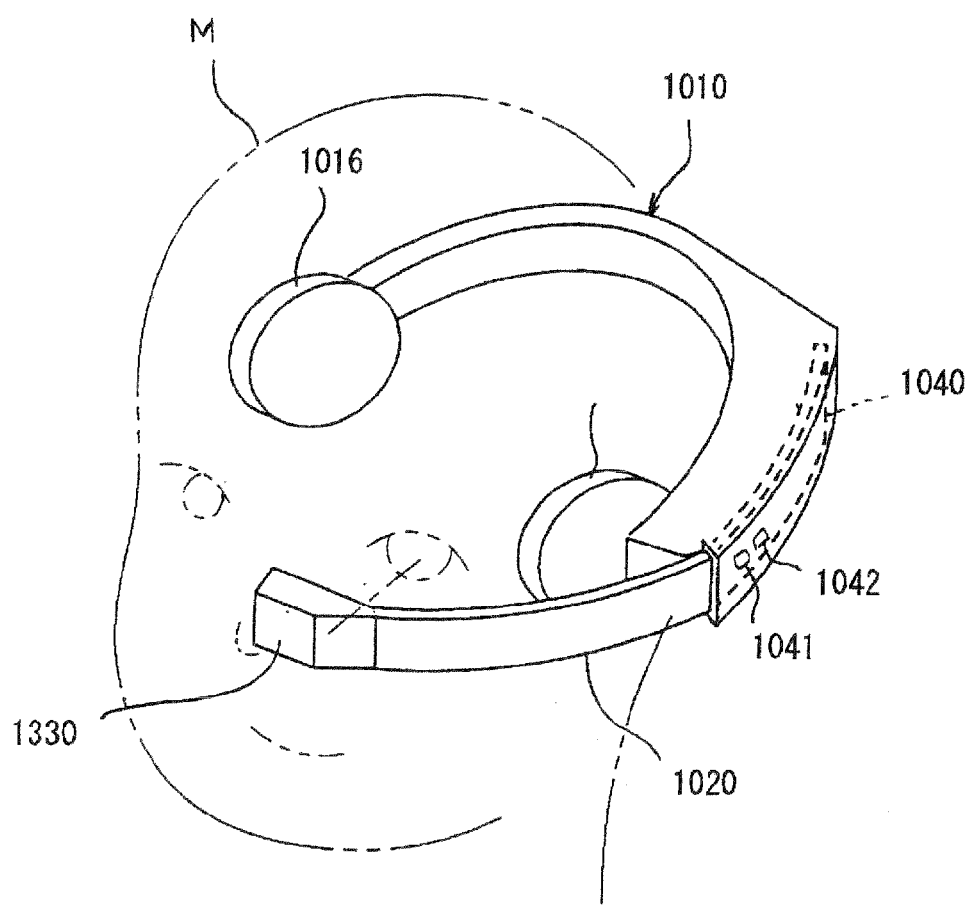
FIG. 70 is a perspective view showing a state in which the video image display part of a head mounted display device constituting a forty-fifth working configuration of the present invention has been pulled out to the use position.

Cylindrical projections 1233 are formed on the left and right side surfaces of the second outer packaging part 1232A, which is integrally formed on one end of the display arm 1020 (see FIG. 70).

Rectilinear cam grooves 1234 that engage with the projections 1233 are formed so that these cam grooves cross the optical axis in the inside surface of the first outer packaging part 1231A, which is supported on the outside surface of the second outer packaging part 1232A.

Moreover, a rack 1235 is formed on one end surface (on the left side in FIG. 67(b)) of the second outer packaging part 1232A. A pinion 236 which is disposed on the first outer packaging part 1231A engages with this rack 1235.

The shaft (not shown in the figures) of the pinion 1236 protrudes from the first outer packaging part 1231A. A knob (operating part) 1237 is attached to this shaft. Furthermore, a roulette pattern is formed on the knob 1237 in order to prevent slipping.

In addition, the position of the knob 1237 is not limited to the position shown by the solid line; this position may be the position indicated by the two-dot chain line (side surface on the opposite side), or may be a position on the undersurface of the second outer packaging part 1232A.

An operating mechanism is constructed from the projections 1233, cam grooves 1234, rack 1235, pinion 1236 and knob 1237.

Next, the operation of this operating mechanism will be described.

When the knob 1237 is operated, the rack 1235 engaged with the pinion 1236 moves upward or downward in accordance with the rotation of the knob 1237. Accordingly, the cam grooves 1234 also move upward or downward, so that the first outer packaging part 1231A moves in the direction of the optical axis.

Consequently, the display device part 131 can be moved in the direction of the optical axis along the optical lens part 132 by operating the knob 237.

Effects similar to those of the forty-first working configuration can be exhibited using this forty-third working configuration.

(Forty-Fourth Working Configuration)

Figure 68:
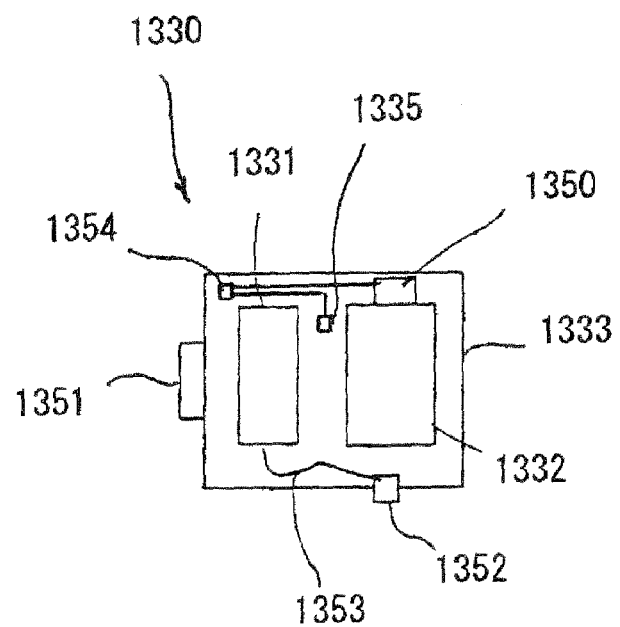
FIG. 68 is a block diagram showing the construction of the video image display part of a head mounted display device constituting a forty-fourth working configuration of the present invention.
Figure 69:
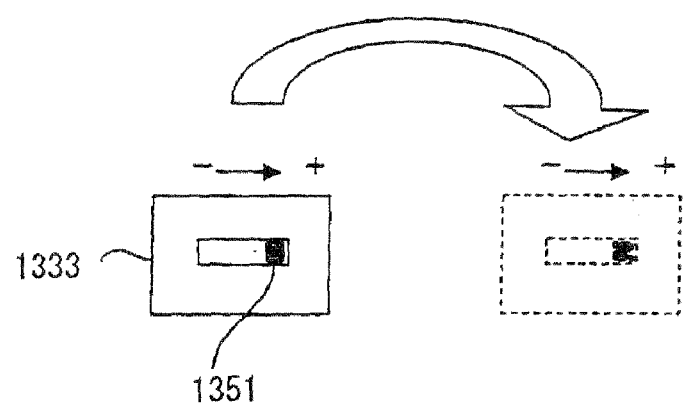
FIG. 69 is a view of the slide switch as seen from the front.

FIG. 68 is a block diagram showing the construction of the video display part of a head mounted display device constituting a forty-fourth working configuration of the present invention, and FIG. 69 is a view of the slide switch as seen from the front.

The video display part 1330 comprises a display device part 1331, an optical lens part 332, an outer packaging part 1333, an up-down detection sensor (detection sensor) 350, a slide switch (operating part) 1351, a connector 1352, a control part 1354, and a driving member 1355 that varies the gap between the display device part 1331 and the optical lens part 1332 by means of an electrical force.

Furthermore, the driving part 1355 comprises an actuator or the like which drives a mechanism that varies the gap between the display device part 1331 and optical lens part 1332 by means of a motor or the like (not shown in the figures) as in the first working configuration or second working configuration, and the gap between the display device part 1331 and optical lens part 1332 is varied in accordance with signals that are output from the control part 1354.

Moreover, the control part 1354 detects the switching state of the slide switch 1351, and causes this state to be reflected in the control of the driving part 1355.

The slide switch 1351 is disposed on the back surface of the outer packaging part 1333, and causes the display device part 1331 to move in the direction of the optical axis. In FIG. 69, for example, + indicates the direction that causes the display device part 1331 to move away from the optical lens part 1352, and − indicates the direction that causes the display device part 1331 to approach the optical lens part 1352.

The display device part 1331 and connector 1352 are electrically connected via a signal line 1353, and video signals, for example from a VCR (not shown in the figures), are sent to the display device part 1331 via the connector 1352. Furthermore, the signal line 1353 has a sufficient length to handle the movement of the display device part 1331.

The up-down detection sensor 1350 is fastened, for example, to the optical lens part 1332. As a result of being fastened to the outer packaging part 1333, the up-down detection sensor 1350 detects the up-down orientation of the display device part 1331, and outputs the detection results to the control part 1354. The control part functions as operating part switching means, and also causes the polarity of the slide switch 1351 to be reversed when it is detected on the basis of the output of the up-down detection sensor 1350 that the up-down relationship of the outer packaging part 1333 has been inverted.

Specifically, if the user causes the slide switch 351 to move in the same direction as that prior to the inversion of up and down even if the up-down relationship of the outer packaging part 1333 is inverted, then, even in cases where the slide switch with up and down inverted is operated with the same feel, the display device part 1331 will move in the same direction as that prior to the inversion of the up-down orientation of the outer packaging part 1333 (see FIG. 67).

In this forty-fourth working configuration, effects similar to those of the forty-first working configuration are manifested; furthermore, even in cases where the head mounted display device is mounted with its up-down orientation inverted, the operating direction of the slide switch 1351 is the same, so that the operability is improved.

(Forty-Fifth Working Configuration)

FIG. 70 is a perspective view showing a case in which the video display part of a head mounted display device constituting a forty-fifth working configuration of the present invention has been pulled out to the use position.

This working configuration is a head mounted display device having a configuration in which adjustment of the focus is performed without performing a manual operation. Here, a description will be given using a display device part 330 (see FIG. 68) having the construction shown in FIG. 68 as the display device part.

This head mounted display device comprises a rear arm 1100, a display arm 1020, a video display part 1330, and an accommodating part 1040.

The rear arm 1010 has a circular arc shape. The rear arm 1010 is mounted on the back part of the head of the user M, and both end parts of this rear arm are pressed against the side parts of the head of the user M with an appropriate force.

Speaker parts 1015 and 1016 that are mounted on the left and right ears of the user M are attached to either end part of the rear arm 1010.

The display arm 1020 is supported on one end of the rear arm 1010. Like the rear arm 1010, the display arm 1020 has a circular arc shape.

The video display part 1330 is supported on one end of the display arm 1020, and is disposed in front of the eye of the user M.

The accommodating part 1040 is disposed on the rear arm 1010, and accommodates the display arm 1020. Switches (operating parts) 1041 and 1042 that are used to cause the display device part 1331 (see FIG. 68) to move in the direction of the optical axis are disposed on the side surface of the rear arm 1010.

For example, the switch 1041 causes the display device part 1331 to move in such a direction that the display device part 1331 is separated from the optical lens part 1332. Furthermore, for example, the switch 1042 causes the display device part 1331 to move in such a direction that the display device part 1331 approaches the optical lens part 1332.

The switches 1041 and 1042 are connected to a control part (not shown in the figures), and when the switches 1041 and 1042 are pressed, the control part drives a driving circuit (not shown in the figures) so that the display device part 1331 is caused to move.

The driving circuit is constructed, for example, from a motor disposed in the video display part 1330, and a motor driver which is disposed in the accommodating part 1040, and which controls the current that is supplied to the motor by means of a control part.

Furthermore, since the visual acuity of the user M varies from individual to individual, and since the visual acuity also usually differs between the left and right eyes of the same user M, it would also be possible to devise the system so that (for example) the position where the focus is adjusted is stored in a memory (not shown in the figures), and the display device part 1331 is caused to move to the position stored in the memory when the switches 1041 and 1042 are pressed.

Moreover, it would also be possible to devise the system so that the position of the display device part 331 is stored beforehand in the memory for respective users, and a visual acuity adjustment is automatically performed in accordance with individual differences between users by recognizing the user in each case.

In addition, in the head mounted display device of the present working configuration, when video images are alternately viewed with the left and right eyes, the head mounted display device is turned upside down; accordingly, detection means that detects such vertical inversion of the display device part 1332 may be provided in this working configuration as well, and the system may be devised so that the display device part 1331 is moved in accordance with signals from this detection means.

Furthermore, there may be cases in which viewing is easier when the position to which the display device part 1331 is caused to move varies according to the distance between the video display part 330 and the eye E. Accordingly, the system may also be devised so that (for example) a displacement gauge (not shown in the figures) is disposed on the display arm 1020, the distance between the video display part 1330 and the eye E is monitored on the basis of the amount of displacement that is output by this displacement gauge, and the display device part 1331 is caused to move in accordance with the distance between the video display part 1330 and the eye E.

In this forty-fifth working configuration, effects similar to those of the forty-first working configuration can be exhibited; furthermore, the display device part 1331 can be caused to move simply by pressing the switches 1041 and 1042, so that the operability is improved.

(Forty-Six Working Configuration)

Figure 71:
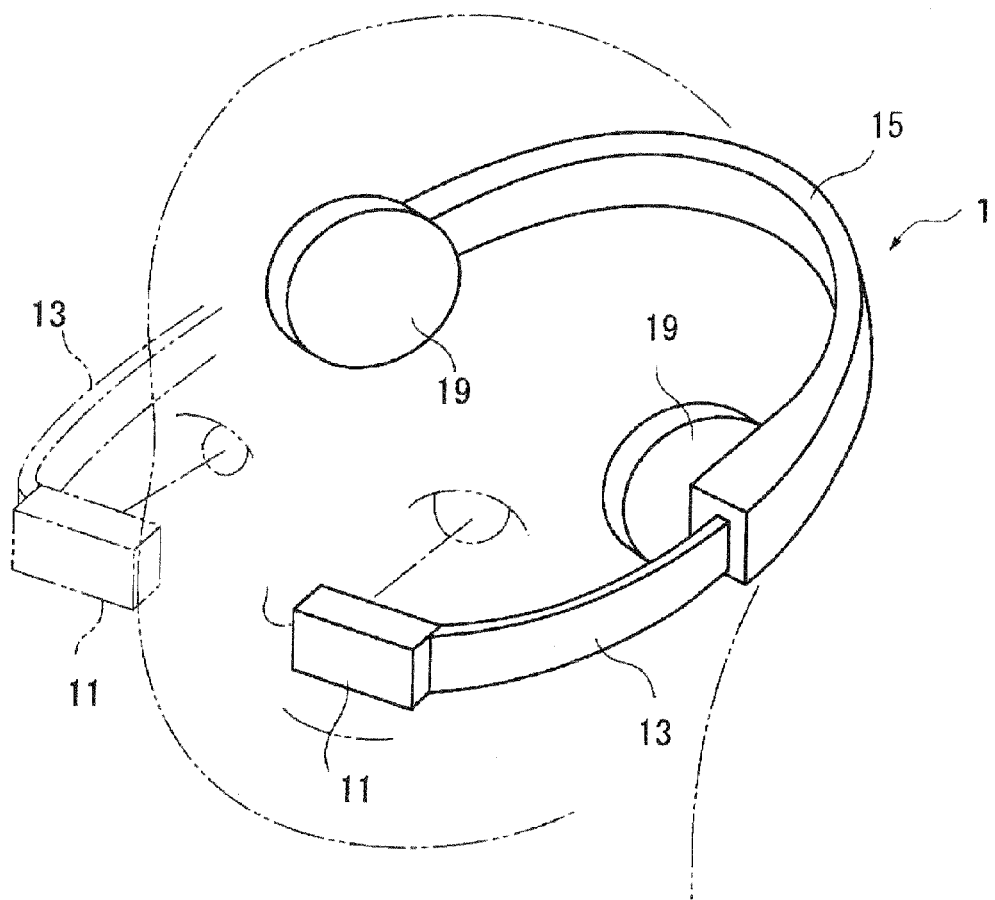
FIG. 71 is a schematic diagram showing how the portion of a head mounted display constituting a forty-sixth working configuration of the present invention that is mounted on the head is mounted on the head.

FIG. 71 is a schematic diagram showing how the portion of a head mounted display constituting a forty-sixth working configuration of the present invention that is mounted on the head (i.e., the head mounted display main body part) is mounted on the head. The head mounted display main body part 1 is constructed from the following main parts: a mounting part 15 which is mounted on the back part of the head, and which possesses elasticity so that the head is clamped, a supporting part 13 which is fitted into the mounting part 15 so that this supporting part 13 can emerge from and be retracted into the mounting part 15, a display part 11 which is attached to the tip end part of the supporting part 13, and which displays images, and left and right holding parts 19 which are attached to the mounting part 15. In the figure, the system is adjusted so that the display part 11 is positioned in front of the left eye (by adjusting the pull-out length of the supporting part 13); thus, the head mounted display is used on the left eye.

FIG. 72(a) is a plan view of this mounted state as seen from the top of the head.

A hollow part 15a is formed in the mounting part 15, and the supporting part 13 is fitted into this hollow part 15a, so that the supporting part 13 can move into and out of the hollow part 15a in the forward-rearward direction (upward-downward direction in FIG. 72(a)). As is shown by the two-dot chain line in FIG. 71, a supporting part 13 is also disposed on the right side (left side in FIG. 72(a)) of the hollow part 15a of the mounting part 15. However, in cases where the display part 11 is used on the left eye, this supporting part is retracted into the hollow part 2a of the mounting part 15 as shown in FIG. 72(a), so that the visual field of the right eye is not blocked.

FIG. 72(b) is a sectional view along line A-A in FIG. 72(a). Coupling pins 6 are coupled with the tip end part of the supporting part 13. Meanwhile, coupling holes 11a are formed in both the left and right sides of the display part 11. In the figures, coupling pins 16 are fitted into the coupling holes 11a on the right side (left side as seen from the face), so that the display part 111 and the supporting part 13 on the left side as seen from the face are coupled.

A switch part 17 is disposed on the tip end part of the supporting part 13, and is devised so that when the display part 11 is coupled, this can be detected. A proximity switch may be used as the switch part 17, or a limit switch whose contact part protrudes from the tip end of the supporting part 13 may be used. This switch part 17 determines whether the head mounted display is being used on the left eye or is being used on the right eye; the image display can be controlled accordingly.

Furthermore, in the figures, 20 indicates a brake that restricts the movement of the supporting part 13. For example, a part such as an electromagnetic brake is used as the brake 20. When positioning is performed, the brake 20 is released so that the supporting part 13 can move freely; then, after this positioning is completed, the brake 20 is applied so that the movement of the supporting part is restricted.

When the display part 11 is to be used on the right eye, the display part 11 is removed from the supporting part 13 on the left side as seen from the face (in the state shown in FIG. 72), and the supporting part 13 on the left side as seen from the face is retracted by being pushed into the mounting part 15. Then, the supporting part 13 on the right side as seen from the face is pulled out of the mounting part 15, and the coupling holes 11a of the display part 11 are engaged with the coupling pins 16 on the tip end part of the supporting part 13, so that these parts are coupled.

Furthermore, in this working configuration, the coupling holes 11a of the display part 11 are formed in the left and right sides of the display part 11. Accordingly, the coupling holes 11a on the left side of the figure (right side as seen from the face) can be used in this case. However, in cases where coupling holes 11a are formed only in one side of the display part 11, the system is devised so that the parts are coupled by turning the display part 11 upside down in a 180-degree rotation in the leftward or rightward direction.

In the present working configuration, both when the head mounted display main body part is used on the left eye and when this main body part is used on the right eye, there is nothing blocking the visual field of the eye on the opposite side; accordingly, there is no bothersome feeling.

(Forty-Seventh Working Configuration)

FIG. 73 is a schematic diagram (plan view) showing the mounted state in a case where the main body part of a head mounted display constituting a forty-seventh working configuration of the present invention is mounted on the head. The perspective view of the mounted state is the same as that shown in FIG. 71.

In this working configuration, only a single supporting part 13 is installed. Accordingly, in order to change from a state in which the device is used on the left eye as shown in FIG. 73(a) to a state in which the device is used on the right eye as shown in FIG. 73(b), the supporting part 13 is pulled out of the hollow part 15a of the mounting part 15, inverted by being rotated 180 degrees in the left-right direction, inserted into the hollow part 15a on the right side of the face, and used. Here, in cases where coupling holes 4a are formed in both sides of the display part 11, the orientation of the image can be maintained as the original orientation by reattaching only the display part 11 to the supporting part 13 without inverting this display part 180 degrees.

In the present working configuration as well, there is nothing blocking the visual field of the eye on the opposite side, either when the head mounted display main body is used on the left eye, or when this head mounted display main body is used on the right eye; accordingly, there is no bothersome feeling.

Furthermore, when use is temporarily interrupted during use on the left eye or use on the right eye, blocking of the visual field by the display part 11 can be prevented by pushing the supporting part 13 into the hollow part 15a of the mounting part 15 as indicated by the arrow in the figures.

(Forty-Eighth Working Configuration)

FIG. 74 is a schematic diagram showing the mounted state in a case where the main body part of a head mounted display constituting a forty-eighth working configuration of the present invention is mounted on the head. The perspective view of the mounted state is substantially the same as that shown in FIG. 71.

In this working configuration, one display part 11 each is provided for use on the left eye and use on the right eye, and these display parts 11 are attached to both end parts of the supporting part 13. The state shown in FIG. 74(a) is a state in which the display part 11 for use on the left eye is being used. If the supporting part 13 is moved from this state in the direction indicated by the arrow, then the state shown in FIG. 74(b) is produced, so that the display part 11 for use on the right eye can be used.

In the present working configuration as well, there is nothing blocking the visual field of the eye on the opposite side, either when the head mounted display main body is used on the left eye, or when this head mounted display main body is used on the right eye; accordingly, there is no bothersome feeling.

Furthermore, in the head mounted display main body part shown in FIG. 74, the display parts 11 are respectively mounted on both sides of the supporting part 13. However, it would also be possible, for example, to make these display parts 11 removable from the supporting part 13 as shown in FIG. 72, and to attach one of these display parts 11 to the left or right tip end part of the supporting part 13.

Moreover, in the working configuration shown in FIG. 74, if a mechanism is attached which detects that either the left or right side of the supporting part 13 has jumped out of the mounting part 15 beyond a specified distance, then it can be discriminated whether the head mounted display is being used on the left eye or being used on the right eye. Such a detector can easily be realized, for example, by using a proximity switch.

(Forty-Ninth Working Configuration)

FIG. 36 is a schematic diagram showing the mounted state in a case where the main body part of a head mounted display constituting a forty-ninth working configuration of the present invention is mounted on the head. FIG. 36(a) is a perspective view, and FIG. 36(b) is a plan view as seen from the top of the head. The perspective view of the mounted state is the same as that shown in FIG. 71.

As is seen from a comparison of FIG. 72(a) and FIG. 36(b), the hollow part 2a of the mounting part 15 does not reach as far as the rear part of the mounting part 15 in the working configuration shown in FIG. 36, and has only a depth that is sufficient for the insertion of the supporting part 13. Furthermore, the display part 11 is not made to be removable from the supporting part 13, and is formed as an integral part of the supporting part 13.

A switch 94 is disposed in the deep inside part of the hollow part 15a; the fact that the supporting part 13 is attached can be detected by the contact of the contact part 94a of this switch with the supporting part 13. It is ascertained by means of this switch whether the head mounted display is being used on the left eye or being used on the right eye, and the image display can be controlled accordingly.

In cases where the display part 11 is to be used on the right eye, this can be accomplished by an operation in which the supporting part 13 is pulled out of the mounting part 15 (in the state shown in the figure), turned upside down by a 180-degree rotation in the left-right direction, and inserted into the hollow part 15a of the mounting part 15 on the right side as seen from the face.

In the present working configuration as well, there is nothing blocking the visual field of the eye on the opposite side, either when the head mounted display main body is used on the left eye, or when this head mounted display main body is used on the right eye; accordingly, there is no bothersome feeling.

(Fiftieth Working Configuration)

Figure 75:
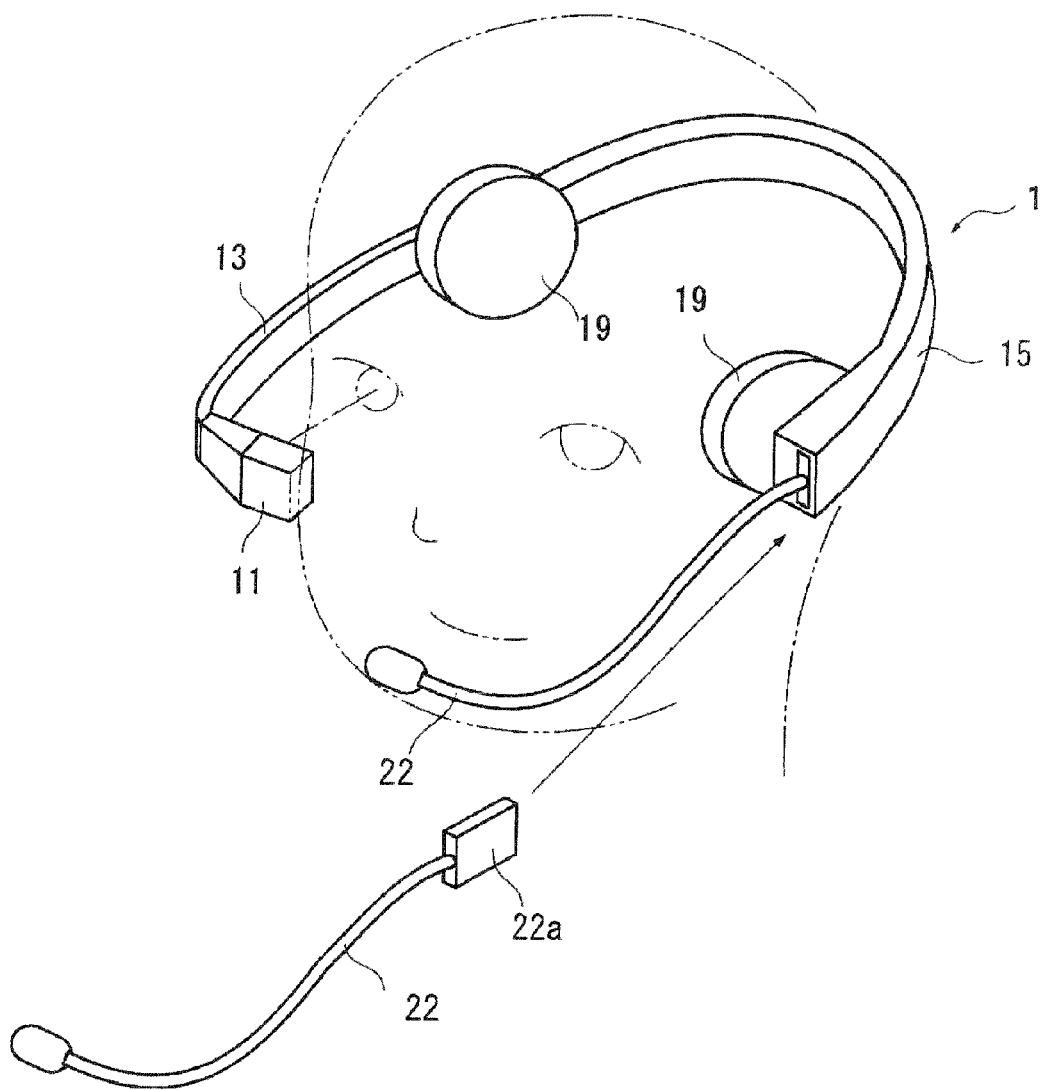
FIG. 75 is schematic diagram showing the mounted state in a case where the main body part of a head mounted display constituting a fiftieth working configuration of the present invention is mounted on the head.

FIG. 75 is a schematic diagram showing the mounted state in a case where the main body part of a head mounted display constituting a fiftieth working configuration of the present invention is mounted on the head. The constructions of the mounting part 15 and holding parts 19 in this working configuration are the same as in the working configuration shown in FIG. 36. The figure shows a state in which the display part 11 is being used on the right eye. In this working configuration, a microphone 22 is attached using the open hollow part 15a of the mounting part 15 on the left side of the face.

Specifically, a plug part 22a is attached to the microphone 22, and the microphone 22 is fastened to the mounting part 15 by inserting this plug part 22a into the hollow part 15a of the mounting part 15. The figure shows a state in which the display part 11 is being used on the right eye; however, in cases where the display part 11 is to be used on the left eye, it goes without saying that the supporting part 13 is attached to the hollow part 15a on the left side of the face, and the microphone 12 is attached to the hollow part 15a on the left side of the face.

In the present working configuration as well, there is nothing blocking the visual field of the eye on the opposite side, either when the head mounted display main body is used on the left eye, or when this head mounted display main body is used on the right eye; accordingly, there is no bothersome feeling.

(Fifty-First Working Configuration)

Figure 76:
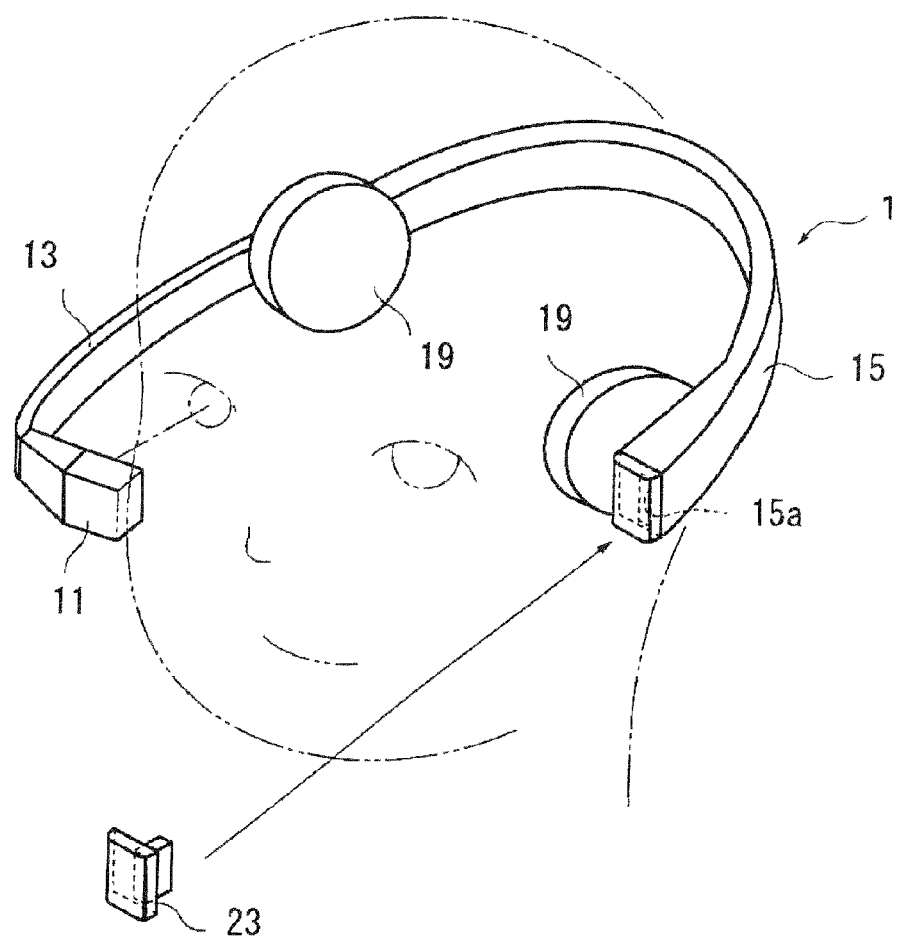
FIG. 76 is a schematic diagram showing the mounted state in a case where the main body part of a head mounted display constituting a fifty-first working configuration of the present invention is mounted on the head.

FIG. 76 is a schematic diagram showing the mounted state in a case where the main body part of a head mounted display constituting a fifty-first working configuration of the present invention is mounted on the head. The constructions of the mounting part 15 and holding parts 19 in this working configuration are the same as in the working configuration shown in FIG. 36. The figure shows a state in which the display part 11 is being used on the right eye. In this working configuration, a cap 23 is inserted into the open hollow part 15a of the mounting part 15 on the left side of the face, so that this hollow part 15a is covered. In this way, it is possible to prevent dust or the like from entering the open hollow part 15a.

What is claimed is:

1. A head mounted display comprising:
    a display part for displaying images to a wearer, the display part including a two-dimensional display element and an ocular optical system that forms a false image corresponding to a display screen of the two-dimensional display element, wherein the display part controls image data that is displayed on the two-dimensional display element in accordance with a positional relationship between the two-dimensional display element and the wearer,
    a mounting part which holds the display part and which is mountable on the wearer in a position other than a position in front of the face of the wearer, wherein the mounting part mounts the display part on the head of the wearer so that a position where the false image is formed is substantially in front of an eye of the wearer,
    a circuit part which displays images on the display screen of the two-dimensional display element, and which is configured to alter a display magnification rate of the images on the display screen,
    an adjustment mechanism for adjusting a positional relationship between the eve of the wearer and the display part, wherein the adjustment mechanism is disposed in the mounting part, and
    a measurement unit, which is provided on the display part, for measuring a distance between the eye of the wearer and the display part to acquire data relating to a variation in the distance,
    wherein the circuit part alters the display magnification rate in accordance with the data acquired by the measurement unit.

2. The head mounted display according to claim 1, further comprising an input unit for inputting instructions from the wearer, wherein the circuit part alters the display magnification rate in accordance with the instructions that are input via the input unit.

3. The head mounted display according to claim 1, further comprising:
    a driving unit for causing displacement of a distance between the two-dimensional display element and the ocular optical system in relative terms, a storage unit for storing information relating to the distance between the two-dimensional display element and the ocular optical system, and a control unit for controlling the driving unit based on the information relating to the distance between the two-dimensional display element and the ocular optical system stored in the storage unit.

4. The head mounted display according to claim 3, further comprising a detection unit for detecting an up and down in the display part, and wherein, in accordance with an output of the detection unit, the control unit obtains information relating to the distance between the two-dimensional display element and the ocular optical system stored in the storage unit, and sets the driving unit.

5. The head mounted display according to claim 4, further comprising a setting unit for setting the distance between the two-dimensional display element and the ocular optical system, and wherein, in accordance with an output of the setting unit, the control unit obtains information relating to the distance between the two-dimensional display element and the ocular optical system stored in the storage unit, and sets the driving unit.

6. The head mounted display according to claim 3, further comprising a setting unit for setting the distance between the two-dimensional display element and the ocular optical system, and wherein, in accordance with an output of the setting unit, the control unit obtains information relating to the distance between the two-dimensional display element and the ocular optical system stored in the storage unit, and sets the driving unit.

7. The head mounted display according to claim 1, wherein the mounting part directly holds the display part.

8. The head mounted display according to claim 1, wherein the mounting part indirectly holds the display part.

9. The head mounted display according to claim 1, wherein the display part further includes:

a display device part which includes the two-dimensional display element and a first holding frame that holds the two-dimensional display element, and an optical lens part which includes the ocular optical system that forms the false image corresponding to the display screen of the two-dimensional display element, and a second holding frame that holds the ocular optical system, wherein the first holding frame is supported on the second holding frame such that the first holding frame can move in a direction of an optical axis of the ocular optical system.

* * * * *